US005835102A

United States Patent [19]

Monroe, III et al.

[11] Patent Number: 5,835,102

[45] Date of Patent: Nov. 10, 1998

[54] SYSTEM FOR TRANSMISSION AND RECOVERY OF DIGITAL DATA USING VIDEO GRAPHICS DISPLAY PROCESSOR AND METHOD OF OPERATION THEREOF

[75] Inventors: John W. Monroe, III, Flint Hill; John J. Smith, Manassas; Stephen C. Kenyon, Fairfax; Michael E. Anderson, Herndon, all of Va.

[73] Assignee: Sparta, Inc., McLean, Va.

[21] Appl. No.: 545,508

[22] Filed: Oct. 19, 1995

[51] Int. Cl.[6] .......... G09G 5/00

[52] U.S. Cl. .......... 345/507; 345/508

[58] Field of Search .......... 395/501, 507, 395/508; 345/201, 185, 203, 507, 508

[56] References Cited

U.S. PATENT DOCUMENTS

| | | | |
|---|---|---|---|
| 4,513,392 | 4/1985 | Shenk | 364/900 |
| 4,755,937 | 7/1988 | Glier | 364/200 |
| 4,811,281 | 3/1989 | Okamoto et al. | 364/900 |
| 4,860,246 | 8/1989 | Inoue | 364/900 |
| 5,265,218 | 11/1993 | Testa et al. | 395/325 |
| 5,303,363 | 4/1994 | Beraducci | 395/425 |
| 5,305,438 | 4/1994 | MacKay et al. | 395/164 |
| 5,313,586 | 5/1994 | Rutman | 395/275 |
| 5,325,488 | 6/1994 | Carteau et al. | 395/275 |
| 5,608,424 | 3/1997 | Takahashi et al. | 345/141 |

OTHER PUBLICATIONS

Winn L. Rosch, The Hardware Bible, 3rd Edition, 1994, pp. 690–693 and 744–745.

*Primary Examiner*—Matthew Luu

*Attorney, Agent, or Firm*—Antonelli, Terry, Stout & Kraus, LLP

[57] ABSTRACT

A system (30) for outputting digital data stored in a memory of a computer (12) in accordance with the invention includes a graphics display processor (20), coupled to the memory, for processing the digital data stored in the memory to produce at least one serial data stream including clock information, which is a function of a clock signal representative of a rate at which the at least one display formatted serial data stream is outputted, and display information for use in controlling a video monitor; a video channel (24), coupled to the display processor, for outputting the at least one serial data stream produced by the graphics display processor; a data processing memory (52); and a data processing system (40, 44 and 50) for processing the at least one serial data stream in response to the clock information and for removing at least the display information and controlling storing of the at least one of the at least one serial data stream with the display information removed which contains the digital data read from the memory of the computer system.

43 Claims, 43 Drawing Sheets

SYSTEM FOR TRANSMISSION AND RECOVERY OF DIGITAL DATA USING VIDEO GRAPHICS DISPLAY PROCESSOR AND METHOD OF OPERATION THEREOF

TECHNICAL FIELD

The invention relates to a system and method for using a video graphics display processor associated with a processor, such as a PC, to achieve high speed digital data transfer to an external device such as for purposes of backup of memory of the processor.

BACKGROUND ART

FIG. 1 illustrates a block diagram of a computing system 10 including associated hardware for providing graphics display capability. The computing system 10 may be a personal computer. Communications in the system are transmitted on bus 11 between the hardware elements described below. The system 10 includes a CPU 12. A disk controller 13 is coupled to bus 11 and to hard drive 14 and floppy disk drive 15. The memory space further includes a dynamic random access memory 16 which is also connected to the bus 11 and which provides high speed reading and writing of data to support data processing performed by the system 10. The memory space is used for diverse functions as known in the art. The hard drive 14 has a much larger storage capacity than the floppy disk 15 and because of its capacity, a substantial time is required for its back up because of the absence of a high speed data port which is available for restoration of the memory space therein. The floppy disk memory 15 is the widely used floppy disk memory for storing information which is processed in accordance with the myriad of functions conventionally performed by the CPU 12. Associated with CPU 12 is a graphics adaptor card 18 which is coupled to bus 11 and which is bidirectionally connected to a video random access memory 19. The video random access memory is also connected to a graphics display processor 20 which continually reads data to be displayed from the video random access memory and formats information for display by a video monitor 22. As is indicated on the video channel 24 by the notation "N", the output from the graphics display processor 20, which is connected to the video monitor 22, is N bits wide which is indicative of the number of bits to produce a color display of a selected number of colors in a color palate encoded by N parallel bits on the N lines of the output 24. The video channel 24 is representative of typically 8 or 24 parallel lines each of which transmits a bit in a word which commands the color encoded by the word to be displayed by the video monitor 22 for each pixel of display data stored in the frame buffer of the video random access memory 19.

The video random access memory 19 functions as a dual ported memory coupled to the bus and graphics display processor which permits the CPU 12 to control writing of information stored in the memory space of the CPU such as that stored in the hard drive 14 while the graphics display processor 20 is retrieving information from the video random access memory for purposes of formatting with appropriate video synchronization information for display by the video monitor 22.

Typically, the graphics display processor is programmed to operate in a graphics mode. For example, the VGA 640×480 graphics mode contains a data space of 480 rows (scan lines). Each of the scan lines contains 640 bits (pixels) of information. Each pixel further is displayed with a programmable color specified by the value of the N bits which are outputted by the N parallel lines of the video channel 24. Thus, the video channel 24 can be thought of as transmitting N serial information streams each having a bit value of zero or one which bit values are combined to command the color of display of each pixel displayed by the video monitor 22.

The graphics display processor 20 has first and second frame buffers which function to store information which is outputted by the video random access memory 19 to one of the frame buffers while the other of the frame buffers is driving the display of the video monitor 22 through the outputting of the display formatted data on the video channel 24.

Standard non-interlaced monitors 22 typically refresh data at rates of 60–72 frames. Thus, each serial data stream of the N serial data streams outputted by the video channel 24 has a data rate of approximately 20 megabits per second or more.

The use of the graphics display processor 20 to send display data to the video monitor 22 over a video channel 24 has been well known for many years. The representation of a video image to be displayed on the video monitor 22 is created by the CPU 12 controlling the writing of the data pattern into the video random access memory 19 where it is read by the graphics display processor 20. The CPU 12 creates proper patterns for display from the address space of system memory including data stored in the hard drive 14 and the bootable backup floppy disk memory 15. The graphics display processor 20 repeatedly scans the video random access memory 19 and processes the pattern of information stored and readout from the frame buffer of the video random access memory into the series of data streams having N parallel bits which are outputted on the video channel 24 to produce color pixels of N bit resolution on the video monitor 22. The video monitor 22 displays the graphical or textual data which has been stored in the memory space of the system 10 and processed by the video random access memory 19 and graphics display processor 20 into a format suitable for display.

Graphics display processors 20 support a variety of video formats. Well defined protocols are known for programming these known variety of video formats.

Currently, the graphics display processor 20 has been developed to perform the single purpose of displaying the data stored in the memory space of the CPU 12 and converting it into a suitable display format for display on the video monitor 22 by the operations performed by the video random access memory 19 and the graphics display processor. The extremely high data rates which are necessary to drive the display of the video monitor 22 at frame rates which are typically, as explained above, between 60 and 72 frames per second have not been applied to other applications which use the video channel 24 as a high speed data output device.

The use of backup procedures to replicate and safeguard information stored in the internal hard drive have become more and more important as the storage capacity of hard drives has rapidly expanded in the last few years. The speed at which backup may be accomplished is a critical factor. As memory drives become larger, the time required to backup the internal hard drive increases. The increased time discourages users from performing backup of the hard drive on a regular basis. PCs having large internal hard drives and PCs not supporting high-speed I/O devices present a particular problem. Today's laptops with large internal drives are good examples of where backup of data is a problem since the backing up of the stored data must be done either via the parallel or serial port which is present on the PC.

Currently, rapid backup of computer disk information requires the use of internal hardware devices capable of transferring information from the computer's data bus to an external storage device in a compressed or otherwise proprietary format. The most popular techniques available in the order of increasing transfer rates include the following:

(1) Serial communication ports

Serial communication ports typically can transfer data at speeds up to 11.5 K/Bytes per second. Serial ports are included on all PCs, are bidirectional and can be used for both backup and restore operations.

(2) Parallel communication ports

Parallel ports can transfer data at up to 30 K-Bytes per second. Occasionally, some input capability exists, but at much slower speeds dependent on the PC manufacturer's design. Generally, these ports are included on all PCs. Newer designs using parallel integrated circuits allow bidirectional data flow and at higher rates than their predecessors.

(3) Floppy disk drives

Usually, PCs come with at least one floppy disk drive. These devices will support a continuous transfer rate of about 45 K-Bytes per second for large data sets. The practical transfer rate is limited by mechanical track-to-track access times and the fact that the media needs to be manually changed about after a megabyte has been written. Floppy drives are bidirectional and can be used for both backup and restore purposes.

(4) Floppy/hard disk controllers

Most PCs come with a disk controller capable of supporting both floppy and hard disk drives. The floppy drive controller can support about 300–500 K-Bytes per second in short bursts but not for continuous periods. The controller is limited by a 16-bit byte count register which requires reloading after 64 K-Bytes have been transferred. The disk controllers are bidirectional and can be used for both backup and restoration.

(5) External or internal magnetic data cartridges

Today, the most popular backup devices use a magnetic data cartridge. These devices either use the PC's floppy disk controller or a separate external or internal interface controller. These devices can maintain about 500 K-Bytes per second without compression or about 1 M-Bytes per second when using compression techniques. These devices are typically optional equipment and cost approximately $200 for 250 K-Byte of backup capability. Both backup and restore are provided with many options for individual and group file selections available. The problem for many PCs, including laptops and palmtops, is that there is no internal space to hold the extra drive and no external connector to allow connection to an external drive.

(6) External or internal disk drives

Occasionally, users will install a second hard drive for the purpose of backing up or replicating data sets. This is the fastest backup technique available today and whenever it is possible, sustained transfer rates in excess 500 K-Bytes per second are easily accomplished.

DISCLOSURE OF INVENTION

The present invention is a process for outputting digital data stored in memory space of a computer having a graphics display processor and further, a system for outputting digital data stored in the memory space of a computer which utilizes the graphics display processor to format data originally stored in the computer memory space to produce at least one serial data stream including the digital data stored in the memory space of the computer and clock information which is a function of a clock signal representative of a rate at which at least one serial data stream is outputted by a video channel associated with the graphics display processor for displaying information formatted for display on a video monitor. With the invention, the high data transfer rates on the video channel which are produced by the graphics display processor for displaying display formatted information with a video monitor are used to output information which is not for display purposes, such as, but not limited to, providing information from the computer memory space for processing in a format to provide restoration of the data stored in the hard drive of the computer memory space to perform backup thereof.

The present invention has substantial advantages over the prior art as discussed above as follows. The invention utilizes a graphics display processor to transfer digital data originally stored in the computer memory space to an external device where the data may be processed for diverse applications. The present invention uses the architecture of a conventional computer system, such as a PC, and does not require any additional cost for additional hardware as a consequence of graphics display processors being standard equipment on virtually all PCs. No additional internal hardware is required to perform backup of the CPU memory in accordance with the present invention. No disassembly of the PC is required other than the possible disconnection of the monitor cable. PC backup and restore programs can be stored on a bootable, low-density floppy or other device, such as a PCMCIA card. Co-processor support is not required by a backup program for restoring data of the CPU. Less than 256 K-Bytes of internal CPU memory is used. The backup and recovery of files on a hard drive is possible using the present invention even if the system will not boot from the drive. Furthermore, recovery is possible from damaged boot sectors. The backing up of the memory space of the CPU is easy to use in that all that is required is the insertion of a floppy disk and the turning of the power on. No knowledge is required of the particular type of PC disk controller in use or the encoding format employed by the controller. The only system BIOS disk service used is the "read logical disk sectors" which is provided by all PC BIOS integrated circuits and is not dependent on the operating system. No knowledge of the operating system is required. High sustained data transfer rates such as 921.6 KBytes per second using 60 Hz VGA graphics display formats are possible. A single DOS backup program can be utilized for all Intel-based PCs. The present invention is extendible to systems using microprocessors other than those manufactured by Intel with the interface to the graphics display processors of non-Intel manufactured processors being almost identical to that of Intel-based graphics display processors. The present invention is not dependent upon the memory drive or speed with the invention being based on the video data display rates rather than the speed of an individual CPU or disk drive. As a result, the dual increase of video rates and the speed of the graphics display processors which is ongoing will not obsolete the present invention. The present invention is especially applicable to backup procedures for replicating and safeguarding information contained on PCs which have large internal hard drives and PCs which do not have high-speeds I/O devices built in, such as today's laptops, which have large internal drives. For example, a 340 M-Byte hard disk may be backed up in under seven minutes using the aforementioned 921.6 K-Bytes per second rate. In accordance with the invention, more information may be backed up than with currently available techniques such as disk partition, boot, and FAT sectors, as well as the deleted files are preserved in the backup copy in addition to all of the normal files. The present invention does not depend on the CPU's operating system or the make or model of the graphics display processor or hard drive in the CPU. In large network installations where giga-bytes of storage are involved, the backup process is generally automated, but can take many hours to perform. The present invention can reduce the time required for backup even in large computer systems of this type.

A processor for outputting digital data stored in a memory of a computer having a graphics display processor in accordance with the invention includes reading digital data from the memory and processing the digital data to produce at least one serial data stream with the at least one serial data stream including the digital data and clock information, the clock information being a function of a clock signal representative of a rate at which the at least one serial data stream is outputted by a video channel; and serially outputting the at least one serial data stream on the video channel under the control of the graphics processor. The at least one serial data stream also includes display information which permits the at least one serial data stream to be displayed by a video monitor connectable to the video channel; processing at least one of the at least one serial data stream after outputting by the video channel to remove the display information from the processed at least one serial data stream; and producing the clock signal representative of a bit rate at which the at least one serial data stream is outputted by the video channel in response to the clock information in the one of the at least one serial data stream. One of the at least one serial data stream contains the clock signal and the display information and another of the at least one serial data stream contains the digital data and the display information or one of the at least one serial data stream includes the digital data with at least a portion of the one of the at least one serial data stream being encoded with self-clocking information which permits the clock signal representative of a rate at which the one of the at least one serial data stream is outputted by the video channel to be derived from processing at least the portion of the one of the at least one serial data stream outputted from the video channel. The invention further includes processing the one of the at least one serial data stream to remove the self-clocking information. The processing the one of the at least one serial data stream to remove the self-clocking information includes converting the one of the at least one serial data stream into parallel digital data having a number of bits corresponding to a number of bits stored at each addressable location of the memory from which the digital data was read.

The at least one serial data stream is outputted in frames formatted for video display, each frame having a set number of lines with each line having bits disposed between periodically occurring horizontal synchronization information with at least a group of bits in each line being encoded with the self-clocking information; the frames are outputted under control of the graphics display processor on the video channel and stored in another memory; and the frames stored in the another memory are read out from the another memory in response to detection of storing the set number of lines in the another memory. Each frame is stored in one of a first and a second frame buffer of the another memory while another frame is being read out of another of the first and second frame buffer with sequential frames stored in the another memory being read out alternatively from the first and second frame buffers during storing of sequential frames outputted on the video channel. The frames read out from the another memory in response to detection of the storing of the set number of lines in the another memory are stored in a memory of a processing system in response to an interrupt signal produced in response to the detection of the storing of the set number of lines in the another memory.

The at least one serial data stream comprises a sequence of frames with each frame being serially read out as a series of lines under control of the graphics display processor, each line being formatted into a packet, including the clock information comprising a sync field for producing the clock signal, a scan line field for encoding an address of each line within each frame, a trigger field for encoding a number of a frame within the sequence of frames being outputted on the video channel, and a data field containing data from the block of digital data; and wherein each frame is transmitted with a vertical synchronization pulse and a horizontal synchronization pulse is transmitted with each line. The sync field is processed to produce the clock signal; and the sequence of frames are processed with a clock signal to remove the clock information and to convert each packet into parallel information formatted into groups of bits with each group of bits being equal in number to a number of bits stored at each addressable location in the memory from which the block of digital data was read. The sequence of frames is stored in another memory having first and second frame buffers; and when the trigger field changes in magnitude by one indicating storing of a complete frame from one of the sequence of frames in one of the frame buffers of the another memory, the complete frame is read out from the one of the first and second frame buffers and storing of a subsequent one of the frames is begun in another of the first and second frame buffers while the complete frame is being read out. An interrupt is produced in response to the change in magnitude of the trigger field by one; and the interrupt is received by a processing system which initiates storing of the frame read out from the one of the first and second frame buffers in response to the interrupt in a memory of the processing system. The memory of the processing system has first and second processing system frame buffers and the first and second processing system frame buffers store a sequence of frames in response to the interrupt to cause each of the first and second processing frame buffers to alternatively store a frame. The one serial data stream comprises a sequence of frames with each frame being serially read out as a series of lines under control of the graphics display processor; each frame is processed to remove the self-clocking information while retaining the digital data; the processed frames are stored in a backup memory; and the frames stored in the backup memory are read back into the memory of the computer to restore the digital data originally stored in the memory of the computer.

A system for outputting digital data stored in a memory of a computer in accordance with the invention includes a graphics display processor, coupled to the memory, for processing the digital data stored in the memory to produce at least one serial data stream including clock information, which is a function of a clock signal representative of a rate at which the at least one display formatted serial data stream is outputted, and display information for use in controlling a video monitor; a video channel, coupled to the display processor, for outputting the at least one serial data stream produced by the graphics display processor; a data processor memory; and a data processing system, coupled to the video channel and to the data processor memory, for processing the at least one serial data stream in response to the clock information and for removing at least the display information and controlling storing of the at least one of the at least one serial data stream with display information removed in the data processing memory which contains the digital data read from the memory of the computer system. One of the at least one serial data streams contain the clock signal and display information and another of the at least one serial data stream contains the digital data and the display information or one of the at least one serial data stream includes the digital data with at least a portion of the one of the at least one serial data stream being encoded with self-clocking information which permits the clock signal representative of a rate at which the one of the at least one serial data stream is outputted by the video channel to be derived from processing the portion of the one of the at least one serial data stream outputted by the video channel. The invention further includes a storage processor memory; and a storage processor, coupled to the data processing system and to the storage processor memory, for controlling storing of data read from the memory of the data processing system in the storage processor memory in response to the data processing system memory storing a data block of set size. The set size is a full frame of information formatted by the graphics display processor for display by the video monitor. The at least one serial data stream encoded with self-clocking information comprises frames having a set number of lines and bits disposed between periodically occurring horizontal synchronization information with at least a group of bits in each line being encoded with the self-clocking information. Each line is formatted into a packet including a sync field for use in detecting the clock signal and a data field containing the digital data stored in the memory of the computer; and the data processing system comprises a clock, responsive to the sync field, for producing the clock signal and a data separator, responsive to the clock signal and the lines, for removing the self-clocking information and converting the lines into parallel digital data having a number of bits equal to a number of bits stored at each addressable location of the memory of the computer. Each packet further includes a scan line field for encoding an address of each line within each frame and a trigger bit field for encoding a number of a frame within a sequence of frames outputted by the video channel; and each frame is outputted with a vertical synchronization pulse transmitted with each frame at a horizontal synchronization pulse transmitted with each line. The data processing system memory comprises first and second frame buffers; and wherein when the trigger field changes in magnitude by one indicating storing of a complete frame from one of the sequence of frames in one of the frame buffers of the data processing system memory, the data processing system causes the complete frame to be read out from one of the first and second frame buffers and controls storing of another one of the frames and another of the first and second frame buffers of the data processing system memory. The data processing system produces an interrupt in response to the change in magnitude of the trigger field by one; and in response to reception of the interrupt from the data processor, the storage processor initiates storing of a frame read out from the one of the first and second frame buffers of the data processing system memory in the storage processor memory. The storage processor memory comprises first and second frame buffers, each storage processor frame buffer storing a frame in response to the reception of the interrupt from the data processing system with the storage processor first and second frame buffers alternatively storing and outputting a frame. The storage processor memory is a backup memory and the storage processor writes frames stored in the storage processor back into the memory of the computer to restore the original digital data.

A system for outputting digital data stored in a memory of the computer in accordance with the invention includes a graphics display processor, coupled to the memory, for processing the digital data stored in the memory to produce at least one serial data stream including the digital data and the clock information which is a function of a clock signal representative of a rate at which at least one serial data stream is outputted; and a video channel, coupled to the display processor, for outputting the at least one serial data stream produced by the graphics display processor. The clock information comprises at least a portion of one of the at least one serial data stream encoded with self-clocking information which permits the clock signal to be derived from processing at least the portion of one of the at least one serial data stream. The at least one serial data stream further comprises display information for use in controlling a video monitor.

BRIEF DESCRIPTION OF THE DRAWINGS

Like reference numerals identify like parts throughout the drawings.

BEST MODE FOR CARRYING OUT THE INVENTION

Figure 1:
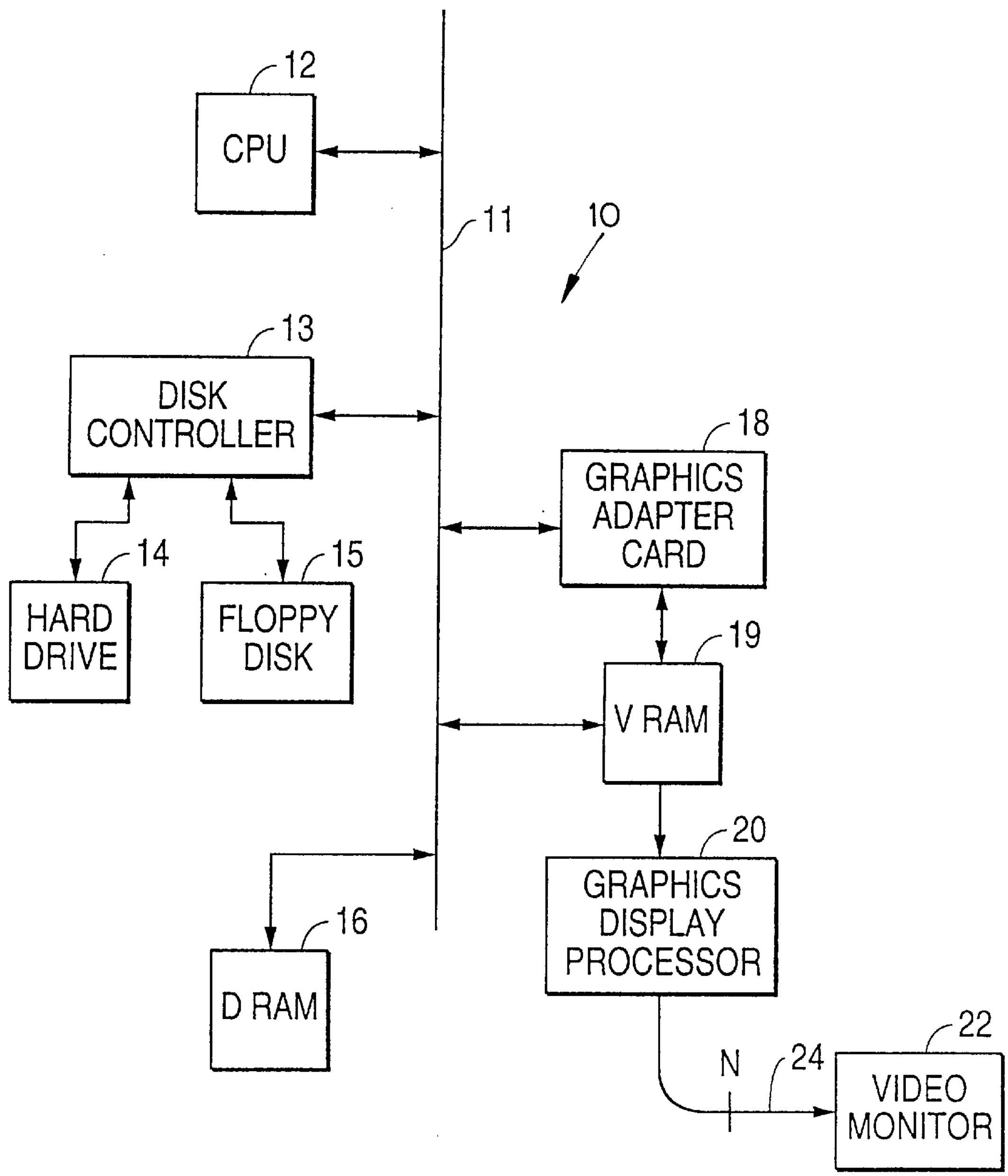
FIG. 1 is a block diagram of a prior art personal computing system including a graphics display processor.
Figure 2:
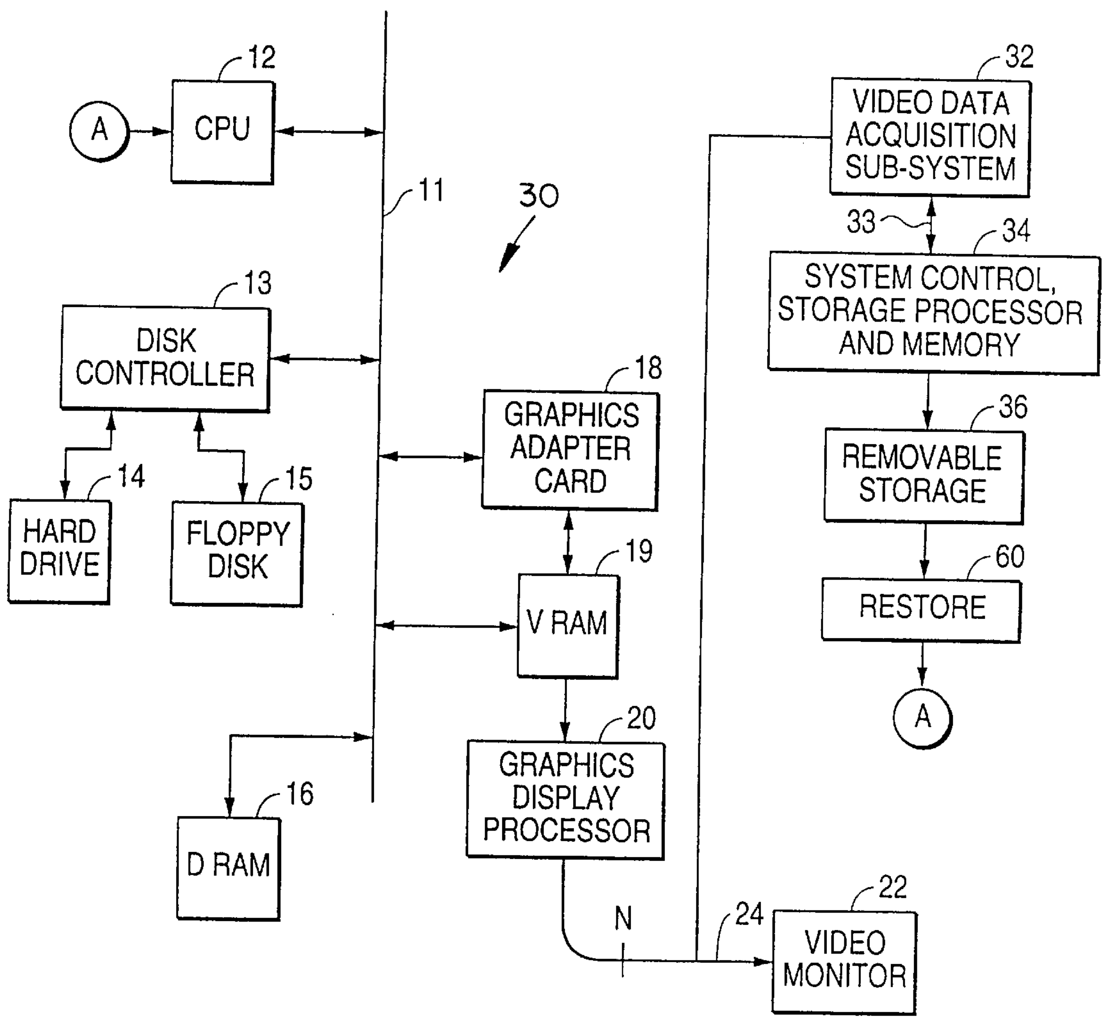
FIG. 2 is a block diagram of an embodiment of the present invention.

FIG. 2 illustrates a block diagram of an embodiment 30 of the present invention. The hardware of the CPU 12, disk controller 13, hard drive 14, floppy disk drive 14, dynamic random access memory 16, graphics adaptor card 18, video random access memory 19, graphics display processor 20, video monitor 22 and video output channel 24 having N parallel lines are identical to the prior art described above in conjunction with FIG. 1. The present invention differs from the prior art in that it utilizes the high speed data outputting capacity of the video channel 24 to process and output at least one serial digital data stream comprised of data stored in the memory space associated with the CPU 12 for applications other than driving a video monitor 22, such as, but not limited to, restoration of data stored within the memory space of the CPU whether in the internal hard drive and/or in the floppy disk drive 15 and/or D RAM 16. The graphics display processor 20 in accordance with the invention outputs at least one serial data stream containing digital data originally stored within the address space of the CPU 12, such as data stored in the hard drive 14 or the floppy disk drive 15 and clock information. The clock information is a function of a clock signal representative of a rate at which the at least one serial data stream is outputted by the video channel 24. The clock information is either an alternating series of one and zero bits outputted on a line of the video channel 24 at an identical rate at which data bits are read out on another line of the video channel or alternatively, at least a portion of each line of each video frame encoded with self-clocking information, such as Manchester code, which may be processed to derive a clock signal as explained below. Connected in parallel to the video channel 24 is a video data acquisition subsystem 32 as described below with respect to FIG. 3. The video data acquisition subsystem 32 contains a processor and associated first and second frame buffer memories which are periodically used to store frames of information outputted by the first and second frame buffers of the graphics display processor 20 as is described below. The video data acquisition subsystem 32 is connected via interface 33 to a system control and storage processor and memory 34 which also contains first and second frame buffers which store frames outputted by the first and second frame buffers of the video data acquisition subsystem 32. The system control, storage processor and memory 34 writes information into a removable storage 36 which may be used to write information back into the internal hard drive 14 for restoration purposes as described below. The restore block 60 represents a processor used for writing information stored on the removable storage 36 back into the address space of the hard drive 14 of the CPU 12 as is described in detail below.

The present invention uses the programmable capability of the graphics display processor 20 to transmit data via the video channel 24 to the video data acquisition subsystem 32 while maintaining synchronism between the CPU 12, graphics display processor 20, video data acquisition subsystem 32 and system control and storage processor and memory 34. An example of protocols which may be used and the hardware required to receive, process and convert the data which has been formatted into a video display format by the graphics display processor 20 back into its original form as read from the address space of the CPU 12 to provide restoration of the internal hard drive is described below.

The graphics display processor 20 is programmed to operate in a graphics mode. For example, the VGA 640×480 graphics mode containing a data space of 480 rows of lines with each containing 640 pixels of information may be utilized. Each of the N parallel lines which are present in the video channel 24, which define the color resolution achievable for display of graphics information on the video monitor 22, has data outputted in a binary state of a one or a zero. The data outputted from the address space of the frame buffers of the graphics display processor 20 associated with the hard drive 14 may be visualized as a linear series of data bits having a length in this example of 307,200 bits per frame (640×480). The graphics display processor 20 formats the groups of 307,200 bits per frame which were read from the memory space of the internal hard drive 14 and which are transmitted from the graphics display processor on the video channel 24. During each refresh cycle of the graphics display processor 20, information contained in the video random access memory 19 is continually transmitted to the graphics display processor. The frame rate may be within the conventional range, such as 60–72 per second, which defines the refresh cycle of the graphics display processor 20.

Assuming that there are 60 frames per second, a refresh rate equal to 60×307,200 bits per frame is transferred by the graphics display processor 20 over the video channel 24 on each of the N parallel lines. This rate represents a rate approaching two megabytes per second. While it is not necessary in practicing the invention, the video monitor 22 may remain attached to display the data outputted by the video channel 24 which has been retrieved from the address space of the internal hard drive of the CPU 12 and processed for display purposes by the graphics display processor 20. As has been stated above, the video channel 24 is also connected to the video data acquisition subsystem 32. In the preferred application of the invention, only a single serial data stream of the N serial data streams are connected to the video data acquisition subsystem 32 as is described below with that line containing the digital data with at least a portion of the one of the at least one serial data stream connected to the video data acquisition subsystem 32 being encoded with self-clocking information which permits the clock signal representative of a rate at which the one of the at least one serial data stream is outputted by the video channel 24 to be derived from processing at least the portion of the one of the at least one serial data stream outputted from the video channel as described below in conjunction with FIGS. 3 and 4. Alternatively, two lines of the N lines of the video channel 24 may be connected to the video data acquisition subsystem 32 with the first line containing the data which has been retrieved from the address space of the CPU 12 and the display information added by the graphics display processor 20 and the other line containing an alternating series of ones and zero bits at the same bit rate at which data is outputted on the first line which is a clock signal for synchronizing the processing of the data by the video data acquisition subsystem 32.

The video data acquisition subsystem 32 processes the at least one of the at least one serial data stream, including processing of the clock information, to produce the clock signal representative of a bit rate at which the at least one serial data stream is outputted by the video channel to the video data acquisition subsystem in response to the clock information contained in the at least one serial data stream as described below in conjunction with FIG. 3. As is described below, the video data acquisition subsystem 32 further removes the self-clocking information and converts the serially outputted information received on the at least one serial data stream into parallel information having the same number of bits as each addressable location within the address space of the CPU 12. Thus, the video data acquisition subsystem 32 converts the data back into a parallel format have a number of bits per word corresponding to the number of bits of data per word stored within the address space of the CPU 12. The words may have differing number of bits depending upon the architecture of the CPU 12.

Synchronization is maintained between the CPU 12 sending the data to the graphics display processor 20, the graphics display processor sending out video formatted information on the video channel 24 and the video data acquisition subsystem 32 hardware receiving the video formatted information and converting it back into data. Several techniques are employed to establish and maintain this synchronism.

The basic output unit of the graphics display processor 20 is a video frame. The video frame includes all data transmitted between consecutive vertical sync (VS) pulses. VS pulses are distinguished from data by a variety of techniques and are usually defined by a slightly higher (and longer) voltage level. Sometimes, a single connector is used to carry this information to the video monitor 22 and sometimes the information is mixed with data on a single connector (such as sync on green).

The graphics display processor 20 generates VS at the start of each video refresh. In the example described above, VS is generated 60 times each second. With each VS, the graphics display processor 20 sets a bit in a status register in the graphics adaptor card 18. The CPU 12 application program monitors the VS bit and determines the exact time each video refresh cycle begins.

When the video data acquisition subsystem 32 receives VS, it resynchronizes to begin receiving the next set of 307,200 bits sent by the graphics display processor, which represents a full frame of video formatted data, which includes the data retrieved from the address space of the CPU 12, as well as the clocking information and display information, as described below, in conjunction with FIG. 4. The VS alone cannot provide synchronization down to the level of individual pixels. The VS alerts the video data acquisition subsystem 32 to begin pixel synchronization and provides frame synchronization between the CPU 12 and the hardware of the video data acquisition subsystem 32.

The video data acquisition subsystem 32 transfers the video data outputted from the graphics display processor 20 on the video channel 24. The video data acquisition subsystem may be implemented with hardware and software modules for performing specific functions on the data to be transferred. The first module of the software controls the graphics display processor 20 which may be, for example without limitation, pages 1–65 of the attached Appendix. This software is used to read data from the hard drive 14, convert it into the transmission format as described below in conjunction with FIG. 4, and write it into the video random access memory 19. The data is then transmitted using the video output channel 24 from the source CPU 12 to the video data acquisition subsystem 32.

The hardware of the video data acquisition subsystem 32 converts the original data from the formatted video signal and makes it available to the system control, storage processor and memory 34 and signals the processor within the system control, storage processor and memory when a frame of data is ready for transmission thereto. The second module is the software which controls the system control, storage processor and memory 34 which may be, for example, without limitation, pages 66–197 of the attached Appendix, and which functions to transfer data to a removable storage 36 which is a disk or other storage medium. Furthermore, the system control, storage processor and memory may be used to maintain multiple images and to provide a user interface backup and restore operations as described herein.

The video data acquisition subsystem 32 converts the input serial data stream outputted from the video channel 24 back into parallel data having the same number of bits which are read out from each address location in the address space of the CPU 12 and makes the converted data available for storage in the storage of the system control, storage processor and memory 34 and removable storage 36. The input serial video signal is conditioned and converted into a TTL level bit stream by processing performed by input conditioner 38, sync detector 40 and clock recovery circuit 42. The serial data is stripped of framing information, which was applied by the graphics display processor 20 in accordance with the conventional function thereof, and is converted to multiple bit words and held for temporary storage by the data recovery circuit 44 and the data stores 46 as described below in detail. The processed data is outputted alternately in a framed format from the data stores 46 which function as frame buffers. The output from the data stores 46 is applied to the interface 33 which is coupled to the system control storage processor and memory 34. The system control, storage processor and memory 34 is connected to the removable storage 36 which is connected to the restore function 60 as described below.

The input conditioner 38 converts the high speed video signal outputted on the video channel 24 into a digital data stream for processing by the remainder of the video data acquisition subsystem hardware. This function is accomplished in two steps using high speed operational amplifier circuits. The first high speed operational amplifier circuit is used to provide a ground reference to the input video signal from the video channel 24 which may be "floating" with reference to ground of the video data acquisition subsystem 32. A differential amplifier is used to compare the video input signal to the return signal and outputs the difference thereof. After this is accomplished, the processed video signal may be converted to a TTL level. The second operational high speed operational amplifier circuit is in a configuration of a Schmitt Trigger. The Schmitt Trigger allows four separate compare points for high and low transitions to provide a high degree of noise immunity. The use of a Schmitt Trigger is necessary to provide adequate processing when poor quality video input signals are received which are often generated by old or low quality video cards present in the video source system. After signal processing by the input conditioner, a pair of output signals are produced in the form of a Manchester encoded digital bit stream which is suitable for processing by digital electronics as described below.

The clock recovery circuit 42 recovers clocking information from the Manchester encoded bit stream. The clock recovery is accomplished by detecting mid-bit transitions in the data which are present in the Manchester encoded bit stream to provide a clock edge which is slightly delayed from these mid-bit transitions. An edge detector circuit is used to output a short pulse corresponding to each transition in the Manchester encoded data stream. Thereafter, the short output pulses are sent through a pulse blanking circuit which removes all pulses occurring between the aforementioned slightly delayed signal transitions produced by the edge detector. The pulse blanking is important for proper clock recovery and should be stable over time to permit processing of pixel rates produced by the graphics display processor 20 which are commonly in frequencies of between 25 and 32 million pixels per second as measured between blanking intervals.

The sync detector circuit 40 does not modify the Manchester data stream applied thereto as an input and functions to detect the sync signal which is the first 64 bits of each line of the video formatted frames outputted by their video graphics display processor 20 as described below in conjunction with FIG. 4. Once the sync word contained in the first 64 bits of each line of bits is detected in the Manchester data stream, the beginning of a valid formatted line of video has been detected. Once the position of the sync information is detected, a START signal is sent to the data recovery circuit 44 to allow the data recovery circuit to start processing the input bits which are received from the input conditioner 38. The data recovery circuit 44 performs four operations on the Manchester data which is outputted from the input conditioner 38. The first operation is to convert the serial Manchester data stream into a word format having a number of bits identical to the number of bits stored at each addressable location of the address space of the CPU 12. This function is accomplished by strobing bits into a serial to parallel converter with the recovered clock pulses as indicated by the CLOCK output from the clock recovery circuit 42. This processing also strips the Manchester data outputted by the input conditioner 38 of the Manchester encoding of the data. The second operation is to deformat the input lines of video of each frame by stripping off the sync, scan line, control channel and trigger bits as described below in conjunction with FIG. 4. This function is accomplished by routing the bits of each of the fields of FIG. 4 to an appropriate address based upon their position within the scan line having the format of FIG. 4. Frame and line number information are routed to registers used for control of data storage. The third operation is to route the data which is the last field within the line format of FIG. 4 to one of the data stores 46 using an address based on the line number received in the header. Addresses are then incremented for each incoming word until the line is complete. The least significant bit of the frame number is used to determine which of the data stores 40 in which the frame of data will be written. The least significant bit is also routed from the data recovery circuit 44 as the DATA READY signal to the interface 33 to function as a switch between the two data stores during read out. The fourth operation is to signal the interface 33 that the frame is ready for read out which is accomplished by the reception of the aforementioned DATA READY signal.

The data stores 46 are identical and perform identical functions. Each stores one complete frame of video data which has been stripped of all of the bits as described below in conjunction with FIG. 4 except the 512 data bits therein. The two data stores 46 perform the function of frame buffers for read out through the interface 33. Control over which store 46 is to be dedicated to data recovery and which store 46 is to be available for read out is based upon the value of the least significant bit of the frame number. When a data store 46 is dedicated to the data recovery process, data is written into the store using local bus control signals that come from the data recovery circuit 44. When a data store 46 is dedicated to the interface 33, data is read from the store using control signals that come from the interface. A data store may not simultaneously receive data from the data recovery circuit 44 and output the data to the interface 33.

The interface 33 provides access to the DATA READY signal and the data stores 46 to the system control, storage processor and memory 34 as described above. The interface 33 may have different circuit implementations without changing its performance. The interface 33 may be configured in different ways, but it must have sufficient bandwidth to handle the nominal data rate produced by the video channel 24 and to permit the system control, storage processor and memory 34 to respond to the DATA READY signal without any significant time delay. If the entire frame of data is not read out from the video data acquisition subsystem 32 before the next DATA READY signal, unread data will be corrupted by the next incoming frame.

Figure 4:
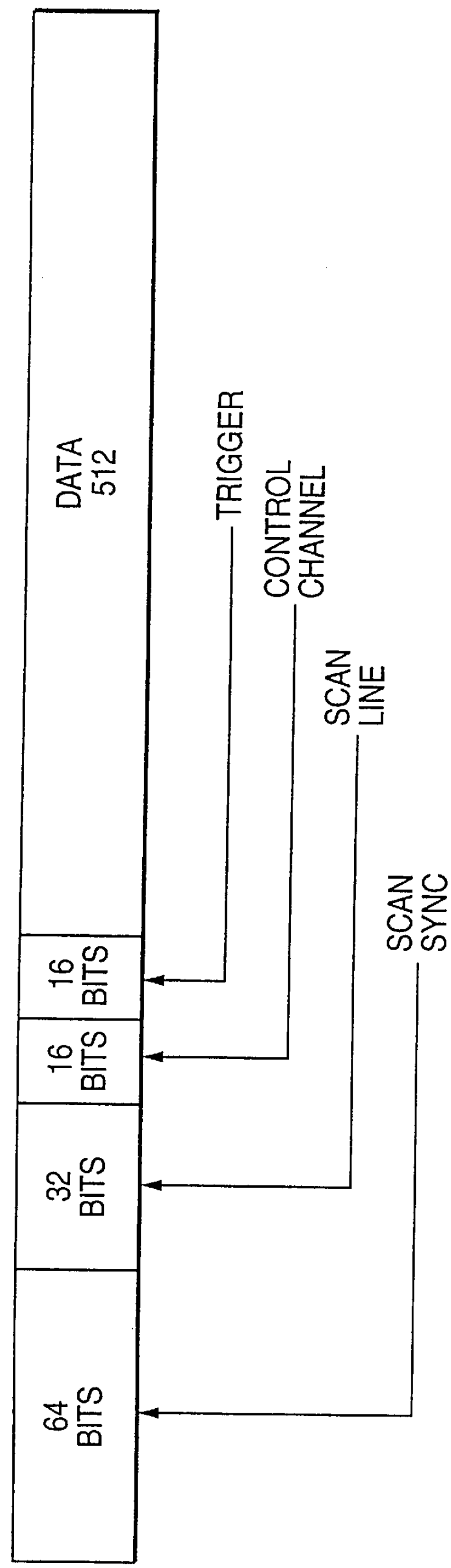
FIG. 4 is a block diagram of the protocol of encoding data for the scan lines of frames outputted by the graphics display processor.
Figure 5A:
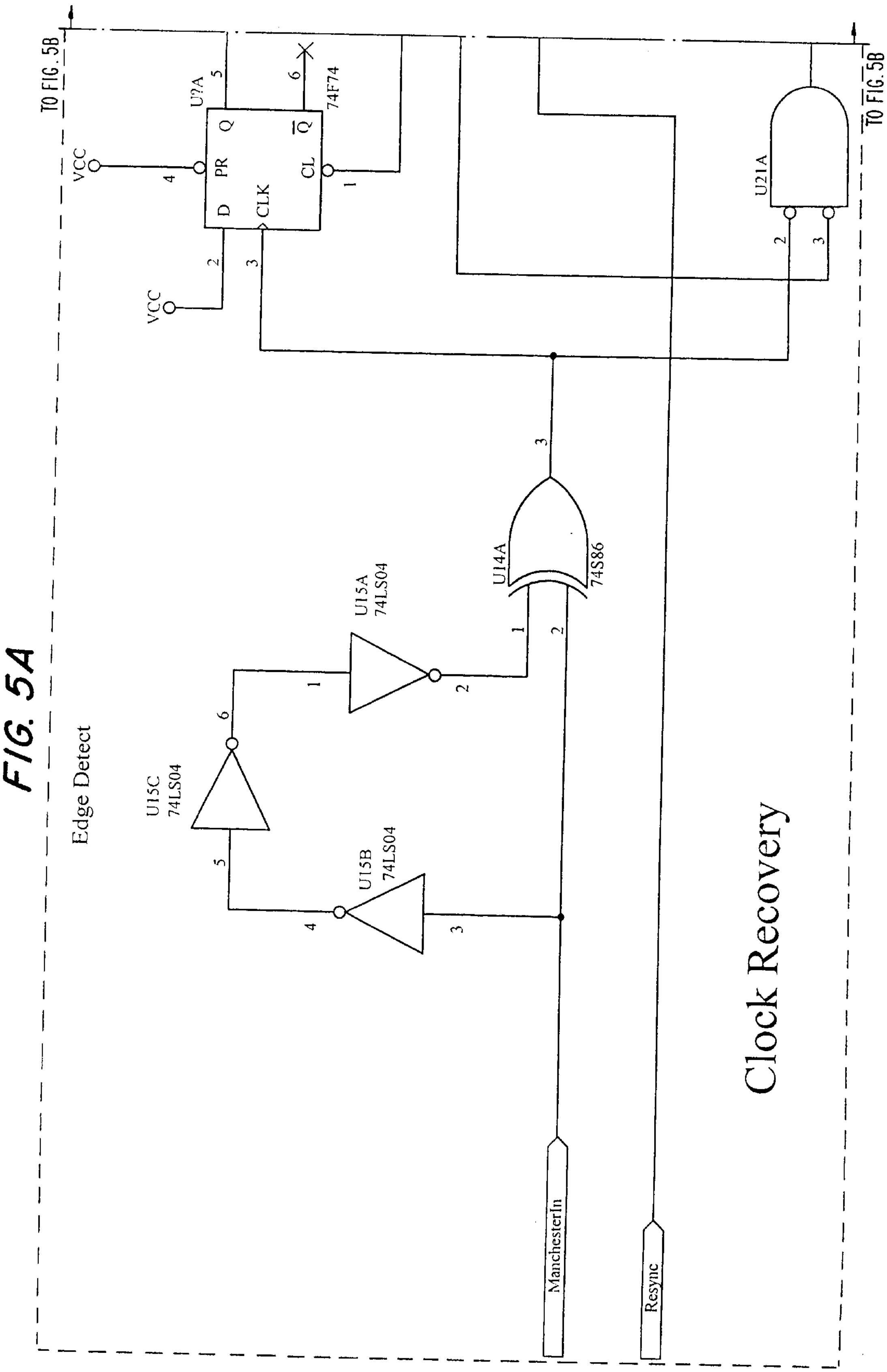
FIGS. 5A–5B, 6A–6D, 7–7E, 8–8F, 9, 10A–10C, 11A–11F, 12A–12F and 13A–13F are a circuit schematic of an embodiment of a system for practicing the invention as illustrated in FIG. 3.
Figure 5B:
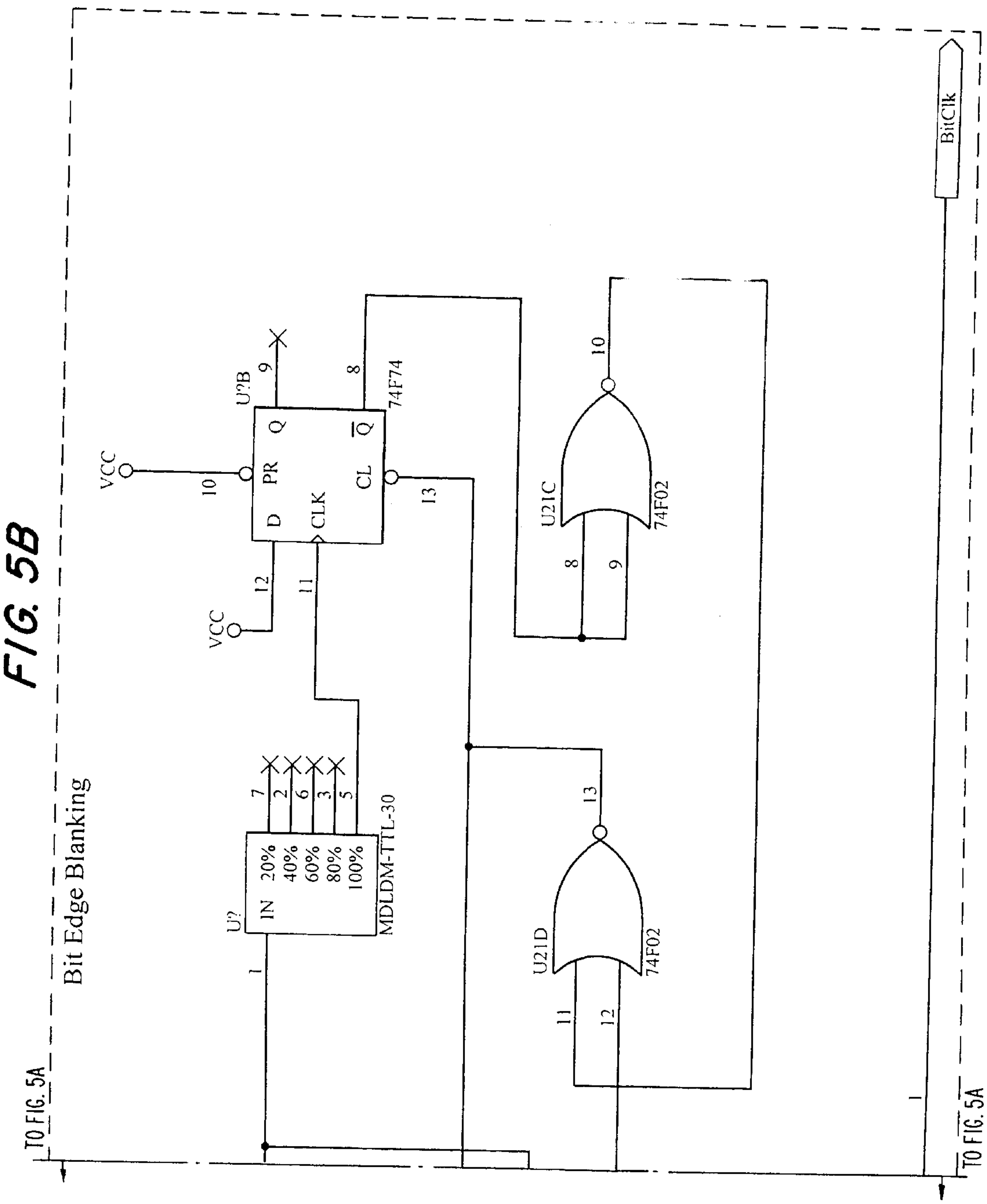
Figure 6A:
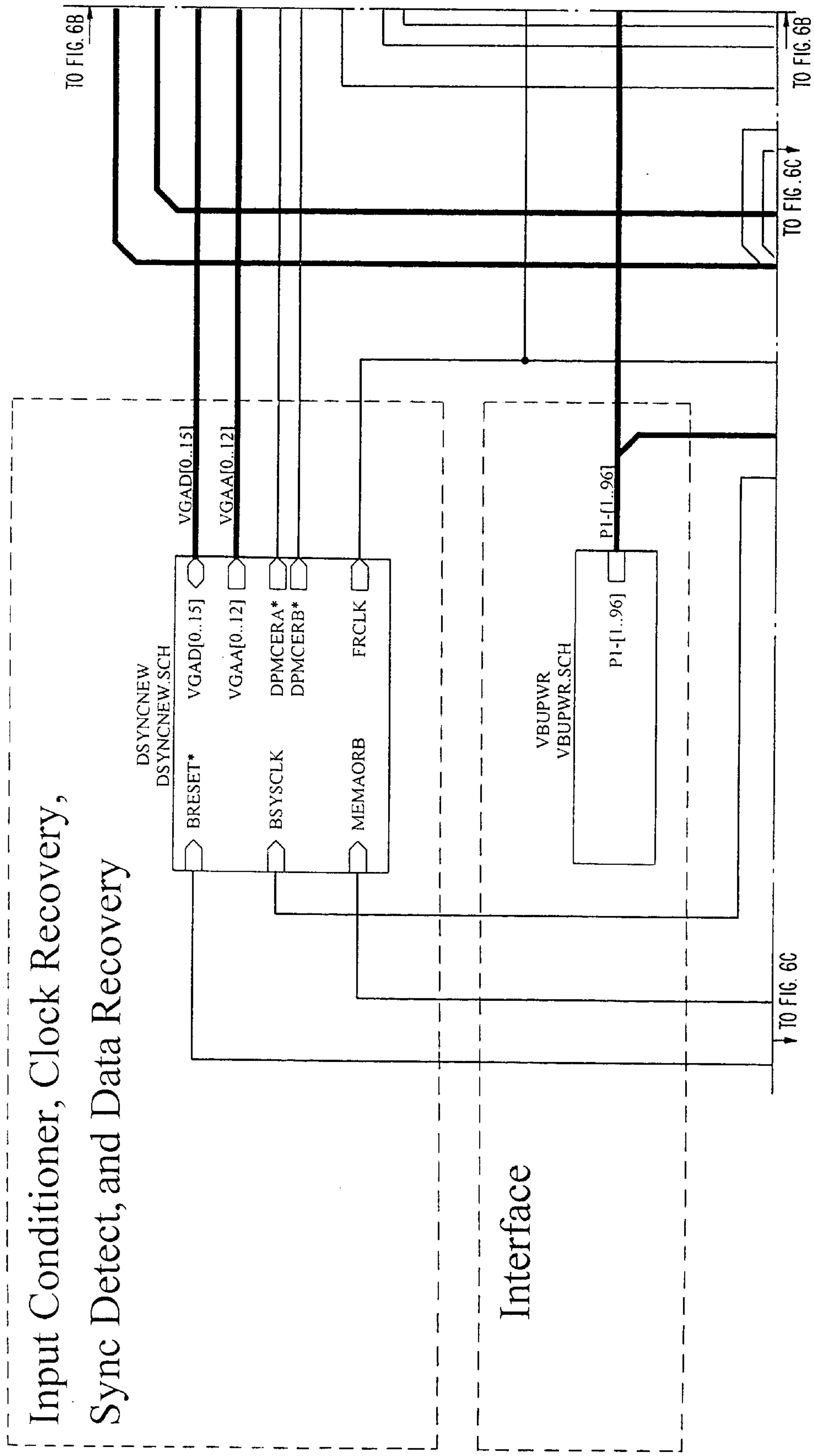
Figure 6B:
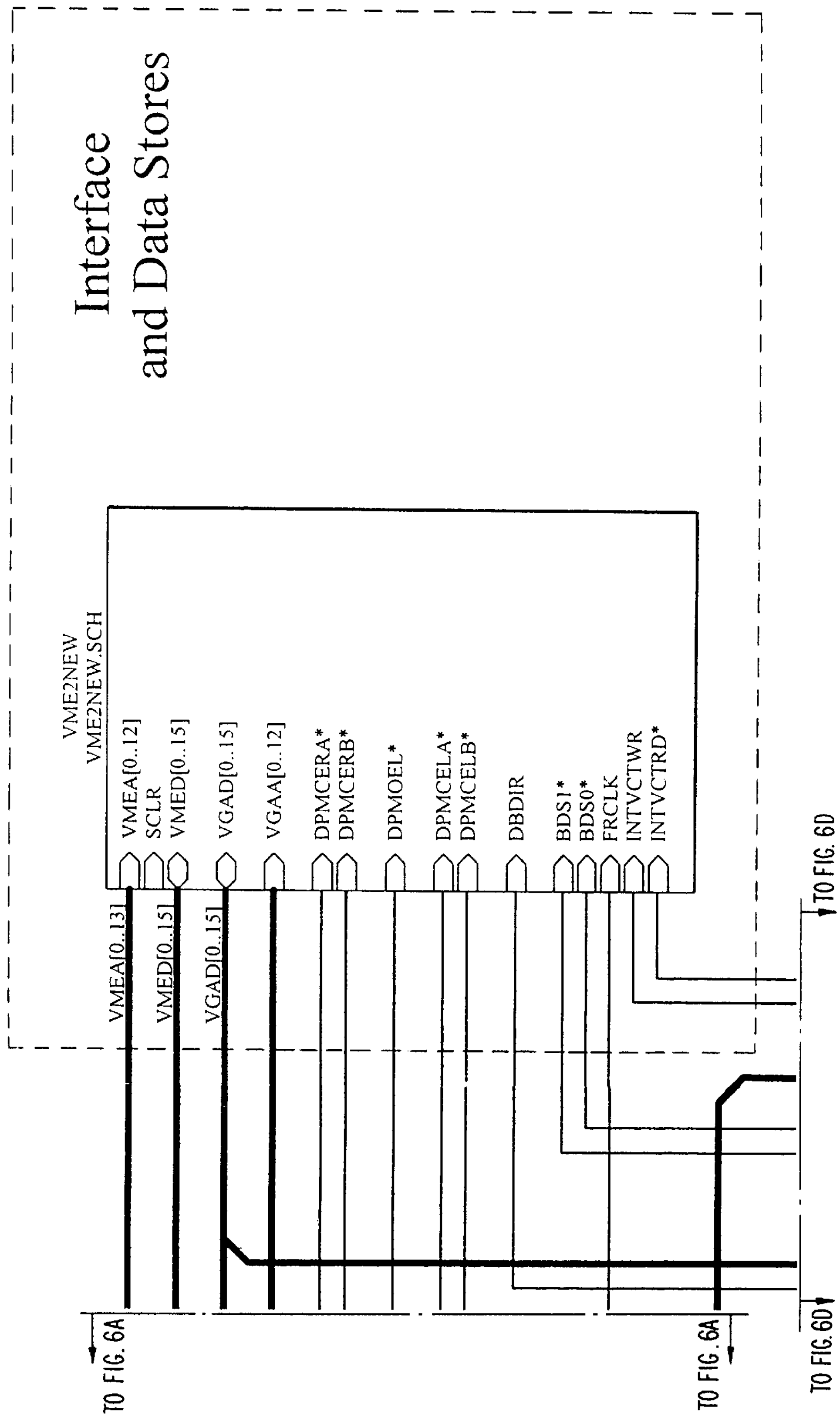
Figure 6C:
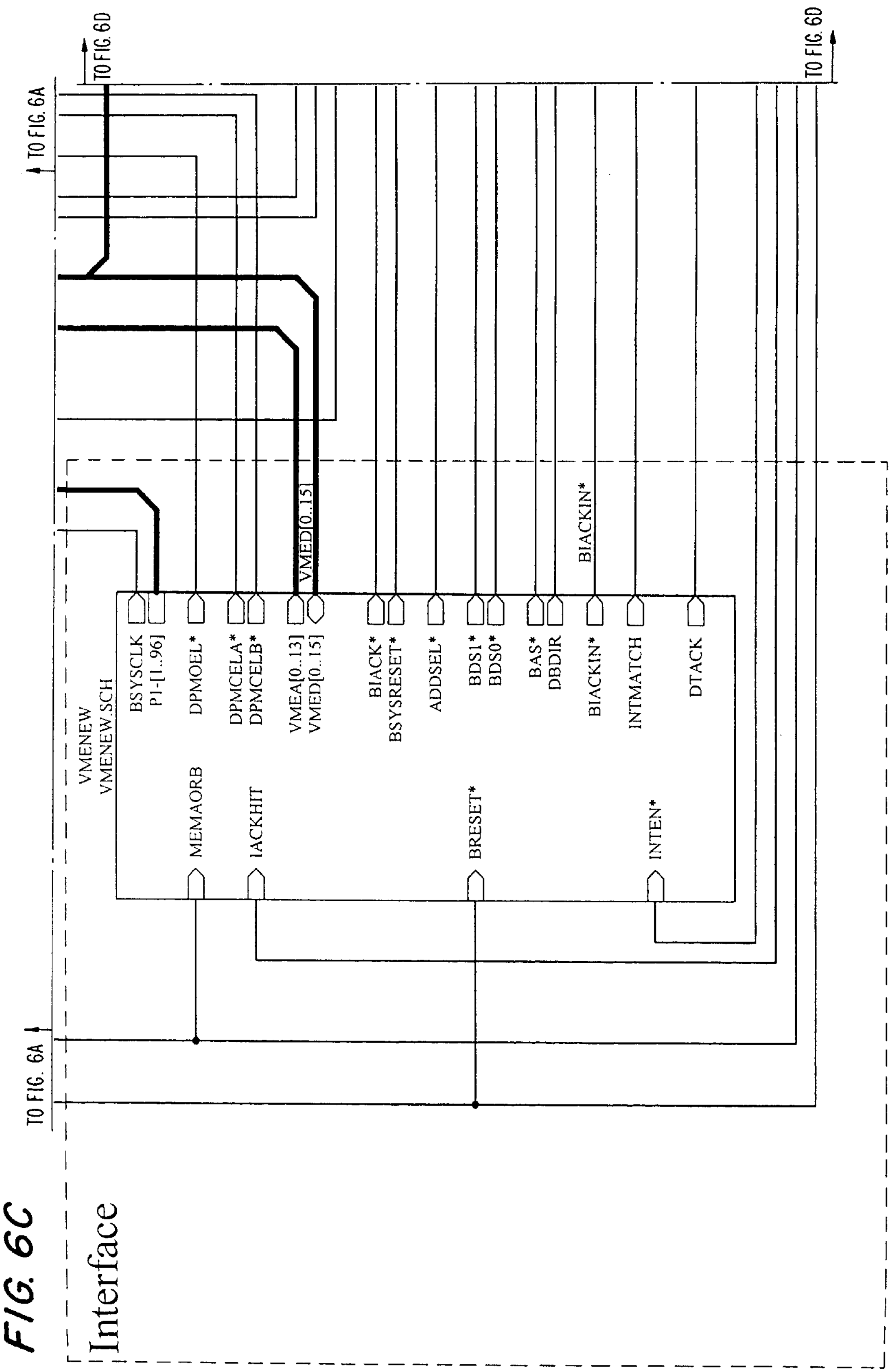
Figure 6D:
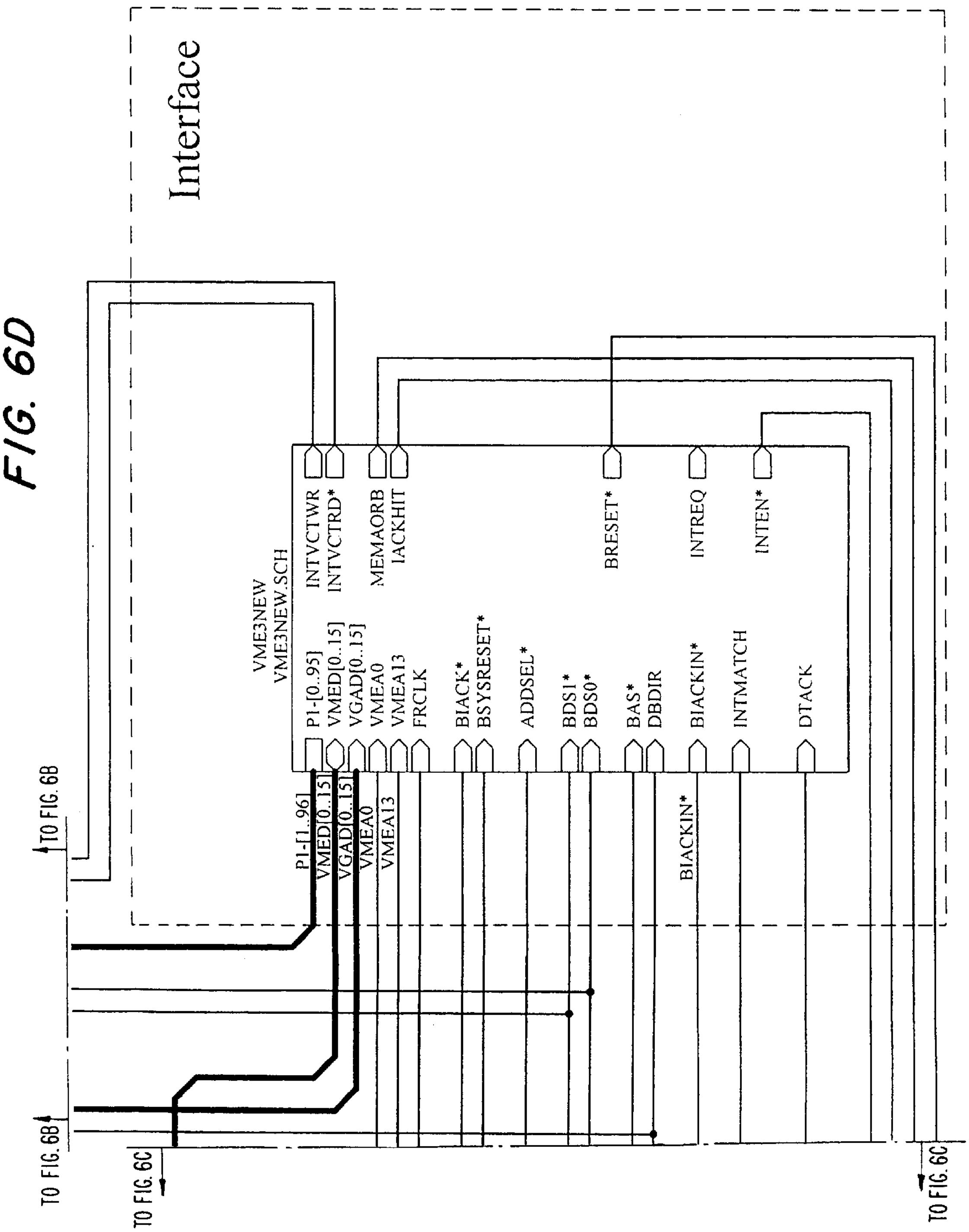
Figure 7A:
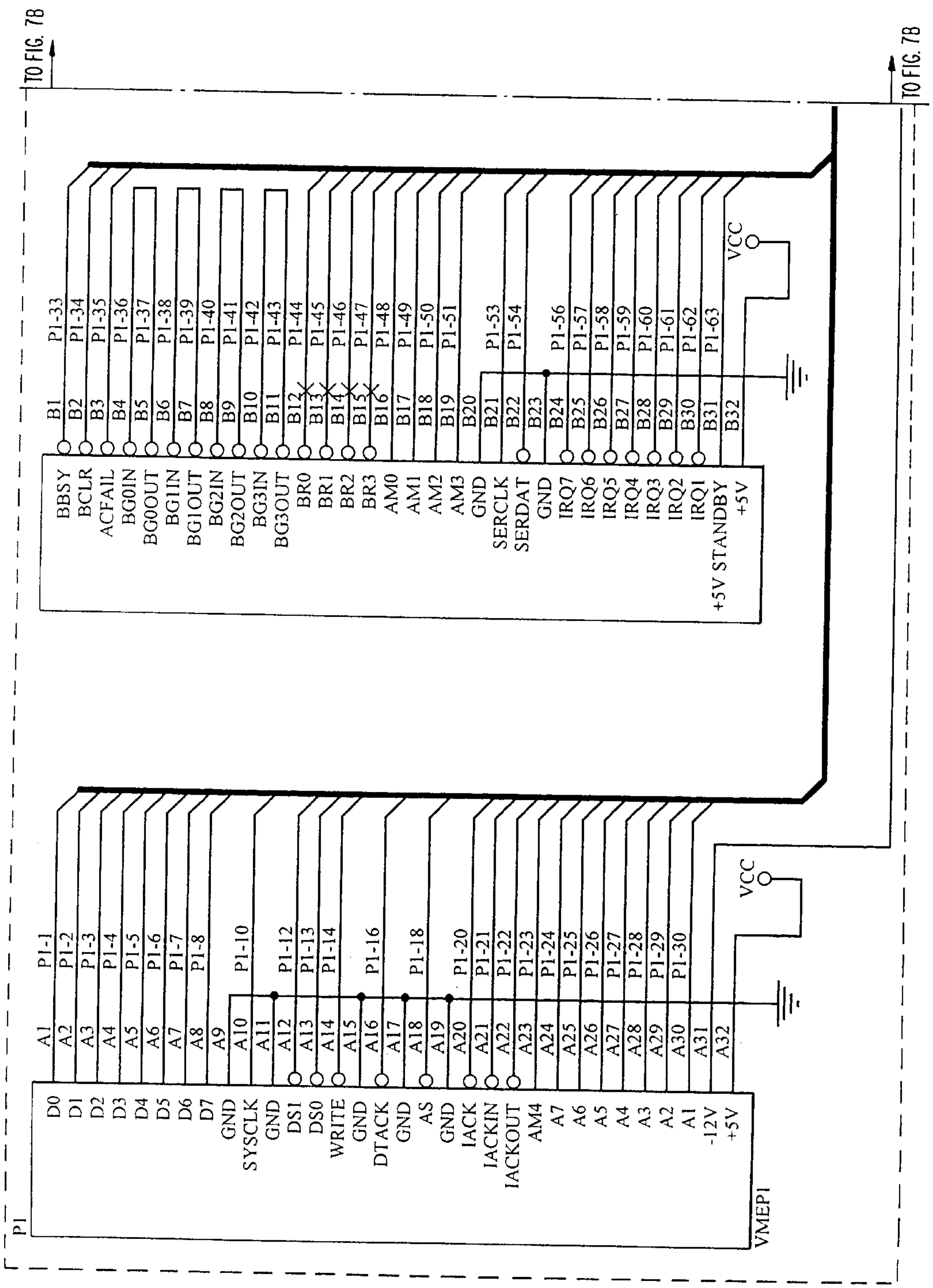
Figure 7B:
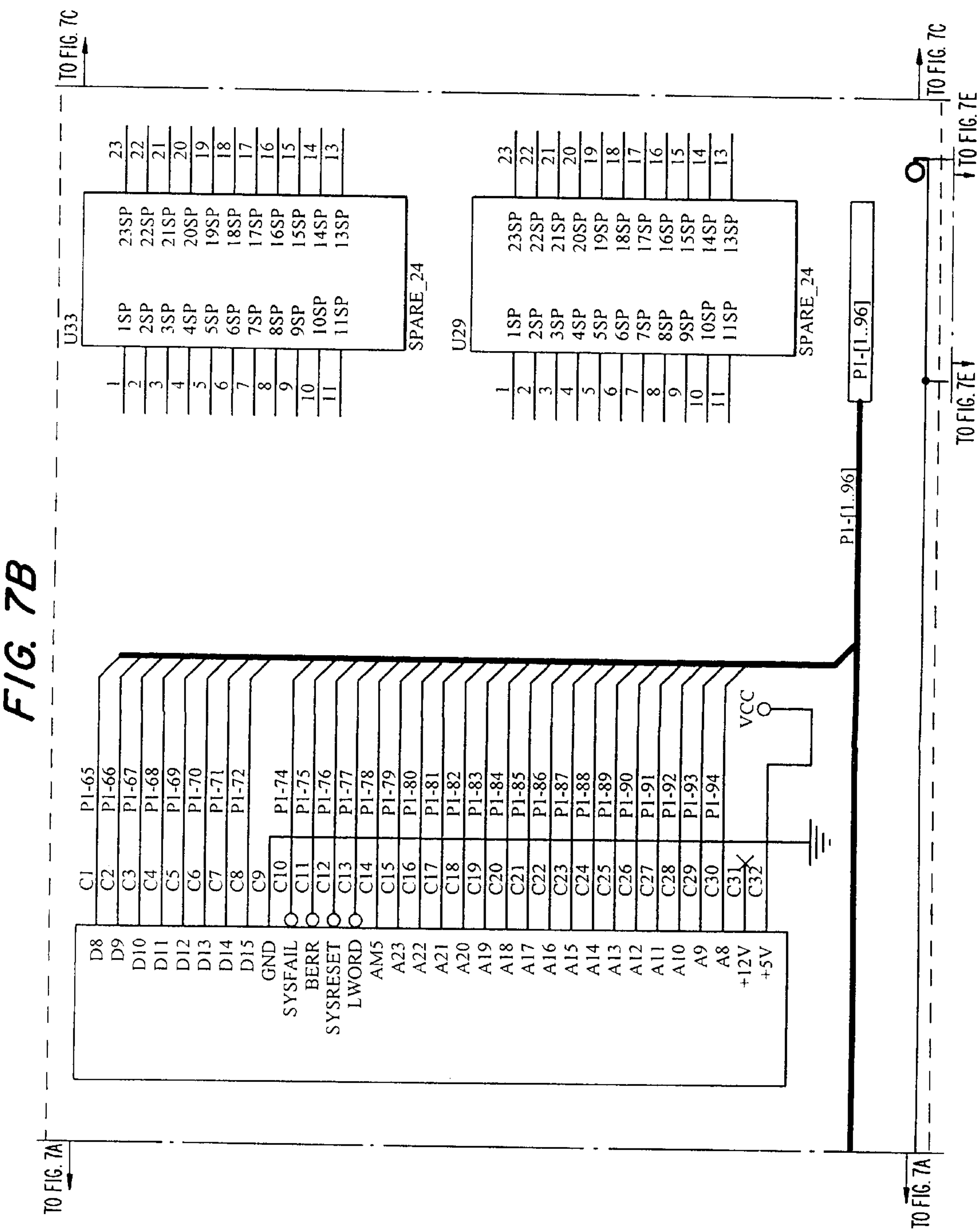
Figure 7:
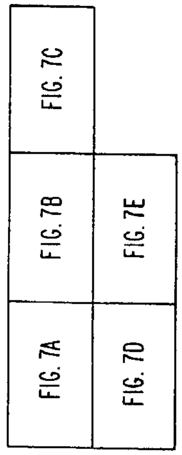
Figure 7C:
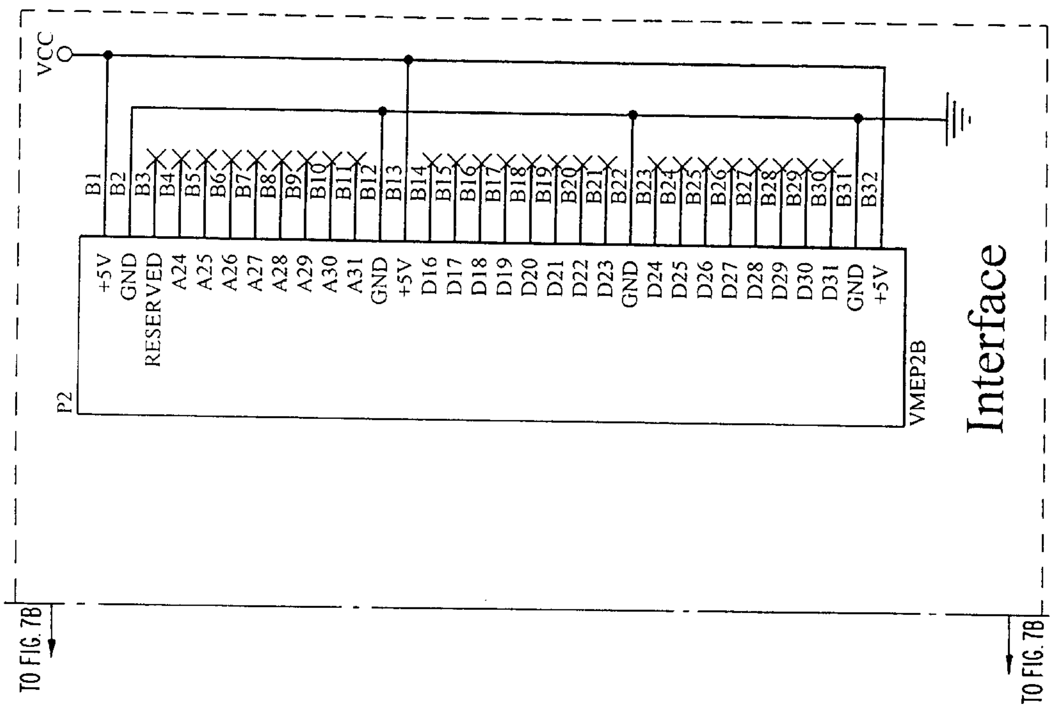
Figure 7D:
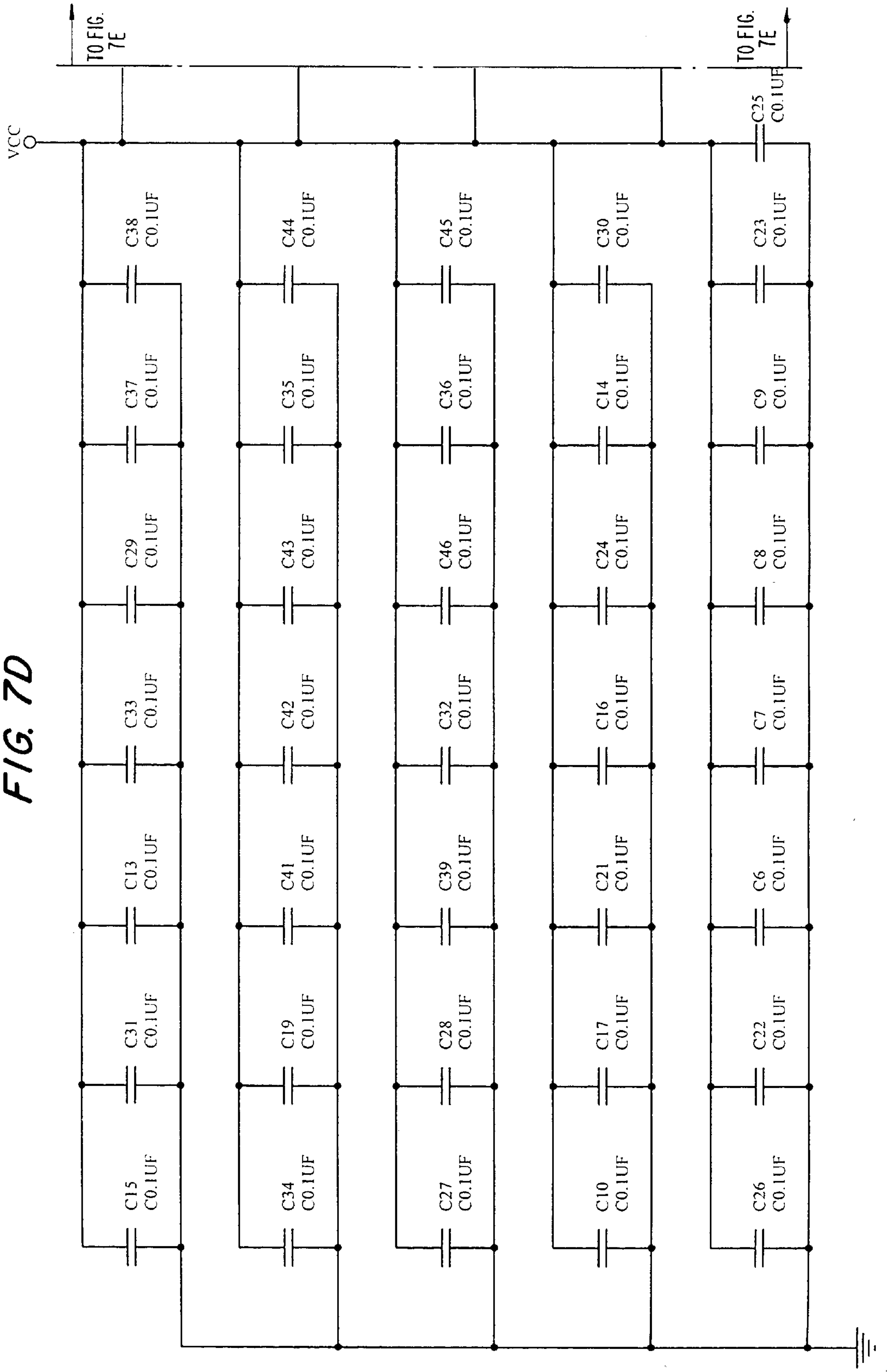
Figure 7E:
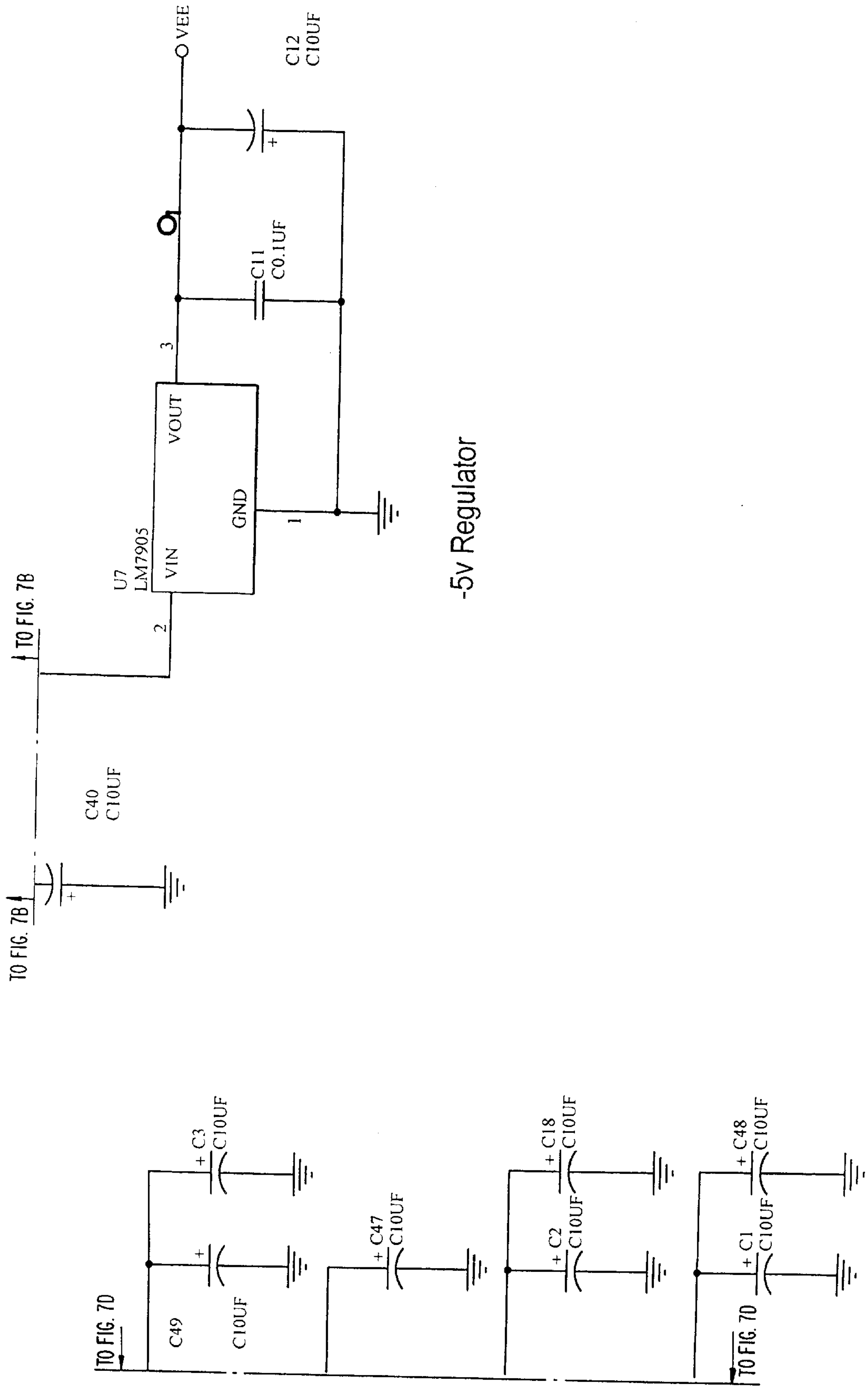
Figures 8, 8F:
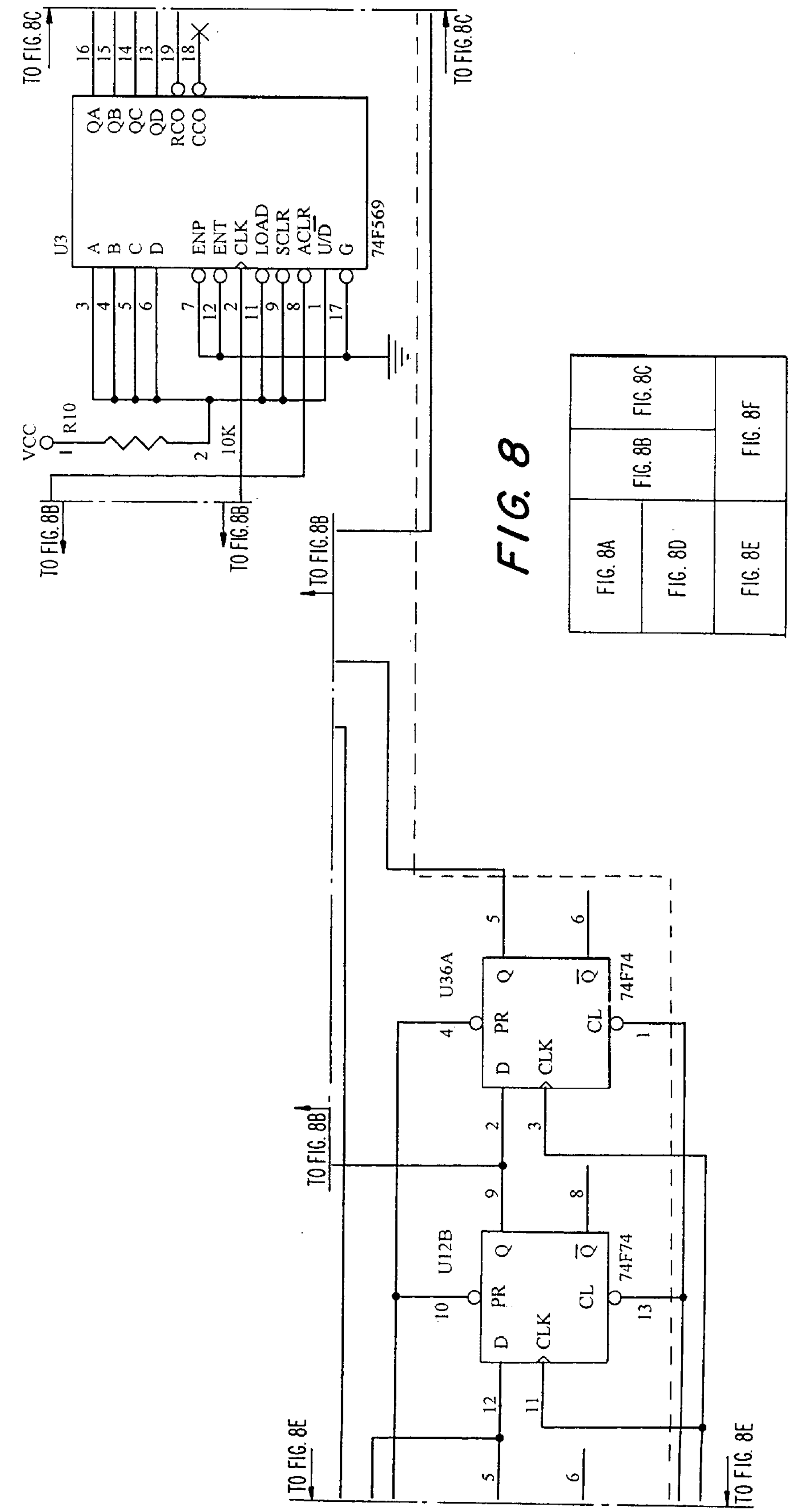
Figure 8A:
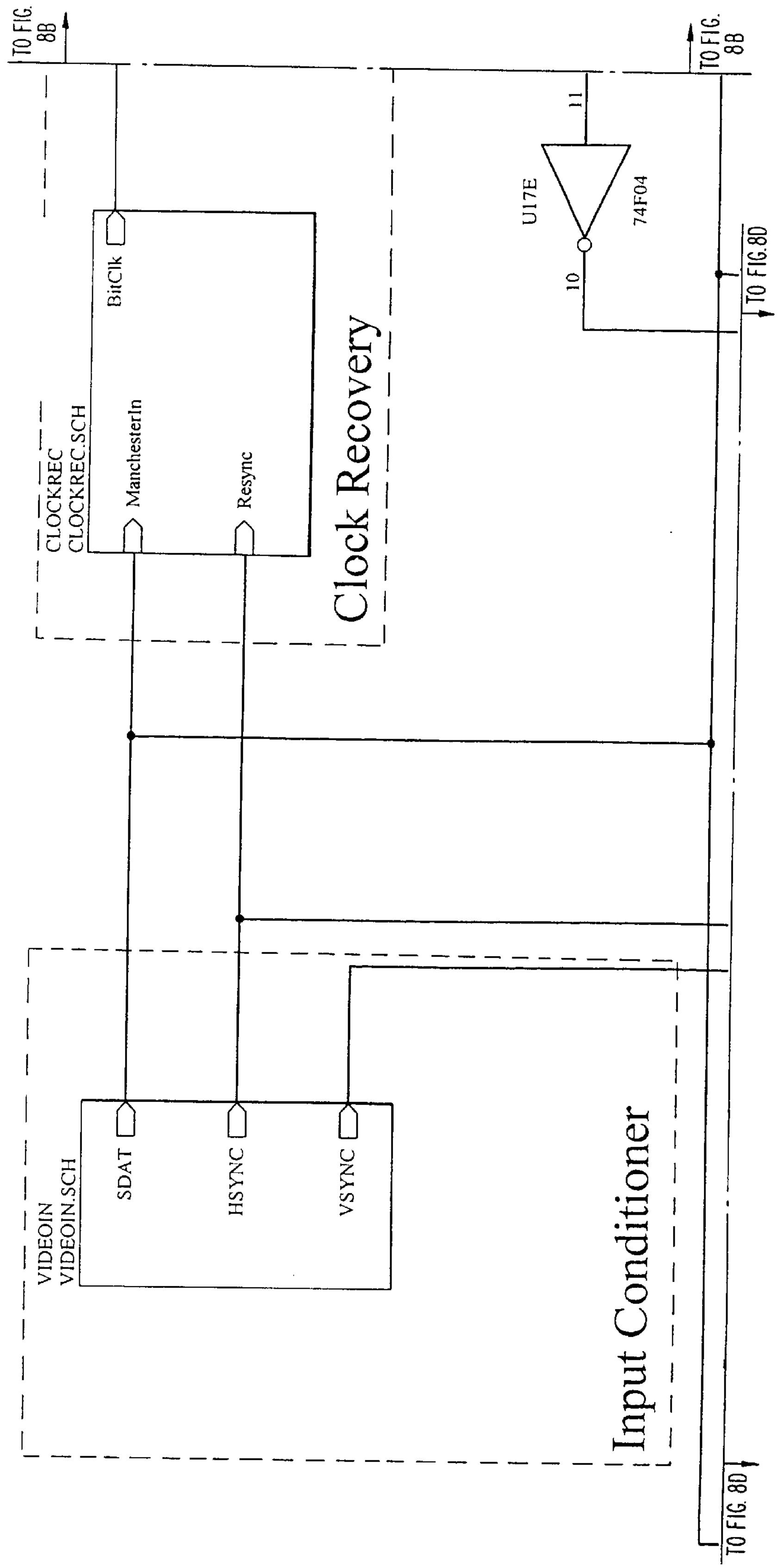
Figure 8B:
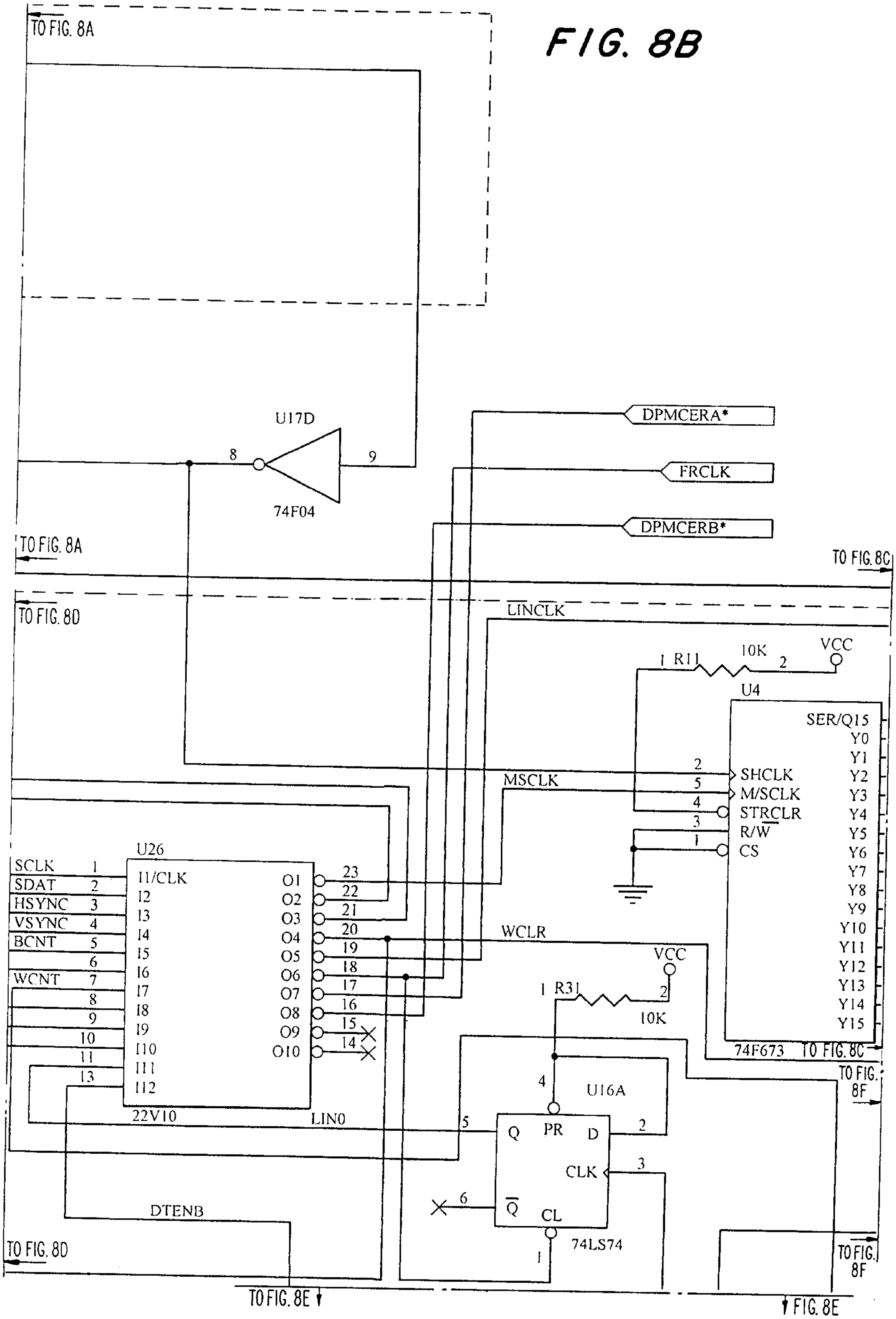
Figure 8C:
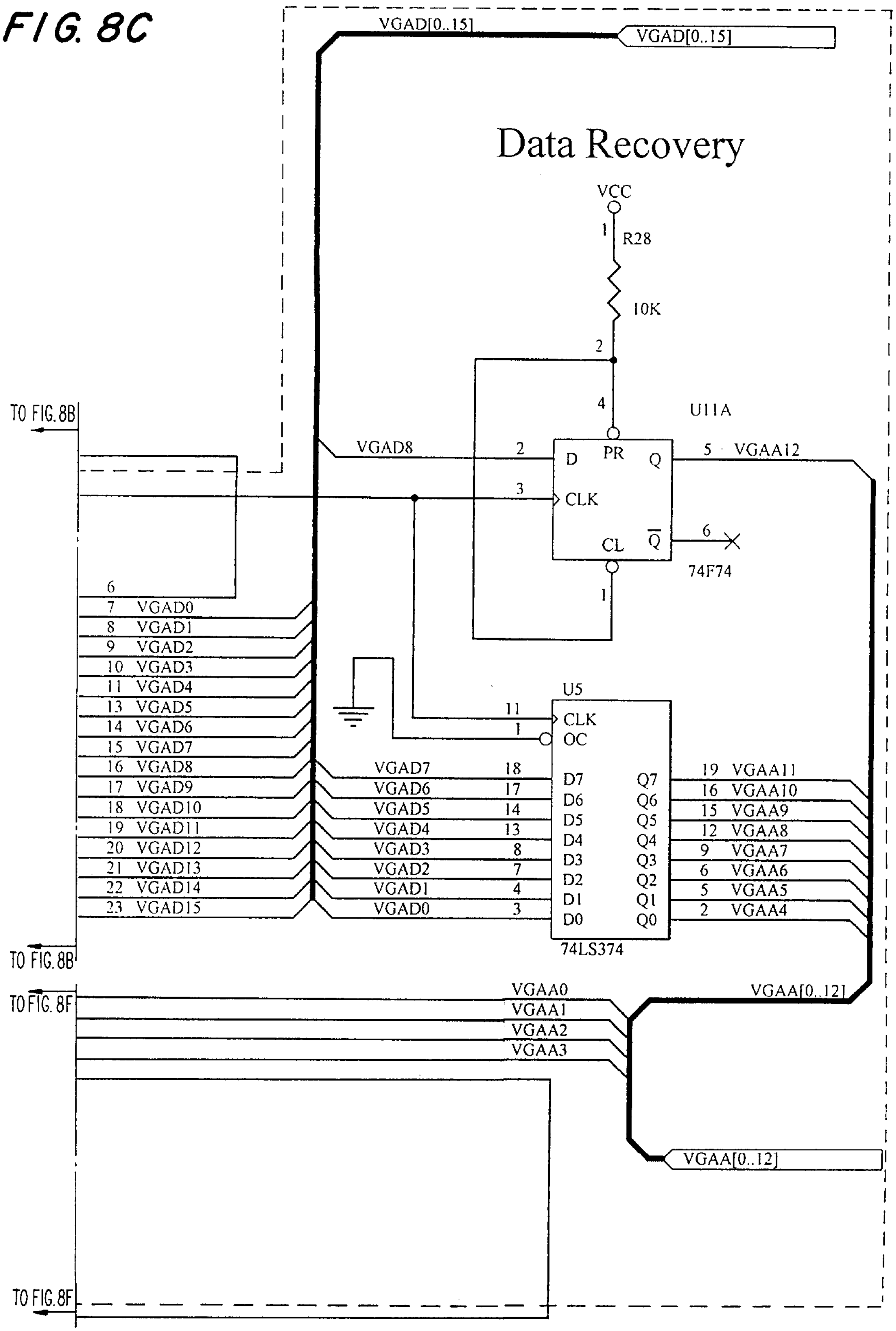
Figure 8D:
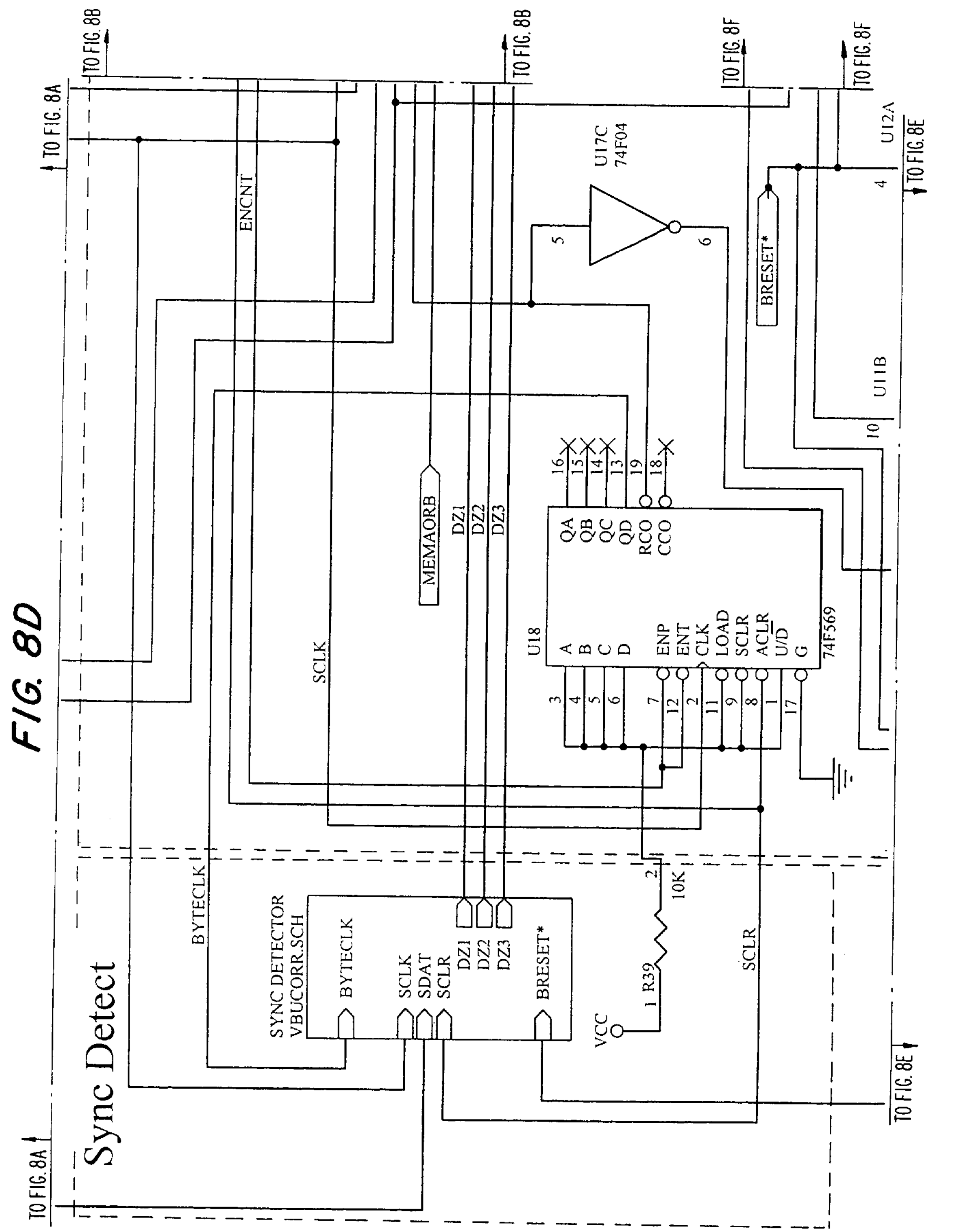
Figure 8E:
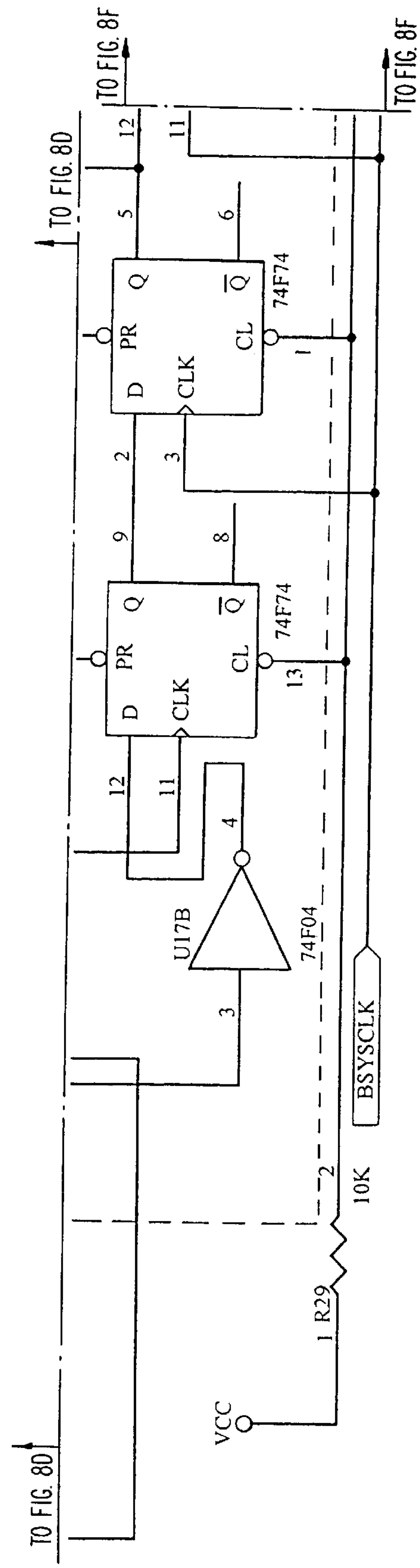
Figure 9:
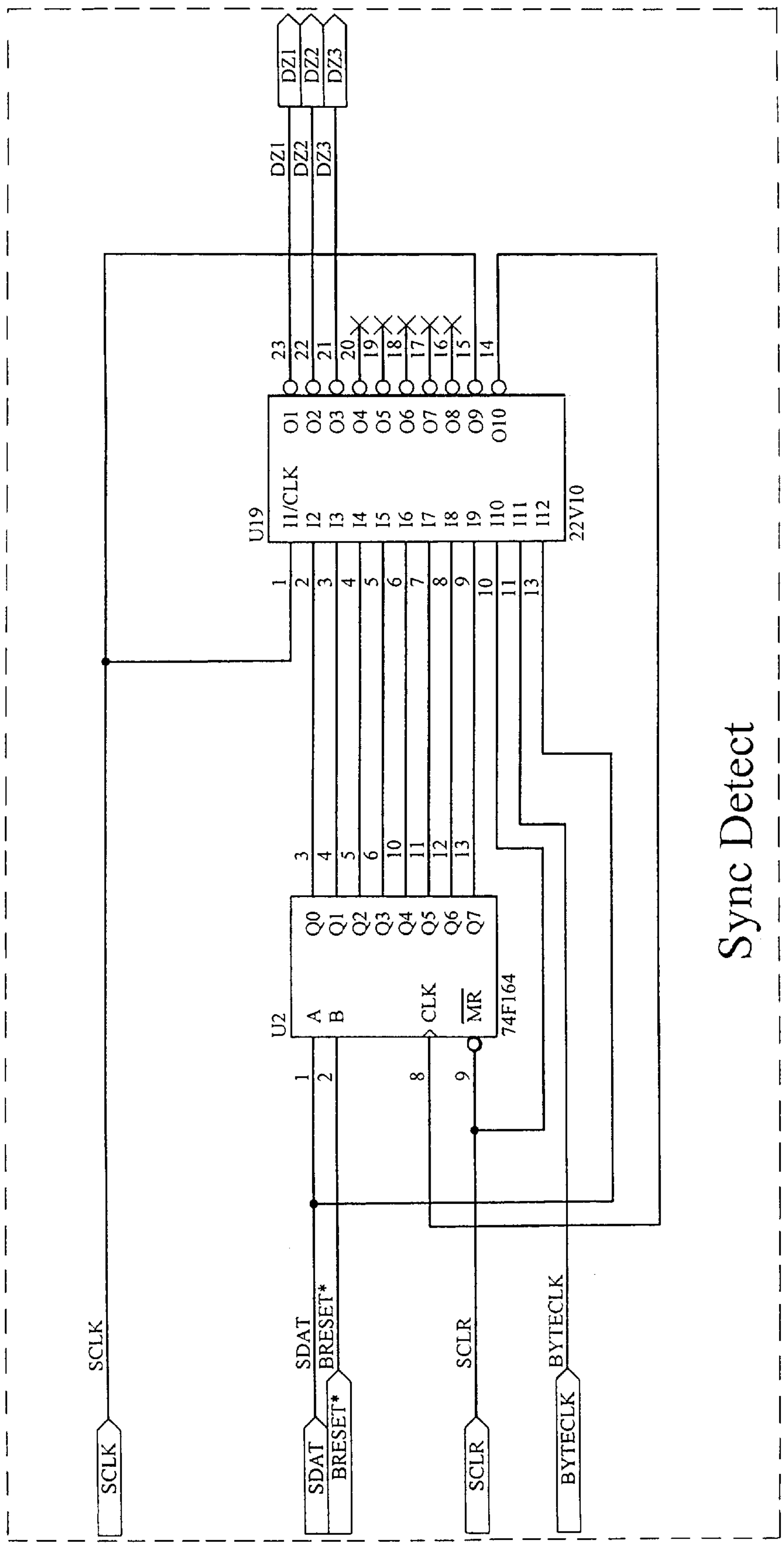
Figure 10A:
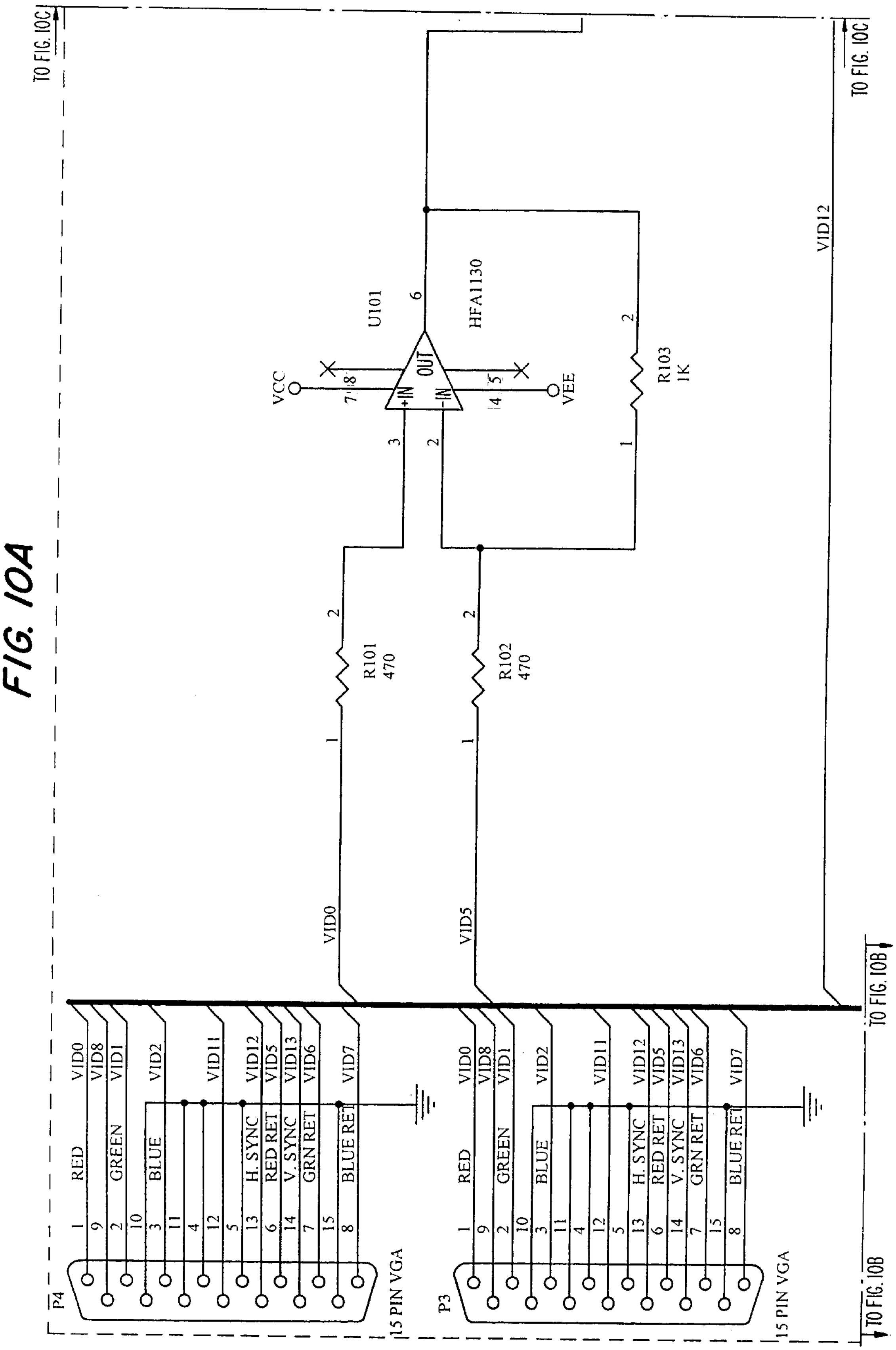
Figure 10B:
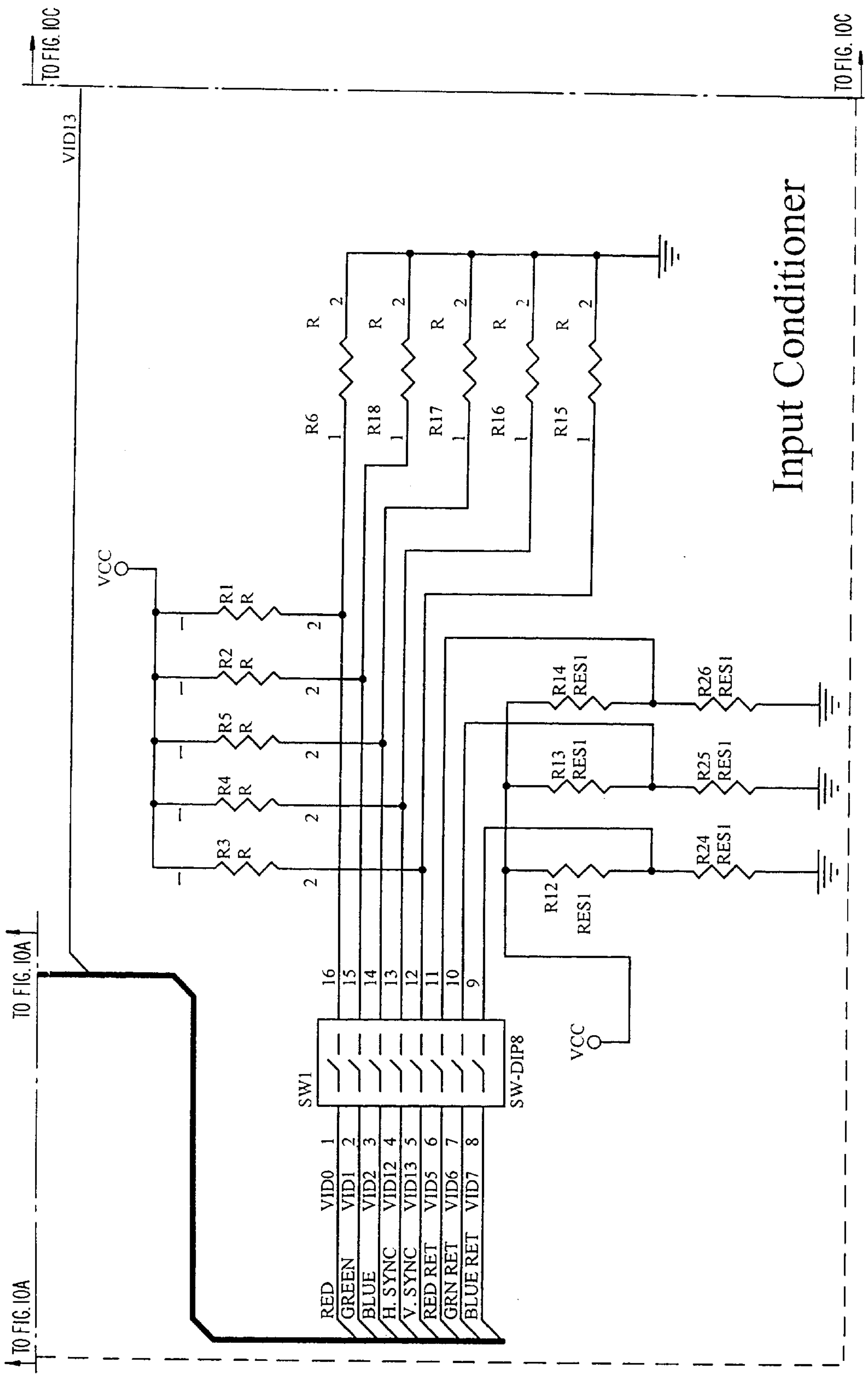
Figure 10C:
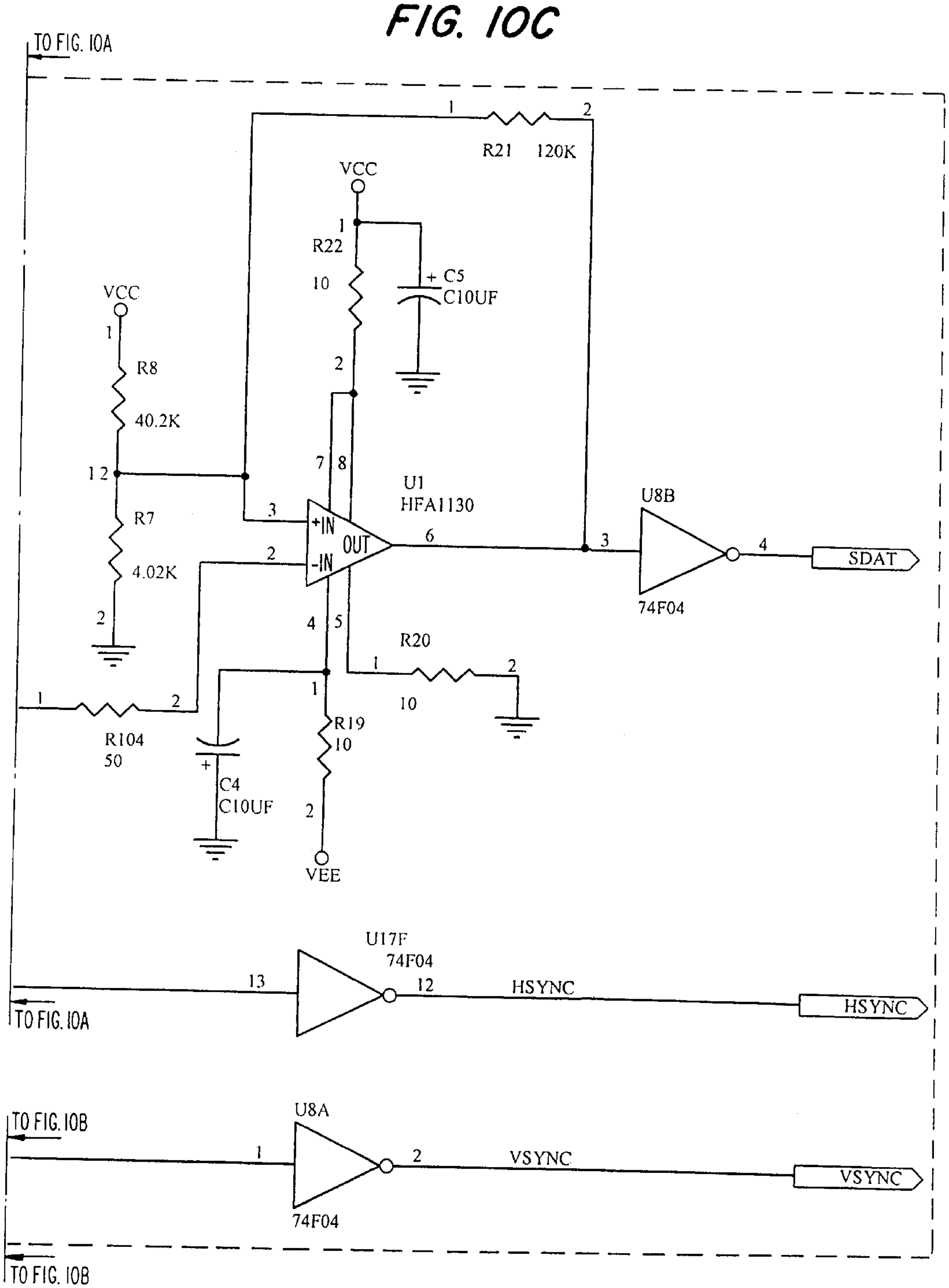
Figure 11A:
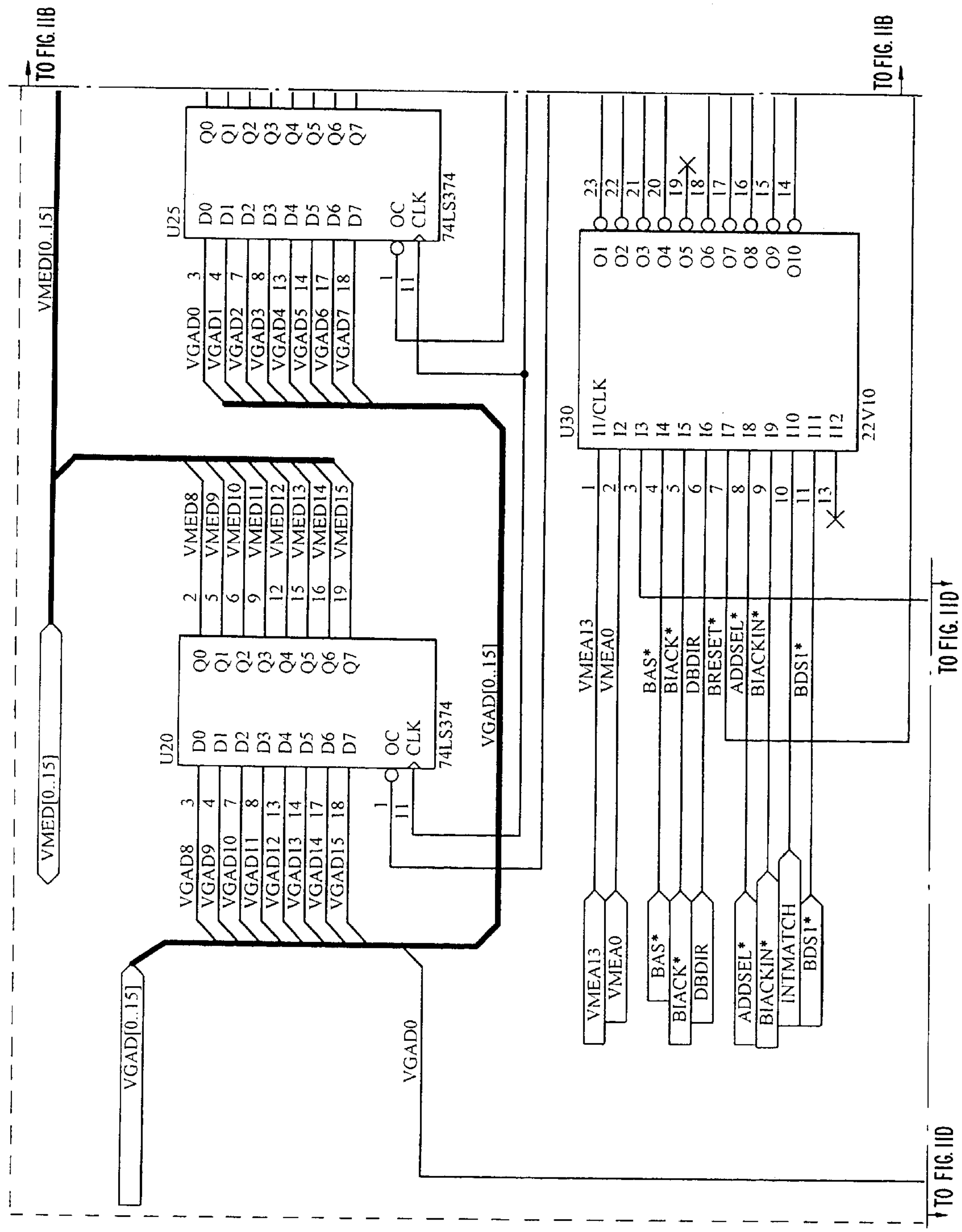
Figure 11B:
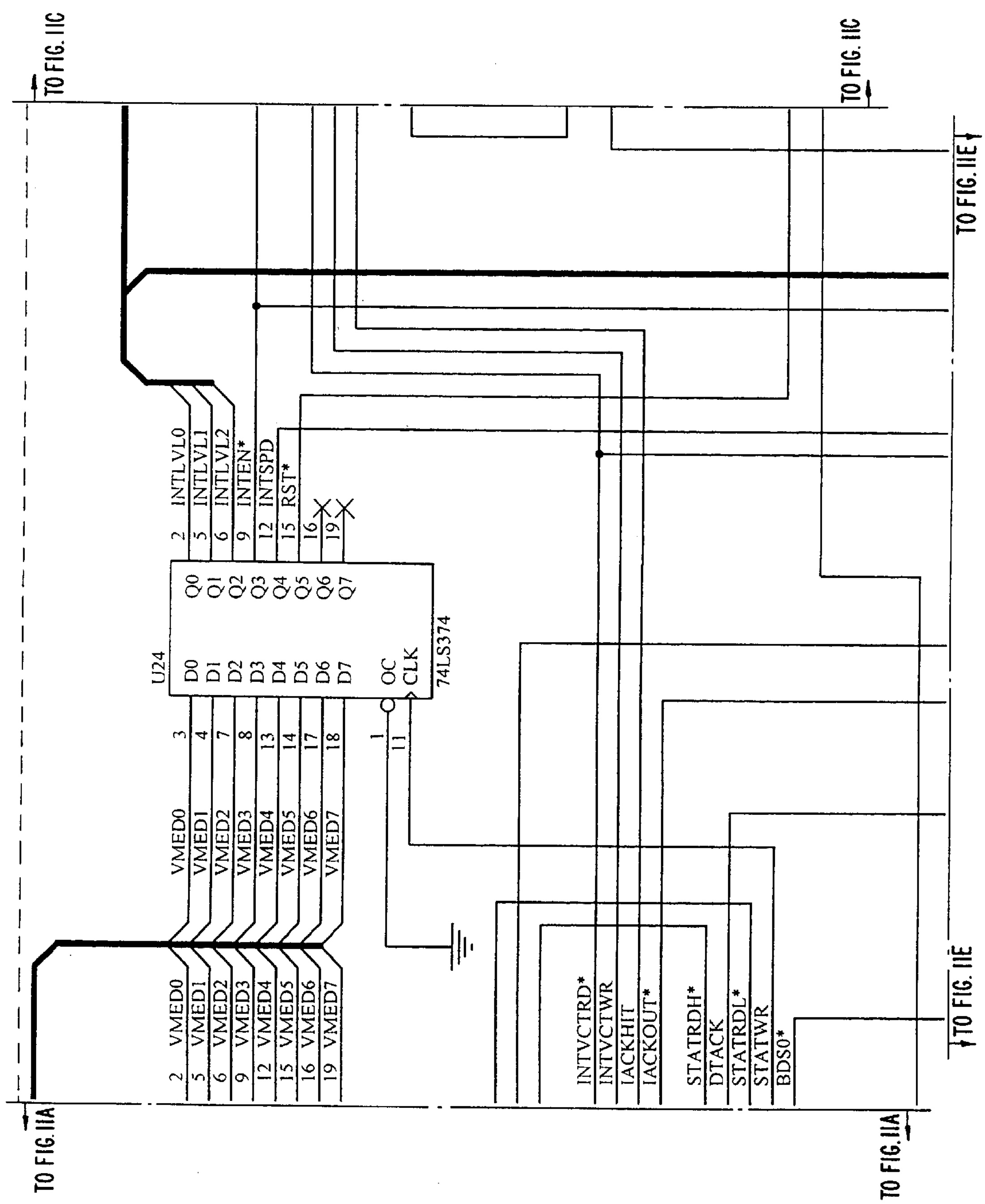
Figure 11C:
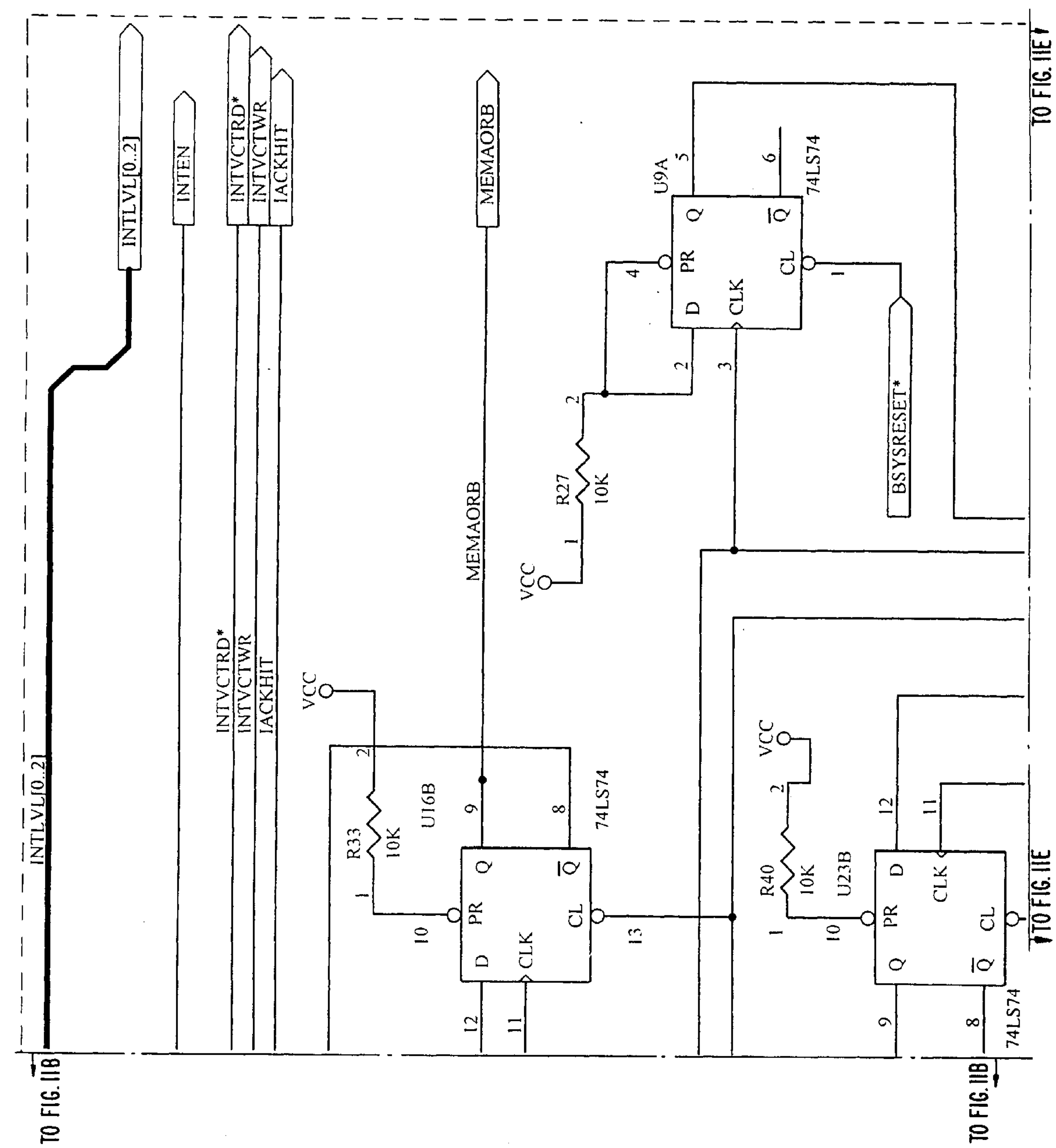
Figure 11D:
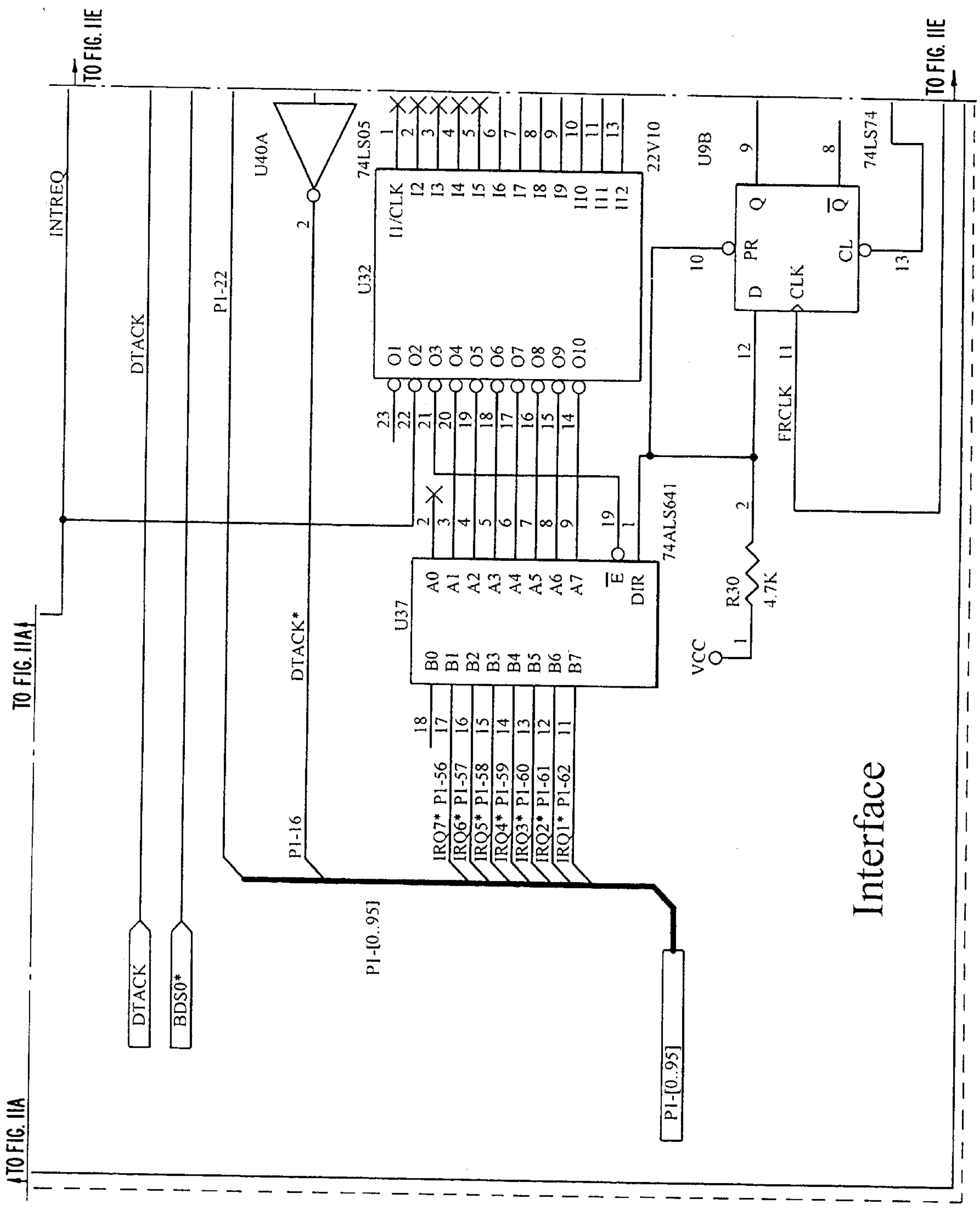
Figure 11E:
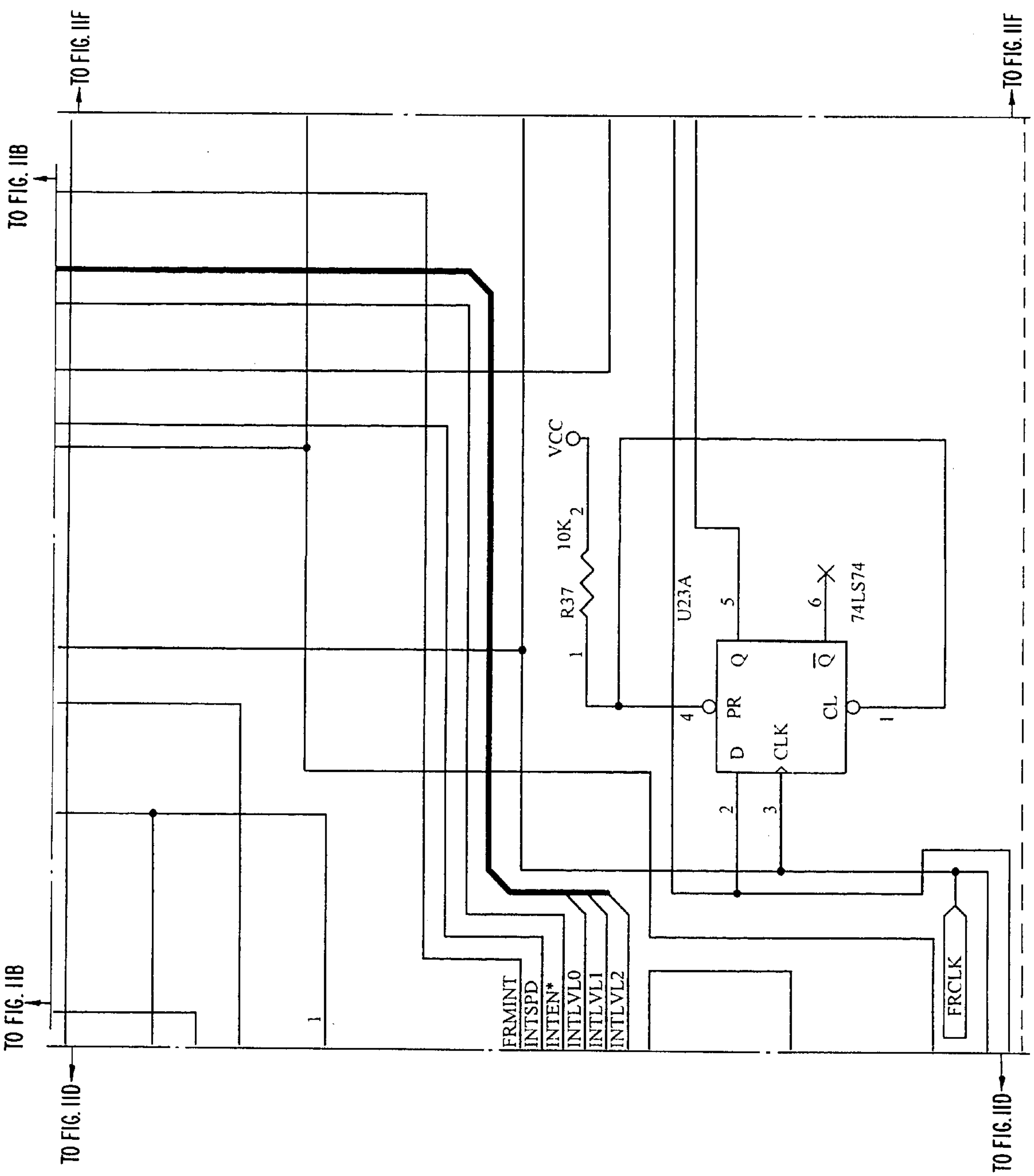
Figure 11F:
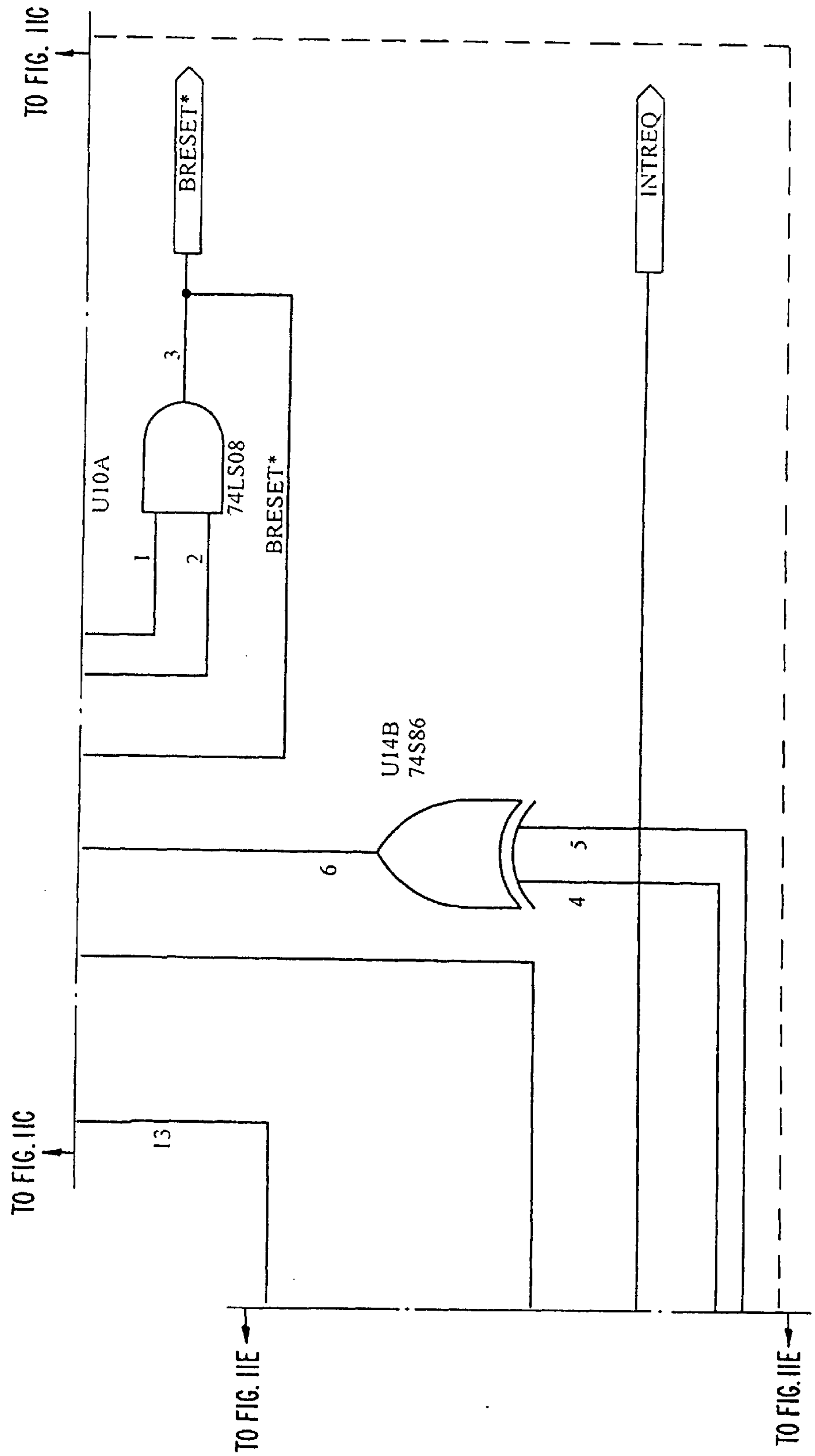
Figure 12A:
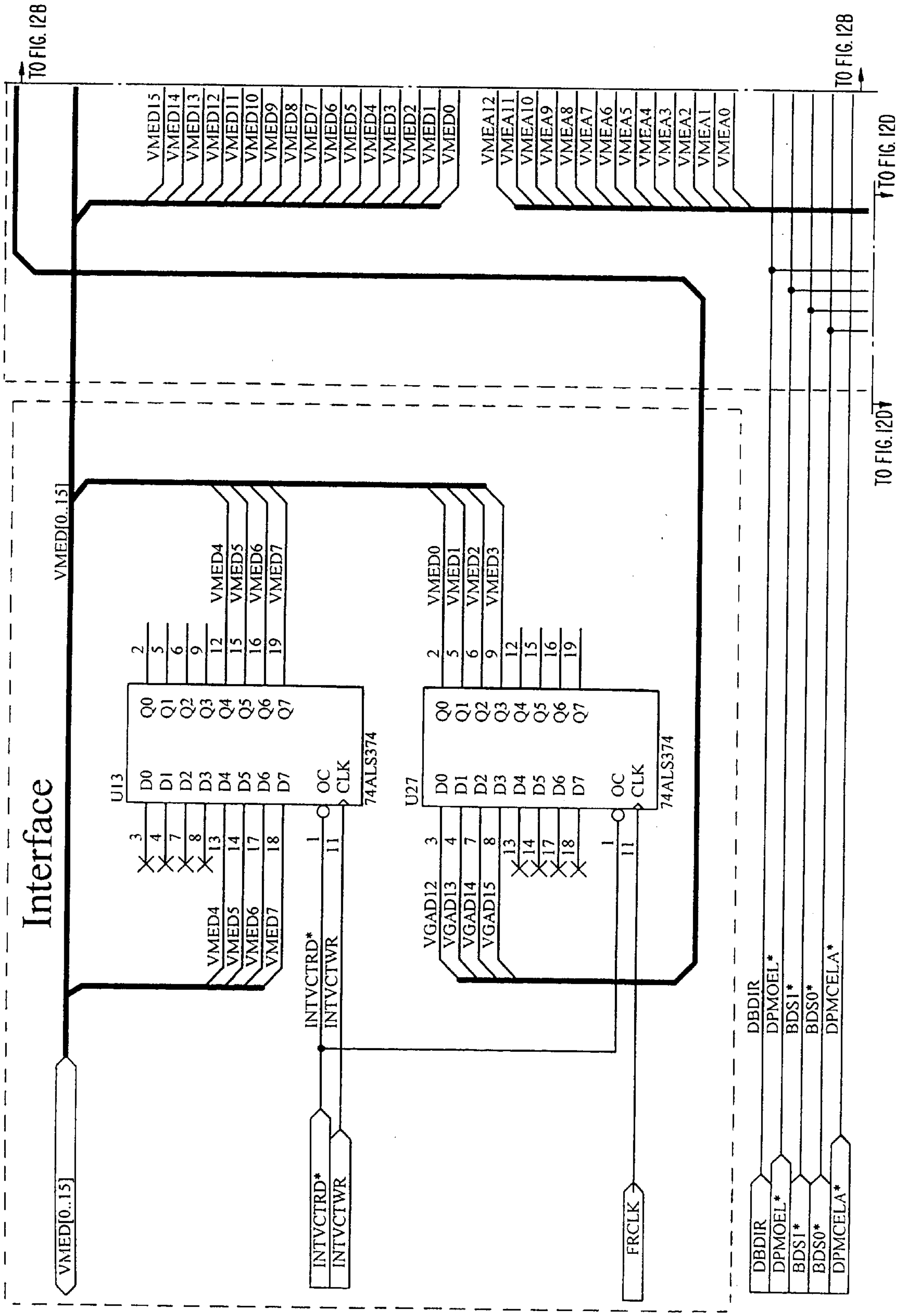
Figure 12B:
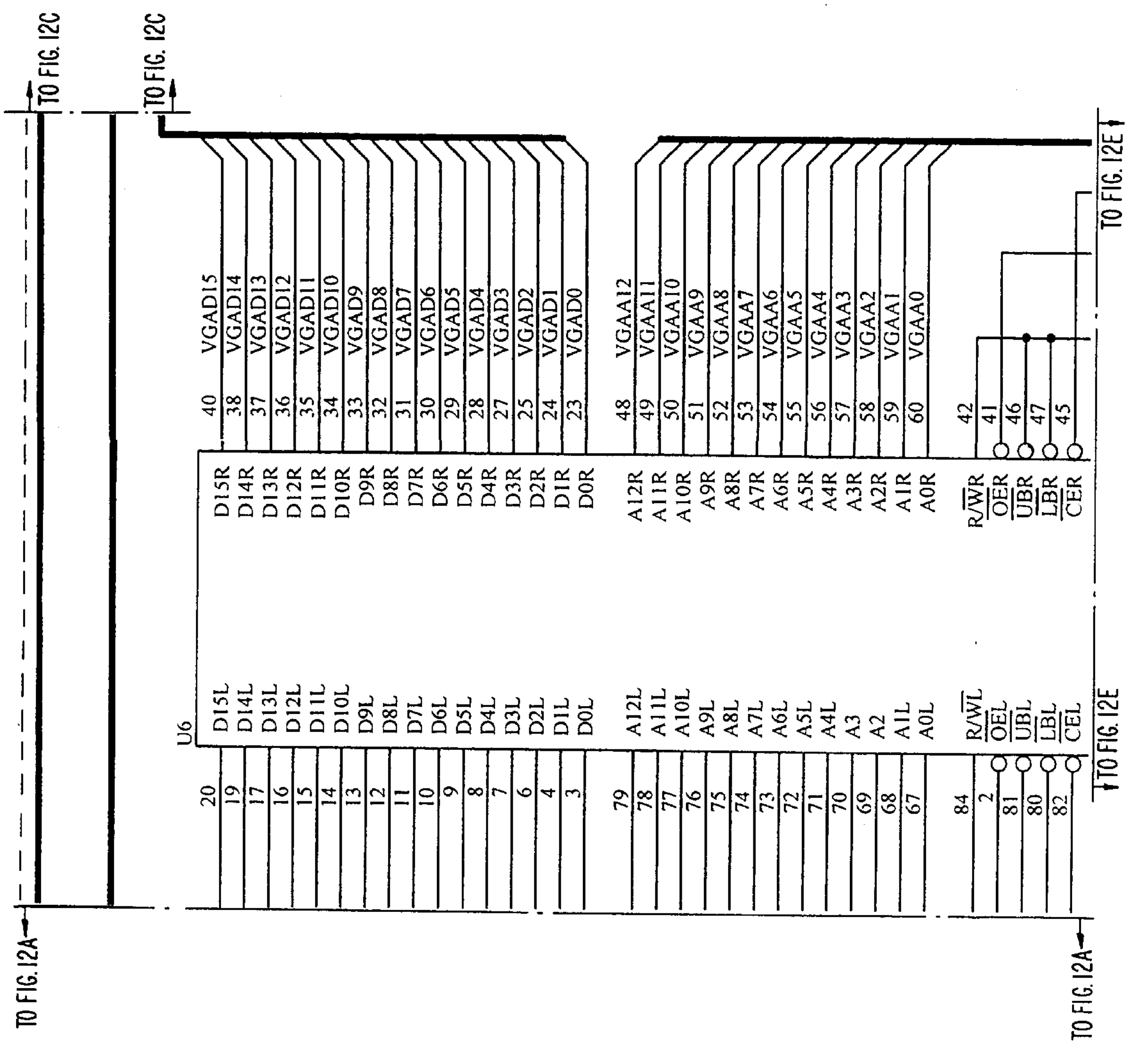
Figure 12C:
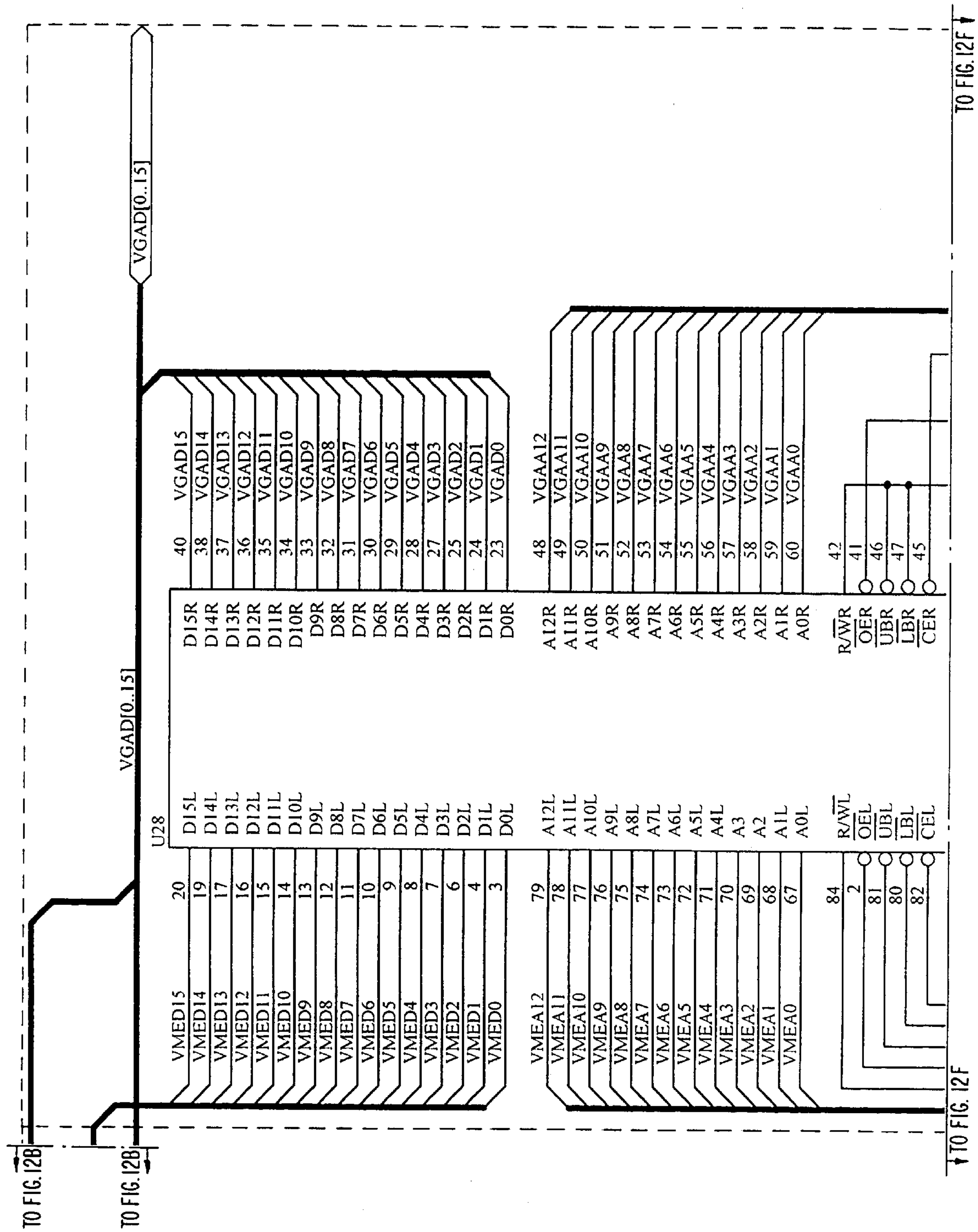
Figure 12D:
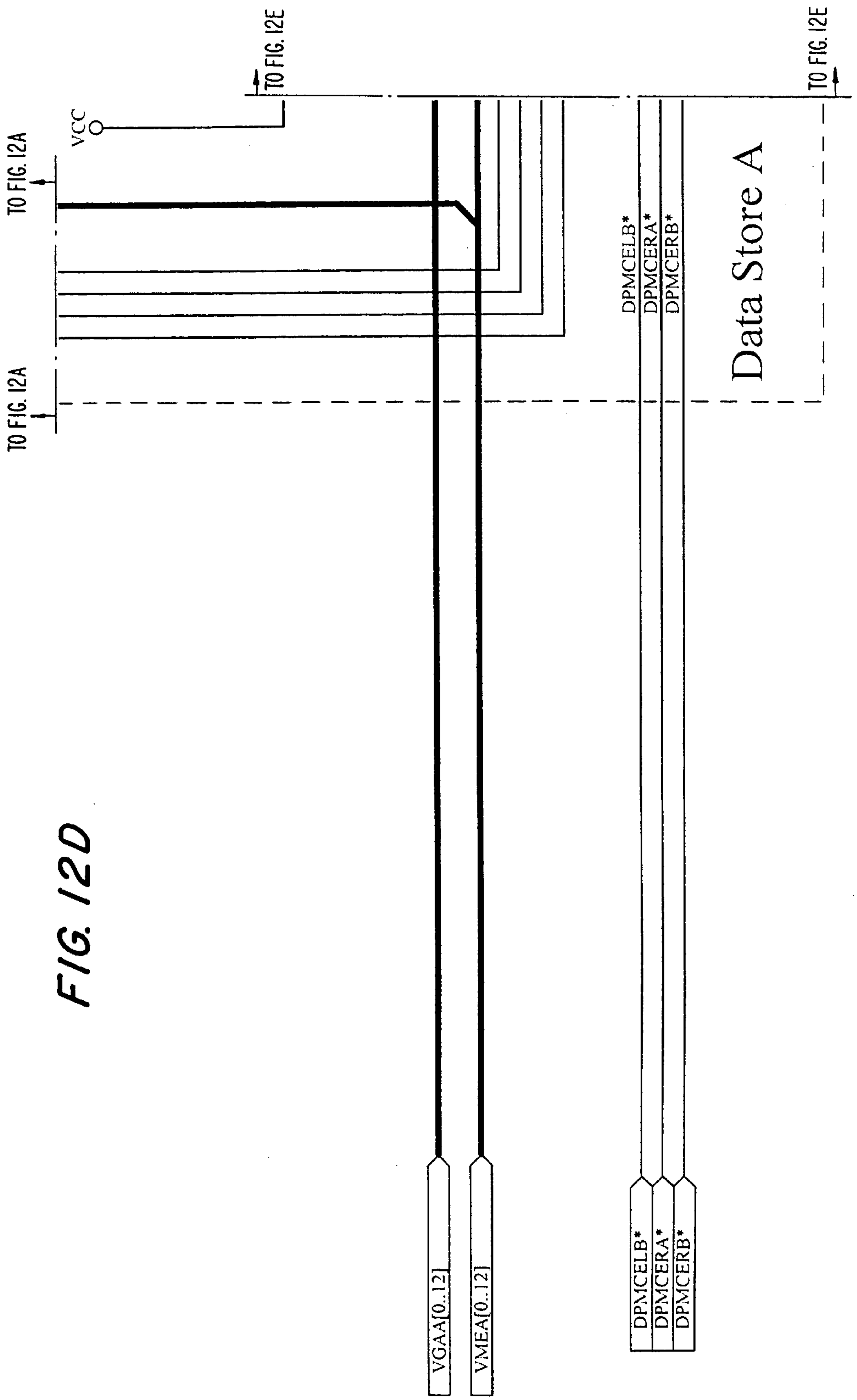
Figure 12E:
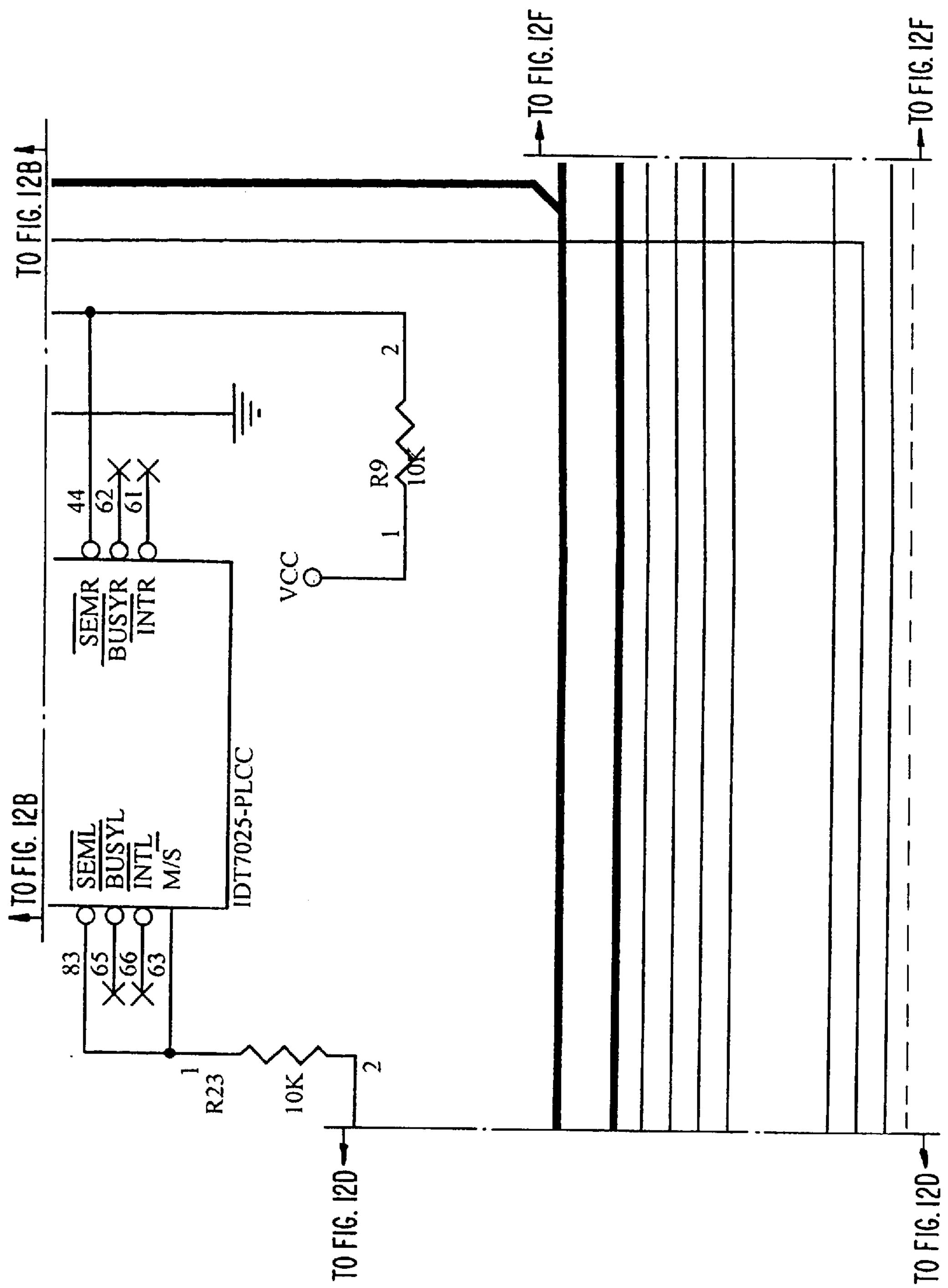
Figure 12F:
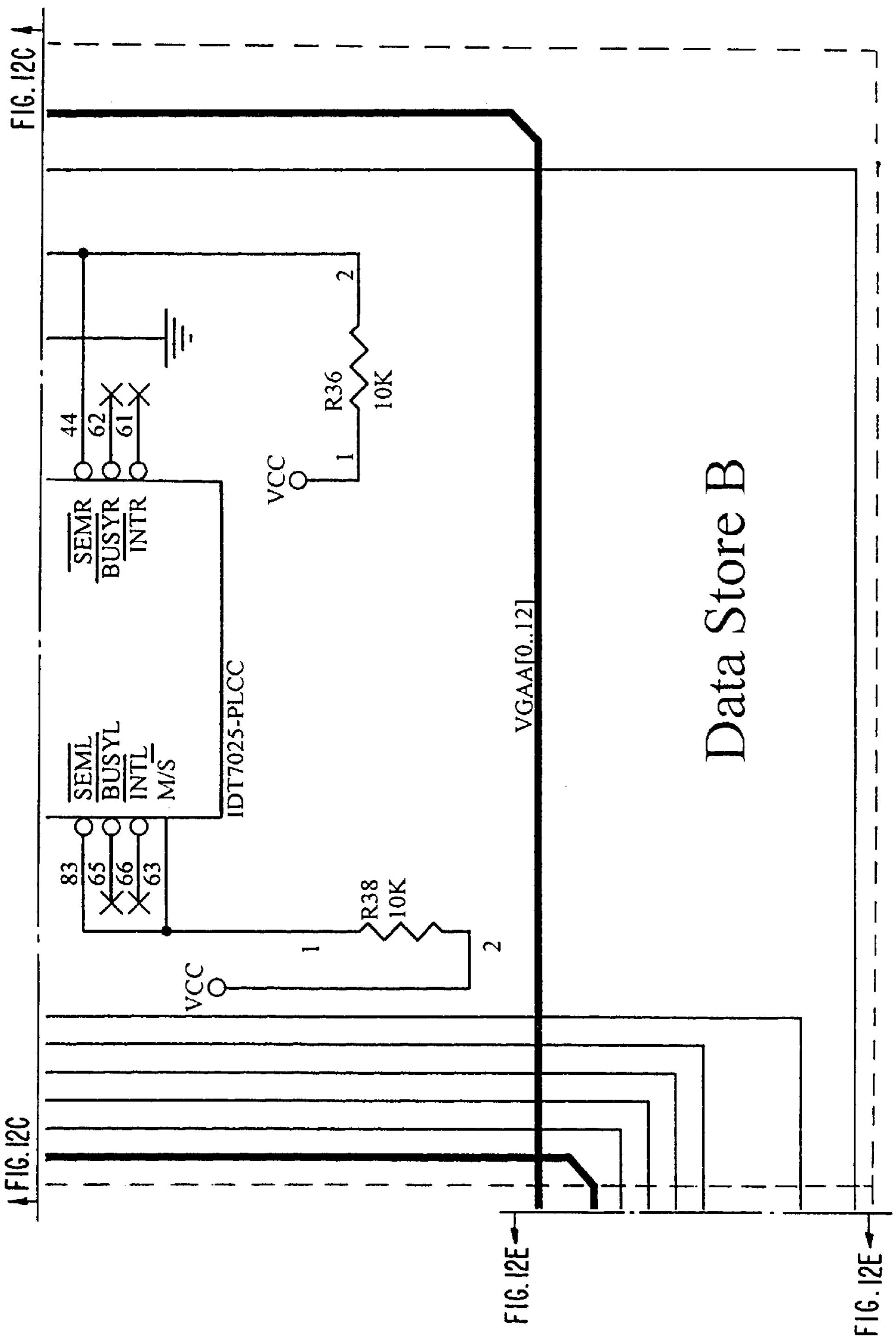
Figure 13A:
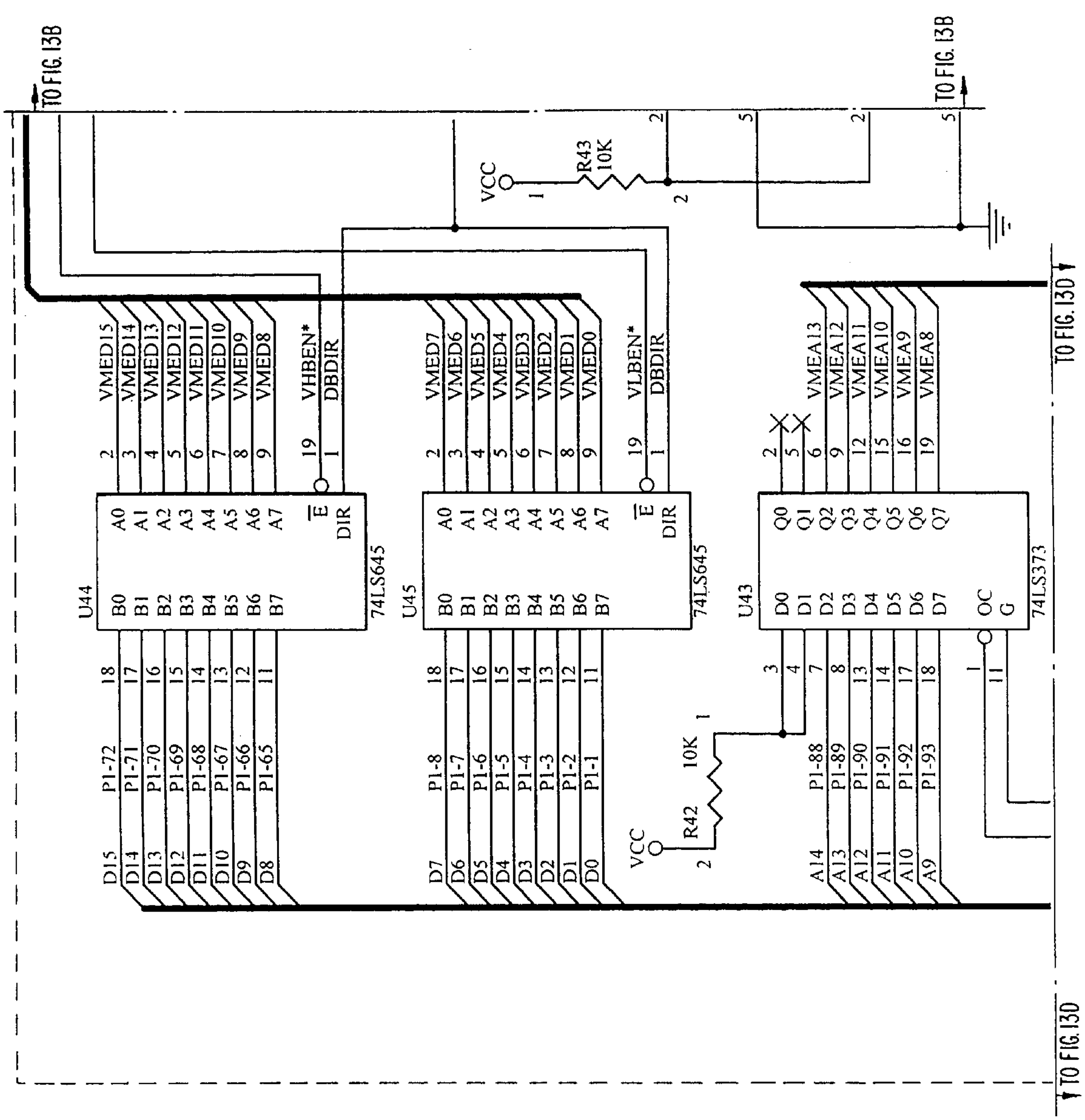
Figure 13B:
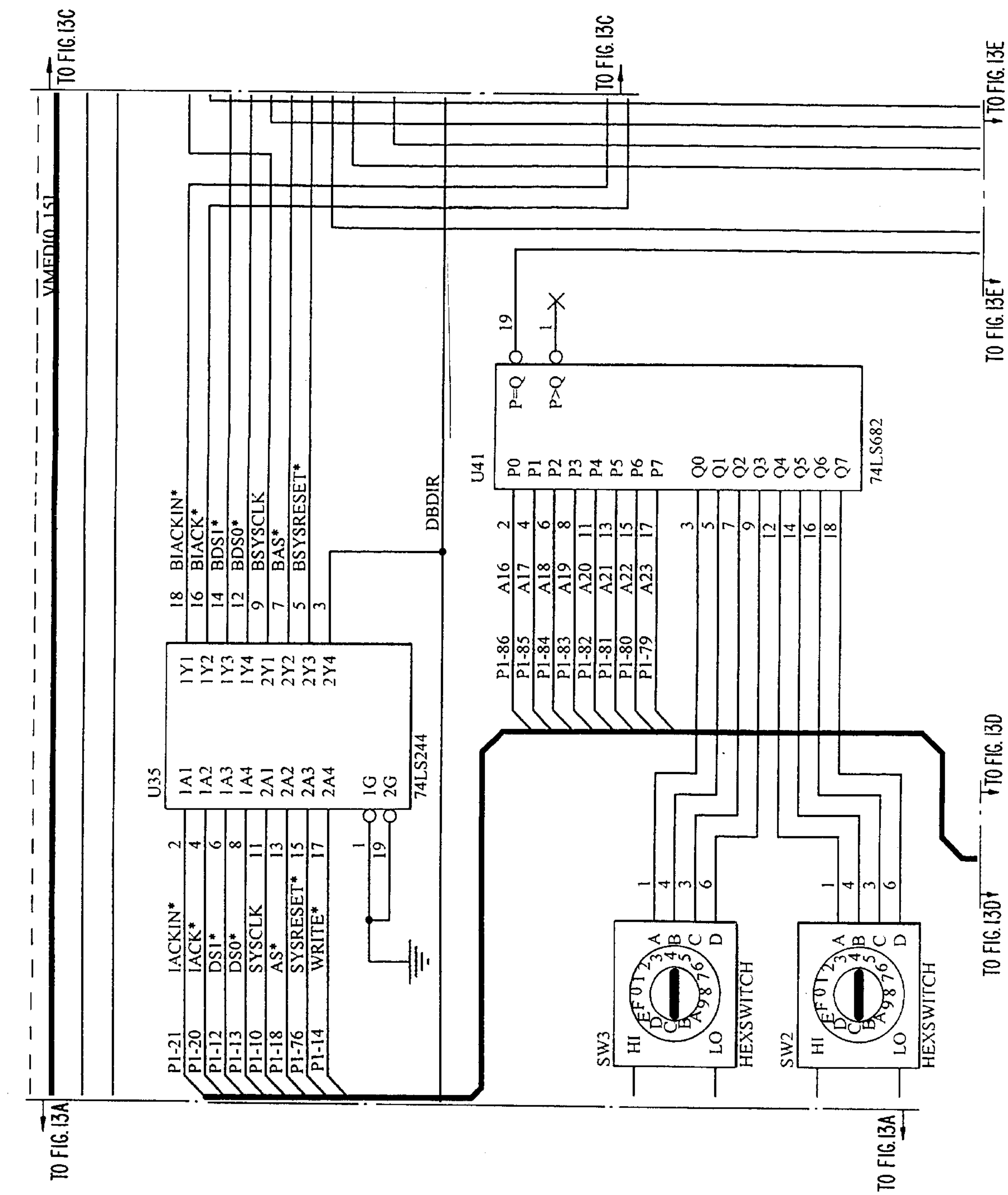
Figure 13C:
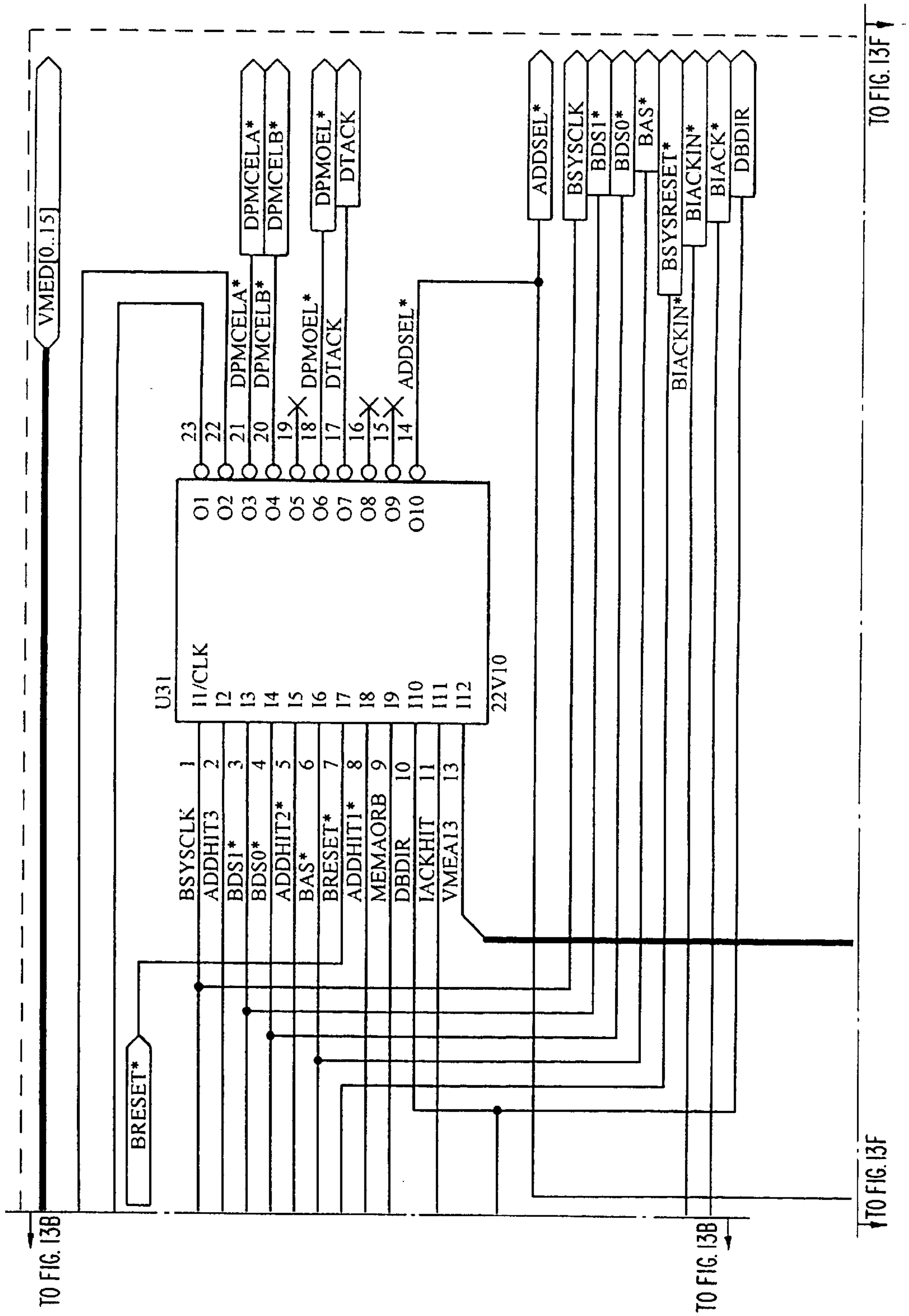
Figure 13D:
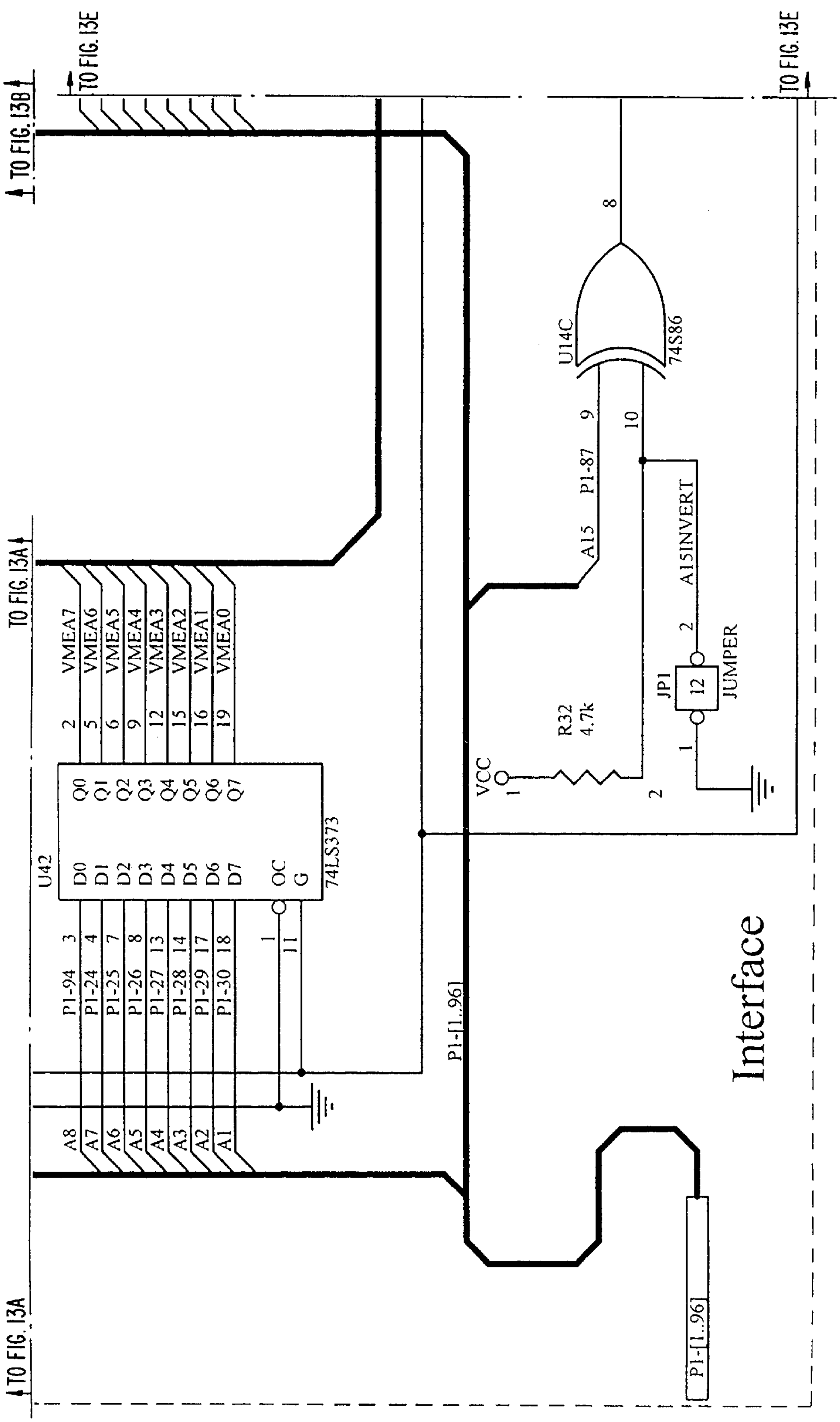
Figure 13E:
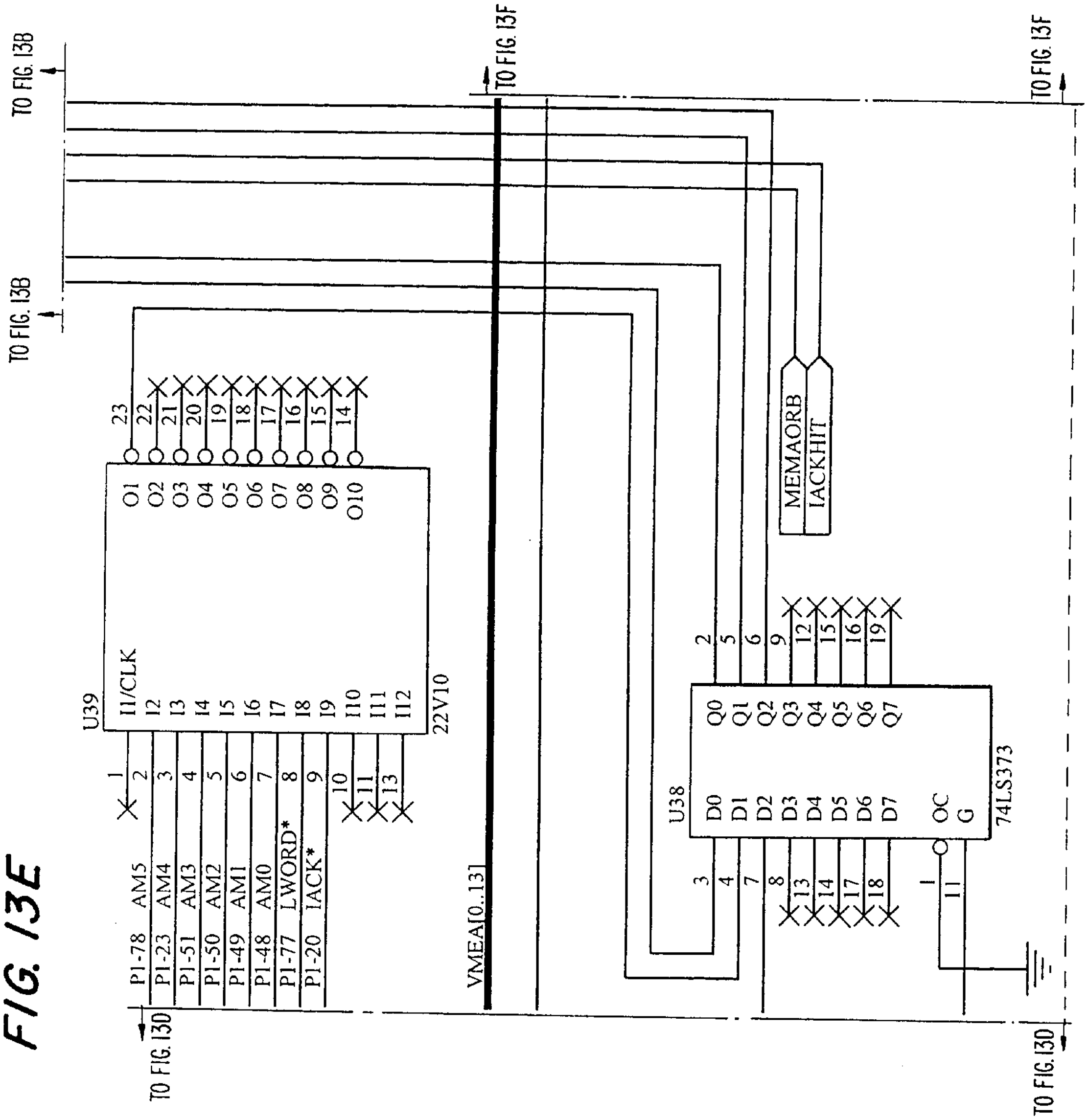
Figure 13F:
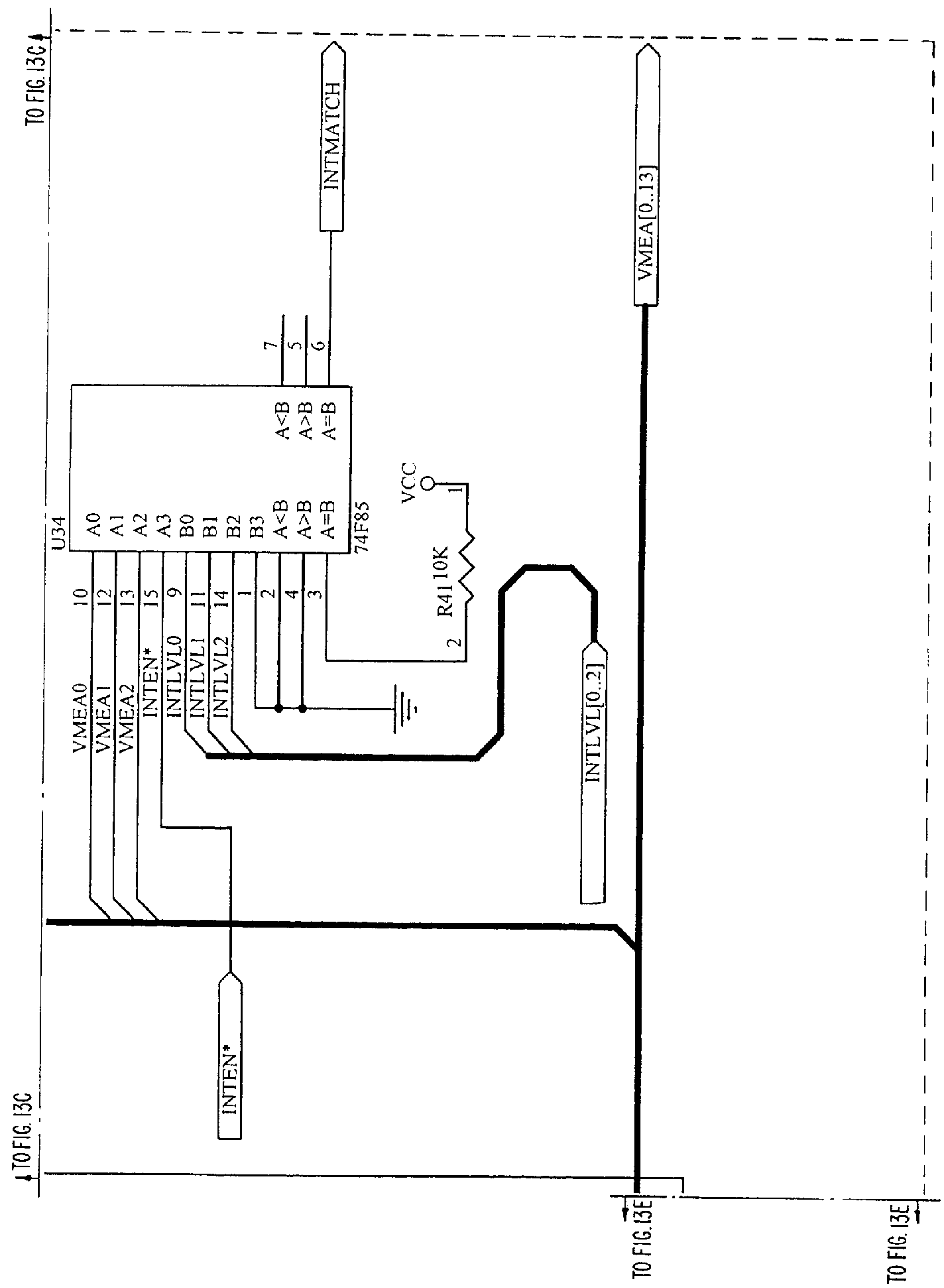

FIG. 4 illustrates an example of a scan line protocol for encoding individual lines of the video formatted frames outputted by the video graphics display processor 20. There are 640 pixels in each of the 480 scan lines which are transmitted in five fields as illustrated in FIG. 4. It should be understood that when Manchester coding is used to encode each bit. Each data bit in each of the fields of FIG. 4 from the address space of the CPU 12 will require two bits to be encoded in a Manchester coded format. The Manchester encoding of each data bit retrieved from the address space of the CPU 12, which is outputted on the video channel 24 under control of the graphics display processor 20, is performed by CPU 12 under control of an application program.

The fields are a scan sync field containing 64 bits, a scan line field containing 32 bits, a control channel containing 16 bits, a trigger field containing 16 bits and a data field containing 512 bits. Thus, because of the use of Manchester coding which requires two bits to encode each data bit in order to provide self-clocking information, the scan sync field will be comprised of 32 bits, the scan line field will be comprised of 16 bits, the control channel will be comprised of 8 bits, the trigger field will be comprise of 8 bits and the data field will be comprised of 256 bits for a total of 320 bits or 40 bytes of actual data.

The scan sync field is optimized to contain a constant pattern of alternating ones and zeros to permit the clock signal to be derived by the clock recovery circuit 42 by permitting a phase lock loop to lock an oscillator to a frequency at which the scan field bits alternate between a one and zero value as described above. The 64 bits in the scan sync field stabilize the phase lock loop of the oscillator within the clock recovery circuit 42 which provides the clock signal on the output thereof to the sync detector 40 with sufficient stability to permit a remainder of each line of a video frame to be processed without further synchronization information. After the initial pixel clock rate is established for each line within the clock recovery circuit 42 by processing the scan sync field, the phase lock loop circuit maintains the video data acquisition subsystem 32 within synchronization for the remainder of the scan line. If synchronization is lost at the end of the line, it will be reacquired on the next line by processing the next 64 bits of the scan sync field.

The scan line field of 32 bits is an address of each scan line in the frame. Numbering starts at zero for the first scan line transmitted following VS. Each scan line address is incremented by one. This technique allows the video data acquisition subsystem 32 to determine the total number of scan lines transmitted with each frame and allows processing when the video frame format is unknown to contain a specified or fixed number of scan lines. The first scan line is detected by the presence of a zero in the scan line field. The line address can also be used to generate addresses at which each scan line's data is stored in the data stores 46.

The control channel of 16 bits provides a mechanism for the program of the CPU 12 to send an "out-of-band" stream of data or control signals to either the video data acquisition subsystem 32 or system control, storage processor and memory 34. With each frame occurring at 60 frames per second, up to eight bits of control information, or data, can be passed to the video data acquisition subsystem 32 and system control, storage processor and memory 34. The high order four bits may be used to interrupt the operation of the storage control, storage processor and memory 34. All eight bits are available to the system control and storage processor 34 as a byte-wide status register. The control channel can be used in numerous ways but the four high order bits can be used to provide an efficient method of identifying the contents of each frame. The four low-order bits can be used to pass data directly to the system control, storage processor and memory 34. Quantities, such as the amount of data remaining, the frame dimensions, the refresh rate, etc., may be encoded with this field.

Frame synchronization is maintained between the CPU 12 and the video data acquisition subsystem 32 for another reason. The CPU 12 controls providing data to the video random access memory 19. The CPU 12 may be able to keep up with the data requirements of the video random access memory 19 and the graphics display processor 20 and therefore send out 307,200 bits per frame as described above. If the CPU 12 cannot keep up with the requirements of the video random access memory 19, the graphics display processor 20 will retransmit whatever is currently in the video random access memory resulting in some frames being sent out more than once. The video data acquisition subsystem 32 must be able to distinguish between new and old frames of data to determine which frames to store and which to ignore.

The trigger field of 16 bits provides the bits necessary for the synchronization. The application program of the CPU 12 increments a counter in the trigger field only when the entire 640 bits×480 line frame has been coded and is ready to be transmitted to the video data acquisition subsystem 32. By the time the video data acquisition subsystem 32 receives the trigger field as explained above, it will have already stored the previous frame in its internal memory which includes the data stores 46 which function as first and second frame buffers. As explained above, the video data acquisition subsystem 32 monitors the state of the least significant bit of the trigger field counter maintained by the CPU 12 for changes from one frame to the next. Since the field contains an incrementing counter, the low-order bit toggles between zero and one each time the counter is incremented. As stated above, the dual-ported data stores 46 of the video data acquisition subsystem 32 have two frame buffers with each being large enough to hold an entire 640 bits by 480 line decoded data frame.

Each of the data stores 46 holds a single frame of decoded data. While the state of the trigger bit (the low-order bit and the trigger field) remains fixed, the video data acquisition subsystem 32 continues to overwrite the data in the current buffer with each successive frame. The video data acquisition subsystem 32 stops writing into the current buffer of the data stores 46 with new data and begins writing into the other frame buffer when the trigger bit toggles. As the trigger bit toggles, the video data acquisition subsystem 32 begins writing data from the next frame into the other frame buffer of the data stores 46. When a complete data frame has been stored, a DATA READY signal is sent to indicate that a new data block is available for transfer to the system control and storage processor and memory 34 via the interface 33.

The dual-ported memory in the form of the data stores 46 permits the CPU within the storage control, storage processor and memory 34 to read data from one memory frame buffer of the dual-ported memory while a new data frame is being stored in the other frame buffer and to read and write data into the first and second frame buffers of the system control, storage processor and memory 34 in the same fashion as data is being read and written into the data stores 46. Once a complete frame has been transferred to the system control, storage processor and memory 34 over the interface 33, the two frame buffers of the data stores 46 are interchanged in function and the process is repeated.

If the CPU 12 program causes the trigger bit to toggle after a valid frame has been stored in the video random access memory 19 connected to the graphics display processor 20 and prior to writing the first bit of the next frame, the required CPU 12 to system control and storage processor and memory 34 synchronization is achieved. The CPU 12 program can write as much of the next frame as desired following the trigger bit since the frame buffer switch will take effect before the first data bit of the new frame is stored by the video data acquisition subsystem 32. It is not necessary for the CPU 12 to wait until the storage control and storage processor 34 has received the trigger bit before writing the next frame of data. The graphics display processor 20 performs the transmitting first, followed by the trigger bit and then additional data bits.

The data field of 512 bits in FIG. 4 transfers actual data from within the memory space of the CPU 12. With the video format given in the above example, 480 scan lines times 256 data bits (32 bytes) per line, can be transferred with each frame. Therefore, as stated above, up to 921,600 bites per second can be transmitted from the CPU 12 to the video data acquisition subsystem 32 continuously if the CPU 12 keeps up with the graphics display processor 20. Faster CPU's 12 are capable of performing this task.

One reason a fast CPU 12 may not keep up with the graphics display processor 20 is that, during backup, it has to read data from the hard drive 14 which takes additional time, with several frames being required to perform the complete disk read. This is particularly true when large disk blocks are being read to optimize the disk I/O. While the CPU 12 is accessing the hard drive 14, calibration data can be continuously sent to the storage control and storage processor and memory 34 for validation. The storage control and storage processor and memory 34 will differentiate between calibration data and valid CPU data by the contents of the control field. If calibration data is found to be incorrect, the operator must be notified by the storage control and storage processor 34 so that the backup process can be terminated. By sending calibration data every time the hard drive 14 is accessed, the validity of the backup is periodically checked throughout the entire backup process.

If frame by frame calibration is desired, the low-order four bits of the control field can be used. This allows for validation of the control field but, does not validate bits in other regions of the scan line, such as the data field.

Furthermore, the first and second frame buffers of the data stores 46 provide temporary storage and synchronization between the video data acquisition subsystem 32 and the system control, storage processor and memory 34. The system control, storage processor and memory 34 must be sufficiently fast to keep up with the average data transfer rate thereto but may at times be unable to keep up with each transmitted individual frame while storing data in its storage device. The use of first and second frame buffers in the system control, storage processor and memory 34 allows the capture of data sent to it. This is sufficient to keep up with the video data acquisition subsystem 32.

When the video data acquisition subsystem 32 notifies the system control, storage processor and memory 34 that one of the data stores 46 is ready to transfer data, the system control and storage processor will transfer the contents of one of the data stores 46 of the video data acquisition subsystem 32 to its own frame buffer space which is comprised of first and second frame buffers and block it for optimal output to the removable storage 36. The first and second frame buffers of the system control and storage processor and memory 34 function in the same fashion as the data stores 46 which function as frame buffers of the video data acquisition subsystem 32 which allow one frame buffer to be written into while the other is being filled and outputting information to the removable storage device 36.

The system control, storage processor and memory 34 includes a set of input/output registers to allow the CPU therein to control operating parameters within the video data acquisition subsystem 32 and to monitor its status. Parameters such as the approximate video formats expected and the number of bits in each field of the data packet format of FIG. 4 can be passed from the system control, storage processor and memory 34 to the video data acquisition subsystem 32 to allow adapting to a wide variety of PCs.

The restore block 60 functions to perform restoration as follows. When the backing up of files of the CPU 12 is required, the format of the backup data stored in the removable storage 36 is important. The format used allows the original CPU 12 internal hard disk drive to be reconstructed on a file-by-file basis or to have the entire disk restored as a bit image. Two methods may be used to perform this task. In the first method, the data written into the system control, storage processor and memory 34 represents an exact image of the original data stored in the disk of the CPU 12. The PC restore program executed by block 60 uses a PC-based device driver to map individual disk read commands into the disk read commands required to read each sector off of the removable storage 36 as though it still resided on the original CPU 12 disk. The second method also uses data written in the removable storage device 36 which is an exact image of the original CPU 12 disk partition. The program executed by the block 60 uses a driver which processes the removable storage 36 as an extended partition of its own containing one or more logical drives. The user will be able to change to the direct logical drive and allow the operating system to read the files directly as though there were files contained by that operating system.

The storage control, storage processor and memory 34 is a fast general-purpose single card computer containing associated memory and further functioning to store collected data on removable storage 36 or to transmit the data by a communications channel (not illustrated) to support diverse applications for the data stored in the internal hard drive 12. Pages 66–197 of the Appendix contain a computer code listing that in association with the circuit schematic of FIGS. 5A–5B, 6A–6D, 7A–7E, 8A–8F, 10A–10C, 11A–11F, 12A–12F and 13A–13F are an embodiment of the present invention. Furthermore, pages 1–65 contain a computer code listing which may be used to control the graphics display 20 which functions in conjunction with the remaining parts of FIG. 3 including the system control, storage processor and memory 34 to practice the present invention. The system control, storage processor and memory 34 is responsible for setting up the mode of operation of the video data acquisition subsystem 32 and monitoring the progress of the backup operation when original data stored within the memory space of the CPU 12 is being restored. The system control, storage processor and memory 34 monitors the amount of data transmitted and computes the estimated time to complete the backup process. The system control, storage processor and memory 34 stores all the collected data and validates calibration data. When operator feedback is utilized, the system control, storage processor and memory 34 is responsible for the generation and formatting of user messages.

As has been stated above, while a preferred embodiment of the present invention, as described above in conjunction with FIG. 4 utilizes the scan sync field to produce the local clock signal necessary for completing processing of the transmitted at least one serial data stream into parallel data having the same number of bits as the number of bits stored in each addressable location of the CPU 12 memory, it is also possible to transmit on one line of the video channel 24 data which has not been formatted with self-clocking information and to transmit on another line of the video channel an alternating sequence of ones and zeros at the same bit rate as the data on the one channel for the purpose of functioning as a clock recovery 42 to be applied directly to the data recovery 44.

While the invention has been described in terms of its preferred embodiments, it should be understood that numerous modifications may be made thereto without departing from the spirit and scope of the invention as defined in the appended claims. It is intended that all such modifications fall within the scope of the appended claims.

APPENDIX

Figure 3:
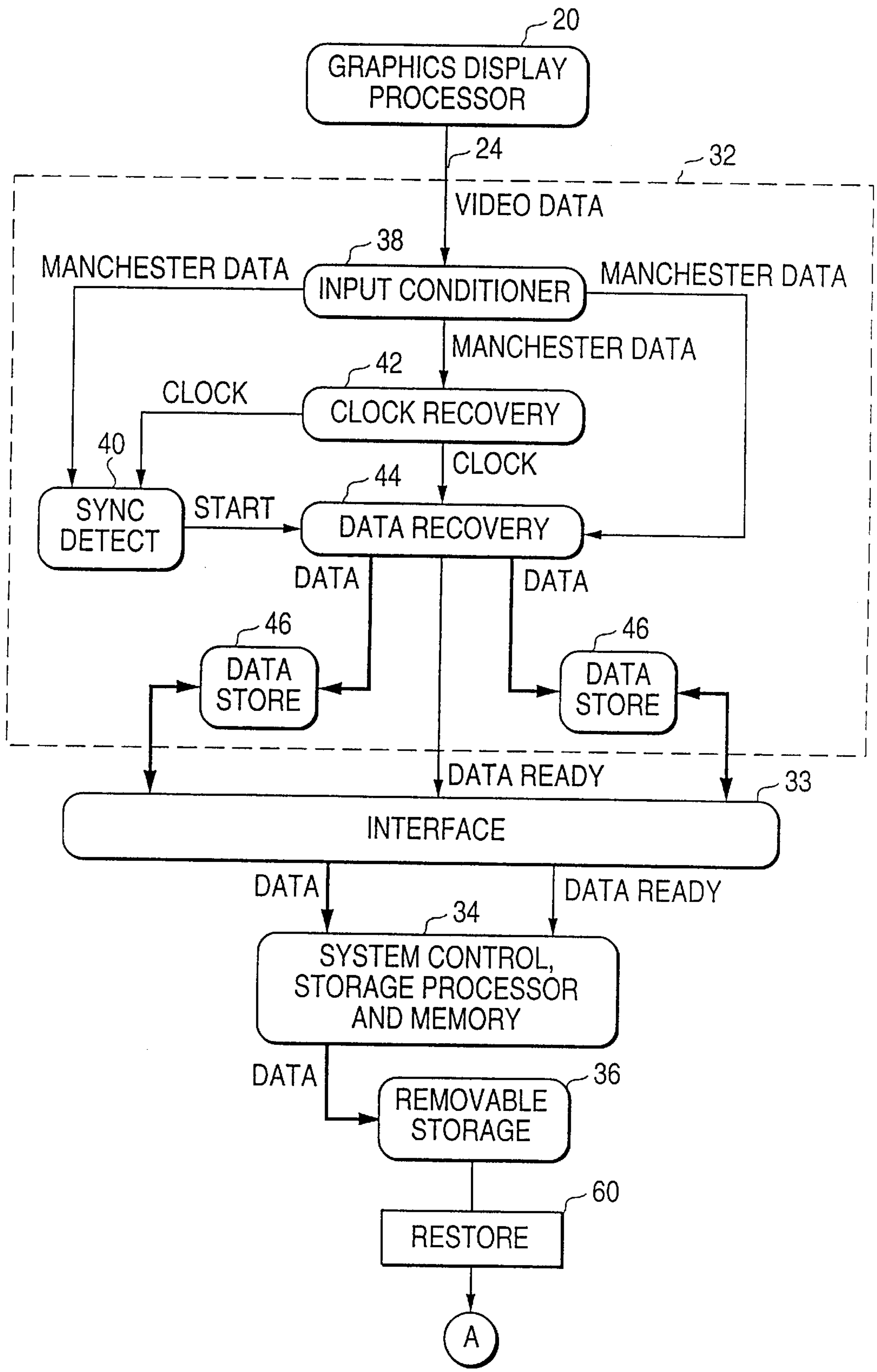
FIG. 3 is an expanded block diagram of an embodiment of the video data acquisition subsystem 32 and the interface 33, system control, storage processor and memory 34, removable storage 36 and restore function 60 of FIG. 2.

Attached hereto is an Appendix containing 197 pages of code used in association with an embodiment of the invention as represented by the block diagram of FIG. 3. Pages 1–65 are used to control the graphics display processor 20 of FIG. 3. Pages 66–197 are used to control the system control, storage processor and memory 34 of FIG. 3 and the circuit schematic of FIGS. 5A–5B, 6A–6D, 7A–7E, 8A–8F, 10A–10C, 11A–11F, 12A–12F and 13A–13F.

95/04/13 13:18:14

© Sparta, Inc. 1995 backup.h

ROOM OCT 10 1995 TRADEMARK OFF.

```
/***********************************************************************/
/*                    Header file for Backup Devices                   */
/***********************************************************************/

/***********************************************************************/
/*                    GENERIC Includes                                 */
/***********************************************************************/

#include "vxWorks.h"
#include "ioLib.h"
#include "ioctl.h"
#include "stdio.h"
#include "scsiLib.h"
#include "config.h"
#include "time.h"
#include "taskLib.h"
#include "string.h"
#include "sysLib.h"
#include "usrConfig.h"
#include "dosFsLib.h"
#include "rawFsLib.h"
#include "usrLib.h"
#include "fioLib.h"
#include "logLib.h"
#include "ctype.h"
#include "tickLib.h"
#include "errnoLib.h"

#ifndef HKV4D
#include "ds1286.h"
#endif

#define swapl(x)  ((((x) & 0x000000ff) << 24) | \
        (((x) & 0x0000ff00) <<  8) | \
        (((x) & 0x00ff0000) >>  8) | \
        (((x) & 0xff000000) >> 24))

#define swaps(x)  ((((x) & 0x00ff) << 8) | \
        (((x) & 0xff00) >> 8))


/* Backup Types */
#define VBU 1
#define SBU 2

/* SCSI bus show commands */
#define SHOW_ONLINE 0
#define SHOW_ALL 1

#define MAX_BYTES_PER_LINE 16
#define MAXLINE 80

/* dual SCSI Bus Debugging Flag */
#define DUMP_SCSI_PHYS_DEV_PTRS 1
#define DUAL_SCSI_DEBUG 2
/* Disk Sector Size */
#define SECTOR_SIZE 512

/* Disk image file name */
#define IMAGE_FILE "image.dat"

/* SCSI Phys Dev and Block dev for boot device and backup device */

extern SCSI_PHYS_DEV *pSpd00;   /* SCSI Physical device */

extern BLK_DEV *pSbd0;          /* block device for boot drive */
extern BLK_DEV *pSbd1;          /* block device for image drive */

/* Boot disk name */
#define BOOT_DISK "/sd0/"

/* Image disk name */
#define IMAGE_DISK "/sd1/"

/* showAvailableDataSources Request Type */
#define SHOW_DISK_BACKUP 0
#define SHOW_DUMP_SECTOR 1
#define SHOW_DISK_RESTORE 2
```

```
#define SHOW_MODIFY_SECTOR 3
#define SHOW_STRING_SCAN 5
#define SHOW_FORMAT 6
#define SHOW_SCRUB 7

/* Request User Input Return */
#define NO_USER_INTERACTION 0
#define RESTORE_IMAGE 1
#define DELETE_IMAGE 2
#define DUMP_SECTOR 3
#define FDISK_PARAMETERS 4
#define MODIFY_SECTOR 5
#define STRING_SCAN 6
#define FORMAT_IMAGE 7
#define SCRUB_IMAGE 8

/* Number of Bytes in each Edit sample for SCSI devices */
#define WINDOW_SIZE 0x100  /* 256 Bytes */

/* Number of Bytes in each disk patch sample */
#define PATCH_SIZE  0x100  /* 256 Bytes */

/* up to 8 (0-7) SCSI Devices */
#define MAX_SCSI_ID 7

/* Mbytes/sec transfer rate guess used in estimating backup time */
#ifdef VBU_SETUP
#define TIME_CONSTANT .8
#else
#define TIME_CONSTANT 1.5
#endif

/* Help Scroll Window Size */
#define SCROLL_AMOUNT 10

/* Base size for the amount to copy in each read/write operation */
#define COPY_WINDOW_SIZE 0x4000  /* 16KBytes */

#define MAX_COPY_BUFFERS 4
#define MAX_COPY_BUFFER_SIZE 0x100200

struct copyBlockMsg {
  ULONG   seekPosition;
  ULONG   bufferSize;
  int     destinationFd;
  SEM_ID  blockSem;
  char    *bufferAddr;
};

struct copyBlockMsg copyBuffer[MAX_COPY_BUFFERS];

/* how many bytes in a Megabyte (1024*1024) */
/* This differs from how disk Manufacturers look at a Megabyte (1000000) */
#define BYTES_PER_MEGABYTE 1048576

/* how many bytes in a Disk Vendor's Megabyte (1000000) */
#define DISK_VENDOR_MEGABYTE 1000000

/* Maximum number of images on the image Disk */
#define MAX_NUM_IMAGES 100

#define BITS_IN_BYTE 8               /*   how many bits in a bytes?         */

#define DOT_PRINT_RATE 0x80000       /*   num bytes before printing a dot   */

#define XFER_BUFFER_SIZE 4096        /*   size of buffer used in NFS xfers  */

#define VBU_WINDOW_SIZE 0x3c00       /*   size of VBU window in RAM (15KB)  */

#define REPORT_RATE 5                /*   report rate in secs on            *
                                      *   # WINDOW_SIZEs captured           *
                                      *                                     */
#ifndef NONE
#define NONE       -1      /* there is nothing                     */
#endif

#ifndef TRUE
#define TRUE        1      /* is something TRUE?                   */
```

```
#endif

#ifndef FALSE
#define FALSE       0       /* is something FALSE?                    */
#endif

/*  This is the main VBU data structure.  We keep most of the info here
 *  so it doesn't appear as global data in VxWorks.  Just to protect
 *  the guilty
 */

struct VBU_STRUCT {
  UINT32  diskSize;            /* size of the disk in bytes               */
  char    description[128];    /* description of source disk              */
  char    fileName[80];        /* file name to open for writing           */
  char   *baseAddress;         /* base address of the VBU hardware in A24 */
  char   *intVectorReg;        /* address of the VBU Int Vector register  */
  UINT16 *statusReg;           /* pointer to VBU status register          */
  char   *validReadBuf0;            /* pointer to read buffer 0                */
  char   *validReadBuf1;            /* pointer to read buffer 0                */
  char   *validReadBuf0MaxAddr;     /* last address in read buffer 0           */
  char   *validReadBuf1MaxAddr;     /* last address in read buffer 0           */
  char   *validOffsetReadBuf0;      /* current offset in read buffer 0         */
  char   *validOffsetReadBuf1;      /* current offset in read buffer 0         */
  int     validCurrentBuf;
  int     validFramesInBuf;
  UINT32  numBytesWritten;
  UINT32  partition1Start;
  UINT32  partition2Start;
  UINT32  partition3Start;
  UINT32  partition4Start;
  int     currentPartition;    /* which buffer am I currently using?      */
  int     intLevel;            /* which VME Interrupt Level (1-7)         */
  int     intVector;           /* VME Interrupt Vector                    */
  int     validPipeFd;         /* file descriptor for the ISR->task commo */
  int     calibrationPipeFd;   /* Pipe for calibration data               */
  int     diskSizePipeFd;      /* Pipe for disk size & description info   */
  int     configDataPipeFd;    /* Pipe for MSD config Data info           */
  int     validFileFd;         /* file descriptor for writing to disk     */
  int     configFileFd;        /* file descriptor for writing to disk     */
  int     calibrationFileFd;        /* file descriptor for writing to disk     */
  int     prevStatus;          /* previous status of memory page (0/1)    */
  SEM_ID  vbuSem1;             /* protects num pages written info         */
  SEM_ID  vbuSem2;             /* lets us know that ISR is done           */
  SEM_ID  vbuSem3;             /* used by WatchDog timer to sched counter */
  SEM_ID  controlRegSem;       /* protects the control register           */
  WDOG_ID vbuWatchDog1;        /* watchdog timer used by counter routine  */
  UINT32  alreadyTerminated;   /* task ID of the vbuWriter task           */
  UINT32  validTaskId;         /* task ID of the vbuWriter task           */
  UINT32  countTaskId;         /* task ID of the vbuCounter task          */
  UINT32  calibrateTaskId;     /* task ID of the calibration task         */
  UINT32  diskSizeTaskId;      /* task ID of the diskSize task            */
  UINT32  configDataTaskId;    /* task ID of the configData task          */
  UINT32  firstTime;           /* is this the first time through the ISR? */
  UINT16  controlWord;         /* control word written to the vbu board   */
                               /* for setting reset bit, interrupt enable */
                               /* and interrupt level CONTROL WORD IS     */
                               /* WRITE-ONLY!!                            */
};


/*****************************************************************************/
/*          Type Declarations for Backup Disk Parition Management            */
/*****************************************************************************/

struct masterHeader {
  int numCurrentDiskImages;
  int numFreeDiskImages;
  ULONG totalImageSpace;
  ULONG largestFreeImageSize;
  ULONG nextByteToUse;
  ULONG lastFreeByte;
  ULONG lastFreeSpace;
  } masterElement;

struct imageHeader {
  int  inUse;
  int  backupType;
```

```
  char description[80];
  char imageDate[10];
  char imageTime[10];
  int  imageSize;
  int  reportedDiskSize;
  int  startingLocation;
  char vendorID[9];
  char productID[17];
  int  scsiBusID;
  ULONG partition1Start;
  ULONG partition2Start;
  ULONG partition3Start;
  ULONG partition4Start;
  ULONG previousImageStartingLocation;
  ULONG nextImageStartingLocation;
  } imageElement;

extern int errno;

/*****************************************************************************/
/*      define array of pointers to all possible physical devices             */
/*****************************************************************************/

SCSI_EXTERN SCSI_PHYS_DEV *pScsiPhysDev[8];

/*****************************************************************************/
/*  define 2 block device pointers to each possible device just in case      */
/*****************************************************************************/

SCSI_EXTERN BLK_DEV       *pScsiBlkDev[7][1];  /* array of 7 phys devs X 2 block devs */
```

95/04/15 16:57:16 backupUtils.c 1

```
/* Helper Routines */
#define SCSI_EXTERN

#include "backup.h"

#include "screenUtils.h"

extern char userResponse;

ULONG debug = 0;

STATUS dumpSector();
STATUS modifySector();
STATUS stringScan();
STATUS scanForStrings();
STATUS formatDisk();
STATUS scrubDisk();

STATUS copyDisk();
VOID display();
VOID modify();

/* I can't find a header for this one but I know it's there */
#ifndef HKV4D
extern STATUS ds1286TimeGet();
#else
extern STATUS sysGetTime();
#endif

#ifndef SAME_SCSI_BUS
/****************************************************************************/
/*                  Type Declaration for Fast (I Hope) SCSI Copies          */
/****************************************************************************/

extern SCSI_CTRL *pSysScsiCtrlCmse;

#define COPY_PIPE_NAME "/pipe/scsiCopy"

SCSI_EXTERN ULONG debug;

SCSI_EXTERN char  diskBuffer[PATCH_SIZE * 2];

int   copyPipeFd;
ULONG scsiWriterId;
int   copyTaskState = 0;

/* STATUS initCopyTask(); */

#endif

int  imageFd;
int  scsiConfigDone = FALSE;
char  diskBuffer[PATCH_SIZE * 2];

STATUS imageFdiskInfo(int targetImage)
  {
    int numExtraChars, nbytes, ix, one = 1;
    char ch, completeFileName[128], diskName[80];
    FILE *imageFile;
                int  partitionSize[5];

                for (ix = 0; ix < 5; ix++) {
                        partitionSize[ix] = NONE;
    }

    bzero(completeFileName, sizeof(completeFileName));
    bzero(diskName, sizeof(diskName));
    strcat(completeFileName, BOOT_DISK);
    strcat(completeFileName, IMAGE_FILE);
    imageFile = fopen(completeFileName, "r+b");

    if (!(imageFile)) {
      printErrMsg(15,1,"Error opening Image File!!");
      return(ERROR);
    }

    fseek(imageFile,
          sizeof(masterElement)+ (targetImage*sizeof(imageElement)),SEEK_SET);
```

95/04/16 16:57:16 backupUtils.c 2

```
nbytes = fread(&imageElement, sizeof(struct imageHeader), 1, imageFile);

            resetTerminal();

            if (imageElement.backupType != VBU) {
                    printErrMsg(15, 1, "This image was not made using the VBU!\n");
                    position(16, 1);
                    printf("You must restore this image using the SBU Software.");
                    delay(5);
  ioctl(fileno(imageFile), FIOFLUSH, one);
  fclose(imageFile);
  return(ERROR);
            }

            if (imageElement.partition1Start != NONE) {
                    partitionSize[1]= imageElement.imageSize;
            }

            if (imageElement.partition2Start != NONE) {
                    partitionSize[1]= imageElement.partition2Start;
                    partitionSize[2]=
                            imageElement.imageSize - imageElement.partition2Start;
            }

            if (imageElement.partition3Start != NONE) {
                    partitionSize[3]=
                            imageElement.imageSize - imageElement.partition3Start;
                    partitionSize[2]=
                            imageElement.partition3Start - imageElement.partition2Start;
            }

            if (imageElement.partition4Start != NONE) {
                    partitionSize[4]=
                            imageElement.imageSize - imageElement.partition4Start;
                    partitionSize[3]=
                            imageElement.partition4Start - imageElement.partition3Start;
            }

            if (imageElement.partition1Start != NONE) {
                    if (partitionSize[1] % BYTES_PER_MEGABYTE)
                      printf("The proper size of Partition 1 is: %d MBytes\n",
                              (partitionSize[1] / BYTES_PER_MEGABYTE) + 1);
                    else
                      printf("The proper size of Partition 1 is: %d MBytes\n",
                              (partitionSize[1] / BYTES_PER_MEGABYTE));
            }

            if (imageElement.partition2Start != NONE) {
                    if (partitionSize[2] % BYTES_PER_MEGABYTE)
                      printf("The proper size of Partition 2 is: %d MBytes\n",
                              (partitionSize[2] / BYTES_PER_MEGABYTE) + 1);
                    else
                      printf("The proper size of Partition 2 is: %d MBytes\n",
                              (partitionSize[2] / BYTES_PER_MEGABYTE));
            }

            if (imageElement.partition3Start != NONE) {
                    if (partitionSize[3] % BYTES_PER_MEGABYTE)
                      printf("The proper size of Partition 3 is: %d MBytes\n",
                              (partitionSize[3] / BYTES_PER_MEGABYTE) + 1);
                    else
                      printf("The proper size of Partition 3 is: %d MBytes\n",
                              (partitionSize[3] / BYTES_PER_MEGABYTE));
            }

            if (imageElement.partition4Start != NONE) {
                    if (partitionSize[4] % BYTES_PER_MEGABYTE)
                      printf("The proper size of Partition 4 is: %d MBytes\n",
                              (partitionSize[4] / BYTES_PER_MEGABYTE) + 1);
                    else
                      printf("The proper size of Partition 4 is: %d MBytes\n",
                              (partitionSize[4] / BYTES_PER_MEGABYTE));
            }

gotoYX(6, 1, "Press Return when ready: ");
readAndEcho ((char *) &ch, 1);
ioctl(STD_IN, FIONREAD, &numExtraChars);
if (numExtraChars)
```

```
    gobbleUpExtraChars (numExtraChars);
    fclose(imageFile);
    return(OK);
  }

void extractCylSect(UINT16 asStored, UINT16 *cyl, UINT8 *sect)
  {
    UINT16 actualCyl, tempCyl;
    UINT8  actualSect;

    tempCyl = swaps(asStored);

    actualCyl = (((tempCyl & 0x00C0) << 2) | ((tempCyl & 0xff00) >> 8));

    actualSect = (tempCyl & 0x003f);
    *cyl = actualCyl;
    *sect = actualSect;
  }

void dumpPart(int partNum, DOS_PART_TBL *pDosPartTbl)
        {
    UINT16 cylNum = 0;
    UINT8  sectNum = 0;

                printf("\nPartition # %d\n", partNum);

    printf("Status = 0x%x = %d\n", pDosPartTbl->dospt_status,
                                   pDosPartTbl->dospt_status);
    printf("Start Head = 0x%x = %d\n", pDosPartTbl->dospt_startHead,
                                   pDosPartTbl->dospt_startHead);
    printf("Start Sect/Cyl = 0x%x = %d\n", swaps(pDosPartTbl->dospt_startSec),
                                   swaps(pDosPartTbl->dospt_startSec));

    extractCylSect(pDosPartTbl->dospt_startSec, &cylNum, &sectNum);

    printf("Start Cyl = 0x%x = %d\n", cylNum, cylNum);
    printf("Start Sect = 0x%x = %d\n", sectNum, sectNum);

    printf("DOS Part Type = 0x%x = %d\n", pDosPartTbl->dospt_type,
                                   pDosPartTbl->dospt_type);
    printf("End Head = 0x%x = %d\n", pDosPartTbl->dospt_endHead,
                                   pDosPartTbl->dospt_endHead);
    printf("End Sect/Cyl = 0x%x = %d\n", swaps(pDosPartTbl->dospt_endSec),
                                   swaps(pDosPartTbl->dospt_endSec));
    extractCylSect(pDosPartTbl->dospt_endSec, &cylNum, &sectNum);

    printf("End Cyl = 0x%x = %d\n", cylNum, cylNum);
    printf("End Sect = 0x%x = %d\n", sectNum, sectNum);

    printf("# Sects B/4 Part = 0x%x = %d\n", swapl(pDosPartTbl->dospt_absSec),
                                   swapl(pDosPartTbl->dospt_absSec));
    printf("# Sects in Part = 0x%x = %d\n", swapl(pDosPartTbl->dospt_nSectors),
                                   swapl(pDosPartTbl->dospt_nSectors));
                d(pDosPartTbl, 16, 1);
  }

void partInfo(char *diskName)
        {
                char *buffer;
    int fd, nBytes;
    DOS_PART_TBL *pDosPartTbl;

                buffer = (char *) malloc(512);
                bzero(buffer, 512);

                fd = open(diskName, READ);

                ioctl(fd, FIOSEEK, 0);

                nBytes = read(fd, buffer, 512);

    buffer += DOS_BOOT_PART_TBL;
                pDosPartTbl = (DOS_PART_TBL *) buffer;
                dumpPart(1, pDosPartTbl);
    buffer += 16;
                pDosPartTbl = (DOS_PART_TBL *) buffer;
                dumpPart(2, pDosPartTbl);
```

```
    buffer += 16;
                pDosPartTbl = (DOS_PART_TBL *) buffer;
                dumpPart(3, pDosPartTbl);
    buffer += 16;
                pDosPartTbl = (DOS_PART_TBL *) buffer;
                dumpPart(4, pDosPartTbl);

    close(fd);
        }

VOID initScsiVars ()
  {
    int ix;
    for (ix = 0; ix <= MAX_SCSI_ID; ix++) {
      pScsiPhysDev[ix] = NULL;
      pScsiBlkDev[ix][0] = NULL;
      pScsiBlkDev[ix][1] = NULL;
    }
    bzero(diskBuffer, sizeof(diskBuffer));
  }

STATUS scsiConfig()
  {
    int ix;
    BOOT_PARAMS params;
    char *bootString;    /* boot parameter string */
    char diskName[10];

#ifdef SAME_SCSI_BUS
    char skipMyBootDevice = FALSE;
    int bootDevId = 0, bootDevLUN = 0;
#endif

    initScsiVars();

    bootString = BOOT_LINE_ADRS;

    if (usrBootLineCrack (bootString, &params) != OK) {
      printf("Error cracking boot line!\n");
      return (ERROR);
    }

#ifdef SAME_SCSI_BUS
    scsiBusReset(pSysScsiCtrl);
    scsiAutoConfig(pSysScsiCtrl, 0);
    printf("\nI have found the following devices on this SCSI Bus:\n\n");
    scsiShow(pSysScsiCtrl);
#else
    scsiBusReset(pSysScsiCtrlCmse);
    scsiAutoConfig(pSysScsiCtrlCmse, 0);
    printf("\nI have found the following devices on this SCSI Bus:\n\n");
    scsiShow(pSysScsiCtrlCmse);
#endif

#ifdef SAME_SCSI_BUS
    if (strncmp (params.bootDev, "scsi", 4) == 0) {
      sscanf (params.bootDev, "%*4s%*c%d%*c%d", &bootDevId, &bootDevLUN);
      printf("\nI booted using using SCSI ID #%d \n", bootDevId);
      printf("So, I'll exclude that one from the displays\n");
      skipMyBootDevice = TRUE;
    }
#endif

    delay(5);
    printf("\nAuto configuring physical devices ...\n\n");
    printf("device: ");

    for (ix = 0; ix <= MAX_SCSI_ID; ix++) {
#ifdef SAME_SCSI_BUS
      if (ix == bootDevId) {
        if (!(skipMyBootDevice)) {
          if(((pScsiPhysDev[ix] =
                                         scsiPhysDevIdGet(pSysScsiCtrl, ix, 0)) != NULL) &&
              ((pScsiPhysDev[ix]->scsiDevType == SCSI_DEV_DIR_ACCESS) ||
              (pScsiPhysDev[ix]->scsiDevType == SCSI_DEV_RO_DIR_ACCESS) ||
              (pScsiPhysDev[ix]->scsiDevType == SCSI_DEV_WORM)) )
            printf("#%d, ", ix);
        }
```

```
        } else {
            if(((pScsiPhysDev[ix] =
               scsiPhysDevIdGet(pSysScsiCtrl, ix, 0)) != NULL) &&
               ((pScsiPhysDev[ix]->scsiDevType == SCSI_DEV_DIR_ACCESS) ||
                (pScsiPhysDev[ix]->scsiDevType == SCSI_DEV_RO_DIR_ACCESS) ||
                (pScsiPhysDev[ix]->scsiDevType == SCSI_DEV_WORM)) )
            printf("#%d, ", ix);
        }
#else
        if(((pScsiPhysDev[ix] =
             scsiPhysDevIdGet(pSysScsiCtrlCmse, ix, 0)) != NULL) &&
               ((pScsiPhysDev[ix]->scsiDevType == SCSI_DEV_DIR_ACCESS) ||
                (pScsiPhysDev[ix]->scsiDevType == SCSI_DEV_RO_DIR_ACCESS) ||
                (pScsiPhysDev[ix]->scsiDevType == SCSI_DEV_WORM)) )
          printf("#%d, ", ix);
#endif
    }

    if (debug & DUMP_SCSI_PHYS_DEV_PTRS) {
      for(ix = 0; ix <= MAX_SCSI_ID; ix++)
        printf("\npScsiPhysDev[%d] = 0x%x\n", ix, (ULONG) pScsiPhysDev[ix]);
    }

    printf("\n\nAuto configuring block devices ...\n\n");
    printf("device: ");

    for (ix = 0; ix <= MAX_SCSI_ID; ix++) {
      if ((pScsiPhysDev[ix]) &&
              ((pScsiPhysDev[ix]->scsiDevType == SCSI_DEV_DIR_ACCESS) ||
               (pScsiPhysDev[ix]->scsiDevType == SCSI_DEV_RO_DIR_ACCESS) ||
               (pScsiPhysDev[ix]->scsiDevType == SCSI_DEV_WORM)) ) {
          pScsiBlkDev[ix][0] = scsiBlkDevCreate(pScsiPhysDev[ix], 0, 0);
          printf("#%d, ", ix);
      }
    }

    printf("\n\nCreating disk device handles... \n\n");

    for (ix = 0; ix <= MAX_SCSI_ID; ix++) {
      if ((pScsiPhysDev[ix]) &&
           ((pScsiPhysDev[ix]->scsiDevType == SCSI_DEV_DIR_ACCESS) ||
            (pScsiPhysDev[ix]->scsiDevType == SCSI_DEV_RO_DIR_ACCESS) ||
            (pScsiPhysDev[ix]->scsiDevType == SCSI_DEV_WORM)) ) {
        sprintf(diskName, "%s%d", "/tsd/", ix);
        if (rawFsDevInit(diskName, pScsiBlkDev[ix][0]) == NULL)
          printf("rawFs device create failed for device %d\n!", ix);
        else
          printf("Created device %s ...\n", diskName);
      }
    }
    printf("\n");

/*
#ifndef SAME_SCSI_BUS
                initCopyTask();
#endif
*/

    delay(5);
    return(OK);
  }     /* end displayScsi */


int showScsiBus(char *heading, int showAll)
  {
    int ix, driveSize, printPos = 5;
    char capacity[20];

    bzero(capacity, sizeof(capacity));
    clear();
    gotoYX(1,1, heading);
    gotoYX(3,1, "Bus ID  Vendor   Product ID       Description  Capacity      ")
;
    gotoYX(4,1, "======  ======== ================ ===========  ==============")
;
    for(ix = 0; ix <= MAX_SCSI_ID; ix++) {
      if (pScsiPhysDev[ix]) {
        position(printPos, 3);
```

```
        printf("%2d", ix);
        gotoYX(printPos, 9, pScsiPhysDev[ix]->devVendorID);
        gotoYX(printPos, 18, pScsiPhysDev[ix]->devProductID);
        if ((pScsiPhysDev[ix]->numBlocks > 0) &&
            (pScsiPhysDev[ix]->blockSize > 0)) {
          driveSize = ((pScsiPhysDev[ix]->numBlocks *
                        pScsiPhysDev[ix]->blockSize ) );
          sprintf(capacity, "%d", driveSize / DISK_VENDOR_MEGABYTE);
        } else {
          driveSize = 0;
        }
        switch(pScsiPhysDev[ix]->scsiDevType) {
          case SCSI_DEV_DIR_ACCESS:
            gotoYX(printPos, 35, "Disk Drive");
            if (driveSize) {
              gotoYX(printPos, 48, capacity);
              printf(" MBytes");
            } else {
              gotoYX(printPos, 48, "Not Avail");
            }
            break;
          case SCSI_DEV_SEQ_ACCESS:
           gotoYX(printPos, 35, "Tape Drive");
            if (driveSize) {
              gotoYX(printPos, 48, capacity);
              printf(" MBytes");
            } else {
              gotoYX(printPos, 48, "Not Avail");
            }
            break;
          case SCSI_DEV_PRINTER:
            gotoYX(printPos, 35, "Printer");
            break;
          case SCSI_DEV_PROCESSOR:
            gotoYX(printPos, 35, "Host Cntrl");
            break;
          case SCSI_DEV_WORM:
            gotoYX(printPos, 35, "WORM Drive");
            if (driveSize) {
              gotoYX(printPos, 48, capacity);
              printf(" MBytes");
            } else {
              gotoYX(printPos, 48, "Not Avail");
            }
            break;
          case SCSI_DEV_RO_DIR_ACCESS:
            gotoYX(printPos, 35, "CDROM Drive");
            if (driveSize) {
              gotoYX(printPos, 48, capacity);
              printf(" MBytes");
            } else {
              gotoYX(printPos, 48, "Not Avail");
            }
            break;
          default:
            gotoYX(printPos, 35, "UNKNOWN");
            break;
        }
        if (!showAll)
          printPos++;
      } else {
        if (showAll) {
          position(printPos, 3);
          printf("%2d", ix);
          gotoYX(printPos, 20, "*No Device*");
        }
      }
      if (showAll)
        printPos++;
    }
    return(printPos);
  }

int showAvailableDataSources( int currentPrintPos, int requestType)
  {
    int ix, numExtraChars;
    char printPos;
    int userInputLoop;
```

```
printPos = currentPrintPos+2;
userInputLoop = TRUE;
while (userInputLoop) {
  eraseToEOL(printPos);
  switch (requestType) {
    case SHOW_DISK_BACKUP:
      gotoYX(printPos, 1, "Enter ID number to backup (or E to exit): ");
      break;
    case SHOW_DUMP_SECTOR:
      gotoYX(printPos, 1, "Enter ID number to dump (or E to exit): ");
      break;
    case SHOW_DISK_RESTORE:
      gotoYX(printPos, 1, "Enter ID number to restore to (or E to exit): ");
      break;
    case SHOW_MODIFY_SECTOR:
      gotoYX(printPos, 1, "Enter ID number to modify (or E to exit): ");
      break;
    case SHOW_STRING_SCAN:
      gotoYX(printPos, 1, "Enter ID number to scan (or E to exit): ");
      break;
    case SHOW_FORMAT:
      gotoYX(printPos, 1, "Enter ID number to format (or E to exit): ");
      break;
    case SHOW_SCRUB:
      gotoYX(printPos, 1, "Enter ID number to scrub (or E to exit): ");
      break;
    default:
      break;
  }
  readAndEcho ((char *) &userResponse, 1);
  ix = userResponse & 0xf;
  ioctl(STD_IN, FIONREAD, &numExtraChars);
  if (numExtraChars)
      gobbleUpExtraChars (numExtraChars);
  switch (userResponse) {
    case '0':
    case '1':
    case '2':
    case '3':
    case '4':
    case '5':
    case '6':
    case '7':
      if (pScsiPhysDev[ix]) {
        switch(pScsiPhysDev[ix]->scsiDevType) {
          case SCSI_DEV_DIR_ACCESS:
          case SCSI_DEV_WORM:
          case SCSI_DEV_RO_DIR_ACCESS:
            return(ix);
          default:
            switch (requestType) {
              case SHOW_DISK_BACKUP:
                printErrMsg(printPos+2, 1, "Illegal backup device!");
                break;
              case SHOW_DUMP_SECTOR:
                printErrMsg(printPos+2, 1, "Illegal dump device!");
                break;
              case SHOW_MODIFY_SECTOR:
                printErrMsg(printPos+2, 1, "Illegal modify device!");
                break;
              case SHOW_STRING_SCAN:
                printErrMsg(printPos+2, 1, "Illegal scan device!");
                break;
              case SHOW_FORMAT:
                printErrMsg(printPos+2, 1, "Illegal format device!");
                break;
              case SHOW_SCRUB:
                printErrMsg(printPos+2, 1, "Illegal scrub device!");
                break;
              default:
                break;
            }
        }
      } else {
         switch (requestType) {
           case SHOW_DISK_BACKUP:
             printErrMsg(printPos+2, 1, "Illegal backup device!");
```

```
              break;
            case SHOW_DUMP_SECTOR:
              printErrMsg(printPos+2, 1, "Illegal dump device!");
              break;
            case SHOW_MODIFY_SECTOR:
              printErrMsg(printPos+2, 1, "Illegal modify device!");
              break;
            case SHOW_STRING_SCAN:
              printErrMsg(printPos+2, 1, "Illegal scan device!");
              break;
            case SHOW_FORMAT:
              printErrMsg(printPos+2, 1, "Illegal format device!");
              break;
            case SHOW_SCRUB:
              printErrMsg(printPos+2, 1, "Illegal scrub device!");
              break;
            default:
              break;
          }
        }
        break;
      case 'q':
      case 'Q':
      case 'e':
      case 'E':
        return(NONE);
        break;
      default:
        position(printPos,0);
        printf("%c",0x7);
        break;
    } /* end switch */
  }
  return(NONE);
}


VOID dosDateTimeHookFn(DOS_DATE_TIME *pDosDateTime)
{
  struct tm theTime;

#ifdef HKV4D
  sysGetTime(&theTime);
#else
  ds1286TimeGet(&theTime);
#endif

  pDosDateTime->dosdt_year = theTime.tm_year + 1900;
  pDosDateTime->dosdt_month = theTime.tm_mon + 1;
  pDosDateTime->dosdt_day = theTime.tm_mday;
  pDosDateTime->dosdt_hour = theTime.tm_hour;
  pDosDateTime->dosdt_minute = theTime.tm_min;
  pDosDateTime->dosdt_second = theTime.tm_sec;
}

VOID setDosTimeHook()
{
  dosFsDateTimeInstall(dosDateTimeHookFn);
}

STATUS initializeImageManager()
{
  int ix, nbytes, one = 1;
  char completeFileName[128], ch;
  int usrInputLoop;
  FILE *imageFile;
  int currentPrintPos, numExtraChars;
  char diskName[80];

  usrInputLoop = TRUE;
  resetTerminal();
  gotoYX(1,1,"Preparing to initialize the disk image data file!!!");
  currentPrintPos = 3;
  while (usrInputLoop) {
    eraseToEOL(currentPrintPos);
    gotoYXBlink(currentPrintPos, 1,
                "Are you sure you want to continue (y/n)? ");
    readAndEcho ((char *) &ch, 1);
```

```
  ioctl(STD_IN, FIONREAD, &numExtraChars);
  if (numExtraChars)
      gobbleUpExtraChars (numExtraChars);
  switch (ch) {
    case 'y':
    case 'Y':
      usrInputLoop = FALSE;
      break;
    case 'N':
    case 'n':
      return(OK);
    default:
      position(currentPrintPos+2,0);
      printf("%c",0x7);
      break;
  }
}

for (ix = 1; ix <= MAX_NUM_IMAGES; ix++) {
  sprintf(diskName,"%s%s%d%s",BOOT_DISK,"image", ix ,".cnf");
            rm(diskName);
          }

masterElement.numCurrentDiskImages = 0;
masterElement.numFreeDiskImages = MAX_NUM_IMAGES;
masterElement.nextByteToUse = 0;
masterElement.lastFreeByte = NONE;
masterElement.lastFreeSpace = NONE;
masterElement.totalImageSpace =
  pSbdl->bd_nBlocks * pSbdl->bd_bytesPerBlk;
masterElement.largestFreeImageSize =
  pSbdl->bd_nBlocks * pSbdl->bd_bytesPerBlk;

imageElement.inUse = FALSE;
bzero(imageElement.description, sizeof(imageElement.description));
bzero(imageElement.imageDate, sizeof(imageElement.imageDate));
bzero(imageElement.imageTime, sizeof(imageElement.imageTime));
imageElement.imageSize = NONE;
imageElement.reportedDiskSize = NONE;
imageElement.startingLocation = NONE;
bzero(imageElement.vendorID, sizeof(imageElement.vendorID));
bzero(imageElement.productID, sizeof(imageElement.productID));
imageElement.scsiBusID = NONE;
imageElement.partition1Start = NONE;
imageElement.partition2Start = NONE;
imageElement.partition3Start = NONE;
imageElement.partition4Start = NONE;

imageElement.previousImageStartingLocation = NONE;
imageElement.nextImageStartingLocation = NONE;

bzero(completeFileName, sizeof(completeFileName));
strcat(completeFileName, BOOT_DISK);
strcat(completeFileName, IMAGE_FILE);

printf("\n\nFile name = %s\n", completeFileName);

rm(completeFileName);

imageFile = fopen(completeFileName, "wb");

printf("Writing Master Image Record \n");

nbytes = fwrite(&masterElement, sizeof(struct masterHeader), 1, imageFile);

printf("Writing Image Element Records \n");
for (ix=0; ix < MAX_NUM_IMAGES; ix++) {
  printf("Record # %d   \r", ix);
                    taskDelay((int) (sysClkRateGet() / 20));
  nbytes = fwrite(&imageElement, sizeof(struct imageHeader), 1, imageFile);
}

printf("\n");

ioctl(fileno(imageFile), FIOFLUSH, &one);
fclose(imageFile);
return(OK);
```

```
    }

STATUS reportImageBlocks(int returnUserChoice)
  {
    int ix, iy, nbytes, numericResponse, userResponseLoop;
    char completeFileName[128], usrInput[5], ch, numPrintedSoFar;
    FILE *imageFile;
    struct imageHeader tempImageElement;

    resetTerminal();
    switch(returnUserChoice) {
      case NO_USER_INTERACTION:
        gotoYXBlink(1,1,"Display Image Information:");
        break;
      case RESTORE_IMAGE:
        gotoYXBlink(1,1,"Select Image Number to Restore:  ");
        break;
      case DELETE_IMAGE:
        gotoYXBlink(1,1,"Select Image Number to Delete:  ");
        break;
      case DUMP_SECTOR:
        gotoYXBlink(1,1,"Select Image Number for Sector Dump:  ");
        break;
      case FDISK_PARAMETERS:
        gotoYXBlink(1,1,"Select Image Number for FDISK Info:  ");
        break;
      case MODIFY_SECTOR:
        gotoYXBlink(1,1,"Select Image Number for modify:  ");
        break;
      case STRING_SCAN:
        gotoYXBlink(1,1,"Select Image Number for string scan:  ");
        break;
      case FORMAT_IMAGE:
        gotoYXBlink(1,1,"Select Image Number to format :  ");
        break;
      case SCRUB_IMAGE:
        gotoYXBlink(1,1,"Select Image Number to scrub :  ");
        break;
      default:
        gotoYXBlink(1,1,"Display Image Information:");
        break;
    }
    scrollRegion(2,15);
    numericResponse = ERROR;
    bzero(completeFileName, sizeof(completeFileName));
    strcat(completeFileName, BOOT_DISK);
    strcat(completeFileName, IMAGE_FILE);
    imageFile = fopen(completeFileName, "rb");

    if (!(imageFile)) {
      printErrMsg(22,1,"Error opening Image File!!");
      return(ERROR);
    }

    nbytes = fread(&masterElement, sizeof(struct masterHeader), 1, imageFile);

    position(1, 39);

            switch (masterElement.numCurrentDiskImages) {
                    case 0:
                            printf("There are no images on this disk!\n");
                            delay(3);
                            eraseToEOL(1);
                            return(ERROR);
                            break;
                    case 1:
      printf("This disk has %d image.\n",masterElement.numCurrentDiskImages);
                            break;
      default:
        printf("This disk has %d images.\n",masterElement.numCurrentDiskImages);
        break;
            }

    numPrintedSoFar = 0;

    for (ix = 1; ix < MAX_NUM_IMAGES+1; ix++) {
                    bzero(imageElement, sizeof(imageElement));
```

```
nbytes = fread(&imageElement, sizeof(struct imageHeader), 1, imageFile);
if (imageElement.inUse) {
  numPrintedSoFar++;
  position((((numPrintedSoFar - 1) % 2) * 5) + 2, 1);
  printf("Image ID Number  : %3d          Image Size: %.1f Mbytes\n",
         ix, (((float) imageElement.imageSize /
                                                  (float) DISK_VENDOR_MEGAB
YTE)));
  position((((numPrintedSoFar - 1) % 2) * 5) + 3, 1);
  printf("Date             : %s       Time       : %s",
    imageElement.imageDate,imageElement.imageTime);
#ifndef VBU_SETUP
                        printf("    SCSI Bus ID: %d\n", imageElement.scsiBusID);
#endif
  position((((numPrintedSoFar - 1) % 2) * 5) + 4, 1);
#ifndef VBU_SETUP
  printf("Disk Vendor ID   : %s       Product ID: %s \n",
      imageElement.vendorID, imageElement.productID);
#endif
                        eraseToEOL((((numPrintedSoFar - 1) % 2) * 5) + 5);
  position((((numPrintedSoFar - 1) % 2) * 5) + 5, 1);
  printf("Image Description: %s\n\n", imageElement.description);

  if (((numPrintedSoFar % 2) == 1) &&
        (numPrintedSoFar == masterElement.numCurrentDiskImages)) {
      numPrintedSoFar++;
      for(iy=6; iy < 11; iy++)
        eraseToEOL(iy);
  }

  if ((numPrintedSoFar*5) % SCROLL_AMOUNT == 0) {
    if (returnUserChoice) {
      userResponseLoop = TRUE;
      while (userResponseLoop) {
        bzero(usrInput, sizeof(usrInput));
        gotoYX (13, 1,
          "Type <Enter> to continue, E<Enter> to exit or Image Number: ");
        readAndEcho ((char *) &usrInput, 4);
        switch (usrInput[0]) {
          case 'E':
          case 'e':
          case 'Q':
          case 'q':
            fclose(imageFile);
            return(NONE);
            break;
          case 0xa:
          case 0xd:
          case 0x0:
            userResponseLoop = FALSE;
            continue;
            break;
          default:
            if (isdigit(usrInput[0])) {
              sscanf(usrInput, "%d", &numericResponse);
              if ((numericResponse > 0) &&
                  (numericResponse <= MAX_NUM_IMAGES)) {
                fseek(imageFile, ((numericResponse - 1)*
                    sizeof(imageElement)) + sizeof(masterElement),
                    SEEK_SET);
                nbytes = fread(&tempImageElement,
                               sizeof(struct imageHeader), 1, imageFile);
                if (tempImageElement.inUse) {
                  userResponseLoop = FALSE;
                  return(numericResponse - 1); /* adjust to index rel 0 */
                } else {
                  printErrMsg(13,1,"Invalid Image Number!");
                }
              }
            } else {
              continue;
            }
        }
      }
    } else {
      gotoYX (13, 1, "Type <Enter> to continue, E<Enter> to exit: ");
      readAndEcho ((char *) &ch, 1);
      switch (ch) {
```

```
            case 'q':
            case 'Q':
            case 'E':
            case 'e':
              fclose(imageFile);
              return(NONE);
              break;
            default:
              printf ("\n");
              break;
          }
        }
      }
    }
  }
  fclose(imageFile);
  return(numericResponse);
}

STATUS findFirstFitImageBlock(int blockSize, int backupSource)
{
    int ix, nbytes;
    char completeFileName[128] ;
    FILE *imageFile;
    struct imageHeader tempImageElement;
#ifndef VBU_SETUP
    int numExtraChars;
#endif
    int realBlockSize;
                int numTimesThruLoop, one = 1;
    struct tm theTime;
    int foundEmptyGap = FALSE;

#ifdef VBU_SETUP
                /* John's estimation code is sometimes way off */
    realBlockSize = ((blockSize / VBU_WINDOW_SIZE) + 3) * VBU_WINDOW_SIZE;
#else
                realBlockSize = blockSize;
#endif

    bzero(completeFileName, sizeof(completeFileName));
    strcat(completeFileName, BOOT_DISK);
    strcat(completeFileName, IMAGE_FILE);
    imageFile = fopen(completeFileName, "r+b");

    if (!(imageFile)) {
      printErrMsg(15,1,"Error opening Image File!!");
      return(ERROR);
    }

    nbytes = fread(&masterElement, sizeof(struct masterHeader), 1, imageFile);

    numTimesThruLoop = masterElement.numCurrentDiskImages + 1 ;

    if (masterElement.numFreeDiskImages) {
      if (masterElement.largestFreeImageSize > realBlockSize) {
        for (ix = 0; ix <= numTimesThruLoop; ix++) {
          fseek(imageFile, sizeof(masterElement)+ (ix*sizeof(imageElement)),
                SEEK_SET);
          nbytes = fread(&imageElement, sizeof(struct imageHeader),
                         1, imageFile);

          if (!(imageElement.inUse)) {
            if ((imageElement.imageSize > 0) &&
                 (imageElement.imageSize < realBlockSize)) {
              continue;
            } else {
              if (ix < masterElement.numCurrentDiskImages)
                foundEmptyGap = TRUE;
            }
            imageElement.inUse = TRUE;

#ifdef VBU_SETUP
            imageElement.backupType = VBU;
#else
            imageElement.backupType = SBU;
#endif
            if ((masterElement.numCurrentDiskImages != 0) &&
```

```
                (ix != 0)) {
              fseek(imageFile, sizeof(masterElement)+
                    ((ix - 1)*sizeof(imageElement)), SEEK_SET);
              nbytes = fread(&tempImageElement, sizeof(struct imageHeader),
                             1, imageFile);
              imageElement.previousImageStartingLocation =
                tempImageElement.startingLocation;
            }
#ifdef VBU_SETUP
            bzero(imageElement.description, sizeof(imageElement.description));
            bzero(imageElement.vendorID, sizeof(imageElement.vendorID));
            bzero(imageElement.productID, sizeof(imageElement.productID));
#else
                                            clear();
            gotoYX(1,1,"Please enter disk description (up to 80 chars):");
            position(2,1);
            bzero(imageElement.description, sizeof(imageElement.description));
            bzero(imageElement.vendorID, sizeof(imageElement.vendorID));
            bzero(imageElement.productID, sizeof(imageElement.productID));
            readAndEcho ((char *) &imageElement.description,
                         sizeof(imageElement.description));
            ioctl(STD_IN, FIONREAD, &numExtraChars);
            if (numExtraChars)
              gobbleUpExtraChars (numExtraChars);
#endif

#ifdef HKV4D
            sysGetTime(&theTime);
#else
            ds1286TimeGet(&theTime);
#endif

            sprintf(&imageElement.imageDate, "%02d/%02d/%02d", theTime.tm_mon+1,
                    theTime.tm_mday, theTime.tm_year);

            sprintf(&imageElement.imageTime, "%02d:%02d:%02d", theTime.tm_hour,
                    theTime.tm_min, theTime.tm_sec);

            imageElement.imageSize = realBlockSize;

#ifdef VBU_SETUP
            imageElement.reportedDiskSize = blockSize;
#else
            imageElement.reportedDiskSize =
                  (pScsiPhysDev[backupSource]->numBlocks *
                   pScsiPhysDev[backupSource]->blockSize );
#endif

            if (!(foundEmptyGap)) {
              imageElement.nextImageStartingLocation =
                masterElement.nextByteToUse + imageElement.imageSize;
              imageElement.startingLocation = masterElement.nextByteToUse;
            }

#ifndef VBU_SETUP
            strncpy(imageElement.vendorID,
                    pScsiPhysDev[backupSource]->devVendorID,
                    sizeof(imageElement.vendorID));

            strncpy(imageElement.productID,
                    pScsiPhysDev[backupSource]->devProductID,
                    sizeof(imageElement.productID));

            imageElement.scsiBusID = backupSource;
#endif

            if (!(foundEmptyGap)) {
              masterElement.nextByteToUse += imageElement.imageSize;
            } else {
            }
            masterElement.largestFreeImageSize -= imageElement.imageSize;
            masterElement.totalImageSpace -= imageElement.imageSize;
            masterElement.numFreeDiskImages--;
            masterElement.numCurrentDiskImages++;
            fseek(imageFile, 0, SEEK_SET);
            nbytes = fwrite(&masterElement, sizeof(struct masterHeader),
                            1, imageFile);
            fseek(imageFile, sizeof(masterElement) + ix * sizeof(imageElement),
```

```
                SEEK_SET);
            nbytes = fwrite(&imageElement, sizeof(struct imageHeader),
                            1, imageFile);

            ioctl(fileno(imageFile), FIOFLUSH, one);
            fclose(imageFile);
            return(ix);
          }
        }
      } else {

                              eraseToEOL(13);
                              eraseToEOL(14);
                              eraseToEOL(15);
                              eraseToEOL(16);
        printErrMsg(13, 1, "There is not enough free space on image disk!");
        printErrMsg(14, 1, "Please make room by deleting some images!\n");
        printErrMsg(15, 1, "Or reduce the size of the backup!\n");
        printf("There is only %ld MBytes left on the image disk!\n",
            masterElement.largestFreeImageSize / BYTES_PER_MEGABYTE);

        delay(4);
        ioctl(fileno(imageFile), FIOFLUSH, one);
        fclose(imageFile);
        return(ERROR);
      }
    } else {
                       eraseToEOL(15);
                       eraseToEOL(16);
      printErrMsg(15, 1, "There are no disk image slots available!");
      printErrMsg(16, 1, "Please make room by deleting some images!");
      ioctl(fileno(imageFile), FIOFLUSH, one);
      fclose(imageFile);
      return(ERROR);
    }
               eraseToEOL(15);
    printErrMsg(15, 1, "This shouldn't have happened!");
    ioctl(fileno(imageFile), FIOFLUSH, one);
    fclose(imageFile);
    return(ERROR);
  }

STATUS deleteImage(int imageToDelete)
  {
    int nbytes;
    char completeFileName[128], diskName[80];
    FILE *imageFile;

    bzero(completeFileName, sizeof(completeFileName));
    bzero(diskName, sizeof(diskName));
    strcat(completeFileName, BOOT_DISK);
    strcat(completeFileName, IMAGE_FILE);
    imageFile = fopen(completeFileName, "r+b");

    if (!(imageFile)) {
      printErrMsg(15,1,"Error opening Image File!!");
      return(ERROR);
    }

#ifdef VBU_SETUP
    sprintf(diskName,"%s%s%d%s",BOOT_DISK,"image",imageToDelete + 1 ,".cnf");
                rm(diskName);
#endif

    fseek(imageFile, 0, SEEK_SET);
    nbytes = fread(&masterElement, sizeof(struct masterHeader), 1, imageFile);

    fseek(imageFile,
          sizeof(masterElement)+ (imageToDelete*sizeof(imageElement)),SEEK_SET);
    nbytes = fread(&imageElement, sizeof(struct imageHeader), 1, imageFile);

    imageElement.inUse = FALSE;
    bzero(imageElement.description, sizeof(imageElement.description));
    bzero(imageElement.imageDate, sizeof(imageElement.imageDate));
    bzero(imageElement.imageTime, sizeof(imageElement.imageTime));
    imageElement.reportedDiskSize = NONE;
    bzero(imageElement.vendorID, sizeof(imageElement.vendorID));
    bzero(imageElement.productID, sizeof(imageElement.productID));
```

```
      imageElement.scsiBusID = NONE;
              imageElement.partition1Start = NONE;
              imageElement.partition2Start = NONE;
              imageElement.partition3Start = NONE;
              imageElement.partition4Start = NONE;

    if (imageElement.imageSize > masterElement.largestFreeImageSize) {
      masterElement.lastFreeSpace = masterElement.largestFreeImageSize;
      masterElement.largestFreeImageSize = imageElement.imageSize;
      masterElement.lastFreeByte = masterElement.nextByteToUse;
      masterElement.nextByteToUse = imageElement.startingLocation;
    }

    masterElement.totalImageSpace += imageElement.imageSize;
    masterElement.numFreeDiskImages++;
    masterElement.numCurrentDiskImages--;

    fseek(imageFile, 0, SEEK_SET);
    nbytes = fwrite(&masterElement, sizeof(struct masterHeader), 1, imageFile);

    fseek(imageFile,
          sizeof(masterElement)+ (imageToDelete*sizeof(imageElement)),SEEK_SET);
    nbytes = fwrite(&imageElement, sizeof(struct imageHeader), 1, imageFile);

    fclose(imageFile);
    return(OK);
  }

STATUS restoreImage(int imageToRestore)
  {
    int numExtraChars, restoreTarget, nbytes, status;
    char completeFileName[128], diskName[128];
    FILE *imageFile, *tempFile;
    int one = 1, userInputLoop;
    int currentPrintPos;

#ifdef VBU_SETUP
    UINT32 destStartPos;
              int    ix, fd, nBytes, numPartitions = 0;
              char  *buffer, *bufPtr;
    DOS_PART_TBL *pDosPartTbl;
              struct {
                      int     partitionInUse;
                UINT32 storedPartitionStart;
                      UINT32 expectedSize;
                UINT32 partitionOffset;
                UINT32 partitionSize;
              } partitionInfo[5];

              for (ix = 1; ix <= 4; ix++) {
                      partitionInfo[ix].partitionInUse = FALSE;
                partitionInfo[ix].storedPartitionStart = NONE;
                      partitionInfo[ix].expectedSize = NONE;
                partitionInfo[ix].partitionOffset = NONE;
                partitionInfo[ix].partitionSize = NONE;
              }
#endif

    bzero(completeFileName, sizeof(completeFileName));
    bzero(diskName, sizeof(diskName));
    strcat(completeFileName, BOOT_DISK);
    strcat(completeFileName, IMAGE_FILE);
    imageFile = fopen(completeFileName, "rb");

    if (!(imageFile)) {
      printErrMsg(15,1,"Error opening Image File!!");
      return(ERROR);
    }

    fseek(imageFile,
      sizeof(masterElement)+(imageToRestore*sizeof(imageElement)),SEEK_SET);
    nbytes = fread(&imageElement, sizeof(struct imageHeader), 1, imageFile);

    resetTerminal();
    userInputLoop = TRUE;
    while (userInputLoop) {
      gotoYX(1,1,"Restore to R)aw SCSI Disk or across the N)etwork (R/N) ? ");
      readAndEcho ((char *) &userResponse, 1);
```

```
ioctl(STD_IN, FIONREAD, &numExtraChars);
if (numExtraChars)
  gobbleUpExtraChars (numExtraChars);
switch (userResponse) {
  case 'N':
  case 'n':
                              gotoYX(5,1,"Available Network Devices:");
                              nfsDevShow();
    gotoYX(3,1,"Please enter Network Device/Filename or <Enter> to exit: ");
    readAndEcho ((char *) &diskName, sizeof(diskName));
    if (strlen(diskName) == 0)
      return(OK);
    ioctl(STD_IN, FIONREAD, &numExtraChars);
    if (numExtraChars)
      gobbleUpExtraChars (numExtraChars);
    if ((tempFile = fopen(&diskName, "wb")) == ERROR) {
      position(6,1);
      printf("disk name = "%s"\n", diskName);
      printErrMsg(5,1,"Invalid Destination Filename!!");
      return(ERROR);
    } else {
      fclose(tempFile);
    }
    break;
  case 'R':
  case 'r':
    if (scsiConfigDone) {
      currentPrintPos = showScsiBus("Available Raw SCSI Devices: ",
                                  SHOW_ONLINE);
      restoreTarget= showAvailableDataSources(currentPrintPos,
                                  SHOW_DISK_RESTORE);
      if (restoreTarget != ERROR)
        sprintf(diskName, "%s%d", "/tsd/", restoreTarget);
      if ((tempFile = fopen(&diskName, "wb")) == ERROR) {
        position(6,1);
        printf("disk name = "%s"\n", diskName);
        printErrMsg(5,1,"Invalid Destination Filename!!");
        return(ERROR);
      } else {
        fclose(tempFile);
      }
    } else {
      printErrMsg(14,1,"You must configure the SCSI Bus First!!!");
      return(ERROR);
    }
    userInputLoop = FALSE;
    break;
  case 'Q':
  case 'q':
  case 'e':
  case 'E':
    userInputLoop = FALSE;
    return(OK);
    break;
  default:
    position(12,0);
    printf("%c",0x7);
    break;
  }
}

#ifndef VBU_SETUP

          if (imageElement.backupType != SBU) {
                printErrMsg(15, 1, "This image was not made using the SBU!\n");
                position(16, 1);
                printf("You must restore this image using the VBU Software.");
                delay(5);
    ioctl(fileno(imageFile), FIOFLUSH, one);
    fclose(imageFile);
    return(ERROR);
          }

          resetTerminal();
          gotoYXBlink(1,1,"Restoring image...");
  if((status = copyDisk(IMAGE_DISK, &diskName, 32, imageElement.imageSize,
        imageElement.startingLocation, 0)) == ERROR) {
    printErrMsg(15,1,"Error encountered during copy!");
```

```
        position(16,1);
        printf("disk name = "%s"\n", diskName);
        printErrno(errnoGet());
        delay(5);
        ioctl(fileno(imageFile), FIOFLUSH, one);
        fclose(imageFile);
        return(ERROR);
    }
#else

            if (imageElement.backupType != VBU) {
                    printErrMsg(15, 1, "This image was not made using the VBU!\n");
                    position(16, 1);
                    printf("You must restore this image using the SBU Software.");
                    delay(5);
        ioctl(fileno(imageFile), FIOFLUSH, one);
        fclose(imageFile);
        return(ERROR);
            }

            if (imageElement.partition1Start != NONE) {
                    partitionInfo[1].expectedSize = imageElement.imageSize;
                    numPartitions = 1;
                    partitionInfo[1].partitionInUse = TRUE;
                    partitionInfo[1].storedPartitionStart =
                            imageElement.partition1Start + imageElement.startingLocation;
            }

            if (imageElement.partition2Start != NONE) {
                    partitionInfo[1].expectedSize = imageElement.partition2Start;
                    partitionInfo[2].expectedSize =
                            imageElement.imageSize - imageElement.partition2Start;
                    numPartitions++;
                    partitionInfo[2].partitionInUse = TRUE;
                    partitionInfo[2].storedPartitionStart =
                            imageElement.partition2Start + imageElement.startingLocation;
            }

            if (imageElement.partition3Start != NONE) {
                    partitionInfo[3].expectedSize =
                            imageElement.imageSize - imageElement.partition3Start;
                    partitionInfo[2].expectedSize =
                            imageElement.partition3Start - imageElement.partition2Start;
                    numPartitions++;
                    partitionInfo[3].partitionInUse = TRUE;
                    partitionInfo[3].storedPartitionStart =
                            imageElement.partition3Start + imageElement.startingLocation;
            }

            if (imageElement.partition4Start != NONE) {
                    partitionInfo[4].expectedSize =
                            imageElement.imageSize - imageElement.partition4Start;
                    partitionInfo[3].expectedSize =
                            imageElement.partition4Start - imageElement.partition3Start;
                    numPartitions++;
                    partitionInfo[4].partitionInUse = TRUE;
                    partitionInfo[4].storedPartitionStart =
                            imageElement.partition4Start + imageElement.startingLocation;
            }

    buffer = (char *) malloc(512);
            bufPtr = buffer;
    bzero(buffer, 512);

    fd = open(diskName, READ);

    ioctl(fd, FIOSEEK, 0);

    nBytes = read(fd, buffer, 512);

    buffer += DOS_BOOT_PART_TBL;
    pDosPartTbl = (DOS_PART_TBL *) buffer;

    destStartPos = swapl(pDosPartTbl->dospt_absSec) * SECTOR_SIZE;

            for (ix = 1; ix <= numPartitions; ix++) {
                    if (partitionInfo[ix].expectedSize >
                            (swapl(pDosPartTbl->dospt_nSectors) * SECTOR_SIZE )) {
```

```
                        position(15, 1);
                        printf("Partition %d will not fit on the target disk!\n", ix);
                        position(16, 1);
                        printf("Partition %d must be > %f Mbytes in size.",ix,
                               ((float)partitionInfo[ix].expectedSize/(float) BYTES_PER_MEGABYTE));
                        delay(5);
        ioctl(fileno(imageFile), FIOFLUSH, one);
        fclose(imageFile);
                                free(bufPtr);
                                close(fd);
        return(ERROR);
                    } else {
                                partitionInfo[ix].partitionOffset =
                                        swapl(pDosPartTbl->dospt_absSec) * SECTOR_SIZE ;
                                partitionInfo[ix].partitionSize =
                                        swapl(pDosPartTbl->dospt_nSectors) * SECTOR_SIZE ;
                    }
                    buffer += 16;
                    pDosPartTbl = (DOS_PART_TBL *) buffer;
            }

            resetTerminal();
            gotoYXBlink(1,1,"Restoring image...");

            for (ix = 1; ix <= numPartitions; ix++) {
                    if( partitionInfo[ix].partitionInUse ) {
        if((status = copyDisk(IMAGE_DISK, &diskName, 16,
                                    partitionInfo[ix].expectedSize,
           partitionInfo[ix].storedPartitionStart,
                                    partitionInfo[ix].partitionOffset)) == ERROR) {
                        position(15, 1);
          printf("Error encountered during Partition %d copy!", ix);
          position(16,1);
          printf("disk name = "%s"\n", diskName);
          printErrno(errnoGet());
          delay(5);
          ioctl(fileno(imageFile), FIOFLUSH, one);
          fclose(imageFile);
                                free(bufPtr);
                                close(fd);
          return(ERROR);
        }
                    }
            }

            free(bufPtr);
            close(fd);
#endif
    ioctl(fileno(imageFile), FIOFLUSH, one);
    fclose(imageFile);
    delay(3);
    return(OK);
  }

STATUS imageMaintenance()
  {
    int userInputLoop, numExtraChars;
    int status, targetImage;

    while (TRUE) {
      userInputLoop = TRUE;
      while (userInputLoop) {
        resetTerminal();
        gotoYX(1, 20, "Disk Image Maintenance");
        gotoYX(3, 12, "Options:");
        gotoYX(5, 15, "1) Restore Disk Image");
        gotoYX(6, 15, "2) Display Image Info");
        gotoYX(7, 15, "3) Initialize Image Manager");
        gotoYX(8, 15, "4) Delete Image");
#ifdef VBU_SETUP
        gotoYX(9, 15, "5) Show Image Partition Sizes for MSDOS FDISK");
#endif
        gotoYX(12, 15, "E) Exit ");
        eraseToEOL(14);
#ifdef VBU_SETUP
        gotoYX(14, 16, "Enter Choice (1-5 or E): ");
#else
        gotoYX(14, 16, "Enter Choice (1-4 or E): ");
```

```
#endif
        readAndEcho ((char *) &userResponse, 1);
        ioctl(STD_IN, FIONREAD, &numExtraChars);
        if (numExtraChars)
          gobbleUpExtraChars (numExtraChars);
        switch (userResponse) {
          case '1':
            targetImage = reportImageBlocks(RESTORE_IMAGE);
            resetTerminal();
            userInputLoop = FALSE;
            if (targetImage == ERROR) {
              break;
            }
            status = restoreImage(targetImage);
            userInputLoop = FALSE;
            break;
          case '2':
            targetImage = reportImageBlocks(NO_USER_INTERACTION);
            userInputLoop = FALSE;
            break;
          case '3':
            userInputLoop = FALSE;
            status = initializeImageManager();
            break;
          case '4':
            targetImage = reportImageBlocks(DELETE_IMAGE);
            if(targetImage > NONE)
              status = deleteImage(targetImage);
            userInputLoop = FALSE;
            break;
#ifdef VBU_SETUP
          case '5':
            targetImage = reportImageBlocks(FDISK_PARAMETERS);
            if(targetImage > NONE)
              status = imageFdiskInfo(targetImage);
            userInputLoop = FALSE;
            break;
#endif
          case 'q':
          case 'Q':
          case 'e':
          case 'E':
            userInputLoop = FALSE;
            return(OK);
            break;
          default:
            position(16,0);
            printf("%c",0x7);
            break;
        }
      }
    }
  }

STATUS dumpMasterRecord()
  {
    int nbytes;
    char completeFileName[128], ch;
    FILE *imageFile;

    bzero(completeFileName, sizeof(completeFileName));
    strcat(completeFileName, BOOT_DISK);
    strcat(completeFileName, IMAGE_FILE);
    imageFile = fopen(completeFileName, "rb");

    if (!(imageFile)) {
      printErrMsg(15,1,"Error opening Image File!!");
      return(ERROR);
    }

    fseek(imageFile, 0, SEEK_SET);
    nbytes = fread(&masterElement, sizeof(struct masterHeader), 1, imageFile);

    printf("Number of current disk images %d\n",
            masterElement.numCurrentDiskImages);
    printf("Number of Free Disk Images: %d\n", masterElement.numFreeDiskImages);
    printf("Next Available Byte       : %ld\n", masterElement.nextByteToUse);
    printf("Total Image space         : %ld\n", masterElement.totalImageSpace );
```

```
    printf("Last Free Byte           : %ld\n", masterElement.lastFreeByte );
    printf("Last Free Space          : %ld\n", masterElement.lastFreeSpace );
    printf("Largest Free Image size  : %ld\n",
            masterElement.largestFreeImageSize);

    printf ("\nType <Enter> to continue: ");
    readAndEcho ((char *) &ch, 1);
    fclose(imageFile);
    return(OK);
  }

STATUS dumpImageRecord(int imageNumber)
  {
    int nbytes;
    char completeFileName[128];
    FILE *imageFile;

    bzero(completeFileName, sizeof(completeFileName));
    strcat(completeFileName, BOOT_DISK);
    strcat(completeFileName, IMAGE_FILE);
    imageFile = fopen(completeFileName, "rb");

    if (!(imageFile)) {
      printErrMsg(15,1,"Error opening Image File!!");
      return(ERROR);
    }

    fseek(imageFile,
          sizeof(masterElement)+ ((imageNumber - 1)*sizeof(imageElement)),
                 SEEK_SET);
    nbytes = fread(&imageElement, sizeof(struct imageHeader), 1, imageFile);

    if (imageElement.inUse) {
      printf("Record # %d is IN USE\n", imageNumber);
      printf("Image Description      : %s \n", imageElement.description);
      printf("Image Date             : %s \n", imageElement.imageDate);
      printf("Image Time             : %s \n", imageElement.imageTime);
      printf("Image Size             : %d \n", imageElement.imageSize);
      printf("Reported Disk Size     : %d \n", imageElement.reportedDiskSize);
      printf("Image Starting Location: %d \n", imageElement.startingLocation);
      if ( imageElement.backupType == VBU) {
        printf("Dumped with              : VBU \n");
        printf("MSDOS Partition 1 Start: %d \n", imageElement.partition1Start);
        printf("MSDOS Partition 2 Start: %d \n", imageElement.partition2Start);
        printf("MSDOS Partition 3 Start: %d \n", imageElement.partition3Start);
        printf("MSDOS Partition 4 Start: %d \n", imageElement.partition4Start);
      }
      if ( imageElement.backupType == SBU) {
        printf("Dumped with              : SBU \n");
        printf("Disk Vendor ID           : %s \n", imageElement.vendorID);
        printf("Disk Product ID          : %s \n", imageElement.productID);
        printf("Disk SCSI ID             : %d \n", imageElement.scsiBusID);
      }
    } else {
      printf("Record # %d is NOT in use ", imageNumber);
    }

#ifndef VBU_SETUP
    printf ("\nType <Enter> to continue: ");
    readAndEcho ((char *) &userResponse, 1);
#endif
    fclose(imageFile);
    return(OK);
  }

STATUS lowLevelDiskFunctions()
  {
    int userInputLoop, numExtraChars;
    char userResponse;

    while (TRUE) {
      userInputLoop = TRUE;
      clear();
      gotoYX(1, 20, "Low-Level Disk Operations");
      gotoYX(3, 12, "Options:");
      gotoYX(5, 15, "1) Dump a Sector");
      gotoYX(6, 15, "2) Scan for ASCII Strings");
      gotoYX(7, 15, "3) Modify Disk Sector (Destructive)");
```

```
      gotoYX(8, 15, "4) Format Disk (VERY Destructive)");
      gotoYX(9, 15, "5) Scrub Disk (INCREDIBLY Destructive)");
      gotoYX(10, 15, "E) Exit ");
      while (userInputLoop) {
        eraseToEOL(12);
        gotoYX(12, 15, "Enter Choice (1-5 or E): ");
        readAndEcho ((char *) &userResponse, 1);
        ioctl(STD_IN, FIONREAD, &numExtraChars);
        if (numExtraChars)
          gobbleUpExtraChars (numExtraChars);
        switch (userResponse) {
          case '1':
            dumpSector();
            userInputLoop = FALSE;
            break;
          case '2':
            stringScan();
            userInputLoop = FALSE;
            break;
          case '3':
            userInputLoop = FALSE;
            modifySector();
            break;
          case '4':
            userInputLoop = FALSE;
            formatDisk();
            break;
          case '5':
            userInputLoop = FALSE;
            scrubDisk();
            break;
          case 'Q':
          case 'q':
          case 'e':
          case 'E':
            userInputLoop = FALSE;
            return(OK);
            break;
          default:
            position(12,0);
            printf("%c",0x7);
            break;
        }
      }
    }
  }


STATUS stringScan ()
  {
    FILE *imageFile;
    UINT32 startingPoint = 0, currentPosition, lastByte, offset;
                UINT32 searchDistance, numericResponse;
                int bytesPerString, linesPerScreen;
    int status, tempFd, nBytes;
    int numExtraChars;
    int targetImage;
    int userInputLoop = TRUE;
    int currentPrintPos, backupSource;
    int userResponseLoop = TRUE;
    unsigned char usrInput[14];
    unsigned char userResponse;
    unsigned char diskName[128];
    unsigned char completeFileName[128];


    resetTerminal();
    while (userInputLoop) {
      gotoYX(1,1,"Is the file on the I)mage disk or a R)aw SCSI disk (I/R) ? ");
      readAndEcho ((char *) &userResponse, 1);
      ioctl(STD_IN, FIONREAD, &numExtraChars);
      if (numExtraChars)
        gobbleUpExtraChars (numExtraChars);
      switch (userResponse) {
        case 'I':
        case 'i':
          targetImage = reportImageBlocks(STRING_SCAN);
          if (targetImage > NONE) {
```

```
              userInputLoop = FALSE;
              bzero(completeFileName, sizeof(completeFileName));
              bzero(diskName, sizeof(diskName));
              strcat(completeFileName, BOOT_DISK);
              strcat(completeFileName, IMAGE_FILE);
              imageFile = fopen(completeFileName, "r+b");

              if (!(imageFile)) {
                printErrMsg(15,1,"Error opening Image File!!");
                return(ERROR);
              }

              fseek(imageFile, sizeof(masterElement) +
                      (targetImage*sizeof(imageElement)), SEEK_SET);
              nBytes = fread(&imageElement, sizeof(struct imageHeader), 1,
                               imageFile);

              offset = 0;
              startingPoint = imageElement.startingLocation;
              lastByte = imageElement.startingLocation + imageElement.imageSize;

              if ((tempFd = open(IMAGE_DISK, UPDATE)) == ERROR) {
                printErrMsg(5,1,"Invalid Destination Disk or Filename!!");
                return(ERROR);
              }
              ioctl(tempFd, FIOSEEK, startingPoint);
              fclose(imageFile);
            }

            break;
          case 'R':
          case 'r':
            currentPrintPos = showScsiBus("Available Raw Devices: ", SHOW_ONLINE);
            backupSource= showAvailableDataSources(currentPrintPos,

SHOW_STRING_SCAN);
            if (backupSource != ERROR) {
              sprintf(diskName, "%s%d", "/tsd/", backupSource);
              if ((tempFd = open(&diskName, READ)) == ERROR) {
                printErrMsg(5,1,"Invalid Destination Disk or Filename!!");
                return(ERROR);
              }
              startingPoint = 0;
              offset = 0;
                                            lastByte = pScsiPhysDev[backupSource]->numBlocks *

pScsiPhysDev[backupSource]->blockSize;

              ioctl(tempFd, FIOSEEK, startingPoint);
              userInputLoop = FALSE;
            } else {
              position(12,0);
              printf("%c",0x7);
            }

            break;
          case 'Q':
          case 'q':
          case 'e':
          case 'E':
            userInputLoop = FALSE;
            return(OK);
            break;
          default:
            position(12,0);
            printf("%c",0x7);
            break;
        }
      }

    clear();
    userResponseLoop = TRUE;
    while (userResponseLoop) {
      bzero(usrInput, sizeof(usrInput));
                      eraseToEOL(1);
      gotoYX (1, 1, "How many lines per screen on your display <Enter>=24 ? ");
      readAndEcho ((char *) &usrInput, 3);
      switch (usrInput[0]) {
```

```
          case 'E':
          case 'e':
          case 'Q':
          case 'q':
            close(tempFd);
            return(OK);
            break;
          case 0xa:
          case 0xd:
          case 0x0:
                                    if ((startingPoint + offset ) <= (lastByte - SECTOR_SIZE)) {
            ioctl(tempFd, FIOSEEK, startingPoint + offset);
                                            currentPosition = startingPoint+offset;
                                            userResponseLoop = FALSE;
                                    } else {
                                            printf("\nYou've reached the end of this image!\n");
                                    }
            break;
          default:
            if (isdigit(usrInput[0])) {

              switch (usrInput[1]) {
                case 'x':
                case 'X':
                  sscanf(usrInput, "%x", &numericResponse);
```

```
        case 0xa:
        case 0xd:
        case 0x0:
                    scrollRegion(2,24);
                                linesPerScreen = 23;
                                userResponseLoop = FALSE;
          break;
        default:
          if (isdigit(usrInput[0])) {
            sscanf(usrInput, "%d", &numericResponse);
            if ( numericResponse <= 100 ) {
                                  linesPerScreen = numericResponse - 1;
                      scrollRegion(2,numericResponse);
                                          userResponseLoop = FALSE;
            }
          } else {
             position(12,0);
             printf("%c",0x7);
             continue;
          }
      }
    }

    clear();
          gotoYXBlink(1,1, "Scan for ASCII Strings");
    userResponseLoop = TRUE;
    while (userResponseLoop) {
      bzero(usrInput, sizeof(usrInput));
      printf (
      "\nType Starting Sector Number or E<Enter> to exit : ");
      readAndEcho ((char *) &usrInput, 13);
      switch (usrInput[0]) {
        case 'E':
        case 'e':
        case 'Q':
        case 'q':
          close(tempFd);
          return(OK);
          break;
        case 0xa:
        case 0xd:
        case 0x0:
                                if ((startingPoint + offset ) <= (lastByte - SECTOR_SIZE)) {
            ioctl(tempFd, FIOSEEK, startingPoint + offset);
                                    currentPosition = startingPoint+offset;
                                    userResponseLoop = FALSE;
                                } else {
                                    printf("\nYou've reached the end of this image!\n");
                                }
          break;
        default:
          if (isdigit(usrInput[0])) {

            switch (usrInput[1]) {
              case 'x':
              case 'X':
                sscanf(usrInput, "%x", &numericResponse);
                                                    break;
              default:
                sscanf(usrInput, "%d", &numericResponse);
                                    }

            if ( numericResponse <= 0xffffffff ) {
                                  if ((startingPoint + (numericResponse * SECTOR_SIZE) )
                                                   <= (lastByte - SECTOR_SIZE)) {
              status = ioctl(tempFd, FIOSEEK,
                  ((numericResponse * SECTOR_SIZE) + startingPoint));

                                      currentPosition = startingPoint + (numericResponse * SECTOR_S
IZE);
                                      userResponseLoop = FALSE;
                                  } else {
                                      printf("\nYou've reached the end of this image!\n");
                                  }
          } else {
            position(12,0);
            printf("%c",0x7);
            continue;
```

```
          }
        }
      }
    }

    userResponseLoop = TRUE;
    while (userResponseLoop) {
      bzero(usrInput, sizeof(usrInput));
      printf (
      "\nSearch how far (in bytes) or E)xit (Default = 512) : ");
      readAndEcho ((char *) &usrInput, 13);
      switch (usrInput[0]) {
        case 'E':
        case 'e':
        case 'Q':
        case 'q':
          close(tempFd);
          return(OK);
          break;
        case 0xa:
        case 0xd:
        case 0x0:
                                    if ((currentPosition + SECTOR_SIZE ) <= lastByte ) {
                                            userResponseLoop = FALSE;
                                    } else {
                                            printf("\nYou've reached the end of this image!\n");
                                    }
          break;
        default:
          if (isdigit(usrInput[0])) {

            switch (usrInput[1]) {
              case 'x':
              case 'X':
                sscanf(usrInput, "%x", &numericResponse);
                                                            break;
              default:
                sscanf(usrInput, "%d", &numericResponse);
                                            }

            if ( numericResponse <= 0xffffffff ) {
                                      if ((currentPosition + numericResponse )
                                                              <= lastByte ) {

                                              searchDistance = numericResponse;
                                              userResponseLoop = FALSE;
                                      } else {
                                              printf("\nYou've reached the end of this image!\n");
                                      }
            } else {
             position(12,0);
             printf("%c",0x7);
             continue;
            }
          }
      }
    }

    userResponseLoop = TRUE;
    while (userResponseLoop) {
      bzero(usrInput, sizeof(usrInput));
      printf (
      "\nEnter how many ASCII bytes to qualify as a string or E)xit (default = 4) : ");
      readAndEcho ((char *) &usrInput, 4);
      switch (usrInput[0]) {
        case 'E':
        case 'e':
        case 'Q':
        case 'q':
          close(tempFd);
          return(OK);
          break;
        case 0xa:
        case 0xd:
        case 0x0:
                                    bytesPerString = 4;
                                    userResponseLoop = FALSE;
          break;
```

```
      default:
        if (isdigit(usrInput[0])) {

          switch (usrInput[1]) {
            case 'x':
            case 'X':
              sscanf(usrInput, "%x", &numericResponse);
                                                      break;
            default:
              sscanf(usrInput, "%d", &numericResponse);
                                          }

          if ( numericResponse <= 0xffffffff ) {
                                          userResponseLoop = FALSE;
                                          bytesPerString = numericResponse;
          } else {
           position(12,0);
           printf("%c",0x7);
           continue;
          }
        }
      }
    }

              scanForStrings(tempFd, currentPosition, searchDistance, bytesPerString,
                                                        linesPerScreen);

    return(OK);

  }


STATUS formatDisk()
        {
    int status, tempFd;
    int bufferOffset;
    int userInputLoop = TRUE;
    int currentPrintPos, backupSource;
    int userResponseLoop = TRUE;
              unsigned char *buf, *buffer;
    unsigned char usrInput[14];
    unsigned char diskName[128];

    buffer = (unsigned char *) malloc(SECTOR_SIZE + 16);
    bufferOffset = (int) buffer % 16;
              if (bufferOffset != 0)
      buf = buffer + (16 - bufferOffset);
              else
                      buf = buffer;

    resetTerminal();
    while (userInputLoop) {
      currentPrintPos = showScsiBus("Available Raw Devices: ", SHOW_ONLINE);
      backupSource= showAvailableDataSources(currentPrintPos, SHOW_FORMAT);
      if (backupSource != ERROR) {
        sprintf(diskName, "%s%d", "/tsd/", backupSource);
        if ((tempFd = open(&diskName, O_RDWR)) == ERROR) {
          printErrMsg(5,1,"Invalid Destination Disk or Filename!!");
          return(ERROR);
        }
        userInputLoop = FALSE;
      }  else {
        position(12,0);
        printf("%c",0x7);
      }
    }

    clear();
    userResponseLoop = TRUE;
    while (userResponseLoop) {
      bzero(usrInput, sizeof(usrInput));
                      eraseToEOL(1);
      gotoYX (1, 1, "This is really destructive and takes a long time! ");
      gotoYX (2, 1, "Are you sure you want to do this (Y/N) ? ");
      readAndEcho ((char *) &usrInput, 1);
      switch (usrInput[0]) {
        case 'Y':
        case 'y':
```

```
                                clear();
                                gotoYXBlink(1, 1, "Formatting ");
                                printf("%s\n", diskName);
                                status = ioctl(tempFd, FIODISKFORMAT, 1);
                                gotoYXBlink(2, 1, "Done!");
                                delay(2);
                                userResponseLoop = FALSE;
          break;
        case 'N':
        case 'n':
                                clear();
                                gotoYXBlink(1, 1, "Aborting Format Operation!");
                                delay(2);
                                userResponseLoop = FALSE;
          break;
        default:
          position(12,0);
          printf("%c",0x7);
          continue;
      }
    }

             close(tempFd);
    return(OK);
        }

STATUS scrubDisk ()
  {
    FILE *imageFile;
    UINT32 startingPoint = 0, lastByte, offset;
    int status, tempFd, nBytes, ix, iy;
    int numExtraChars;
    int targetImage;
    int userInputLoop = TRUE;
    int currentPrintPos, backupSource;
    int userResponseLoop = TRUE;
             unsigned char *buffer;
    unsigned char usrInput[14];
    unsigned char userResponse;
    unsigned char diskName[128];
    unsigned char completeFileName[128];
    int nextTarget;
    UINT32 destFileOffset = 0, totalSize;
    UINT32 numBytesToWrite = 0;
    UINT32 numBytesWritten = 0;


    buffer = (unsigned char *) malloc(BYTES_PER_MEGABYTE);

    resetTerminal();
    while (userInputLoop) {
      gotoYX(1,1,"Is the target on the I)mage disk or a R)aw SCSI disk (I/R) ? ");
      readAndEcho ((char *) &userResponse, 1);
      ioctl(STD_IN, FIONREAD, &numExtraChars);
      if (numExtraChars)
        gobbleUpExtraChars (numExtraChars);
      switch (userResponse) {
        case 'I':
        case 'i':
          targetImage = reportImageBlocks(SCRUB_IMAGE);
          if (targetImage > NONE) {
            userInputLoop = FALSE;
            bzero(completeFileName, sizeof(completeFileName));
            bzero(diskName, sizeof(diskName));
            strcat(completeFileName, BOOT_DISK);
            strcat(completeFileName, IMAGE_FILE);
            imageFile = fopen(completeFileName, "r+b");

            if (!(imageFile)) {
              printErrMsg(15,1,"Error opening Image File!!");
              return(ERROR);
            }

            fseek(imageFile, sizeof(masterElement) +
                   (targetImage*sizeof(imageElement)), SEEK_SET);
            nBytes = fread(&imageElement, sizeof(struct imageHeader), 1,
                           imageFile);
```

```
            offset = 0;
            startingPoint = imageElement.startingLocation;
            lastByte = imageElement.startingLocation + imageElement.imageSize;

            if ((tempFd = open(IMAGE_DISK, UPDATE)) == ERROR) {
              printErrMsg(5,1,"Invalid Destination Disk or Filename!!");
              return(ERROR);
            }
            ioctl(tempFd, FIOSEEK, startingPoint);
            fclose(imageFile);
                                                deleteImage(targetImage);
          }

          break;
        case 'R':
        case 'r':
          currentPrintPos = showScsiBus("Available Raw Devices: ", SHOW_ONLINE);
          backupSource= showAvailableDataSources(currentPrintPos,
SHOW_SCRUB);
          if (backupSource != ERROR) {
            sprintf(diskName, "%s%d", "/tsd/", backupSource);
            if ((tempFd = open(&diskName, O_RDWR)) == ERROR) {
              printErrMsg(5,1,"Invalid Destination Disk or Filename!!");
              return(ERROR);
            }
            startingPoint = 0;
            offset = 0;
                                                lastByte = pScsiPhysDev[backupSource]->numBlocks *
pScsiPhysDev[backupSource]->blockSize;

            ioctl(tempFd, FIOSEEK, startingPoint);
            userInputLoop = FALSE;
          } else {
            position(12,0);
            printf("%c",0x7);
          }

          break;
        case 'Q':
        case 'q':
        case 'e':
        case 'E':
          userInputLoop = FALSE;
                                        free(buffer);
          return(OK);
          break;
        default:
          position(12,0);
          printf("%c",0x7);
          break;
      }
    }

    clear();
    userResponseLoop = TRUE;
    while (userResponseLoop) {
      bzero(usrInput, sizeof(usrInput));
                       eraseToEOL(1);
      gotoYX (1, 1, "This is IRREVERSIBLE and takes a really *LONG* time! ");
      gotoYX (2, 1, "Are you sure you want to do this (Y/N) ? ");
      readAndEcho ((char *) &usrInput, 1);
      switch (usrInput[0]) {
        case 'Y':
        case 'y':
                                        clear();
                                        gotoYXBlink(1, 1, "Scrubbing ");
                                        userResponseLoop = FALSE;
          break;
        case 'N':
        case 'n':
                                        clear();
                                        gotoYXBlink(1, 1, "Aborting Scrub Operation!");
                                        delay(2);
                                        return(OK);
                                        userResponseLoop = FALSE;
          break;
```

```
default:
  position(12,0);
  printf("%c",0x7);
  continue;
 }
}

        gotoYX(3, 1, "This will require 4 passes!");
        for(ix = 0; ix < 4; ix++) {
                gotoYX(4,1,"Pass # ");
                printf("%d\n", ix + 1);
                if (ix < 3) {
                  for (iy = 0; iy < 2; iy++) {
  /* set up buffer and fill it with something */
                          switch (iy) {
                                  case 0:
     bfill(buffer, BYTES_PER_MEGABYTE, 0xff);
                                          break;
                                  case 1:
     bfill(buffer, BYTES_PER_MEGABYTE, 0x0);
                                        break;
                  }


              numBytesWritten = 0;
  numBytesToWrite = (UINT32) (BYTES_PER_MEGABYTE);

  nextTarget = 10;    /* print a msg after 10 MBytes have been written */
  printf("\n");      /* get us to a new line */

  totalSize = lastByte - startingPoint;

  if (totalSize <= 0)
    return(OK);

  destFileOffset = startingPoint;

  status = ioctl(tempFd, FIOSEEK, destFileOffset );

  while (numBytesWritten < totalSize ) {

    if ((totalSize - numBytesWritten) < numBytesToWrite) {
      numBytesToWrite = (totalSize - numBytesWritten);
    }

  /* write it */
    if((nBytes=write(tempFd, buffer, numBytesToWrite)) != numBytesToWrite) {
       logMsg("Error writing to disk file!\n");
       printErrno(errnoGet());
       close(tempFd);
                   free(buffer);
                                                 delay(5);
       return(ERROR);
    }

    /* adjust file pointer and number of bytes written */
    destFileOffset += numBytesToWrite;
    numBytesWritten += numBytesToWrite;

    if ((numBytesWritten / DISK_VENDOR_MEGABYTE) > nextTarget ) {
      printf("\r                                                          ");
      printf("\r%ld Mbytes Written ", nextTarget);
      nextTarget += 10;
    } else {
        printf(".");
    }

  }
}
                } else {
bfill(buffer, BYTES_PER_MEGABYTE, 0xf6);

            numBytesWritten = 0;
numBytesToWrite = (UINT32) (BYTES_PER_MEGABYTE);

nextTarget = 10;    /* print a msg after 10 MBytes have been written */
printf("\n");      /* get us to a new line */
```

```
        totalSize = lastByte - startingPoint;

        if (totalSize <= 0)
          return(OK);

        destFileOffset = startingPoint;

        status = ioctl(tempFd, FIOSEEK, destFileOffset );

        while (numBytesWritten < totalSize ) {

          if ((totalSize - numBytesWritten) < numBytesToWrite) {
            numBytesToWrite = (totalSize - numBytesWritten);
          }

          /* write it */
          if((nBytes=write(tempFd, buffer, numBytesToWrite)) != numBytesToWrite) {
             logMsg("Error writing to disk file!\n");
             printErrno(errnoGet());
             close(tempFd);
             delay(5);
                         free(buffer);
             return(ERROR);
          }

          /* adjust file pointer and number of bytes written */
          destFileOffset += numBytesToWrite;
          numBytesWritten += numBytesToWrite;

          if ((numBytesWritten / DISK_VENDOR_MEGABYTE) > nextTarget ) {
            printf("\r                                                        ");
            printf("\r%ld Mbytes Written ", nextTarget);
            nextTarget += 10;
          } else {
              printf(".");
          }

        }
                    }
                }

                close(tempFd);
                free(buffer);
    return(OK);

  }


STATUS dumpSector ()
  {
    FILE *imageFile;
    UINT32 startingPoint = 0, lastByte, offset;
                UINT32 numericResponse;
    int status, tempFd, nBytes;
    int numExtraChars;
    int targetImage, bufferOffset;
    int userInputLoop = TRUE;
    int currentPrintPos, backupSource;
    int userResponseLoop = TRUE;
                unsigned char *buf, *buffer;
    unsigned char usrInput[14];
    unsigned char userResponse;
    unsigned char diskName[128];
    unsigned char completeFileName[128];

    buffer = (unsigned char *) malloc(SECTOR_SIZE + 16);
    bufferOffset = (int) buffer % 16;
                if (bufferOffset != 0)
      buf = buffer + (16 - bufferOffset);
                else
                        buf = buffer;

    resetTerminal();
    while (userInputLoop) {
      gotoYX(1,1,"Is the file on the I)mage disk or a R)aw SCSI disk (I/R) ? ");
      readAndEcho ((char *) &userResponse, 1);
      ioctl(STD_IN, FIONREAD, &numExtraChars);
      if (numExtraChars)
```

```
      gobbleUpExtraChars (numExtraChars);
    switch (userResponse) {
      case 'I':
      case 'i':
        targetImage = reportImageBlocks(DUMP_SECTOR);
        if (targetImage > NONE) {
          userInputLoop = FALSE;
          bzero(completeFileName, sizeof(completeFileName));
          bzero(diskName, sizeof(diskName));
          strcat(completeFileName, BOOT_DISK);
          strcat(completeFileName, IMAGE_FILE);
          imageFile = fopen(completeFileName, "r+b");

          if (!(imageFile)) {
            printErrMsg(15,1,"Error opening Image File!!");
            return(ERROR);
          }

          fseek(imageFile, sizeof(masterElement) +
                (targetImage*sizeof(imageElement)), SEEK_SET);
          nBytes = fread(&imageElement, sizeof(struct imageHeader), 1,
                         imageFile);

          offset = 0;
          startingPoint = imageElement.startingLocation;
          lastByte = imageElement.startingLocation + imageElement.imageSize;

          if ((tempFd = open(IMAGE_DISK, UPDATE)) == ERROR) {
            printErrMsg(5,1,"Invalid Destination Disk or Filename!!");
            return(ERROR);
          }
          ioctl(tempFd, FIOSEEK, startingPoint);
          fclose(imageFile);
        }

        break;
      case 'R':
      case 'r':
        currentPrintPos = showScsiBus("Available Raw Devices: ", SHOW_ONLINE);
        backupSource= showAvailableDataSources(currentPrintPos,
SHOW_DUMP_SECTOR);
        if (backupSource != ERROR) {
          sprintf(diskName, "%s%d", "/tsd/", backupSource);
          if ((tempFd = open(&diskName, READ)) == ERROR) {
            printErrMsg(5,1,"Invalid Destination Disk or Filename!!");
            return(ERROR);
          }
          startingPoint = 0;
          offset = 0;
                                  lastByte = pScsiPhysDev[backupSource]->numBlocks *
pScsiPhysDev[backupSource]->blockSize;

          ioctl(tempFd, FIOSEEK, startingPoint);
          userInputLoop = FALSE;
        } else {
          position(12,0);
          printf("%c",0x7);
        }

        break;
      case 'Q':
      case 'q':
      case 'e':
      case 'E':
        userInputLoop = FALSE;
                              free(buffer);
        return(OK);
        break;
      default:
        position(12,0);
        printf("%c",0x7);
        break;
    }
  }

  clear();
```

```
userResponseLoop = TRUE;
while (userResponseLoop) {
  bzero(usrInput, sizeof(usrInput));
                eraseToEOL(1);
  gotoYX (1, 1, "How many lines per screen on your display <Enter>=24 ? ");
  readAndEcho ((char *) &usrInput, 3);
  switch (usrInput[0]) {
    case 0xa:
    case 0xd:
    case 0x0:
                scrollRegion(2,24);
                                userResponseLoop = FALSE;
      break;
    default:
      if (isdigit(usrInput[0])) {
        sscanf(usrInput, "%d", &numericResponse);
        if ( numericResponse <= 100 ) {
                scrollRegion(2,numericResponse);
                                userResponseLoop = FALSE;
        }
      } else {
         position(12,0);
         printf("%c",0x7);
         continue;
      }
  }
}

clear();
            gotoYXBlink(1,1, "Dump Sector");
userResponseLoop = TRUE;
while (userResponseLoop) {
  bzero(usrInput, sizeof(usrInput));
  printf (
  "\nType Sector Number, <Enter> for next sector or E<Enter> to exit : ");
  readAndEcho ((char *) &usrInput, 13);
  switch (usrInput[0]) {
    case 'E':
    case 'e':
    case 'Q':
    case 'q':
      close(tempFd);
                                free(buffer);
      return(OK);
      break;
    case 0xa:
    case 0xd:
    case 0x0:
                                if ((startingPoint + offset ) <= (lastByte - SECTOR_SIZE)) {
        ioctl(tempFd, FIOSEEK, startingPoint + offset);
        nBytes = read(tempFd, buf, SECTOR_SIZE);
        if (nBytes != SECTOR_SIZE) {
          printErrMsg(5,1,"Bad Read from device!! Phone Home!");
          return(ERROR);
        }
                                  printf("\n\n");
        printf ("Dumping sector %d (0x%x):\n", offset / SECTOR_SIZE,
                                                        offset / SECTOR_SIZE);
                                  printf("\n");
        display(buf, SECTOR_SIZE, 1, offset);
        offset += SECTOR_SIZE;
                                } else {
                                        printf("\nYou've reached the end of this image!\n");
                                }
      break;
    default:
      if (isdigit(usrInput[0])) {

        switch (usrInput[1]) {
          case 'x':
          case 'X':
            sscanf(usrInput, "%x", &numericResponse);
                                                break;
          default:
            sscanf(usrInput, "%d", &numericResponse);
                                        }

        if ( numericResponse <= 0xffffffff ) {
```

```
                                          if ((startingPoint + (numericResponse * SECTOR_SIZE) )
                                                         <= (lastByte - SECTOR_SIZE)) {
                status = ioctl(tempFd, FIOSEEK,
                    ((numericResponse * SECTOR_SIZE) + startingPoint));

                nBytes = read(tempFd, buf, SECTOR_SIZE);

                if (nBytes != SECTOR_SIZE) {
                  printErrMsg(5,1,"Bad Read from device!! Phone Home!");
                  return(ERROR);
                }
                offset = numericResponse * SECTOR_SIZE;
                                              printf("\n\n");
                printf ("Dumping sector %d (0x%x):\n", numericResponse,
numericResponse);
                                              printf("\n");
                display(buf, SECTOR_SIZE, 1, offset);
                offset += SECTOR_SIZE;
                                          } else {
                                                printf("\nYou've reached the end of this image!\n");
                                          }
            } else {
             position(12,0);
             printf("%c",0x7);
             continue;
            }
          }
      }
    }

                close(tempFd);
                free(buffer);
    return(OK);

  }


STATUS modifySector ()
  {
    FILE *imageFile;
    UINT32 startingPoint = 0, lastByte, offset, currentPosition;
                UINT32 numericResponse;
    int status, tempFd, nBytes;
    int numExtraChars, currentSector;
    int targetImage, bufferOffset;
    int userInputLoop = TRUE;
    int currentPrintPos, backupSource;
    int userResponseLoop = TRUE;
                unsigned char *buf, *buffer;
    unsigned char usrInput[14];
    unsigned char userResponse;
    unsigned char diskName[128];
    unsigned char completeFileName[128];

    buffer = (unsigned char *) malloc(SECTOR_SIZE + 16);
    bufferOffset = (int) buffer % 16;
                if (bufferOffset != 0)
      buf = buffer + (16 - bufferOffset);
                else
                        buf = buffer;

    resetTerminal();
    while (userInputLoop) {
      gotoYX(1,1,"Is the file on the I)mage disk or a R)aw SCSI disk (I/R) ? ");
      readAndEcho ((char *) &userResponse, 1);
      ioctl(STD_IN, FIONREAD, &numExtraChars);
      if (numExtraChars)
        gobbleUpExtraChars (numExtraChars);
      switch (userResponse) {
        case 'I':
        case 'i':
          targetImage = reportImageBlocks(MODIFY_SECTOR);
          if (targetImage > NONE) {
            userInputLoop = FALSE;
            bzero(completeFileName, sizeof(completeFileName));
            bzero(diskName, sizeof(diskName));
            strcat(completeFileName, BOOT_DISK);
```

```
          strcat(completeFileName, IMAGE_FILE);
          imageFile = fopen(completeFileName, "r+b");

          if (!(imageFile)) {
            printErrMsg(15,1,"Error opening Image File!!");
            return(ERROR);
          }

          fseek(imageFile, sizeof(masterElement) +
                (targetImage*sizeof(imageElement)), SEEK_SET);
          nBytes = fread(&imageElement, sizeof(struct imageHeader), 1,
                         imageFile);

          offset = 0;
          startingPoint = imageElement.startingLocation;
          lastByte = imageElement.startingLocation + imageElement.imageSize;

          if ((tempFd = open(IMAGE_DISK, O_RDWR)) == ERROR) {
            printErrMsg(5,1,"Invalid Destination Disk or Filename!!");
            return(ERROR);
          }
          ioctl(tempFd, FIOSEEK, startingPoint);
          fclose(imageFile);
        }

        break;
      case 'R':
      case 'r':
        currentPrintPos = showScsiBus("Available Raw Devices: ", SHOW_ONLINE);
        backupSource= showAvailableDataSources(currentPrintPos,
SHOW_MODIFY_SECTOR);
        if (backupSource != ERROR) {
          sprintf(diskName, "%s%d", "/tsd/", backupSource);
          if ((tempFd = open(&diskName, O_RDWR)) == ERROR) {
            printErrMsg(5,1,"Invalid Destination Disk or Filename!!");
            return(ERROR);
          }
          startingPoint = 0;
          offset = 0;
                                          lastByte = pScsiPhysDev[backupSource]->numBlocks *
pScsiPhysDev[backupSource]->blockSize;
          ioctl(tempFd, FIOSEEK, startingPoint);
          userInputLoop = FALSE;
        } else {
          position(12,0);
          printf("%c",0x7);
        }

        break;
      case 'Q':
      case 'q':
      case 'e':
      case 'E':
        userInputLoop = FALSE;
                                    free(buffer);
        return(OK);
        break;
      default:
        position(12,0);
        printf("%c",0x7);
        break;
    }
  }

  clear();
  userResponseLoop = TRUE;
  while (userResponseLoop) {
    bzero(usrInput, sizeof(usrInput));
                    eraseToEOL(1);
    gotoYX (1, 1, "How many lines per screen on your display <Enter>=24 ? ");
    readAndEcho ((char *) &usrInput, 3);
    switch (usrInput[0]) {
      case 0xa:
      case 0xd:
      case 0x0:
                scrollRegion(2,24);
```

```
                                        userResponseLoop = FALSE;
        break;
      default:
        if (isdigit(usrInput[0])) {
          sscanf(usrInput, "%d", &numericResponse);
          if ( numericResponse <= 100 ) {
                        scrollRegion(2,numericResponse);
                                                  userResponseLoop = FALSE;
          }
        } else {
           position(12,0);
           printf("%c",0x7);
           continue;
        }
    }
  }

  clear();
              gotoYXBlink(1,1, "Modify Sector");
  userResponseLoop = TRUE;
  while (userResponseLoop) {
    bzero(usrInput, sizeof(usrInput));
    printf (
    "\nType Sector Number, <Enter> for next sector or E<Enter> to exit : ");
    readAndEcho ((char *) &usrInput, 13);
    switch (usrInput[0]) {
      case 'E':
      case 'e':
      case 'Q':
      case 'q':
        close(tempFd);
                                      free(buffer);
        return(OK);
        break;
      case 0xa:
      case 0xd:
      case 0x0:
                                      if ((startingPoint + offset ) <= (lastByte - SECTOR_SIZE)) {
          ioctl(tempFd, FIOSEEK, startingPoint + offset);
                                              currentPosition = startingPoint+offset;
          nBytes = read(tempFd, buf, SECTOR_SIZE);
          if (nBytes != SECTOR_SIZE) {
            printErrMsg(5,1,"Bad Read from device!! Phone Home!");
            return(ERROR);
          }
                                        printf("\n\n");
          currentSector = offset / SECTOR_SIZE;
          printf ("Dumping sector %d: \n", currentSector);
                                        printf("\n");
          display(buf, SECTOR_SIZE, 1, offset);
                                        userResponseLoop = FALSE;
                                      } else {
                                              printf("\nYou've reached the end of this image!\n");
                                      }
        break;
      default:
        if (isdigit(usrInput[0])) {

          switch (usrInput[1]) {
            case 'x':
            case 'X':
              sscanf(usrInput, "%x", &numericResponse);
                                                              break;
            default:
              sscanf(usrInput, "%d", &numericResponse);
                                              }

          if ( numericResponse <= 0xffffffff ) {
                                        if ((startingPoint + (numericResponse * SECTOR_SIZE) )
                                                              <= (lastByte - SECTOR_SIZE)) {
              status = ioctl(tempFd, FIOSEEK,
                    ((numericResponse * SECTOR_SIZE) + startingPoint));

                                                  currentPosition = startingPoint + (numericResponse * SECTOR_S
IZE);
              nBytes = read(tempFd, buf, SECTOR_SIZE);

              if (nBytes != SECTOR_SIZE) {
```

```
                                          eraseToEOL(18);
          printErrMsg(18,1,"Bad Read from device!! Phone Home!");
          return(ERROR);
        }
        offset = numericResponse * SECTOR_SIZE;
                                  printf("\n\n");
        currentSector = numericResponse;
        printf ("Dumping sector %d: \n", currentSector);
                                  printf("\n");
        display(buf, SECTOR_SIZE, 1, offset);
                                  userResponseLoop = FALSE;
      }
                              } else {
                                  printf("\nYou've reached the end of this image!\n");
                              }
    } else {
      position(12,0);
      printf("%c",0x7);
      continue;
    }
  }
}

userResponseLoop = TRUE;
while (userResponseLoop) {
  bzero(usrInput, sizeof(usrInput));
  printf ("\nModify which byte location (E<Enter> to Exit) ? ");
  readAndEcho ((char *) &usrInput, 13);
  switch (usrInput[0]) {
    case 'E':
    case 'e':
    case 'Q':
    case 'q':
      close(tempFd);
                              free(buffer);
      return(OK);
      break;
    case 0xa:
    case 0xd:
    case 0x0:
                              modify(buf, 1, offset);
                              printf("\n\n");
      printf ("Dumping sector %d: \n", currentSector);
      display(buf, SECTOR_SIZE, 1, offset);
                              printf("\n");
      break;
    default:
      if (isdigit(usrInput[0])) {

        switch (usrInput[1]) {
          case 'x':
          case 'X':
            sscanf(usrInput, "%x", &numericResponse);
                                              break;
          default:
            sscanf(usrInput, "%d", &numericResponse);
                                  }

        if ( (numericResponse >= offset) &&
                                              (numericResponse <= offset + SECTOR_SIZE )) {
                                  modify(buf + (numericResponse - offset), 1,
                                                 (offset + numericResponse));
                                  printf("\n\n");
          printf ("Dumping sector %d: \n", currentSector);
          display(buf, SECTOR_SIZE, 1, offset);
                                  printf("\n");
        }
      } else {
        position(12,0);
        printf("%c",0x7);
        continue;
      }
  }

  bzero(usrInput, sizeof(usrInput));
  printf ("\nC)ommit modifications, M)ore mods or E)xit without saving ? ");
  readAndEcho ((char *) &usrInput, 1);
  switch (usrInput[0]) {
```

```
        case 'E':
        case 'e':
        case 'Q':
        case 'q':
          close(tempFd);
                                        free(buffer);
          return(OK);
          break;
        case 'C':
        case 'c':
                                        status = ioctl(tempFd, FIOSEEK, currentPosition);
                                        nBytes = write(tempFd, buf, SECTOR_SIZE);
          if (nBytes != SECTOR_SIZE) {
                                                eraseToEOL(18);
            printErrMsg(18,1,"Bad Write to device!! Phone Home!");
            return(ERROR);
          }
          break;
        case 'M':
        case 'm':
          break;
        default:
          position(12,0);
          printf("%c",0x7);
          continue;

      }

    }

              close(tempFd);
              free(buffer);
    return(OK);

  }


/* fileName is the name of the RAW partition
 * blockSize is the number of WINDOW_SIZE blocks to be written
 * totalSize is the total number of bytes to be written
 *
 * example call:
 * -> stringScan("/tsd/0", 1, 0, 0x100000, 1)
 *    this would read 1* WINDOW_SIZE bytes at a time starting at
 *    0 for 0x100000 bytes pausing after each display
 *
 */

int scanForStrings(fileFd, startingPosition, numBytesToSearch, bytesPerString,
                                                                    linesPerScreen)
  int     fileFd;
  ULONG   startingPosition;
  ULONG   numBytesToSearch;
  int     bytesPerString;
  int     linesPerScreen;

  {

    char *buffer;
    char *bufPtr;
    int nBytes, status, length, offset;
    UINT32 fileOffset = 0;
    UINT32 numBytesToRead = 0;
    UINT32 numBytesRead = 0;
    char usrInput[100], foundSomething = FALSE, foundAnything = FALSE;
    char buildString[100];
    int  index, linesPrinted;

/* set up buffer and fill it with something */
    buffer = (char *) malloc(SECTOR_SIZE);
    bzero(buffer, SECTOR_SIZE);
    numBytesToRead = (UINT32) (SECTOR_SIZE);
    fileOffset = startingPosition;

              printf("\n");

    while (numBytesRead <= numBytesToSearch ) {
```

```
/* seek to the end */
status = ioctl(fileFd, FIOSEEK, fileOffset);

/* and read it */
if((nBytes = read(fileFd, buffer, numBytesToRead)) != numBytesToRead) {
   logMsg("Error reading from disk file!\n");
   status = ioctl(fileFd, FIOSEEK, 0);
   close(fileFd);
   free(buffer);
   return(ERROR);
}

bufPtr = buffer;
index = 0;
                  printf("\nScanning sector #%d (0x%x):\n\n",
                                          (fileOffset+index) / SECTOR_SIZE,
                                          (fileOffset+index) / SECTOR_SIZE) ;
while (bufPtr < (buffer + numBytesToRead)) {
  if ( isalnum(*bufPtr)) {
    foundSomething = TRUE;
    buildString[0] = *bufPtr;
    offset = (int) (bufPtr - buffer);
    length  = 1;
    bufPtr++;
    while ( (length < 60) &&
      ((*bufPtr == 0x20) || (isascii(*bufPtr) && isgraph(*bufPtr))) ) {
      buildString[length++] = *bufPtr;
      bufPtr++;
    }
    buildString[length] = 0;
    if (length >= bytesPerString) {
      printf ( "%.10x:  %s\n", fileOffset + index,  buildString);
      foundSomething = TRUE;
                                    linesPrinted++;
                                    foundAnything = TRUE;
                                    if (linesPrinted >= linesPerScreen) {
        bzero(usrInput, sizeof(usrInput));
        printf ("\nPress <Enter> to continue or (E<Enter> to Exit) : ");
        readAndEcho ((char *) &usrInput, 2);
                            printf("\n");
        switch (usrInput[0]) {
          case 'E':
          case 'e':
          case 'Q':
          case 'q':
                                    free(buffer);
            return(OK);
            break;
          case 0xa:
          case 0xd:
          case 0x0:
                                                        linesPrinted = 0;
            break;
          default:
                                                        linesPrinted = 0;
            break;
        }
      }

    } else {
      foundSomething = FALSE;
    }
  }
  index = (int) (bufPtr - buffer);
  bufPtr++;
}

if (foundAnything && linesPrinted) {
  bzero(usrInput, sizeof(usrInput));
  printf ("\nPress <Enter> to continue or (E<Enter> to Exit) : ");
                        foundAnything = FALSE;
  readAndEcho ((char *) &usrInput, 2);
                        printf("\n");
  switch (usrInput[0]) {
    case 'E':
    case 'e':
    case 'Q':
    case 'q':
```

```
                                    free(buffer);
            return(OK);
            break;
          case 0xa:
          case 0xd:
          case 0x0:
                                          linesPrinted = 0;
            break;
          default:
                                          linesPrinted = 0;
            break;
        }

      }

      foundSomething = FALSE;

      /* adjust file pointer and number of bytes written */
      fileOffset += numBytesToRead;
      numBytesRead += numBytesToRead;

    }

    bzero(usrInput, sizeof(usrInput));
    printf ("\nThat's all folks!\n ");
    printf ("\nPress <Enter> to continue or (E<Enter> to Exit) : ");
                foundAnything = FALSE;
    readAndEcho ((char *) &usrInput, 2);

                delay(3);
    close(fileFd);
    free(buffer);
    return(OK);
}


#ifdef SAME_SCSI_BUS
int copyDisk(source, destination, blockSize, totalSize, srcStartingLocation,
             destStartingLocation)
  char *source;
  char *destination;
  int   blockSize;
  int   totalSize;
  int   srcStartingLocation;
  int   destStartingLocation;

  {

                int numStars, ix, lastNumStars = 0;
                int oneShot = TRUE;
    char *buffer;
    int srcFd, destFd, nBytes, nRdBytes, nextTarget, status;
    UINT32 srcFileOffset = 0;
    UINT32 destFileOffset = 0;
    UINT32 numBytesToWrite = 0;
    UINT32 numBytesWritten = 0;
    UINT32 tickStart, tickStop, elapsedTicks;
    float  msecs;

    if ((srcFd=open(source, O_RDWR)) == ERROR) {
      printf("Could not open source file for reading!\n");
      return(ERROR);
    }

    if ((destFd=open(destination, O_RDWR)) == ERROR) {
      printf("Could not open destination file for writing!\n");
      return(ERROR);
    }

/* set up buffer and fill it with something */
    buffer = (char *) malloc(blockSize * COPY_WINDOW_SIZE);
    bfill(buffer, blockSize * COPY_WINDOW_SIZE, 0);

    numBytesToWrite = (UINT32) (blockSize * COPY_WINDOW_SIZE);

    /* get the time */
    tickStart = tickGet();
```

```
nextTarget = 0;     /* print a msg after 0 MBytes have been copied */
printf("\n");       /* get us to a new line */

if (totalSize <= 0)
  return(OK);

destFileOffset = destStartingLocation;
srcFileOffset = srcStartingLocation;

status = ioctl(srcFd, FIOSEEK, srcFileOffset );
status = ioctl(destFd, FIOSEEK, destFileOffset );

while (numBytesWritten < totalSize ) {

  if ((totalSize - numBytesWritten) < numBytesToWrite) {
    numBytesToWrite = (totalSize - numBytesWritten);
/*    printf("\rLast read is %ld bytes ", numBytesToWrite); */
  }

  /* read it */
  if((nRdBytes = read(srcFd, buffer, numBytesToWrite)) < 1) {
     logMsg("Error reading from disk file!\n");
     printErrno(errnoGet());
     close(srcFd);
     close(destFd);
     delay(5);
     return(ERROR);
  }

  /* and write it */
  if((nBytes = write(destFd, buffer, nRdBytes)) != nRdBytes) {
     logMsg("Error writing to disk file!\n");
     printErrno(errnoGet());
     close(srcFd);
     close(destFd);
     delay(5);
     return(ERROR);
  }

  /* adjust file pointer and number of bytes written */
  srcFileOffset += numBytesToWrite;
  destFileOffset += numBytesToWrite;
  numBytesWritten += numBytesToWrite;

  if(oneShot) {
    eraseToEOL(3);
    eraseToEOL(4);
    eraseToEOL(5);
    eraseToEOL(6);
                        position(3,1);
                        printf("%% transferred up so far...");
    position(5,1);
    printf("0%% | 10 | 20 | 30 | 40 | 50 | 60 | 70 | 80 | 90 | 100%%");
    position(6,1);
    printf("|                                                  |");
    oneShot = FALSE;
  }

                if ((nextTarget % 50) == 0) {
    if (numBytesWritten >= totalSize) {
        numStars = 50;
    } else {
        numStars = ((((float) (numBytesWritten/
                      (float) totalSize))*100.0)/2);
    }
                        if (numStars > lastNumStars) {
      position(6, 2);
      for( ix = 0; ix < numStars; ix++)
        printf("*");
                                lastNumStars = numStars;
                        }
                } else {
                        nextTarget++;
                }

}

/* get the time */
```

```
    tickStop = tickGet();
    elapsedTicks = tickStop - tickStart;

    /* express in millisecs */
    msecs = (float) (elapsedTicks * (1.0 / sysClkRateGet()) * 1000.0);

    position(12, 1);
    /* print results */
    printf("\nTotal time   : %10.2f secs\n", msecs / 1000.0);
    printf("Transfer rate: %10.2f Mbytes/sec\n",
           (float) ((numBytesWritten/msecs) / 1000.0));

    close(destFd);
    close(srcFd);
    free(buffer);
    return(OK);
}

#else


STATUS scsiWriterTask(int pipeFd)
  {
    int status, nBytes;
    struct copyBlockMsg copyMsg;

    taskUnsafe();
    while (TRUE) {

      if ((status = read(pipeFd, &copyMsg,
           sizeof(struct copyBlockMsg))) == ERROR) {
        logMsg("Error reading pipeFd!\n");
        printErrno(errnoGet());
        return(ERROR);
      }

      taskSafe();
      ioctl(copyMsg.destinationFd, FIOSEEK, copyMsg.seekPosition);

      semTake(copyMsg.blockSem, WAIT_FOREVER);

      if(debug & DUAL_SCSI_DEBUG)
        printf("Buffer addr = 0x%x, size = 0x%x, seek = 0x%x\n",
           (ULONG) copyMsg.bufferAddr, (ULONG) copyMsg.bufferSize,
           (ULONG) copyMsg.seekPosition);

      /* and write it */
      if((nBytes = write(copyMsg.destinationFd, copyMsg.bufferAddr,
                     copyMsg.bufferSize)) != copyMsg.bufferSize) {
         logMsg("Error writing to disk file!\n");
         printErrno(errnoGet());
         close(copyMsg.destinationFd);
         delay(5);
         copyTaskState = IDLE;
         return(ERROR);
      }

      semGive(copyMsg.blockSem);
      taskUnsafe();

    }
  }

STATUS killCopyTask()
  {
    int ix;

    for(ix=0; ix < MAX_COPY_BUFFERS; ix++) {
      free(copyBuffer[ix].bufferAddr);
      semDelete(copyBuffer[ix].blockSem);
    }
    return(taskDelete(scsiWriterId));

  }

STATUS initCopyTask()
  {
```

```
  int ix, iy;

  if ((pipeDevCreate(COPY_PIPE_NAME, MAX_COPY_BUFFERS,
      sizeof(struct copyBlockMsg )) == ERROR)) {
    logMsg("Error creating copyBlockMsg pipe device !\n");
    return(ERROR);
  }

  for(ix = 0; ix < MAX_COPY_BUFFERS; ix++) {
    copyBuffer[ix].seekPosition = -1;
    copyBuffer[ix].bufferSize = -1;
    copyBuffer[ix].destinationFd = -1;
    copyBuffer[ix].blockSem =
      semMCreate(SEM_INVERSION_SAFE|SEM_Q_PRIORITY);
    semGive(copyBuffer[ix].blockSem);
    copyBuffer[ix].bufferAddr = malloc(MAX_COPY_BUFFER_SIZE);
    if (copyBuffer[ix].bufferAddr == NULL) {
      logMsg("Error mallocing buffer # %d!\n", ix);
      for (iy = 0; iy < ix; iy++) {
        free(copyBuffer[iy].bufferAddr);
        semDelete(copyBuffer[iy].blockSem);
      }
      return(ERROR);
    } else {
      bzero(copyBuffer[ix].bufferAddr, MAX_COPY_BUFFER_SIZE);
    }
  }
  if ((copyPipeFd = open(COPY_PIPE_NAME, O_RDWR)) == ERROR) {
    logMsg("Error opening copyPipeFd!\n");
    return(ERROR);
  }
  scsiWriterId = taskSpawn("scsiWriter", 1, VX_DEALLOC_STACK | VX_FP_TASK,
                           0x1000, scsiWriterTask, copyPipeFd);
  return(OK);
 }


#if FALSE
/* fileName is the name of the RAW partition
 * blockSize is the number of WINDOW_SIZE blocks to be written
 * totalSize is the total number of bytes to be written
 *
 * example call:
 * -> copyDisk("/sd0/", "/sd1/", 16, 204800000, 0, 0)
 *    this would write 200 MBytes 256KBytes at the time
 *    (16 * COPY_WINDOW_SIZE)
 */

int copyDisk(source, destination, blockSize, totalSize, srcStartingLocation,
          destStartingLocation)
  char *source;
  char *destination;
  int   blockSize;
  int   totalSize;
  int   srcStartingLocation;
  int   destStartingLocation;

  {

              int numStars, ix, lastNumStars = 0;
              int oneShot = TRUE;
    int srcFd, destFd, nBytes, nextTarget, status;
    int bufferIndex = 0;
    UINT32 srcFileOffset = 0;
    UINT32 destFileOffset = 0;
    UINT32 numBytesToWrite = 0;
    UINT32 numBytesWritten = 0;
    UINT32 tickStart, tickStop, elapsedTicks;
    float  msecs;
    struct copyBlockMsg *msgPtr;

    if ((srcFd=open(source, O_RDWR)) == ERROR) {
      printf("Could not open source file for reading!\n");
      return(ERROR);
    }

    if ((destFd=open(destination, O_RDWR)) == ERROR) {
      printf("Could not open destination file for writing!\n");
```

```
    return(ERROR);
  }

  numBytesToWrite = (UINT32) (blockSize * COPY_WINDOW_SIZE);

  /* get the time */
  tickStart = tickGet();

  nextTarget = 0;    /* print a msg after 10 MBytes have been copied */
  printf("\n");     /* get us to a new line */

  if (totalSize <= 0)
    return(OK);

  destFileOffset = destStartingLocation;
  srcFileOffset = srcStartingLocation;

  status = ioctl(srcFd, FIOSEEK, srcFileOffset );

  msgPtr = copyBuffer;

  while (numBytesWritten < totalSize ) {

    if ((totalSize - numBytesWritten) < numBytesToWrite) {
      numBytesToWrite = (totalSize - numBytesWritten);
    /*  printf("\rLast read is %ld bytes ", numBytesToWrite); */
    }

    semTake(copyBuffer[bufferIndex].blockSem, WAIT_FOREVER);


                  taskDelay(25);
    /* read it */
    if((copyBuffer[bufferIndex].bufferSize = read(srcFd,
        copyBuffer[bufferIndex].bufferAddr, numBytesToWrite)) < 1) {
       logMsg("Error reading from disk file!\n");
       printErrno(errnoGet());
       close(srcFd);
       close(destFd);
       delay(5);
       return(ERROR);
    }

    copyBuffer[bufferIndex].seekPosition = destFileOffset;
    copyBuffer[bufferIndex].destinationFd = destFd;

    /* and write it */
    if((nBytes = write(copyPipeFd, msgPtr,
        sizeof(struct copyBlockMsg))) != sizeof(struct copyBlockMsg)) {
       logMsg("Error writing to copyPipe!\n");
       logMsg("size = %d nBytes = %d !\n",
               sizeof(struct copyBlockMsg), nBytes);
       logMsg("Address of copyBuffer[%d] = 0x%x\n", bufferIndex, msgPtr);
       printErrno(errnoGet());
       close(srcFd);
       close(destFd);
       delay(5);
       return(ERROR);
    } else {
      semGive(copyBuffer[bufferIndex].blockSem);
    }

    /* adjust file pointer and number of bytes written */
    srcFileOffset += numBytesToWrite;
    destFileOffset += numBytesToWrite;
    numBytesWritten += numBytesToWrite;

    bufferIndex++;
    msgPtr++;
    bufferIndex %= MAX_COPY_BUFFERS;
    if (bufferIndex == 0)
      msgPtr = copyBuffer;

    if(oneShot) {
      eraseToEOL(3);
      eraseToEOL(4);
      eraseToEOL(5);
      eraseToEOL(6);
```

```
                              position(3,1);
                              printf("%% transferred up so far...");
    position(5,1);
    printf("0%% | 10 | 20 | 30 | 40 | 50 | 60 | 70 | 80 | 90 | 100%%");
    position(6,1);
    printf("|                                                          |");
    oneShot = FALSE;
   }

                  if ((nextTarget % 50) == 0) {
    if (numBytesWritten >= totalSize) {
        numStars = 50;
    } else {
        numStars = ((((float) (numBytesWritten/
                      (float) totalSize))*100.0)/2);
    }
                              if (numStars > lastNumStars) {
      position(6, 2);
      for( ix = 0; ix < numStars; ix++)
        printf("*");
                                      lastNumStars = numStars;
                              }
                  } else {
                              nextTarget++;
                  }

  }

  /* get the time */
  tickStop = tickGet();
  elapsedTicks = tickStop - tickStart;

  /* express in millisecs */
  msecs = (float) (elapsedTicks * (1.0 / sysClkRateGet()) * 1000.0);

  position(12, 1);
  /* print results */
  printf("\nTotal time    : %10.2f secs\n", msecs / 1000.0);
  printf("Transfer rate: %10.2f Mbytes/sec\n",
          (float) ((numBytesWritten/msecs) / 1000.0));

  delay(3);
  close(destFd);
  close(srcFd);
  return(OK);
}

#endif

/* fileName is the name of the RAW partition
 * blockSize is the number of WINDOW_SIZE blocks to be written
 * totalSize is the total number of bytes to be written
 *
 * example call:
 * -> copyDisk("/sd0/", "/sd1/", 16, 204800000, 0, 0)
 *    this would write 200 MBytes 256KBytes at the time
 *    (16 * COPY_WINDOW_SIZE)
 */

int copyDisk(source, destination, blockSize, totalSize, srcStartingLocation,
             destStartingLocation)
  char *source;
  char *destination;
  int   blockSize;
  int   totalSize;
  int   srcStartingLocation;
  int   destStartingLocation;

  {

                int numStars, ix, lastNumStars = 0;
                int oneShot = TRUE;
    int srcFd, destFd, nBytes, nextTarget, status;
    int bufferIndex = 0;
    UINT32 srcFileOffset = 0;
    UINT32 destFileOffset = 0;
    UINT32 numBytesToWrite = 0;
    UINT32 numBytesWritten = 0;
```

```
UINT32 tickStart, tickStop, elapsedTicks;
float  msecs;
struct copyBlockMsg *msgPtr;

if ((srcFd=open(source, O_RDWR)) == ERROR) {
  printf("Could not open source file for reading!\n");
  return(ERROR);
}

if ((destFd=open(destination, O_RDWR)) == ERROR) {
  printf("Could not open destination file for writing!\n");
  return(ERROR);
}

numBytesToWrite = (UINT32) (blockSize * COPY_WINDOW_SIZE);

/* get the time */
tickStart = tickGet();

nextTarget = 0;     /* print a msg after 10 MBytes have been copied */
printf("\n");       /* get us to a new line */

if (totalSize <= 0)
  return(OK);

destFileOffset = destStartingLocation;
srcFileOffset = srcStartingLocation;

status = ioctl(srcFd, FIOSEEK, srcFileOffset );

msgPtr = copyBuffer;

while (numBytesWritten < totalSize ) {

  if ((totalSize - numBytesWritten) < numBytesToWrite) {
    numBytesToWrite = (totalSize - numBytesWritten);
  /*  printf("\rLast read is %ld bytes ", numBytesToWrite); */
  }

  semTake(copyBuffer[bufferIndex].blockSem, WAIT_FOREVER);


                   taskDelay(12);
  /* read it */
  if((copyBuffer[bufferIndex].bufferSize = read(srcFd,
      copyBuffer[bufferIndex].bufferAddr, numBytesToWrite)) < 1) {
     logMsg("Error reading from disk file!\n");
     printErrno(errnoGet());
     close(srcFd);
     close(destFd);
     delay(5);
     return(ERROR);
  }

  copyBuffer[bufferIndex].seekPosition = destFileOffset;
  copyBuffer[bufferIndex].destinationFd = destFd;

  /* and write it */
  if((nBytes = write(copyPipeFd, msgPtr,
      sizeof(struct copyBlockMsg))) != sizeof(struct copyBlockMsg)) {
     logMsg("Error writing to copyPipe!\n");
     logMsg("size = %d nBytes = %d !\n",
             sizeof(struct copyBlockMsg), nBytes);
     logMsg("Address of copyBuffer[%d] = 0x%x\n", bufferIndex, msgPtr);
     printErrno(errnoGet());
     close(srcFd);
     close(destFd);
     delay(5);
     return(ERROR);
  } else {
    semGive(copyBuffer[bufferIndex].blockSem);
  }

  /* adjust file pointer and number of bytes written */
  srcFileOffset += numBytesToWrite;
  destFileOffset += numBytesToWrite;
  numBytesWritten += numBytesToWrite;
```

```
        bufferIndex++;
        msgPtr++;
        bufferIndex %= MAX_COPY_BUFFERS;
        if (bufferIndex == 0)
          msgPtr = copyBuffer;

        if(oneShot) {
          eraseToEOL(3);
          eraseToEOL(4);
          eraseToEOL(5);
          eraseToEOL(6);
                                position(3,1);
                                printf("%% transferred so far...");
          position(5,1);
          printf("0%% | 10 | 20 | 30 | 40 | 50 | 60 | 70 | 80 | 90 | 100%%");
          position(6,1);
          printf("|                                                  |");
          oneShot = FALSE;
        }

                        if ((nextTarget % 50) == 0) {
          if (numBytesWritten >= totalSize) {
              numStars = 50;
          } else {
              numStars = ((((float) (numBytesWritten/
                              (float) totalSize))*100.0)/2);
          }
                                if (numStars > lastNumStars) {
            position(6, 2);
            for( ix = 0; ix < numStars; ix++)
              printf("*");
                                        lastNumStars = numStars;
                                }
                        } else {
                                nextTarget++;
                        }

    }

    /* get the time */
    tickStop = tickGet();
    elapsedTicks = tickStop - tickStart;

    /* express in millisecs */
    msecs = (float) (elapsedTicks * (1.0 / sysClkRateGet()) * 1000.0);

    position(12, 1);
    /* print results */
    printf("\nTotal time   : %10.2f secs\n", msecs / 1000.0);
    printf("Transfer rate: %10.2f Mbytes/sec\n",
           (float) ((numBytesWritten/msecs) / 1000.0));

    delay(3);
    close(destFd);
    close(srcFd);
    return(OK);
}

#endif

/*******************************************************************************
*
* display - display memory
*
* This command displays the contents of memory, starting at <adrs>.
* If <adrs> is omitted, d() displays the next memory block, starting from
* where the last d() command completed.
*
* Memory is displayed in units specified by <width>.  If <nunits> is zero
* or absent, the number of units displayed defaults to last use.  If
* <nunits> is non-zero, that number of units is displayed and that number
* then becomes the default.  If <width> is zero or absent, it defaults
* to the previous value.  If <width> is an invalid number, it is set to 1.
* The valid values for <width> are 1, 2, and 4.  The number of units d()
* displays is rounded up to the nearest number of full lines.
*
* RETURNS: N/A
*
```

```
* SEE ALSO: m()
*/

void display
    (
    FAST void *adrs,  /* address to display */
    int nunits,    /* number of units to print (if 0, use default) */
    int width,      /* width of displaying unit (1, 2, 4) */
            ULONG displayAddress
    )
  {
    static dNitems = 0x80;  /* default number of item to display */
    static dWidth  = 2;   /* default width */
    static void *last_adrs = 0; /* last location displayed */

    FAST int item;    /* item counter displayed per line */
    char ascii [MAX_BYTES_PER_LINE + 1]; /* ascii buffer for displaying */
    int ix;      /* temporary count */
    ULONG tmp;       /* temporary to hold the value displayed */
    UINT8 *pByte;   /* byte pointer for filling ascii buffer */
    UINT8 *tmpByte;   /* temporary byte pointer */
    USHORT *tmpShort;   /* temporary short word pointer */
    ULONG *tmpLong;   /* temporary long word pointer */

    ascii [MAX_BYTES_PER_LINE] = EOS; /* put an EOS on the string */

    if (nunits == 0)
      nunits = dNitems; /* no count specified: use default count */
    else
      dNitems = nunits; /* change default count */

    if (width == 0)
      width = dWidth;
    else {     /* check for valid width */
      if (width != 1 && width != 2 && width != 4)
        width = 1;
      dWidth = width;
    }

    if (adrs == 0)     /* no address specified: use last address */
      adrs = last_adrs;
    else
      last_adrs = adrs;

    /* round address down to appropriate boundary */

    last_adrs = (void *)((int) last_adrs & ~(width - 1));

    /* print leading spaces on first line */

    bfill (ascii, 16, '.');

    printf ("%08x:  ", (int) displayAddress & ~0xf);

    for (item = 0; item < ((int) last_adrs & 0xf) / width; item++) {
      printf ("%*s ", 2*width, " ");
            bfill (&ascii[item * width], 2*width, ' ');
    }

    /* print out all the words */

    while (nunits-- > 0) {
      if (item == MAX_BYTES_PER_LINE/width) {
      /* end of line:
       *   print out ascii format values and address of next line */

        printf ("  *%16s*\n%08x:  ", ascii, (int) displayAddress);
        bfill (ascii, MAX_BYTES_PER_LINE, '.'); /* clear out ascii buffer */
        item = 0;       /* reset word count */
      }

      switch (width)  {    /* display in appropriate format */
        case 1:
          tmpByte = (UINT8 *)last_adrs;
          printf ("%02x", *tmpByte);
          tmp = (ULONG) *tmpByte;
          break;
        case 2:
```

```
        tmpShort = (USHORT *)last_adrs;
        printf ("%04x", *tmpShort);
        tmp = (ULONG) *tmpShort;
        break;
      case 4:
        tmpLong = (ULONG *)last_adrs;
        printf ("%08x", *tmpLong);
        tmp = (ULONG) *tmpLong;
        break;
      default:
        tmpByte = (UINT8 *)last_adrs;
        printf ("%02x", *tmpByte);
        tmp = (ULONG) *tmpByte;
        break;
    }

    printf (" "); /* space between words */

    /* set ascii buffer */

    pByte = (UINT8 *) last_adrs;
    for (ix = 0; ix < width; ix ++) {
      if (*pByte == ' ' || (isascii (*pByte) && isprint (*pByte))) {
        ascii[item*width + ix] = *pByte;
      }
      pByte ++;
    }

    last_adrs = (void *)((int)last_adrs + width);

            displayAddress += (ULONG) width;


    item++;
  }

  /* print remainder of last line */

  for (; item < MAX_BYTES_PER_LINE/width; item++)
    printf ("%*s ", 2*width, " ");

    printf ("  *%16s*\n", ascii); /* print out ascii format values */

}

/*******************************************************************************
*
* modify - modify memory
*
* This command prompts the user for modifications to memory in byte, short
* word, or long word specified by <width>, starting at the specified address.
* It prints each address and the current contents of that address, in turn.
* If <adrs> or <width> is zero or absent, it defaults to the previous value.
* The user can respond in one of several ways:
* .iP RETURN 11
* Do not change this address, but continue, prompting at the next address.
* .iP <number>
* Set the content of this address to <number>.
* .iP ". (dot)"
* Do not change this address, and quit.
* .iP EOF
* Do not change this address, and quit.
* .LP
* All numbers entered and displayed are in hexadecimal.
*
* RETURNS: N/A
*
* SEE ALSO: mRegs()
*
* INTERNALS: further improvement needed.  add an addtional paramater indicating
*            whether a read should be done or not before writting.
*/

void modify
    (
    void *adrs,    /* address to change */
    int  width,     /* width of unit to be modified (1, 2, 4) */
            ULONG displayAddress
```

```
  )
{
  static void *lastAdrs;  /* last location modified */
  static int  lastWidth = 2;  /* last width - default to 2 */
  char line[MAXLINE + 1]; /* leave room for EOS */
  char *pLine;    /* ptr to current position in line */
  int value;      /* value found in line */
  char excess;

  if (adrs != 0)    /* set default address */
    lastAdrs = adrs;

  if (width != 0) {  /* check valid width and set the default */
    if (width != 1 && width != 2 && width != 4)
      width = 1;
    lastWidth = width;
  }

            printf("\n\nPress '.' to end modify:\n\n");
  /* round down to appropriate boundary */

  lastAdrs = (void *)((int)lastAdrs & ~(lastWidth - 1));

  for (;; lastAdrs = (void *)((int)lastAdrs + lastWidth)) {
/* prompt for substitution according to width */

    switch (lastWidth) {
      case 1:
        printf ("\n%08x:  %02x-", (int) displayAddress, *(UINT8 *)lastAdrs);
        break;
      case 2:
        printf ("\n%08x:  %04x-", (int) displayAddress, *(USHORT *)lastAdrs);
        break;
      case 4:
        printf ("\n%08x:  %08x-", (int) displayAddress, *(ULONG *)lastAdrs);
        break;
      default:
        printf ("\n%08x:  %08x-", (int) displayAddress, *(UINT8 *)lastAdrs);
        break;
    }

                    displayAddress += (ULONG) lastWidth;

/* get substitution value:
 *   skip empty lines (CR only);
 *   quit on end of file or invalid input;
 *   otherwise put specified value at address
 */

                    readAndEcho((char *) &line, MAXLINE);

    line[MAXLINE] = EOS;  /* make sure input line has EOS */

    for (pLine = line; isspace (*pLine); ++pLine) /* skip leading spaces*/
      ;

    if (*pLine == EOS)      /* skip field if just CR */
      continue;

    if (sscanf (pLine, "%x%1s", &value, &excess) != 1)
      break;        /* quit if not number */

/* assign new value */

    switch (lastWidth) {
      case 1:
        *(UINT8 *)lastAdrs = (UINT8) value;
        break;
      case 2:
        *(USHORT *)lastAdrs = (USHORT) value;
        break;
      case 4:
        *(ULONG *)lastAdrs = (ULONG) value;
        break;
      default:
        *(UINT8 *)lastAdrs = (UINT8) value;
        break;
    }
```

95/04/15 15:57:16 backupUtils.c 49

```
    }

    printf ("\n");
}
```

95/03/28
12:40:33 backupUtils.h

1

```
/* Include file to access backupUtility Functions */

extern int stringScan();

extern VOID initScsiVars ();

extern STATUS scsiConfig();

extern int showScsiBus(char *heading, int showAll);

extern int showAvailableDataSources( int currentPrintPos, int requestType);

extern VOID dosDateTimeHookFn(DOS_DATE_TIME *pDosDateTime);

extern VOID setDosTimeHook();

extern STATUS initializeImageManager();

extern STATUS reportImageBlocks(int returnUserChoice);

extern STATUS findFirstFitImageBlock(int blockSize, int backupSource);

extern STATUS deleteImage(int imageToDelete);

extern STATUS restoreImage(int imageToRestore);

extern STATUS imageMaintenance();

extern STATUS dumpMasterRecord();

extern STATUS dumpImageRecord(int imageNumber);

extern STATUS lowLevelDiskFunctions();

extern int dumpSector (char *filename, int sectorNum);

extern VOID dumpMem();

extern int stringScan();

extern int diskDump();

extern int diskPatch();
```

```
/**************************************************************************/
/*                VBU Backup Unit User Interface Routines                  */
/*                                                                         */
/**************************************************************************/
/* needed for access to some of the SCSI specific routines from sbuDrv.c   */
#define SCSI_EXTERN extern

#include "backup.h"

/* get cursor positioning and user I/O routines declarations              */
#include "screenUtils.h"

/* get generic image management I/O routine declarations                  */
#include "backupUtils.h"

/* Get SCSI backup unit specific routine declarations                     */
#include "sbuDrv.h"

extern STATUS startVbuUp();
extern STATUS startSbuUp();
extern STATUS backupChooser();
extern STATUS vbuInstalled;
extern STATUS sbuInstalled;

extern char userResponse;

VOID startItUp(int delayTime)
  {
    ULONG shellTaskId, rloginTaskId, telnetTaskId;

    delay(delayTime);
    rloginTaskId = taskNameToId("tRlogind");
    telnetTaskId = taskNameToId("tTelnetd");
    shellTaskId = taskNameToId("tShell");
    taskPrioritySet(shellTaskId, 2);
    taskPrioritySet(telnetTaskId, 3);
    taskPrioritySet(rloginTaskId, 3);
    taskSpawn("chooser", 1, VX_DEALLOC_STACK|VX_FP_TASK, 0x6000,
              backupChooser);
  }


STATUS  backupChooser()
  {
    int userInputLoop=TRUE, numExtraChars;

    while (userInputLoop) {
      userInputLoop = TRUE;
      clear();
      gotoYX(1, 20, "Backup System");
      gotoYX(3, 12, "Which System Do You Want to Use?");
      gotoYX(5, 15, "1) Video Backup Unit");
      gotoYX(6, 15, "2) SCSI Backup Unit");
      gotoYX(7, 15, "E) Exit ");
      while (userInputLoop) {
        eraseToEOL(9);
        gotoYX(9, 15, "Enter Choice (1-2 or E): ");
        readAndEcho ((char *) &userResponse, 1);
        ioctl(STD_IN, FIONREAD, &numExtraChars);
        if (numExtraChars)
          gobbleUpExtraChars (numExtraChars);
        switch (userResponse) {
          case '1':
                                        if (vbuInstalled) {
            clear();
            startVbuUp();
            userInputLoop = FALSE;
                                        } else {
                                                gotoYXBlink(11,1,
                                                                "The Video Backup Unit is not installed i
n this system!");

                                                delay(5);
                                                eraseToEOL(11);
                                        }

          break;
         case '2':
                                        if (sbuInstalled) {
            clear();
```

```
                startSbuUp();
                userInputLoop = FALSE;
            } else {
                gotoYXBlink(11,1,
                        "The SCSI Backup Unit is not installed in
this system!");
                delay(5);
                eraseToEOL(11);
            }
            break;
          case 'Q':
          case 'q':
          case 'e':
          case 'E':
            userInputLoop = FALSE;
            return(OK);
            break;
          default:
            position(10,0);
            printf("%c",0x7);
            break;
        }
      }
    }
              return(OK);
  }
```

95/03/28 12:40:36 compare.c 1

```
#include <stdio.h>
#define FALSE 0
#define TRUE 1
unsigned char buf[65536];
unsigned char buf2[65536];

int getint(i)
int i;
{
return ( (buf[i]<<8) | buf[i+1]);
}


long getlongint(i)
int i;
{
return ( (buf[i]<<24) |(buf[i+1]<<16) |(buf[i+2]<<8) | buf[i+3]);
}



int main (argc, argv)
int argc;
char *argv[];
{
FILE *in, *in2;
unsigned char c;
int i,j,n;
int port;
int len;
int sector;
long offset;
int flag;

in = fopen (argv[1], "r");
in2 = fopen (argv[2], "r");


printf ("comparing file %s to %s\n", argv[1], argv[2]);

for (i=0;i<1000;i++) {

        fread (buf, 1, 512, in);
        fread (buf2, 1, 512, in2);

        flag = FALSE;
        for (j=0;j<512;j++) if (buf[j] != buf2[j]) flag = TRUE;
        if (flag) {
                printf ("found differences in sector %d decimal\n", i);
                dumpmem(buf,512);
                dumpmem(buf2,512);
                }
        }

}





int dumpmem(buf,len)
unsigned char buf[];
int len;
{
int i,j,k;
unsigned char *ptr;
unsigned char c;
ptr = buf;
i = len;
while (i > 0) {
        k = i;
        if (k > 16) k = 16;
        printf ("      ");
        for (j=0;j<k;j++) printf ("%.2X ", *(ptr+j));
        printf ("   ");
```

95/03/28 12:40:36 compare.c 2

```
		if (k<16) for (j=k;j<16;j++) printf ("   ");
		for (j=0;j<k;j++) if (isprint(*(ptr+j))) printf ("%c", *(ptr+j)); else printf (".");
		if (k<16) for (j=k;j<16;j++) printf (" ");
		printf ("   ");
		for (j=0;j<k;j++) {
			c = *(ptr+j);
			c &= 0x7f;
			if (isprint(c)) printf ("%c", c); else printf (".");
			}
		printf ("\n");
		i -= 16;
		ptr += 16;
		}
}
```

```
#include "vxWorks.h"
#include "ioLib.h"
#include "iosLib.h"
#include "errnoLib.h"
#include "taskLib.h"

#define WINDOW_SIZE 0x4000  /* 16KBytes */

/* fileName is the name of the RAW partition
 * blockSize is the number of WINDOW_SIZE blocks to be written
 * totalSize is the total number of bytes to be written
 *
 * example call:
 * -> diskWriter("/sd1/", 16, 204800000)
 *     this would write 200 MBytes 256KBytes at the time
 *     (16 * WINDOW_SIZE)
 */

int diskWriter(fileName, blockSize, totalSize)
  char *fileName;
  int   blockSize;
  int   totalSize;

  {

    char *buffer;
    int fileFd, nBytes, status;
    UINT32 fileOffset = 0;
    UINT32 numBytesToWrite = 0;
    UINT32 numBytesWritten = 0;
    UINT32 tickStart, tickStop, elapsedTicks;
    float  msecs, xferRate;

    if ((fileFd=open(fileName, O_RDWR)) == ERROR) {
      printf("Could not open file for writing!\n");
      return(ERROR);
    }

/* set up buffer and fill it with something */
    buffer = (char *) malloc(blockSize * WINDOW_SIZE);
    bfill(buffer, blockSize * WINDOW_SIZE, 0xa5);
    numBytesToWrite = (UINT32) (blockSize * WINDOW_SIZE);

    /* get the time */
    tickStart = tickGet();

    while (numBytesWritten <= totalSize ) {

      /* seek to the end */
      status = ioctl(fileFd, FIOSEEK, fileOffset);

      /* and write it */
      if((nBytes = write(fileFd, buffer, numBytesToWrite)) != numBytesToWrite) {
         logMsg("Error writing to disk file!\n");
         status = ioctl(fileFd, FIOSEEK, 0);
         write(fileFd, &fileOffset, sizeof(fileOffset));
         close(fileFd);
         return(ERROR);
      }

      /* adjust file pointer and number of bytes written */
      fileOffset += numBytesToWrite;
      numBytesWritten += numBytesToWrite;
                       logMsg("%ld\n", numBytesWritten);

      /* seek to relative 0 */
      status = ioctl(fileFd, FIOSEEK, 0);
      /* and write current pointer */
      write(fileFd, &fileOffset, sizeof(fileOffset));
    };

    /* get the time */
    tickStop = tickGet();
    elapsedTicks = tickStop - tickStart;

    /* express in millisecs */
    msecs = (float) (elapsedTicks * (1.0 / sysClkRateGet()) * 1000.0);
```

95/03/28
12:40:36 diskTest.c

2

```
    /* print results */
    printf("Total time: %ld ticks (%f msecs)\n", elapsedTicks, msecs);
    printf("Total bytes transferred: %ld bytes\n", numBytesWritten);
    printf("Transfer rate: %f bytes/sec\n",
            (float) ((numBytesWritten/msecs)*1000.0) );

    close(fileFd);
    free(buffer);
    return(OK);
}
```

```
#include "vxWorks.h"
#include "dosFsLib.h"
#include "blkIo.h"
#include "scsiLib.h"

#define SPIN_UP_TIMEOUT 20

SCSI_PHYS_DEV * pSpd00;          /* SCSI_PHYS_DEV ptrs (suffix == ID, LUN) */
BLK_DEV *       pSbd0;


STATUS scsiDosConfig (char *diskName, int scsiId)

    {

                int ix, bootDevId = 0, bootDevLUN = 0;

    /* NOTE: Either of the following global variables may be set or reset
     * from the VxWorks shell. Under 5.0, they should NOT both be set at the
     * same time, or output will be interleaved and hard to read!! They are
     * intended as an aid to trouble-shooting SCSI problems.
     */

    if ((pSpd00 = scsiPhysDevCreate (pSysScsiCtrl, scsiId, bootDevLUN,

128, 0, 0, 0xffff, 512)) == NULL) {
        printErr ("scsiPhysDevCreate failed.\n");
        return (ERROR);
    }

    /* issue a couple fo TEST UNIT READY commands to clear reset execption */

    scsiTestUnitRdy (pSpd00);
    scsiTestUnitRdy (pSpd00);

    /* issue a TEST UNIT READY every second for SPIN_UP_TIMEOUT seconds,
     * or until device returns OK status.
     */

    if (scsiTestUnitRdy (pSpd00) != OK) {
        printf ("Waiting for disk to spin up...");

        for (ix = 0; ix < SPIN_UP_TIMEOUT; ix++) {
            if (scsiTestUnitRdy (pSpd00) == OK) {
                printf (" done.\n");
                break;
            }
            else {
                if (ix != (SPIN_UP_TIMEOUT - 1))
                    printf (".");
                else {
                    printf (" timed out.\n");
                    return (ERROR);
                }
                taskDelay (sysClkRateGet ());
            }
        }
    }
    scsiPhysDevDelete (pSpd00);

    printf ("Attaching to scsi device... \n");

    /* configure Winchester at busId = 0, LUN = 0 */

    if ((pSpd00 = scsiPhysDevCreate (pSysScsiCtrl, scsiId, bootDevLUN,
                                            0, NONE, 0, 0, 0)) == (SCSI_PHYS_DEV *) NULL) {
        SCSI_DEBUG_MSG ("usrScsiConfig: scsiPhysDevCreate failed.\n",
                        0, 0, 0, 0, 0, 0);
            printf("usrScsiConfig Failed \n");
        }
    else {
        /* create block devices */

      if (((pSbd0 = scsiBlkDevCreate (pSpd00, 0x0, 0)) == NULL))
            {
        SCSI_DEBUG_MSG ("usrScsiConfig: scsiBlksDevCreate failed.\n",
                        0, 0, 0, 0, 0, 0);
            printf("scsiBlkDevCreate Failed \n");
```

```
        return (ERROR);
        }

   if ((dosFsDevInit  (diskName, pSbd0, NULL) == NULL))
        {
     SCSI_DEBUG_MSG ("usrScsiConfig: FsDevInit  failed.\n",
                          0, 0, 0, 0, 0, 0);
          printf("scsiFile System init Failed \n");
        return (ERROR);
        }
     }

printf ("done. \n");
return (OK);

}
```

95/07/12 11:06:23 doubleTest.c 1

```
#include "vxWorks.h"

void doubleTest(char *fred)
	{
		double fred2, fred2a;
		ULONG fred3, fred4;
		int hours, mins, secs;

	sscanf(fred, "%4x%8x", &fred3, &fred4);
		printf("Original was %s\n", fred);
		printf("Scanned Original was 0x%lx 0x%lx\n", fred3, fred4);
		fred2a = (double) (fred4 << 16) * 32768.0;
		fred2 = fred3 +  fred2a;
		printf("Fred2 =  %15.5f\n", fred2);
		fred2 = fred2 / 2.0;
		printf("In MicroSeconds %f\n", fred2);
		fred2 /= 1000.0;
		printf("In Seconds %f\n", fred2);
	hours = fred2 / 3600;
		fred2 = (long) fred2 % 3600;
		mins = fred2 / 60;
		fred2 = (long) fred2 % 60;
		secs = fred2;
		printf("Since Midnight:\n");
		printf("Time : %02d:%02d:%02d\n", hours, mins, secs);

	}
```

95/03/28 12:40:56 dumpSector.c 1

```
#include "vxWorks.h"
#include "stdioLib.h"

int dumpSector (char *filename, int sectorNum)
{
FILE *in;
unsigned char c;
int i,j,n;
int port;
int len;
unsigned char buf[2048];
int sector;
long offset;


in = fopen (filename, "rb");

sector=sectorNum;

printf ("dumping sector %d of file %s\n", sector, filename);

offset = (long) (512 * sector);
printf ("seeking to %ld\n", offset);

if (fseek (in,  offset , 0) != 0) {
        printf ("error in seeking\n");
        }

offset = ftell(in);
printf ("positioned at %ld\n", offset);

fread (buf, 1, 512, in);

dumpmem(&buf, 512);

/*d(&buf, 512, 1); */


}

int dumpmem(buf,len)
unsigned char *buf;
int len;
{
int i,j,k;
unsigned char *ptr;
unsigned char c;
ptr = buf;
i = len;
while (i > 0) {
        k = i;
        if (k > 16) k = 16;
        printf ("      ");
        for (j=0;j<k;j++) printf ("%.2X ", *(ptr+j));
        printf ("   ");
        if (k<16) for (j=k;j<16;j++) printf ("   ");
        for (j=0;j<k;j++) if (isprint(*(ptr+j))) printf ("%c", *(ptr+j)); else printf (".");
        if (k<16) for (j=k;j<16;j++) printf (" ");
        printf ("   ");
        for (j=0;j<k;j++) {
                c = *(ptr+j);
                c &= 0x7f;
                if (isprint(c)) printf ("%c", c); else printf (".");
                }
        printf ("\n");
        i -= 16;
        ptr += 16;
        }
}
```

frames.c 1

```
#include <stdio.h>

int main (argc, argv)
int argc;
char *argv[];
{
FILE *in;
unsigned char c;
int i,j,n;
int port;
int len;
unsigned char buf[65536];
int sector;
long offset;


in = fopen (argv[1], "r");

sscanf(argv[2], "%d", &sector);

printf ("dumping sector %d of file %s\n", sector, argv[1]);

offset = (long) (512 * sector);
printf ("seeking to %ld\n", offset);

if (fseek (in,  offset , 0) != 0) {
        printf ("error in seeking\n");
        printf ("errno = %d\n", errno);
        }

offset = ftell(in);
printf ("positioned at %ld\n", offset);

fread (buf, 1, 512, in);

dumpmem(buf, 512);


}




int dumpmem(buf,len)
unsigned char buf[];
int len;
{
int i,j,k;
unsigned char *ptr;
unsigned char c;
ptr = buf;
i = len;
while (i > 0) {
        k = i;
        if (k > 16) k = 16;
        printf ("      ");
        for (j=0;j<k;j++) printf ("%.2X ", *(ptr+j));
        printf ("   ");
        if (k<16) for (j=k;j<16;j++) printf ("   ");
        for (j=0;j<k;j++) if (isprint(*(ptr+j))) printf ("%c", *(ptr+j)); else printf (".");
        if (k<16) for (j=k;j<16;j++) printf (" ");
        printf ("   ");
        for (j=0;j<k;j++) {
                c = *(ptr+j);
                c &= 0x7f;
                if (isprint(c)) printf ("%c", c); else printf (".");
                }
        printf ("\n");
        i -= 16;
        ptr += 16;
        }
}
```

partInfo.c

```
#include "vxWorks.h"
#include "dosFsLib.h"

DOS_PART_TBL *pDosPartTbl;

#define swapl(x)   ((((x) & 0x000000ff) << 24) | \
        (((x) & 0x0000ff00) <<  8) | \
        (((x) & 0x00ff0000) >>  8) | \
        (((x) & 0xff000000) >> 24))

#define swaps(x)   ((((x) & 0x00ff) << 8) | \
        (((x) & 0xff00) >> 8))

void extractCylSect(UINT16 asStored, UINT16 *cyl, UINT8 *sect)
  {
    UINT16 actualCyl, tempCyl;
    UINT8  actualSect;

    tempCyl = swaps(asStored);

    actualCyl = (((tempCyl & 0x00C0) << 2) | ((tempCyl & 0xff00) >> 8));

    actualSect = (tempCyl & 0x003f);
    *cyl = actualCyl;
    *sect = actualSect;
  }

dumpPart(int partNum, DOS_PART_TBL *pDosPartTbl)
        {
    UINT16 cylNum = 0;
    UINT8  sectNum = 0;

                printf("\nPartition # %d\n", partNum);

    printf("Status = 0x%x = %d\n", pDosPartTbl->dospt_status,
                                   pDosPartTbl->dospt_status);
    printf("Start Head = 0x%x = %d\n", pDosPartTbl->dospt_startHead,
                                       pDosPartTbl->dospt_startHead);
    printf("Start Sect/Cyl = 0x%x = %d\n", swaps(pDosPartTbl->dospt_startSec),
                                           swaps(pDosPartTbl->dospt_startSec));

    extractCylSect(pDosPartTbl->dospt_startSec, &cylNum, &sectNum);

    printf("Start Cyl = 0x%x = %d\n", cylNum, cylNum);
    printf("Start Sect = 0x%x = %d\n", sectNum, sectNum);

    printf("DOS Part Type = 0x%x = %d\n", pDosPartTbl->dospt_type,
                                          pDosPartTbl->dospt_type);
    printf("End Head = 0x%x = %d\n", pDosPartTbl->dospt_endHead,
                                     pDosPartTbl->dospt_endHead);
    printf("End Sect/Cyl = 0x%x = %d\n", swaps(pDosPartTbl->dospt_endSec),
                                         swaps(pDosPartTbl->dospt_endSec));
    extractCylSect(pDosPartTbl->dospt_endSec, &cylNum, &sectNum);

    printf("End Cyl = 0x%x = %d\n", cylNum, cylNum);
    printf("End Sect = 0x%x = %d\n", sectNum, sectNum);

    printf("# Sects B/4 Part = 0x%x = %d\n", swapl(pDosPartTbl->dospt_absSec),
                                             swapl(pDosPartTbl->dospt_absSec));
    printf("# Sects in Part = 0x%x = %d\n", swapl(pDosPartTbl->dospt_nSectors),
                                            swapl(pDosPartTbl->dospt_nSectors));
                d(pDosPartTbl, 16, 1);
  }

void partInfo(char *diskName)
        {
                char *buffer;
    int fd, ix, nBytes;
                UINT16 bytesPerSect = 0, sectsPerTrack = 0;
                UINT16 numHeads = 0;

                buffer = (char *) malloc(512);
                bzero(buffer, 512);

                fd = open(diskName, READ);

                ioctl(fd, FIOSEEK, 0);
```

95/10/28 12:40:17 partInfo.c 2

```
            nBytes = read(fd, buffer, 512);

            bytesPerSect = *(buffer+DOS_BOOT_BYTES_PER_SEC);
            sectsPerTrack = *(buffer+DOS_BOOT_SEC_PER_TRACK);
            numHeads = *(buffer+DOS_BOOT_NHEADS);

printf("Number Heads = %d \n", swaps(numHeads));
printf("Sectors/track = %d \n", swaps(sectsPerTrack));
printf("bytes/sect = %d \n", swaps(bytesPerSect));

buffer += DOS_BOOT_PART_TBL;
            pDosPartTbl = (DOS_PART_TBL *) buffer;
            dumpPart(1, pDosPartTbl);
buffer += 16;
            pDosPartTbl = (DOS_PART_TBL *) buffer;
            dumpPart(2, pDosPartTbl);
buffer += 16;
            pDosPartTbl = (DOS_PART_TBL *) buffer;
            dumpPart(3, pDosPartTbl);
buffer += 16;
            pDosPartTbl = (DOS_PART_TBL *) buffer;
            dumpPart(4, pDosPartTbl);

close(fd);
    }
```

```
#include "vxWorks.h"
#include "dosFsLib.h"
#include "blkIo.h"
#include "scsiLib.h"

#define SPIN_UP_TIMEOUT 20

SCSI_PHYS_DEV * pSpd00;          /* SCSI_PHYS_DEV ptrs (suffix == ID, LUN) */
BLK_DEV *       pSbd0;


STATUS scsiRawConfig (char *diskName, int scsiId)

    {

                int ix, bootDevId = 0, bootDevLUN = 0;

    /* NOTE: Either of the following global variables may be set or reset
     * from the VxWorks shell. Under 5.0, they should NOT both be set at the
     * same time, or output will be interleaved and hard to read!! They are
     * intended as an aid to trouble-shooting SCSI problems.
     */

    if ((pSpd00 = scsiPhysDevCreate (pSysScsiCtrl, scsiId, bootDevLUN,
128, 0, 0, 0xffff, 512)) == NULL) {
        printErr ("scsiPhysDevCreate failed.\n");
        return (ERROR);
    }

    /* issue a couple fo TEST UNIT READY commands to clear reset execption */

    scsiTestUnitRdy (pSpd00);
    scsiTestUnitRdy (pSpd00);

    /* issue a TEST UNIT READY every second for SPIN_UP_TIMEOUT seconds,
     * or until device returns OK status.
     */

    if (scsiTestUnitRdy (pSpd00) != OK) {
        printf ("Waiting for disk to spin up...");

        for (ix = 0; ix < SPIN_UP_TIMEOUT; ix++) {
            if (scsiTestUnitRdy (pSpd00) == OK) {
                printf (" done.\n");
                break;
            }
            else {
                if (ix != (SPIN_UP_TIMEOUT - 1))
                    printf (".");
                else {
                    printf (" timed out.\n");
                    return (ERROR);
                }
                taskDelay (sysClkRateGet ());
            }
        }
    }
    scsiPhysDevDelete (pSpd00);

    printf ("Attaching to scsi device... \n");

    /* configure Winchester at busId = 0, LUN = 0 */

    if ((pSpd00 = scsiPhysDevCreate (pSysScsiCtrl, scsiId, bootDevLUN,
                                     0, NONE, 0, 0, 0)) == (SCSI_PHYS_DEV *) NULL) {
        SCSI_DEBUG_MSG ("usrScsiConfig: scsiPhysDevCreate failed.\n",
                        0, 0, 0, 0, 0, 0);
            printf("usrScsiConfig Failed \n");
        }
    else {
        /* create block devices */

      if (((pSbd0 = scsiBlkDevCreate (pSpd00, 0x0, 0)) == NULL))
            {
        SCSI_DEBUG_MSG ("usrScsiConfig: scsiBlksDevCreate failed.\n",
                        0, 0, 0, 0, 0, 0);
            printf("scsiBlkDevCreate Failed \n");
```

rawIt.c 2

```
        return (ERROR);
        }

    if ((rawFsDevInit  (diskName, pSbd0) == NULL))
        {
      SCSI_DEBUG_MSG ("usrScsiConfig: FsDevInit  failed.\n",
                      0, 0, 0, 0, 0, 0);
          printf("scsiFile System init Failed \n");
        return (ERROR);
        }
      }

          printf("Num blocks = %d\n", pSbd0->bd_nBlocks);
          printf("Num Bytes/Block = %d\n", pSbd0->bd_bytesPerBlk);
          printf("Num blocks/track = %d\n", pSbd0->bd_blksPerTrack);
          printf("Num heads = %d\n", pSbd0->bd_nHeads);

  printf ("done. \n");
  return (OK);

  }
```

95/03/28 12:40:37 sbu.h 1

```
/* sbu.h  Header File for SCSI Backup */

/*****************************************************************************/
/*                 Type Declaration for Fast (I Hope) SCSI Copies            */
/*****************************************************************************/

#define COPY_PIPE_NAME "/pipe/scsiCopy"

#define MAX_COPY_BUFFER_SIZE 0x100000

SCSI_EXTERN struct copyBlockMsg copyBuffer[MAX_COPY_BUFFERS];
```

sbuDrv.h 1

```
/* External declarations for SCSI Backup Driver Code                    */

extern int copyDisk();

extern STATUS scsiWriterTask(int pipeFd);

extern STATUS killCopyTask();

extern STATUS initCopyTask();

extern int copyDisk2();
```

sbuMenu.c

```
/****************************************************************************/
/*                    SCSI Backup Unit User Interface Routines              */
/*                                                                          */
/****************************************************************************/
/* needed for access to some of the SCSI specific routines from sbuDrv.c   */
#define SCSI_EXTERN extern

#include "backup.h"

/* get cursor positioning and user I/O routines declarations               */
#include "screenUtils.h"

/* get generic image management I/O routine declarations                   */
#include "backupUtils.h"

/* Get SCSI backup unit specific routine declarations                      */
#include "sbuDrv.h"

STATUS scsiMainMenu();
STATUS backupScsiDisk();
STATUS copyImageBlock();

extern char userResponse;
extern int  imageFd;
extern int  scsiConfigDone;
int  scsiBackupDone = FALSE;

VOID startSbuUp()
  {
    ULONG shellTaskId, rloginTaskId, telnetTaskId;

    rloginTaskId = taskNameToId("tRlogind");
    telnetTaskId = taskNameToId("tTelnetd");
    shellTaskId = taskNameToId("tShell");
    taskPrioritySet(shellTaskId, 2);
    taskPrioritySet(telnetTaskId, 3);
    taskPrioritySet(rloginTaskId, 3);
    taskSpawn("scsiBackup", 1, VX_DEALLOC_STACK|VX_FP_TASK, 0x6000,
              scsiMainMenu);
  }

/*********************************************************************
 *
 * This routine just prints out all of the user accessable commands
 *
 * Inputs : None
 *
 * Outputs: printed info
 *
 *********************************************************************/

VOID scsiHelp()
  {


    static char *help_msg [] = {
    /* page 1 */
    "scsiHelp                          Print this list",
    "",
    "scsiConfig()",
    "",
    "   Example: scsiConfig()",
    "",
    "   Would initialize the SCSI bus and associated variables",
    "",
    "",
    "",
    "stringScan(fileName, blockSize, startLocation, numBytes, waitForInput)",
    "",
    "   Scan disk for ASCII strings starting at startLocation for",
    "   numBytes waiting for input if waitForInput is 1",
    "",
    "   Example: stringScan(\"/tsd/3\", 1, 0, 0x10000, 1)",
    "",
    "",
    "",
    "",
    "diskDump(fileName, blockSize, startLocation, numBytes, waitForInput)",
```

```
    "",
    "   Dumps the disk from startLocation for numBytes in both ASCII & Hex ",
    "   waiting for a keypress if waitForInput is a 1",
    "",
    "   Example: diskDump(\"/tsd/3\", 1, 0, 0x10000, 1)",
    "",
    "",
    "",
    "",
    "copyDisk(source, destination, blockSize, totalSize, srcStartingLocation, de
stStartingLocation)",
    "",
    "   Copy totalSize bytes from source to destination using",
    "   blocksize * 16K blocks per copy start at startingLocation",
    "",
    "   Example: copyDisk(\"/tsd/3\", \"/sd1/\", 2, 200*1024*1024, 0, 0)",
    "   Would copy from source \"/tsd/3\" to destination \"/sd1/\"",
    "   32K Bytes at a time (2 * 16K) for 200 MBytes ",
    "",
    "",
    "diskPatch(fileName, startLocation, readOrWrite)",
    "",
    "   Reads or writes the data from the variable \"diskBuffer\"",
    "   to the destination at the location specified ",
    "",
    "   Example: diskPatch(\"/tsd/0\", 0, 0) ",
    "   This would read/write PATCH_SIZE bytes at a time starting at",
    "   location 0.  0 = READ and 1 = WRITE  ",
    "",
    "",
    NULL
    };

    FAST int ix;
    char ch;

    printf ("\n");
    for (ix = 0; help_msg [ix] != NULL; ix++) {
      if ((ix+1) % SCROLL_AMOUNT == 0) {
        printf ("\nType <CR> to continue, Q<CR> to stop: ");
        fioRdString (STD_IN, &ch, 1);
        if (ch == 'q' || ch == 'Q')
          break;
        else
          printf ("\n");
      }
      printf ("%s\n", help_msg [ix]);
    }
    printf ("\n");
  }


STATUS scsiMainMenu()
  {

    int userInputLoop, numExtraChars, currentPrintPos;
    char ch;

    while (TRUE) {
      userInputLoop = TRUE;
      clear();
      gotoYX(1, 20, "SCSI Backup System");
      gotoYX(3, 12, "Options:");
      gotoYX(5, 15, "1) Configure SCSI Bus");
      if (scsiConfigDone)
        gotoYX(5, 1, "(Completed)");
      gotoYX(6, 15, "2) Backup SCSI Disk");
      if (scsiBackupDone)
        gotoYX(6, 1, "(Completed)");
      gotoYX(7, 15, "3) Display SCSI Device Summary");
      gotoYX(8, 15, "4) Disk Image Maintenance");
      gotoYX(9, 15, "5) Low-level Disk Functions");
      gotoYX(10, 15, "E) Exit ");
      while (userInputLoop) {
        eraseToEOL(12);
        gotoYX(12, 15, "Enter Choice (1-5 or E): ");
        readAndEcho ((char *) &userResponse, 1);
```

```
      ioctl(STD_IN, FIONREAD, &numExtraChars);
      if (numExtraChars)
        gobbleUpExtraChars (numExtraChars);
      switch (userResponse) {
        case '1':
          clear();
          initScsiVars();
          scsiConfig();
          scsiConfigDone = TRUE;
          userInputLoop = FALSE;
          break;
        case '2':
          if (scsiConfigDone) {
            backupScsiDisk();
            scsiBackupDone = TRUE;
          } else {
            printErrMsg(14,1,"You must configure the SCSI Bus First!!!");
          }
          userInputLoop = FALSE;
          break;
        case '3':
          if (scsiConfigDone) {
            currentPrintPos = showScsiBus("Connected SCSI Devices: ",
                                          SHOW_ALL);
            gotoYX(currentPrintPos + 2 , 1, "Press Return when ready: ");
            readAndEcho ((char *) &ch, 1);
            ioctl(STD_IN, FIONREAD, &numExtraChars);
            if (numExtraChars)
              gobbleUpExtraChars (numExtraChars);
          } else {
            printErrMsg(14,1,"You must configure the SCSI Bus First!!!");
          }
          userInputLoop = FALSE;
          break;
        case '4':
          if (scsiConfigDone) {
            userInputLoop = FALSE;
            imageMaintenance();
          } else {
            printErrMsg(14,1,"You must configure the SCSI Bus First!!!");
          }
          break;
        case '5':
          if (scsiConfigDone) {
            userInputLoop = FALSE;
            lowLevelDiskFunctions();
          } else {
            printErrMsg(14,1,"You must configure the SCSI Bus First!!!");
          }
          break;
        case 'Q':
        case 'q':
        case 'e':
        case 'E':
          userInputLoop = FALSE;
          return(OK);
          break;
        default:
          position(12,0);
          printf("%c",0x7);
          break;
      }
    }
  }
}

STATUS backupScsiDisk()
  {
    int diskSize, backupSource = NONE;
    int currentPrintPos, numExtraChars;
    char sourceDisk[10], userResponse;
    char amountToBackup[11], userResponse2;
    int backupSize, usrInputLoop, usrInputLoop2;
    int rerun = TRUE, imageNum = NONE;
    int nbytes;
    char completeFileName[128];
    FILE *imageFile;
```

sbuMenu.c 4

```
bzero(completeFileName, sizeof(completeFileName));
strcat(completeFileName, BOOT_DISK);
strcat(completeFileName, IMAGE_FILE);

imageFile = fopen(completeFileName, "rb");

if (!(imageFile)) {
  printErrMsg(15,1,"Error opening Image File!!");
  return(ERROR);
}

nbytes = fread(&masterElement, sizeof(struct masterHeader), 1, imageFile);

while (rerun) {
  rerun = FALSE;
  clear();
  bzero(sourceDisk, sizeof(sourceDisk));
  currentPrintPos = showScsiBus("Available Data Sources: ", SHOW_ONLINE);
  backupSource= showAvailableDataSources(currentPrintPos, SHOW_DISK_BACKUP);
  usrInputLoop = TRUE;
  if (backupSource != ERROR) {
    sprintf(sourceDisk, "%s%d", "/tsd/", backupSource);
    currentPrintPos += 2;
    while (usrInputLoop) {
      eraseToEOL(currentPrintPos);
      position(currentPrintPos, 1);
      printf("Available Backup Disk Space: %d MBytes",
        masterElement.largestFreeImageSize / DISK_VENDOR_MEGABYTE);
      eraseToEOL(currentPrintPos+1);
      gotoYX(currentPrintPos+1, 1, "Backup entire disk (y/n)? ");
      readAndEcho ((char *) &userResponse, 1);
      ioctl(STD_IN, FIONREAD, &numExtraChars);
      if (numExtraChars)
        gobbleUpExtraChars (numExtraChars);
      switch (userResponse) {
        case 'y':
        case 'Y':
          usrInputLoop = FALSE;
          if ((pScsiPhysDev[backupSource]->numBlocks > 0) &&
              (pScsiPhysDev[backupSource]->blockSize > 0)) {
            backupSize = ((pScsiPhysDev[backupSource]->numBlocks *
               pScsiPhysDev[backupSource]->blockSize ) );
          } else {
            printErrMsg(currentPrintPos + 2, 1,
                    "Device size cannot be determined!");
            fclose(imageFile);
            return(ERROR);
          }
          position(currentPrintPos + 2, 1);
          printf("Amount to back up = %d MBytes\n",
            backupSize / DISK_VENDOR_MEGABYTE);
          printf("Estimated to take %8.2f Minutes\n",
            (float) ((backupSize / BYTES_PER_MEGABYTE) / TIME_CONSTANT)/ 60.0);
          usrInputLoop2 = TRUE;
          while (usrInputLoop2) {
            eraseToEOL(currentPrintPos + 4);
            gotoYX(currentPrintPos + 4, 1, "Do you wish to continue (y/n)? ");
            readAndEcho ((char *) &userResponse2, 1);
            ioctl(STD_IN, FIONREAD, &numExtraChars);
            if (numExtraChars)
              gobbleUpExtraChars (numExtraChars);
            switch (userResponse2) {
              case 'y':
              case 'Y':
                usrInputLoop2 = FALSE;
                break;
              case 'N':
              case 'n':
                fclose(imageFile);
                return(OK);
              default:
                position(currentPrintPos+2,0);
                printf("%c",0x7);
                break;
            }
          }
          delay(1);
          break;
```

```
        case 'n':
        case 'N':
          usrInputLoop = FALSE;
          eraseToEOL(currentPrintPos);
          position(currentPrintPos, 1);
          eraseToEOL(currentPrintPos);
          printf("Available Backup Disk Space: %d MBytes",
            masterElement.largestFreeImageSize / DISK_VENDOR_MEGABYTE);
          eraseToEOL(currentPrintPos + 1);
          gotoYX(currentPrintPos+1, 1, "Enter amount to backup in MBytes: ");
          readAndEcho((char *) &amountToBackup, 10);
          ioctl(STD_IN, FIONREAD, &numExtraChars);
          if (numExtraChars)
            gobbleUpExtraChars (numExtraChars);
          backupSize = 0;
          sscanf(amountToBackup, "%d", &backupSize);
          if ((pScsiPhysDev[backupSource]->numBlocks > 0) &&
              (pScsiPhysDev[backupSource]->blockSize > 0)) {
            diskSize = ((pScsiPhysDev[backupSource]->numBlocks *
               pScsiPhysDev[backupSource]->blockSize ) );
          } else {
            eraseToEOL(currentPrintPos + 2);
            printErrMsg(currentPrintPos + 2, 1,
                        "Device size cannot be determined!");
            fclose(imageFile);
            return(ERROR);
          }
          position(currentPrintPos + 2, 1);
          eraseToEOL(currentPrintPos + 2);
          printf("Amount to back up = %d MBytes\n",
            backupSize);
          backupSize *= DISK_VENDOR_MEGABYTE;
          if (diskSize < backupSize) {
            printErrMsg(currentPrintPos + 2, 1,
                        "Requested backup size > disk size!!");
            usrInputLoop = TRUE;
            eraseToEOL(currentPrintPos);
            continue;
          }
          position(currentPrintPos + 3, 1);
          if (backupSize <= 0) {
            fclose(imageFile);
            return(OK);
          }
          eraseToEOL(currentPrintPos + 3);
          printf("Estimated to take %8.2f Minutes\n",
            (float) ((backupSize / BYTES_PER_MEGABYTE) / TIME_CONSTANT)/ 60.0);
          usrInputLoop2 = TRUE;
          while (usrInputLoop2) {
            eraseToEOL(currentPrintPos + 4);
            gotoYX(currentPrintPos + 4, 1, "Do you wish to continue (y/n)? ");
              readAndEcho ((char *) &userResponse2, 1);
            ioctl(STD_IN, FIONREAD, &numExtraChars);
            if (numExtraChars)
              gobbleUpExtraChars (numExtraChars);
            switch (userResponse2) {
              case 'y':
              case 'Y':
                usrInputLoop2 = FALSE;
                break;
              case 'N':
              case 'n':
                fclose(imageFile);
                return(OK);
              default:
                position(currentPrintPos+2,0);
                printf("%c",0x7);
                break;
            }
          }
          delay(1);
          break;
        default:
          position(currentPrintPos+2,0);
          printf("%c",0x7);
          break;
    }
  }
```

```
        scrollRegion(currentPrintPos + 5, 18);
        imageNum = findFirstFitImageBlock(backupSize, backupSource);
        if (imageNum >= 0) {
          resetTerminal();
                                          gotoYXBlink(1,1,"SCSI Backup in Progress!");
          copyImageBlock(imageNum);
        } else {
          eraseToEOL(currentPrintPos + 2 );
          usrInputLoop2 = TRUE;
          while (usrInputLoop2) {
            eraseToEOL(currentPrintPos + 4);
            eraseToEOL(currentPrintPos + 3);
            gotoYX(currentPrintPos + 4, 1, "Do you wish to reenter (y/n)? ");
            readAndEcho ((char *) &userResponse2, 1);
            ioctl(STD_IN, FIONREAD, &numExtraChars);
            if (numExtraChars)
              gobbleUpExtraChars (numExtraChars);
            switch (userResponse2) {
              case 'y':
              case 'Y':
                usrInputLoop2 = FALSE;
                rerun = TRUE;
                break;
              case 'N':
              case 'n':
                fclose(imageFile);
                return(OK);
              default:
                position(currentPrintPos+2,0);
                printf("%c",0x7);
                break;
            }
          }
        }
        scrollRegion(1, 18);
      }
    }
    return(OK);
  }

STATUS copyImageBlock( int imageNumber)
  {
    int nbytes, status;
    char completeFileName[128], diskName[80];
    FILE *imageFile;
    int one = 1;

    bzero(completeFileName, sizeof(completeFileName));
    bzero(diskName, sizeof(diskName));
    strcat(completeFileName, BOOT_DISK);
    strcat(completeFileName, IMAGE_FILE);
    imageFile = fopen(completeFileName, "rb");

    if (!(imageFile)) {
      printErrMsg(15,1,"Error opening Image File!!");
      return(ERROR);
    }

    fseek(imageFile,
          sizeof(masterElement)+ (imageNumber*sizeof(imageElement)),SEEK_SET);
    nbytes = fread(&imageElement, sizeof(struct imageHeader), 1, imageFile);
    sprintf(diskName, "%s%d", "/tsd/", imageElement.scsiBusID);
#ifdef SAME_SCSI_BUS
    if((status = copyDisk(&diskName, IMAGE_DISK, 32, imageElement.imageSize,
              0, imageElement.startingLocation)) == ERROR) {
#else
    if((status = copyDisk(&diskName, IMAGE_DISK, 16, imageElement.imageSize,
              0, imageElement.startingLocation)) == ERROR) {
#endif

      printErrMsg(15,1,"Error encountered during copy!");
      printErrno(errnoGet());
      ioctl(fileno(imageFile), FIOFLUSH, one);
      fclose(imageFile);
      return(ERROR);
    } else {
      ioctl(fileno(imageFile), FIOFLUSH, one);
      fclose(imageFile);
```

```
      delay(5);
      return(OK);
    }
  }
```

95/08/28 12:01:38 scan.c 1

```
#include "vxWorks.h"
#include "stdioLib.h"

#define FALSE 0
#define TRUE 1
unsigned char buf[1024];
unsigned char header[] = {0,0,0,0,  0,0,0,0,  1, 0, 0,3,  0,0};
int getint(i)
int i;
{
return ( (buf[i]<<8) | buf[i+1]);
}


long getlongint(i)
int i;
{
return ( (buf[i]<<24) |(buf[i+1]<<16) |(buf[i+2]<<8) | buf[i+3]);
}



int scan (char *filename)
{
FILE *in;
unsigned char c;
int i,j,n;
int port;
int len;
int sector;
long offset;
int flag;

in = fopen (filename, "rb");


printf ("scanning file %s\n", filename);

for (i=0;i<164139;i++) {

        fread (buf, 1, 512, in);

        flag = FALSE;
        if ((buf[0] == 0x45) && (buf[1] == 0x52)) flag = TRUE;
        if ((buf[0] == 0x50) && (buf[1] == 0x4d)) flag = TRUE;
        if ((buf[0] == 0x54) && (buf[1] == 0x53)) flag = TRUE;
        if ((buf[0] == 0x4c) && (buf[1] == 0x4b)) flag = TRUE;
        if ((buf[0] == 0x42) && (buf[1] == 0x44)) flag = TRUE;
        if ((buf[0] == 0xd2) && (buf[1] == 0xd7)) flag = TRUE;
        if ((buf[0] == 0x70) && (buf[1] == 0x6d)) flag = TRUE;

        if (flag) {
                printf ("found %x%x in sector %d decimal\n",buf[0], buf[1], i);
                dumpmem(buf,512);
                }
        if ((buf[0] == 0x42) && (buf[1] == 0x44)) {
                printf ("nfiles in root directory = %d\n", getint(12));
                printf ("num alloc blocks = %d\n", getint(18));
                printf ("bytes in alloc block = %ld\n", getlongint(20));
                printf ("default clump size = %ld\n", getlongint(24));
                printf ("first alloc block = %d\n", getint(28));
                printf ("clump size for catalog file = %ld\n", getlongint(78));
                printf ("number directories in root = %d\n", getint(82));
                printf ("number of files in volume = %ld\n", getlongint(84));
                printf ("number directories in volume = %d\n", getint(88));
                printf ("size of extents overflow file = %ld\n", getlongint(130));
                printf ("header node of catalog file = %d  nblocks=%d\n", getint(134), getint(136));
                printf ("header node of catalog file = %d nblocks=%d\n", getint(138), getint(140));
                printf ("header node of catalog file = %d nblocks=%d\n", getint(142), getint(144));
                printf ("size of catalog record = %ld\n", getlongint(146));
                printf ("header node of catalog file = %d nblocks=%d\n", getint(150), getint(152));
                printf ("header node of catalog file = %d nblocks=%d\n", getint(154), getint(156));
                printf ("header node of catalog file = %d nblocks=%d\n", getint(158), getint(160));
                }

        flag = TRUE;
        for (j=0;j<14;j++) if (header[j] != buf[j]) flag = FALSE;
        if (flag) {
```

```
                printf ("\nfound a level 0 header node at sector %d\n",i);
                dumpmem(buf,512);
                }
        }

}

int dumpmem(buf,len)
unsigned char *buf;
int len;
{
int i,j,k;
unsigned char *ptr;
unsigned char c;
ptr = buf;
i = len;
while (i > 0) {
        k = i;
        if (k > 16) k = 16;
        printf ("      ");
        for (j=0;j<k;j++) printf ("%.2X ", *(ptr+j));
        printf ("   ");
        if (k<16) for (j=k;j<16;j++) printf ("   ");
        for (j=0;j<k;j++) if (isprint(*(ptr+j))) printf ("%c", *(ptr+j)); else printf (".");
        if (k<16) for (j=k;j<16;j++) printf (" ");
        printf ("   ");
        for (j=0;j<k;j++) {
                c = *(ptr+j);
                c &= 0x7f;
                if (isprint(c)) printf ("%c", c); else printf (".");
                }
        printf ("\n");
        i -= 16;
        ptr += 16;
        }
}
```

screenUtils.c 1

```
#define SCSI_EXTERN extern

#include "backup.h"

#define ESC 0x1b

char userResponse;

VOID delay(int seconds)
  {
    taskDelay(seconds * sysClkRateGet());
  }


STATUS readAndEcho(char *pLocation, int size)
  {
    int ix;
    char *pLocationPtr;
                char foundFirst = FALSE;

    pLocationPtr = pLocation;
    bzero(pLocationPtr, size);
    ix = 0;
    while (ix <= size) {
      read(STD_IN, pLocationPtr, 1);
      switch (*pLocationPtr) {
                          case 0x20:
          if (ix < size) {
                                          if (foundFirst) {
              write(STD_OUT, pLocationPtr, 1);
              pLocationPtr++;
              ix++;
                                          }
          }
          break;
        case 0xa:
        case 0xd:
          *pLocationPtr = 0x0;
          return(ix + 1);
          break;
        case 0x8:
        case 0x7f:
          *pLocationPtr = 0x0;
          pLocationPtr--;
          ix--;
          if (pLocationPtr < pLocation) {
            pLocationPtr = pLocation;
            ix = 0;
          } else {
            printf("%c %c", 0x8, 0x8);
          }
          break;
        default:
          if (ix < size) {
                                          foundFirst = TRUE;
            write(STD_OUT, pLocationPtr, 1);
            pLocationPtr++;
            ix++;
          }
          break;
      }
    }
    return(size);
  }

STATUS gobbleUpExtraChars(int size)
  {
    int nbytes;
    char ch[128];

    nbytes = read(STD_IN, &ch, size);
    return(nbytes);
  }

VOID clear()
  {
    taskDelay(3);
    printf("%c[2J", ESC);
```

```
    taskDelay(3);
  }

VOID position(int row, int col)
  {
    char xPos[5], yPos[5];

    bzero(xPos, sizeof(xPos));
    bzero(yPos, sizeof(yPos));
    sprintf(xPos, "%d", row);
    sprintf(yPos, "%d", col);
    taskDelay(3);
    printf("%c[%s;%sH", ESC, xPos, yPos);
    taskDelay(3);
  }

VOID eraseToEOL(int row)
  {
    position(row, 0);
    taskDelay(3);
    printf("%c[2K", ESC);
    taskDelay(3);
  }

VOID scrollRegion(int topRow, int bottomRow)
  {
    char top[5], bottom[5];

    bzero(top, sizeof(top));
    bzero(bottom, sizeof(bottom));
    sprintf(top, "%d", topRow);
    sprintf(bottom, "%d", bottomRow);
    taskDelay(3);
    printf("%c[%s;%sr", ESC, top, bottom);
    taskDelay(3);
    position(topRow, 0);
  }

VOID gotoYXBlink(int row, int col, char *message)
  {
    char xPos[5], yPos[5];

    bzero(xPos, sizeof(xPos));
    bzero(yPos, sizeof(yPos));
    sprintf(xPos, "%d", row);
    sprintf(yPos, "%d", col);
    taskDelay(3);
    printf("%c[%s;%sH%c[5m%s%c[0m", ESC, xPos, yPos, ESC, message, ESC);
    taskDelay(3);
  }

VOID printErrMsg(int row, int col, char *message)
  {
    gotoYXBlink(row, col, message);
    printf("%c",0x7);
    taskDelay(3 * sysClkRateGet());
    eraseToEOL(row);
  }

VOID gotoYX(int row, int col, char *message)
  {
    char xPos[5], yPos[5];

    bzero(xPos, sizeof(xPos));
    bzero(yPos, sizeof(yPos));
    sprintf(xPos, "%d", row);
    sprintf(yPos, "%d", col);
    taskDelay(3);
    printf("%c[%s;%sH%s", ESC, xPos, yPos, message);
    taskDelay(3);
  }

VOID resetTerminal()
  {
    printf("%c[61\"p", ESC);
    taskDelay(3);
    clear();
    taskDelay(3);
```

```
    printf("%c[1;24r", ESC);
    taskDelay(3);
    printf("%c[0m", ESC);
    taskDelay(3);
}
```

95/03/28 12:40:38 screenUtils.h 1

```
/****************************************************************************/
/*          Forward Declarations for Cursor Positioning Routines           */
/****************************************************************************/

extern VOID delay() ;

extern STATUS readAndEcho() ;

extern STATUS gobbleUpExtraChars() ;

extern VOID clear() ;

extern VOID position();

extern VOID eraseToEOL();

extern VOID scrollRegion();

extern VOID gotoYXBlink();

extern VOID gotoYX();

extern VOID resetTerminal();

extern VOID printErrMsg();
```

stringfind.c 1

```
#define BUFSIZE (1024 * 1024)

/*  Globals  */
#include <stdio.h>
#define TRUE 1
#define FALSE 0
#define LINESIZE 16

char filename[20];
char filename_exe[20];
char filename_com[20];
char filename_sys[20];
FILE *infile;

unsigned char head [200 * 1024];
unsigned char code [BUFSIZE];

int segments[8000];
char segoffs[20];
int numsegs;



int dump(start, nbytes)
char start[];
int nbytes;
{
char *addr;
int n, i;
addr = start;
n = nbytes;
while (n>0) {
        i = LINESIZE;
        if (n < LINESIZE) i = n;
        dumpline(addr, i);
        addr += LINESIZE;
        n -= LINESIZE;
        }
}



int dumpline (addr, nbytes)
unsigned char addr[];
int  nbytes;
{
int i;
        for (i=0;i<nbytes;i++) printf ( "%.2X ", addr[i]);
        while (i++ < LINESIZE) printf ( "   ");
        printf ("  :  ");
        for (i=0;i<nbytes;i++)
                if (isprint(addr[i])) printf ("%c",addr[i]); else printf (".");
        printf ("\n");
        }


int main (argc, argv)
int argc;
char *argv[];


{
int nbytes;
long size;

int bytes_read;
int i;
int start;
int sr;
int addr;

char string[100];
int offset, length;

int swapped, temp;
```

stringfind.c 2

```
strcpy (filename, argv[1]);

sprintf (filename_exe, "%s.exe", filename);
sprintf (filename_com, "%s.com", filename);
sprintf (filename_sys, "%s.sys", filename);

printf ("opening %s\n" , filename_exe);

if ((infile = fopen (filename_exe, "rb")) == NULL)
        if ((infile = fopen (filename_com, "rb")) == NULL)
        if ((infile = fopen (filename_sys, "rb")) == NULL) {
        printf ("error opening file %s .EXE .COM and .SYS\n", filename);
        exit();
        }


/*  go search thru code for strings  */
bytes_read = fread (code, 1, BUFSIZE , infile);
printf ("read %d bytes from file\n", bytes_read);

i=0;
while (i < bytes_read) {
        if ( isalnum(code[i])) {
                string[0] = code[i];
                offset = i;
                length  = 1;
                i++;
                while ( (length < 100) && ((code[i] == 0x20) || isgraph(code[i])) ) {
                        string[length++] = code[i];
                        i++;
                        }
                string[length] = 0;
                if (length >= 4) {
                        printf ( "%.6d:  %s\n",offset,  string);
                        }
                }
        i++;
        }


}
```

vbu.h 1

```
/* vbu.h  Header File for Video Backup */

/***************************************************************************/
/*                  Type Declaration for Video Copies                     */
/***************************************************************************/

#define NUM_FRAMES_IN_BUFFER 100
```

```
/* vbuDrv.c - Driver for SPARTA's Video Backup Unit */

/*
modification history
--------------------
01a,02mar94,mea  written
01b,21mar94,mea  comments, clean ups, added vbuHelp and vbuDebugHelp
*/

/*
DESCRIPTION
This is the driver for SPARTA's Video Backup Unit.
It uses the prototype board.

USER-CALLABLE ROUTINES
Most of the routines in this driver are accessible only through the I/O
system.  Two routines, however, must be called directly: vbuConfig() to
initialize the driver, and vbuCleanUp() to delete devices.

*/

#define SCSI_EXTERN extern

#include "backup.h"

#include "screenUtils.h"
#include "backupUtils.h"

#include "vbu.h"

/****************************** DEFINES ************************************/

#define BER_BUFFER_SIZE 0x100000        /* size of buffer for calculating BER*/
#define BYTES_IN_FRAME 32               /* how many bytes per video frame    */

#define RAM_BOARD_ADDRESS 0x40300000 /* address of RAM board for ISR debug */

#define VBU_RESET_BIT      0x0020
#define VBU_INT_SPEED_BIT  0x0010
#define VBU_INT_ENABLE_BIT 0x0008

#define DISK_SIZE_PIPE_NAME "/pipe/diskSize"
#define CONFIG_DATA_PIPE_NAME "/pipe/configData"
#define VALID_DATA_PIPE_NAME "/pipe/validData"
#define CALIBRATION_DATA_PIPE_NAME "/pipe/calibrationData"

/************************** DATA DECLARATIONS ******************************/

/*  This structure is used when the ISR writes to the vbuWriter to let
 *  that task know the address of the buffer to read and how many bytes
 *  are there.
 */

extern int vbuConfigDone;
extern int vbuBackupDone;

struct BUFFER_MESSAGE {
        char  *bufferAddr;
        int   numFramesInBuf;
        int   timeToShutDown;
  };

struct BUFFER_MESSAGE intMessage;

struct VBU_MESSAGE {
        char  newPartition;
        int   length;
  char  buffer[VBU_WINDOW_SIZE];
  };

struct VBU_MESSAGE vbuMessage, vbuMessageInt;

struct VBU_STRUCT vbu, vbuBackup;

/* Debugging Flag                                                        */
/*  0x0  turns all debugging/logging off                                 */
/*  Bit  0  (0x1)     turns on debugging in the vbuConfig routine        */
```

```
/*  Bit  1  (0x2)      turns on debugging in the ISR                              */
/*  Bit  2  (0x4)      turns on debugging in the vbuCleanUp routine               */
/*  Bit  3  (0x8)      turns on bus accesses in the ISR for Bus Analyzer          */
/*  Bit  4  (0x10)     turns on writing to VME Address Board                      */
/*  Bit  5  (0x20)     turns on debugging in the vbuTestScanPattern fn            */
/*  Bit  6  (0x40)     turns on debugging in the vbuCalcBER fn                    */
/*  Bit  7  (0x80)     turns on address printing for errors in vbuCalcBER         */
/*  Bit  8  (0x100)    unused                                                     */
/*  Bit  9  (0x200)    unused                                                     */
/*  Bit 10  (0x400)    unused                                                     */
/*  Bit 11  (0x800)    unused                                                     */
/*  Bit 12  (0x1000)   unused                                                     */
/*  Bit 13  (0x2000)   unused                                                     */
/*  Bit 14  (0x4000)   unused                                                     */
/*  Bit 15  (0x8000)   unused                                                     */

UINT32 vbuDebugFlags = 0;
UINT32 uninitIntCnt = 0;
UINT32 newPartIntCnt = 0;
UINT32 calibrateIntCnt = 0;
UINT32 startIntCnt = 0;
UINT32 terminateIntCnt = 0;
UINT32 configIntCnt = 0;
UINT32 validIntCnt = 0;
UINT32 diskSizeIntCnt = 0;
UINT32 type6IntCnt = 0;
UINT32 type9IntCnt = 0;
UINT32 typeAIntCnt = 0;
UINT32 typeBIntCnt = 0;
UINT32 typeCIntCnt = 0;
UINT32 typeDIntCnt = 0;
UINT32 typeEIntCnt = 0;
UINT32 typeFIntCnt = 0;

/* Pointer to offboard VME RAM for use with bus analyzer */

char *vbuDebugPtr = (char *) RAM_BOARD_ADDRESS;

/* number of seconds delay between each block output in
 * rolling checksum routine
 */
UINT32 vbuReadDelay = 0;

/* size of the source disk */
UINT32 sourceDiskSize;

/* Description of this source disk */
char sourceDiskDescription[128];

/* forward declarations */
int  vbuWriter();            /* task to write captured data to disk   */
VOID vbuCleanup();           /* routine to clean up VBU stuff         */
VOID  vbuCounter();          /* task that counts # of MBs written     */
int  vbuIntEnable();          /* task that counts # of MBs written     */
int  vbuIntSpeed();          /* task that counts # of MBs written     */
int  vbuIntLevel();          /* task that counts # of MBs written     */
int  vbuReset();         /* task that counts # of MBs written     */
STATUS  vbuCalibrate();          /* task that counts # of MBs written     */
STATUS  vbuDiskSize();          /* task that counts # of MBs written     */
VOID  undefinedIntHandler();          /* task that counts # of MBs written     */
VOID  calibrateIntHandler();          /* task that counts # of MBs written     */
VOID  newPartitionIntHandler();  /* task that counts # of MBs written     */
VOID  diskSizeIntHandler();  /* task that counts # of MBs written     */
VOID  terminateIntHandler();  /* task that counts # of MBs written     */
VOID  startIntHandler();  /* task that counts # of MBs written     */
VOID  validDataIntHandler();  /* task that counts # of MBs written     */
VOID  configDataIntHandler();  /* task that counts # of MBs written     */
VOID  type6IntHandler();  /* task that counts # of MBs written     */
VOID  type9IntHandler();  /* task that counts # of MBs written     */
VOID  typeAIntHandler();  /* task that counts # of MBs written     */
VOID  typeBIntHandler();  /* task that counts # of MBs written     */
VOID  typeCIntHandler();  /* task that counts # of MBs written     */
VOID  typeDIntHandler();  /* task that counts # of MBs written     */
VOID  typeEIntHandler();  /* task that counts # of MBs written     */
VOID  typeFIntHandler();  /* task that counts # of MBs written     */


/**************************** PROGRAM BEGINS ******************************/
```

```
VOID dumpCounters()
      {

  printf("The uninitialized interrupt count is (0): %d\n", uninitIntCnt);
  printf("The calibration interrupt count is   (1): %d\n", calibrateIntCnt);
  printf("The new partition interrupt count is (2): %d\n", newPartIntCnt);
  printf("The valid interrupt count is         (3): %d\n", validIntCnt);
  printf("The terminate interrupt count is     (4): %d\n", terminateIntCnt);
  printf("The pc config interrupt count is     (5): %d\n", configIntCnt);
  printf("The start interrupt count is         (7): %d\n", startIntCnt);
  printf("The disk size interrupt count is     (8): %d\n", diskSizeIntCnt);
  printf("The number of type 6 interrupts is      : %d\n", type6IntCnt);
  printf("The number of type 9 interrupts is      : %d\n", type9IntCnt);
  printf("The number of type A interrupts is      : %d\n", typeAIntCnt);
  printf("The number of type B interrupts is      : %d\n", typeBIntCnt);
  printf("The number of type C interrupts is      : %d\n", typeCIntCnt);
  printf("The number of type D interrupts is      : %d\n", typeDIntCnt);
  printf("The number of type E interrupts is      : %d\n", typeEIntCnt);
  printf("The number of type F interrupts is      : %d\n", typeFIntCnt);
        printf("Total legal interrupts processed : %d\n", uninitIntCnt +
                                  calibrateIntCnt + newPartIntCnt + validIntCnt +
                                  terminateIntCnt + configIntCnt + startIntCnt + diskSizeIntCnt);

        printf("\n");

  }

/**********************************************************************
 *
 * This routine prints out all of debug flags
 *
 * Inputs : None
 *
 * Outputs: printed info
 *
 **********************************************************************/

VOID vbuDebugHelp()
  {

    static char *help_msg [] = {
    /* page 1 */
    "vbuDebugHelp                       Print this list",
    "",
    "         0x0          turns all debugging/logging off",
    "Bit  0  (0x1)         turns on debugging in the vbuConfig routine",
    "Bit  1  (0x2)         turns on debugging in the ISR",
    "Bit  2  (0x4)         turns on debugging in the vbuCleanUp routine",
    "Bit  3  (0x8)         turns on bus accesses in the ISR for Bus Analyzer",
    "Bit  4  (0x10)        turns on debugging in the vbuWriter task",
    "Bit  5  (0x20)        turns on debugging in the vbuTestScanPattern fn",
    "Bit  6  (0x40)        turns on debugging in the vbuCalcBER fn",
    "Bit  7  (0x80)        turns on address printing for errors in vbuCalcBER",
    "",
    "Example: vbuDebugFlags = 0x0",
    "",
    NULL
    };

    FAST int ix;
    char ch;

    printf ("\n");
    for (ix = 0; help_msg [ix] != NULL; ix++) {
      if ((ix+1) % 23 == 0) {
        printf ("\nType <CR> to continue, Q<CR> to stop: ");
        fioRdString (STD_IN, &ch, 1);
        if (ch == 'q' || ch == 'Q')
          break;
        else
          printf ("\n");
      }
      printf ("%s\n", help_msg [ix]);
    }
    printf ("\n");
 }
```

```
/**********************************************************************
 *
 * This routine just prints out all of the user accessable commands
 *
 * Inputs : None
 *
 * Outputs: printed info
 *
 *********************************************************************/

VOID vbuHelp()
  {

    static char *help_msg [] = {
    /* page 1 */
    "vbuHelp                           Print this list",
    "",
    "vbuConfig(fileName,brdAddress,intVector,intLevel,addrMod,rdBufSize)",
    "",
    "   Example: vbuConfig(\"/sd1/\", 0, 0xa0, 4, 0x3d, 64)",
    "",
    "   Would backup 1MB per time slot (64 Window Size buffers) from a ",
    "   VBU board at IntLevel 4, IntVector 0xa0, address 0 relative to ",
    "   the beginning of A24 space (address modifier 0x3d) using the ",
    "   RAW backup device \"/sd1/\" ",
    "",
    "vbuCleanUp(pVbu) ",
    "   Reset VBU software to initial state and remove ISR",
    "",
    "   Example: vbuCleanUp(&vbu)",
    "",
    "vbuDumpToFile(source, dest, amount)",
    "",
    "   Copies <amount> of captured data from <source> to <destination>",
    "   A <-1> for the amount means copy all data in file",
    "",
    "   Example: vbuDumpToFile(\"/sd1/\", \"/usr/vbuFile\", -1)",
    /* page 2 */
    "",
    "vbuCheckSum(buffer, numBytes)",
    "   Calculates 32-bit checksum for numBytes starting at the address ",
    "   of buffer in RAM",
    "",
    "vbuRollingCheckSum8(buffer, numBlocksToCheck, blockSize)",
    "",
    "   Calculates 32-bit checksum (truncated to lower 8 bits) for ",
    "   <numBlocksToCheck> blocks of size <blockSize> bytes.  The next byte is",
    "   used to compare the calculated checksum with that stored in the data",
    "",
    "   Example: vbuRollingCheckSum8(buffer, 100, 511)",
    "",
    "vbuRollingCheckSum32(buffer, numBlocksToCheck, blockSize)",
    "",
    "   Calculates 32-bit checksum for <numBlocksToCheck> blocks of size" ,
    "   <blockSize> bytes.  The next 4 bytes are used to compare the ",
    "   calculated checksum with that stored in the data",
    "",
    "   Example: vbuRollingCheckSum32(buffer, 100, 508)",
    "",
    "",
    /* page 3 */
    "",
    "",
    "vbuTestScanPattern(buffer, pattern, numBytes, bytesInFrame)",
    "",
    "   Will scan RAM starting at the address of <buffer> with the pattern",
    "   <pattern> for <numBytes>.  <bytesInFrame> is used to tell us ",
    "   where in the video frame the error occured",
    "",
    "   Example: vbuTestScanPattern(buffer, 0xa5a5, 0x100000, 32)",
    "",
    "vbuLoadBuffer(fileName, bufSize, startingPoint)",
    "",
    "   Will read <bufSize> bytes from <fileName> starting from ",
    "   <startingPoint>",
    "",
    "   Example: buffer = vbuLoadBuffer(\"/sd1/\", 0x100000, 0)",
    "",
```

```
"vbuCalcBERFromRAM(buffer, numBytesToCheck, pattern)",
"",
"   Will calculate the Bit Error Rate (BER) of the data lacated at ",
"   address <buffer> in RAM scanning for <pattern> for <numBytesToCheck>",
"   bytes",
"",
"   Example: vbuCalcBERFromRAM(buffer, 0x100000, 0xa5)",
"",
"vbuCalcBERFromDisk(fileName, numBytesToCheck, pattern)",
"",
"   Will calculate the Bit Error Rate (BER) of the data lacated in ",
"   file <fileName> scanning for <pattern> for <numBytesToCheck> bytes",
"",
"   Example: vbuCalcBERFromDisk(\"/sd1/\", 0x100000, 0xa5)",
"",
NULL
};

FAST int ix;
char ch;

printf ("\n");
for (ix = 0; help_msg [ix] != NULL; ix++) {
  if ((ix+1) % 23 == 0) {
    printf ("\nType <CR> to continue, Q<CR> to stop: ");
    fioRdString (STD_IN, &ch, 1);
    if (ch == 'q' || ch == 'Q')
      break;
    else
      printf ("\n");
  }
  printf ("%s\n", help_msg [ix]);
}
printf ("\n");
}


/*******************************************************************
 *
 * vbuConfig - This routine configures the VBU ISR and hardware
 *
 * Inputs :
 *      fileName    - output file name
 *      brdAddress  - VME address of the board's I/O space.
 *      intVector   - VME interrupt vector that board will generate.
 *      intLevel    - VME interrupt level that board will generate.
 *      addrMod     - VME address modifier that the VBU controller should use
 *      rdBufSize   - size of the read buffer to store before writing
 *                    (two buffers of this size will be malloced)
 *
 * Outputs: status info
 *
 *******************************************************************/

STATUS vbuConfig( fileName, brdAddress, intVector, intLevel,
                  addrMod, rdBufSize)
char  *fileName;
char  *brdAddress;
int    intVector;
int    intLevel;
UINT32 addrMod;
int    rdBufSize;
{
   char *virtualBrdAddress;
   STATUS stat;
   int oldLevel, ix, numMessagesInPipe;
   UINT32 AM, nBytes;
   UINT16 vector;
   UINT16 statusReg;
   struct VBU_MESSAGE pipeMsg;

   /*
    *  Initialize the vbu structure data
    */

   vbu.diskSize              = NONE;
   vbu.baseAddress           = NULL;
   vbu.intVectorReg          = NULL;
```

```
vbu.statusReg              = NULL;
vbu.validReadBuf0          = NULL;
vbu.validReadBuf0MaxAddr   = NULL;
vbu.validOffsetReadBuf0    = NULL;
vbu.validReadBuf1          = NULL;
vbu.validReadBuf1MaxAddr   = NULL;
vbu.validOffsetReadBuf1    = NULL;
      vbu.validFramesInBuf       = 0;
vbu.validCurrentBuf        = 0;
      vbu.numBytesWritten        = 0;
      vbu.partition1Start        = NONE;
      vbu.partition2Start        = NONE;
      vbu.partition3Start        = NONE;
      vbu.partition4Start        = NONE;
vbu.currentPartition       = 1;
vbu.alreadyTerminated      = FALSE;
vbu.validCurrentBuf        = 0;
vbu.intLevel          = 0;
vbu.intVector         = 0;
vbu.validPipeFd       = 0;
vbu.calibrationPipeFd= 0;
vbu.diskSizePipeFd    = 0;
vbu.configDataPipeFd = 0;
vbu.validFileFd            = 0;
vbu.configFileFd            = 0;
vbu.prevStatus        = 0;
vbu.vbuSem1           = semBCreate(SEM_Q_PRIORITY, SEM_EMPTY);
vbu.vbuSem2           = semBCreate(SEM_Q_PRIORITY, SEM_EMPTY);
vbu.vbuSem3           = semBCreate(SEM_Q_PRIORITY, SEM_FULL);
vbu.controlRegSem     = semBCreate(SEM_Q_PRIORITY, SEM_FULL);
vbu.vbuWatchDog1      = wdCreate();
vbu.validTaskId       = 0;
vbu.countTaskId       = 0;
vbu.firstTime         = TRUE;
vbu.controlWord       = 0;

/* which address VME address modifier are we using? */
/* we do it like this to account for boards that don't support
 * all of the address modifiers (like BLT and VME64 MBLT)
 */
switch (addrMod)
{
    case 9:
    case 0xd:
    case 0x39:
    case 0x3d:
    {
        AM = addrMod;
        break;
    }
    case 0xb:
    case 0xf:
    case 0x3b:
    case 0x3f:
    {
        AM = addrMod;
        break;
    }
    default:
    {
        logMsg("vbu: VME address modifier 0x%x not supported\n",addrMod);
        return(ERROR);
    }
}

/* create the communications pipe with 100 messages in it */
/* open the ISR-> task commo pipe */
if ((vbu.validPipeFd=open(VALID_DATA_PIPE_NAME, O_RDWR)) == ERROR) {
  if ((pipeDevCreate(VALID_DATA_PIPE_NAME, 4,
                                     sizeof(intMessage)) == ERROR)) {
    logMsg("Error creating VBU VALID_DATA pipe Device!\n");
    return(ERROR);
  } else {
    if ((vbu.validPipeFd=open(VALID_DATA_PIPE_NAME, O_RDWR)) == ERROR) {
      logMsg("Could not open VALID_DATA pipe for reading!\n");
      return(ERROR);
    }
                  }
```

```
} else {
                    ioctl(vbu.validPipeFd, FIONMSGS, &numMessagesInPipe);
                    if (numMessagesInPipe) {
    logMsg("Found messages in validDataPipe!\n");
                            for(ix = 0; ix < numMessagesInPipe; ix++)
                              nBytes = read(vbu.validPipeFd, &pipeMsg, sizeof(struct VBU_MESSAGE));
  }
}


/* create the communications pipe with 4 messages in it */
/* open the ISR-> task commo pipe */
if ((vbu.diskSizePipeFd=open(DISK_SIZE_PIPE_NAME, O_RDWR)) == ERROR) {
  if ((pipeDevCreate(DISK_SIZE_PIPE_NAME, 4,
                                  sizeof(vbuMessage)) == ERROR)) {
    logMsg("Error creating VBU DISK_SIZE pipe Device!\n");
    return(ERROR);
  } else {
    if ((vbu.diskSizePipeFd=open(DISK_SIZE_PIPE_NAME, O_RDWR)) == ERROR) {
      logMsg("Could not open DISK_SIZE pipe for reading!\n");
      return(ERROR);
    }
                    }
} else {
                    ioctl(vbu.diskSizePipeFd, FIONMSGS, &numMessagesInPipe);
                    if (numMessagesInPipe) {
    logMsg("Found messages in validDataPipe!\n");
                            for(ix = 0; ix < numMessagesInPipe; ix++)
                              nBytes=read(vbu.diskSizePipeFd, &pipeMsg, sizeof(struct VBU_MESSAGE));
  }
}

/* create the communications pipe with 128 messages in it */
/* open the ISR-> task commo pipe */
if ((vbu.calibrationPipeFd=open(CALIBRATION_DATA_PIPE_NAME, O_RDWR))
     == ERROR) {
  if ((pipeDevCreate(CALIBRATION_DATA_PIPE_NAME, 100,
                                  sizeof(vbuMessage)) == ERROR)) {
    logMsg("Error creating VBU DISK_SIZE pipe Device!\n");
    return(ERROR);
  } else {
    if ((vbu.calibrationPipeFd=open(CALIBRATION_DATA_PIPE_NAME, O_RDWR))
        == ERROR) {
      logMsg("Could not open CALIBRATION_DATA pipe for reading!\n");
      return(ERROR);
    }
                    }
} else {
                    ioctl(vbu.calibrationPipeFd, FIONMSGS, &numMessagesInPipe);
                    if (numMessagesInPipe) {
    logMsg("Found messages in validDataPipe!\n");
                            for(ix = 0; ix < numMessagesInPipe; ix++)
                              nBytes=read(vbu.calibrationPipeFd, &pipeMsg,
                  sizeof(struct VBU_MESSAGE));
  }
}

/* create the communications pipe with 20 messages in it */
/* open the ISR-> task commo pipe */
if ((vbu.configDataPipeFd=open(CONFIG_DATA_PIPE_NAME, O_RDWR)) == ERROR) {
  if ((pipeDevCreate(CONFIG_DATA_PIPE_NAME, 20,
                                  sizeof(vbuMessage)) == ERROR)) {
    logMsg("Error creating VBU DISK_SIZE pipe Device!\n");
    return(ERROR);
  } else {
    if ((vbu.configDataPipeFd=open(CONFIG_DATA_PIPE_NAME, O_RDWR))
        == ERROR) {
      logMsg("Could not open DISK_SIZE pipe for reading!\n");
      return(ERROR);
    }
                    }
} else {
                    ioctl(vbu.configDataPipeFd, FIONMSGS, &numMessagesInPipe);
                    if (numMessagesInPipe) {
    logMsg("Found messages in validDataPipe!\n");
                            for(ix = 0; ix < numMessagesInPipe; ix++)
                              nBytes=read(vbu.configDataPipeFd, &pipeMsg,
                  sizeof(struct VBU_MESSAGE));
```

```
    }
  }

  /* get ready to check that the VBU is where the user said it was */
  stat = OK;
  stat = sysBusToLocalAdrs(AM, brdAddress, &virtualBrdAddress);

  /* was the address valid? */
  if (stat == OK) {
    /* yes, so lets do it */
    oldLevel = intLock (); /* disable interrupts during init */

    /* set pointer to the interrupt vector register */
    vbu.intVectorReg = virtualBrdAddress + 0x4000;

    /* set pointer to the status register */
    /* the status register is 16 bit access ONLY! */
    vbu.statusReg = (UINT16 *) (virtualBrdAddress + 0x4002);

    /* save the interrupt vector */
    vector = (UINT16) intVector;

    /* disable vbu interrupts before releasing reset... just to be sure
    */

    vbuIntEnable(1, &vbu);

    /* release board reset by sending a rising edge to the bit */

    vbuReset(0, &vbu);
    vbuReset(1, &vbu);

    /* set the interrupt speed:
       1 = interrupt every video frame
       0 = interrupt every data frame
    */

    vbuIntSpeed(0, &vbu);

    /* now write the interrupt level to the register */

    vbuIntLevel(intLevel, &vbu);


    /* write the interrupt vector number to the register */

    /*!!!!!! REMEMBER!! This is really a block of 16 vectors now!! */

    if (vxMemProbe (vbu.intVectorReg, VX_WRITE, 2, &vector) == OK)
      if (vbuDebugFlags & 0x1)
        logMsg ("value %x written to adrs %x\n", vector, vbu.intVectorReg);

    /* clear any pending interrupts */
    if (vxMemProbe (vbu.statusReg, VX_READ, 2, &statusReg) == OK)
      if (vbuDebugFlags & 0x1)
        logMsg ("value %x read from adrs %x\n", statusReg, vbu.statusReg);

    /* save the info */
    vbu.baseAddress = virtualBrdAddress;
    vbu.intLevel = intLevel;
    vbu.intVector = intVector;

    /* malloc the two buffers used in reading data from VBU */
    if ((vbu.validReadBuf0 = (char *)
                                   malloc(VBU_WINDOW_SIZE * (NUM_FRAMES_IN_BUFFER + 1))) != NULL)
      vbu.validReadBuf0MaxAddr = vbu.validReadBuf0 +
                                          VBU_WINDOW_SIZE * (NUM_FRAMES_IN_BUFFER + 1);
    else {
      logMsg("Could not malloc valid read buffer 0!\n");
      return(ERROR);
    }

    if ((vbu.validReadBuf1 = (char *)
                                   malloc(VBU_WINDOW_SIZE * (NUM_FRAMES_IN_BUFFER + 1))) != NULL)
      vbu.validReadBuf1MaxAddr = vbu.validReadBuf1 +
                                          VBU_WINDOW_SIZE * (NUM_FRAMES_IN_BUFFER + 1);
    else {
      logMsg("Could not malloc valid read buffer 0!\n");
```

```
  return(ERROR);
}

/* save that info */
vbu.validOffsetReadBuf0 = vbu.validReadBuf0;
vbu.validOffsetReadBuf1 = vbu.validReadBuf1;

/* zero the buffers out for the first time */
bzero(vbu.validReadBuf0, VBU_WINDOW_SIZE * (NUM_FRAMES_IN_BUFFER + 1));
bzero(vbu.validReadBuf1, VBU_WINDOW_SIZE * (NUM_FRAMES_IN_BUFFER + 1));

/* zero the buffers out for the first time */
bzero(vbu.description, sizeof(vbu.description));
bzero(vbu.fileName, sizeof(vbu.fileName));

/* set up the VBU page switch logic flags */
if (statusReg & 0x1)
  vbu.prevStatus = 1;
else
  vbu.prevStatus = 0;

/* save the fileName info for cleanup routines */
strncpy(&vbu.fileName[0], fileName, sizeof(vbu.fileName));

/* spawn the page counter task */
vbu.countTaskId = taskSpawn("tVbuCounter", 78,
                          VX_FP_TASK | VX_DEALLOC_STACK, 2048,
                          (FUNCPTR) vbuCounter, &vbu);

/* spawn the Calibration task */
vbu.calibrateTaskId = taskSpawn("tVbuCalibrate", 100,
                          VX_FP_TASK | VX_DEALLOC_STACK, 0x100000,
                          (FUNCPTR) vbuCalibrate, &vbu);

/* spawn the diskSize task */
vbu.diskSizeTaskId = taskSpawn("tVbuDiskSize", 76,
                          VX_FP_TASK | VX_DEALLOC_STACK, 0x80000,
                          (FUNCPTR) vbuDiskSize, &vbu);

/* write the data out if debugging is turned on */
if (vbuDebugFlags & 0x1) {
  logMsg("status Reg: %x\n", vbu.statusReg);
  logMsg("virtualBrdAddress : %x\n", virtualBrdAddress);
  logMsg("vbu struct addr : %x\n", &vbu);
  logMsg("rdBuf0 = %x rdBuf0Max = %x\n", vbu.validReadBuf0,
         vbu.validReadBuf0MaxAddr);
  logMsg("vbu.validPipeFd = %d\n", vbu.validPipeFd);
  logMsg("fileName len = %d\n", strlen(fileName));
}

            resetTerminal();
                  gotoYX(14,1,"Please wait a few seconds while I set things up...");

/* give the tasks a chance to spawn and open files, pipes, etc. */
delay(2);

/* set up the interrupt vector */

intConnect(INUM_TO_IVEC(intVector),      undefinedIntHandler,    &vbu);
intConnect(INUM_TO_IVEC(intVector + 1),  calibrateIntHandler,    &vbu);
intConnect(INUM_TO_IVEC(intVector + 2),  newPartitionIntHandler, &vbu);
intConnect(INUM_TO_IVEC(intVector + 3),  validDataIntHandler,    &vbu);
intConnect(INUM_TO_IVEC(intVector + 4),  terminateIntHandler,    &vbu);
intConnect(INUM_TO_IVEC(intVector + 5),  configDataIntHandler,   &vbu);
intConnect(INUM_TO_IVEC(intVector + 6),  type6IntHandler,    &vbu);
intConnect(INUM_TO_IVEC(intVector + 7),  startIntHandler,        &vbu);
intConnect(INUM_TO_IVEC(intVector + 8),  diskSizeIntHandler,     &vbu);
intConnect(INUM_TO_IVEC(intVector + 9),  type9IntHandler,    &vbu);
intConnect(INUM_TO_IVEC(intVector + 10), typeAIntHandler,    &vbu);
intConnect(INUM_TO_IVEC(intVector + 11), typeBIntHandler,    &vbu);
intConnect(INUM_TO_IVEC(intVector + 12), typeCIntHandler,    &vbu);
intConnect(INUM_TO_IVEC(intVector + 13), typeDIntHandler,    &vbu);
intConnect(INUM_TO_IVEC(intVector + 14), typeEIntHandler,    &vbu);
intConnect(INUM_TO_IVEC(intVector + 15), typeFIntHandler,    &vbu);

if (vbuDebugFlags & 0x1)
  logMsg("enabling intLevel\n");
```

```
      /* enable the bus interrupts */
      sysIntEnable(intLevel);

      /* enable VBU interrupts */

      vbuIntEnable(0, &vbu);

      if (vbuDebugFlags & 0x1)
        logMsg("VBU control reg contents: 0x%X\n", vbu.controlWord);

      /* unlock interrupts */
      intUnlock (oldLevel);
    }

    /* send the user a message */
    if (vbuDebugFlags & 0x1)
      logMsg("done\n");

               eraseToEOL(14);
               gotoYX(14,1, "Ready for Calibration...");
               delay(2);
    position(16,1);
               shellPromptSet("Working ....... ");
    return(stat);
}

/*********************************************************************
 *
 * type6IntHandler - This is the interrupt handler for the VBU
 *
 * Inputs : pointer to the VBU data structure
 *
 * Outputs: messages written to the writer pipe
 *
 ********************************************************************/

/*
 *  Interrupt routine called when board generates an interrupt.
 */
VOID type6IntHandler(pVbu)
struct VBU_STRUCT *pVbu;    /* Unit number interrupt is on */
{
  UINT16 status;

  if (vbuDebugFlags & 0x8)
    *vbuDebugPtr = 0xa6;

  type6IntCnt++;
  if (vbuDebugFlags & 0x100)
    logMsg("> type6IntHandler\n");


  /* reset the interrupt */
  if (vxMemProbe (pVbu->statusReg, VX_READ, 2, &status) == OK)
      status &= 0x1;

  /* check the current status vis-a-vis previous status */
  if ((status == pVbu->prevStatus) && !(pVbu->firstTime)) {
    pVbu->prevStatus = status;
  } else
    pVbu->prevStatus = status;

  if (vbuDebugFlags & 0x100)
    logMsg("< type6IntHandler\n");

  if (vbuDebugFlags & 0x8)
    *vbuDebugPtr = 0xa6;


}

/*********************************************************************
 *
 * type9IntHandler - This is the interrupt handler for the VBU
 *
 * Inputs : pointer to the VBU data structure
 *
```

```
 * Outputs: messages written to the writer pipe
 *
 ********************************************************************/

/*
 *  Interrupt routine called when board generates an interrupt.
 */
VOID type9IntHandler(pVbu)
struct VBU_STRUCT *pVbu;   /* Unit number interrupt is on */
{
  UINT16 status;

  if (vbuDebugFlags & 0x8)
    *vbuDebugPtr = 0xa9;

  type9IntCnt++;
  if (vbuDebugFlags & 0x100)
    logMsg("> type9IntHandler\n");


  /* reset the interrupt */
  if (vxMemProbe (pVbu->statusReg, VX_READ, 2, &status) == OK)
      status &= 0x1;

  /* check the current status vis-a-vis previous status */
  if ((status == pVbu->prevStatus) && !(pVbu->firstTime)) {
    pVbu->prevStatus = status;
  } else
    pVbu->prevStatus = status;

  if (vbuDebugFlags & 0x100)
    logMsg("< type9IntHandler\n");

  if (vbuDebugFlags & 0x8)
    *vbuDebugPtr = 0xa9;

}
/********************************************************************
 *
 * typeAIntHandler - This is the interrupt handler for the VBU
 *
 * Inputs : pointer to the VBU data structure
 *
 * Outputs: messages written to the writer pipe
 *
 ********************************************************************/

/*
 *  Interrupt routine called when board generates an interrupt.
 */
VOID typeAIntHandler(pVbu)
struct VBU_STRUCT *pVbu;   /* Unit number interrupt is on */
{
  UINT16 status;

  if (vbuDebugFlags & 0x8)
    *vbuDebugPtr = 0xaa;

  typeAIntCnt++;
  if (vbuDebugFlags & 0x100)
    logMsg("> typeAIntHandler\n");


  /* reset the interrupt */
  if (vxMemProbe (pVbu->statusReg, VX_READ, 2, &status) == OK)
      status &= 0x1;

  /* check the current status vis-a-vis previous status */
  if ((status == pVbu->prevStatus) && !(pVbu->firstTime)) {
    pVbu->prevStatus = status;
  } else
    pVbu->prevStatus = status;

  if (vbuDebugFlags & 0x100)
    logMsg("< typeAIntHandler\n");

  if (vbuDebugFlags & 0x8)
```

```
    *vbuDebugPtr = 0xaa;

}

/*********************************************************************
 *
 * typeBIntHandler - This is the interrupt handler for the VBU
 *
 * Inputs : pointer to the VBU data structure
 *
 * Outputs: messages written to the writer pipe
 *
 *********************************************************************/

/*
 *  Interrupt routine called when board generates an interrupt.
 */
VOID typeBIntHandler(pVbu)
struct VBU_STRUCT *pVbu;   /* Unit number interrupt is on */
{
  UINT16 status;

  if (vbuDebugFlags & 0x8)
    *vbuDebugPtr = 0xab;

  typeBIntCnt++;
  if (vbuDebugFlags & 0x100)
    logMsg("> typeBIntHandler\n");


  /* reset the interrupt */
  if (vxMemProbe (pVbu->statusReg, VX_READ, 2, &status) == OK)
      status &= 0x1;

  /* check the current status vis-a-vis previous status */
  if ((status == pVbu->prevStatus) && !(pVbu->firstTime)) {
    pVbu->prevStatus = status;
  } else
    pVbu->prevStatus = status;

  if (vbuDebugFlags & 0x100)
    logMsg("< typeBIntHandler\n");

  if (vbuDebugFlags & 0x8)
    *vbuDebugPtr = 0xab;

}

/*********************************************************************
 *
 * typeCIntHandler - This is the interrupt handler for the VBU
 *
 * Inputs : pointer to the VBU data structure
 *
 * Outputs: messages written to the writer pipe
 *
 *********************************************************************/

/*
 *  Interrupt routine called when board generates an interrupt.
 */
VOID typeCIntHandler(pVbu)
struct VBU_STRUCT *pVbu;   /* Unit number interrupt is on */
{
  UINT16 status;

  if (vbuDebugFlags & 0x8)
    *vbuDebugPtr = 0xac;

  typeCIntCnt++;
  if (vbuDebugFlags & 0x100)
    logMsg("> typeCIntHandler\n");


  /* reset the interrupt */
  if (vxMemProbe (pVbu->statusReg, VX_READ, 2, &status) == OK)
      status &= 0x1;
```

```
  /* check the current status vis-a-vis previous status */
  if ((status == pVbu->prevStatus) && !(pVbu->firstTime)) {
    pVbu->prevStatus = status;
  } else
    pVbu->prevStatus = status;

  if (vbuDebugFlags & 0x100)
    logMsg("< typeCIntHandler\n");

  if (vbuDebugFlags & 0x8)
    *vbuDebugPtr = 0xac;

}

/********************************************************************
 *
 * typeDIntHandler - This is the interrupt handler for the VBU
 *
 * Inputs : pointer to the VBU data structure
 *
 * Outputs: messages written to the writer pipe
 *
 ********************************************************************/

/*
 *  Interrupt routine called when board generates an interrupt.
 */
VOID typeDIntHandler(pVbu)
struct VBU_STRUCT *pVbu;   /* Unit number interrupt is on */
{
  UINT16 status;

  if (vbuDebugFlags & 0x8)
    *vbuDebugPtr = 0xad;

  typeDIntCnt++;
  if (vbuDebugFlags & 0x100)
    logMsg("> typeDIntHandler\n");


  /* reset the interrupt */
  if (vxMemProbe (pVbu->statusReg, VX_READ, 2, &status) == OK)
      status &= 0x1;

  /* check the current status vis-a-vis previous status */
  if ((status == pVbu->prevStatus) && !(pVbu->firstTime)) {
    pVbu->prevStatus = status;
  } else
    pVbu->prevStatus = status;

  if (vbuDebugFlags & 0x100)
    logMsg("< typeDIntHandler\n");

  if (vbuDebugFlags & 0x8)
    *vbuDebugPtr = 0xad;

}

/********************************************************************
 *
 * typeEIntHandler - This is the interrupt handler for the VBU
 *
 * Inputs : pointer to the VBU data structure
 *
 * Outputs: messages written to the writer pipe
 *
 ********************************************************************/

/*
 *  Interrupt routine called when board generates an interrupt.
 */
VOID typeEIntHandler(pVbu)
struct VBU_STRUCT *pVbu;   /* Unit number interrupt is on */
{
  UINT16 status;

  if (vbuDebugFlags & 0x8)
    *vbuDebugPtr = 0xae;
```

```
  typeEIntCnt++;
  if (vbuDebugFlags & 0x100)
    logMsg("> typeEIntHandler\n");


  /* reset the interrupt */
  if (vxMemProbe (pVbu->statusReg, VX_READ, 2, &status) == OK)
      status &= 0x1;

  /* check the current status vis-a-vis previous status */
  if ((status == pVbu->prevStatus) && !(pVbu->firstTime)) {
    pVbu->prevStatus = status;
  } else
    pVbu->prevStatus = status;

  if (vbuDebugFlags & 0x100)
    logMsg("< typeEIntHandler\n");

  if (vbuDebugFlags & 0x8)
    *vbuDebugPtr = 0xae;

}

/*******************************************************************
 *
 * typeFIntHandler - This is the interrupt handler for the VBU
 *
 * Inputs : pointer to the VBU data structure
 *
 * Outputs: messages written to the writer pipe
 *
 *******************************************************************/

/*
 *  Interrupt routine called when board generates an interrupt.
 */
VOID typeFIntHandler(pVbu)
struct VBU_STRUCT *pVbu;   /* Unit number interrupt is on */
{
  UINT16 status;

  if (vbuDebugFlags & 0x8)
    *vbuDebugPtr = 0xaf;

  typeFIntCnt++;
  if (vbuDebugFlags & 0x100)
    logMsg("> typeFIntHandler\n");


  /* reset the interrupt */
  if (vxMemProbe (pVbu->statusReg, VX_READ, 2, &status) == OK)
      status &= 0x1;

  /* check the current status vis-a-vis previous status */
  if ((status == pVbu->prevStatus) && !(pVbu->firstTime)) {
    pVbu->prevStatus = status;
  } else
    pVbu->prevStatus = status;

  if (vbuDebugFlags & 0x100)
    logMsg("< typeFIntHandler\n");

  if (vbuDebugFlags & 0x8)
    *vbuDebugPtr = 0xaf;

}

/*******************************************************************
 *
 * undefinedIntHandler - This is the interrupt handler for the VBU
 *
 * Inputs : pointer to the VBU data structure
 *
 * Outputs: messages written to the writer pipe
 *
 *******************************************************************/
```

```
/*
 *  Interrupt routine called when board generates an interrupt.
 */
VOID undefinedIntHandler(pVbu)
struct VBU_STRUCT *pVbu;   /* Unit number interrupt is on */
{
  UINT16 status;

  if (vbuDebugFlags & 0x8)
    *vbuDebugPtr = 0xa0;

  uninitIntCnt++;
  if (vbuDebugFlags & 0x100)
    logMsg("> undefinedIntHandler\n");


  /* reset the interrupt */
  if (vxMemProbe (pVbu->statusReg, VX_READ, 2, &status) == OK)
      status &= 0x1;

  /* check the current status vis-a-vis previous status */
  if ((status == pVbu->prevStatus) && !(pVbu->firstTime)) {
    pVbu->prevStatus = status;
  } else
    pVbu->prevStatus = status;

  if (vbuDebugFlags & 0x100)
    logMsg("< undefinedIntHandler\n");

  if (vbuDebugFlags & 0x8)
    *vbuDebugPtr = 0xa0;

}

/**********************************************************************
 *
 * calibrateIntHandler - This is the interrupt handler for the VBU
 *
 * Inputs : pointer to the VBU data structure
 *
 * Outputs: messages written to the writer pipe
 *
 **********************************************************************/

/*
 *  Interrupt routine called when board generates an interrupt.
 */
VOID calibrateIntHandler(pVbu)
struct VBU_STRUCT *pVbu;   /* Unit number interrupt is on */
{
    UINT32 status;

  if (vbuDebugFlags & 0x8)
    *vbuDebugPtr = 0xa1;

  calibrateIntCnt++;

  if (vbuDebugFlags & 0x200)
    logMsg("> calibrateIntHandler\n");

    /* reset the interrupt */
    if (vxMemProbe (pVbu->statusReg, VX_READ, 2, &status) == OK)
        status &= 0x1;

    vbuMessageInt.newPartition = FALSE;
                vbuMessageInt.length = VBU_WINDOW_SIZE;
    /* copy VBU_WINDOW_SIZE/2 words from recovery module to local RAM */
    bcopyWords(pVbu->baseAddress, &vbuMessageInt.buffer,
                                                        ((VBU_WINDOW_SIZE+1)>>1));

    /* write the message to the pipe */
    if ((write(pVbu->calibrationPipeFd,&vbuMessageInt,
                                   sizeof(struct VBU_MESSAGE))==ERROR)) {
     /*   logMsg("Error writing Pipe from calibration !\n"); */
              }

    /* check the current status vis-a-vis previous status */
    if ((status == pVbu->prevStatus) && !(pVbu->firstTime)) {
```

```
            pVbu->prevStatus = status;
    } else
            pVbu->prevStatus = status;

    /* reset the firstTime flag so status checking becomes valid */
    pVbu->firstTime = FALSE;

    /* Give the semaphore so we know that the ISR is done */
    semGive(pVbu->vbuSem2);

   if (vbuDebugFlags & 0x200)
     logMsg("< calibrateIntHandler\n");

   if (vbuDebugFlags & 0x8)
     *vbuDebugPtr = 0xa1;

}


/*******************************************************************
 *
 * newPartitionIntHandler - This is the interrupt handler for the VBU
 *
 * Inputs : pointer to the VBU data structure
 *
 * Outputs: messages written to the writer pipe
 *
 *******************************************************************/

/*
 *  Interrupt routine called when board generates an interrupt.
 */
VOID newPartitionIntHandler(pVbu)
struct VBU_STRUCT *pVbu;    /* Unit number interrupt is on */
{
    UINT32 status;

   if (vbuDebugFlags & 0x8)
       *vbuDebugPtr = 0xa2;

   newPartIntCnt++;

   if (vbuDebugFlags & 0x400)
     logMsg("> newPartitionIntHandler\n");

        switch (pVbu->currentPartition) {
                case 1:
      pVbu->partition1Start = pVbu->numBytesWritten ;
                        pVbu->currentPartition++;
                        break;
                case 2:
      pVbu->partition2Start = pVbu->numBytesWritten ;
                        pVbu->currentPartition++;
                        break;
                case 3:
      pVbu->partition3Start = pVbu->numBytesWritten ;
                        pVbu->currentPartition++;
                        break;
            case 4:
      pVbu->partition4Start = pVbu->numBytesWritten ;
                        pVbu->currentPartition++;
                        break;
    default:
                        logMsg("Too Many New Partition Messages!\n");
                        break;
        }

        switch (pVbu->validCurrentBuf) {
                case 0:
      /* copy VBU_WINDOW_SIZE/2 words from recovery module to local RAM */
      bcopyWords(pVbu->baseAddress, pVbu->validOffsetReadBuf0,
                                                              ((VBU_WINDOW_SIZE+1)>>1));
      pVbu->numBytesWritten += VBU_WINDOW_SIZE;
      pVbu->validOffsetReadBuf0 += VBU_WINDOW_SIZE;
      pVbu->validFramesInBuf++;
      if (pVbu->validFramesInBuf == NUM_FRAMES_IN_BUFFER) {
        intMessage.timeToShutDown = FALSE;
                              intMessage.bufferAddr = pVbu->validReadBuf0;
```

vbuDrv.c 17

```
                        intMessage.numFramesInBuf = pVbu->validFramesInBuf;
                    if ((write(pVbu->validPipeFd, &intMessage, sizeof(intMessage))
                                                    == ERROR))
                                    logMsg("Error writing to Valid pipe from New Partiton Int 0!\n");
                        pVbu->validFramesInBuf = 0;
                        pVbu->validCurrentBuf = 1;
                        pVbu->validOffsetReadBuf0 = pVbu->validReadBuf0;
                    }
                    break;
            case 1:
    /* copy VBU_WINDOW_SIZE/2 words from recovery module to local RAM */
    bcopyWords(pVbu->baseAddress, pVbu->validOffsetReadBuf1,
                                                    ((VBU_WINDOW_SIZE+1)>>1));
    pVbu->numBytesWritten += VBU_WINDOW_SIZE;
    pVbu->validOffsetReadBuf1 += VBU_WINDOW_SIZE;
    pVbu->validFramesInBuf++;
    if (pVbu->validFramesInBuf == NUM_FRAMES_IN_BUFFER) {
                            intMessage.bufferAddr = pVbu->validReadBuf1;
                        intMessage.numFramesInBuf = pVbu->validFramesInBuf;
      intMessage.timeToShutDown = FALSE;
                        if ((write(pVbu->validPipeFd, &intMessage, sizeof(intMessage))
                                                    == ERROR))
                          logMsg("Error writing to Valid pipe from New Partiton Int 1!\n");
                        pVbu->validFramesInBuf = 0;
                        pVbu->validCurrentBuf = 0;
                        pVbu->validOffsetReadBuf1 = pVbu->validReadBuf1;
                    }
                    break;
            default:
                    logMsg("New Partition Int currentBuf out of range = %d\n",
                                                    pVbu->validCurrentBuf);
    break;
      }

  if (vbuDebugFlags & 0x8)
   *vbuDebugPtr = 0x1d;

    /* reset the interrupt */
    if (vxMemProbe (pVbu->statusReg, VX_READ, 2, &status) == OK)
        status &= 0x1;

    /* check the current status vis-a-vis previous status */
    if ((status == pVbu->prevStatus) && !(pVbu->firstTime)) {
         pVbu->prevStatus = status;
    } else
         pVbu->prevStatus = status;

   /* reset the firstTime flag so status checking becomes valid */
   pVbu->firstTime = FALSE;

   /* Give the semaphore so we know that the ISR is done */
   semGive(pVbu->vbuSem2);

  if (vbuDebugFlags & 0x400)
    logMsg("< newPartitionIntHandler\n");

  if (vbuDebugFlags & 0x8)
    *vbuDebugPtr = 0xa2;

}

/*********************************************************************
 *
 * validDataIntHandler - This is the interrupt handler for the VBU
 *
 * Inputs : pointer to the VBU data structure
 *
 * Outputs: messages written to the writer pipe
 *
 *********************************************************************/

/*
 *  Interrupt routine called when board generates an interrupt.
 */
VOID validDataIntHandler(pVbu)
struct VBU_STRUCT *pVbu;   /* Unit number interrupt is on */
{
    UINT32 status;
```

```
if (vbuDebugFlags & 0x8)
  *vbuDebugPtr = 0xa3;

validIntCnt++;

if (vbuDebugFlags & 0x800)
  logMsg("> validDataIntHandler\n");

              switch (pVbu->validCurrentBuf) {
                      case 0:
      /* copy VBU_WINDOW_SIZE/2 words from recovery module to local RAM */
      bcopyWords(pVbu->baseAddress, pVbu->validOffsetReadBuf0,
                                                          ((VBU_WINDOW_SIZE+1)>>1));
      pVbu->numBytesWritten += VBU_WINDOW_SIZE;
      pVbu->validOffsetReadBuf0 += VBU_WINDOW_SIZE;
      pVbu->validFramesInBuf++;
      if (pVbu->validFramesInBuf == NUM_FRAMES_IN_BUFFER) {
        intMessage.timeToShutDown = FALSE;
                                        intMessage.bufferAddr = pVbu->validReadBuf0;
                                        intMessage.numFramesInBuf = pVbu->validFramesInBuf;
                                        if ((write(pVbu->validPipeFd, &intMessage, sizeof(intMessage))
                                                == ERROR))
                                                logMsg("Error writing to Valid pipe from New Partiton Int 0!\n");
                                        pVbu->validFramesInBuf = 0;
                                        pVbu->validCurrentBuf = 1;
                                        pVbu->validOffsetReadBuf0 = pVbu->validReadBuf0;
                                }
                                break;
                      case 1:
      /* copy VBU_WINDOW_SIZE/2 words from recovery module to local RAM */
      bcopyWords(pVbu->baseAddress, pVbu->validOffsetReadBuf1,
                                                          ((VBU_WINDOW_SIZE+1)>>1));
      pVbu->numBytesWritten += VBU_WINDOW_SIZE;
      pVbu->validOffsetReadBuf1 += VBU_WINDOW_SIZE;
      pVbu->validFramesInBuf++;
      if (pVbu->validFramesInBuf == NUM_FRAMES_IN_BUFFER) {
        intMessage.timeToShutDown = FALSE;
                                        intMessage.bufferAddr = pVbu->validReadBuf1;
                                        intMessage.numFramesInBuf = pVbu->validFramesInBuf;
                                        if ((write(pVbu->validPipeFd, &intMessage, sizeof(intMessage))
                                                == ERROR))
                                                logMsg("Error writing to Valid pipe from New Partiton Int 1!\n");
                                        pVbu->validFramesInBuf = 0;
                                        pVbu->validCurrentBuf = 0;
                                        pVbu->validOffsetReadBuf1 = pVbu->validReadBuf1;
                                }
                                break;
                      default:
                                logMsg("Valid Data Int currentBuf out of range = %d\n",
                                                        pVbu->validCurrentBuf);
      break;
              }


  /* reset the interrupt */
  if (vxMemProbe (pVbu->statusReg, VX_READ, 2, &status) == OK)
      status &= 0x1;

  /* check the current status vis-a-vis previous status */
  if ((status == pVbu->prevStatus) && !(pVbu->firstTime)) {
        pVbu->prevStatus = status;
  } else
        pVbu->prevStatus = status;

 /* reset the firstTime flag so status checking becomes valid */
 pVbu->firstTime = FALSE;

 /* Give the semaphore so we know that the ISR is done */
 semGive(pVbu->vbuSem1);
 semGive(pVbu->vbuSem2);

if (vbuDebugFlags & 0x800)
  logMsg("< validDataIntHandler\n");

if (vbuDebugFlags & 0x8)
  *vbuDebugPtr = 0xa3;
```

```
}

/*******************************************************************
 *
 * terminateIntHandler - This is the interrupt handler for the VBU
 *
 * Inputs : pointer to the VBU data structure
 *
 * Outputs: messages written to the writer pipe
 *
 *******************************************************************/

/*
 *  Interrupt routine called when board generates an interrupt.
 */
VOID terminateIntHandler(pVbu)
struct VBU_STRUCT *pVbu;   /* Unit number interrupt is on */
{
  UINT16 status;

  if (vbuDebugFlags & 0x8)
    *vbuDebugPtr = 0xa4;

  terminateIntCnt++;

  if (vbuDebugFlags & 0x1000)
    logMsg("> TerminateIntHandler\n");

  /* reset the interrupt */
  if (vxMemProbe (pVbu->statusReg, VX_READ, 2, &status) == OK)
      status &= 0x1;

  pVbu->controlWord |= VBU_INT_ENABLE_BIT;
  *pVbu->statusReg = pVbu->controlWord;

        if (pVbu->alreadyTerminated)
                return;
        else
                pVbu->alreadyTerminated = TRUE;

        vbuMessageInt.newPartition = FALSE;
        vbuMessageInt.length = -1;


  /* write the message to the pipe */
  if ((write(pVbu->calibrationPipeFd,&vbuMessageInt,
                         sizeof(struct VBU_MESSAGE))==ERROR))
    logMsg("Error writing calibration Pipe from terminate 0!\n");

  /* write the message to the pipe */
  if ((write(pVbu->configDataPipeFd,&vbuMessageInt,
                         sizeof(struct VBU_MESSAGE))==ERROR))
    logMsg("Error writing config Pipe from terminate 0!\n");


  /* write the message to the pipe */

/*
if ((write(pVbu->diskSizePipeFd,&vbuMessageInt,
                         sizeof(struct VBU_MESSAGE))==ERROR))
    logMsg("Error writing dsize Pipe from terminate 0!\n");
*/

  /* write the message to the pipe */
/*
  if ((write(pVbu->validPipeFd,&vbuMessageInt,
                         sizeof(struct VBU_MESSAGE))==ERROR))
    logMsg("Error writing valid Pipe from terminate 0!\n");
*/

  if (vbuDebugFlags & 0x1000)
    logMsg("< TerminateIntHandler\n");

  if (vbuDebugFlags & 0x8)
    *vbuDebugPtr = 0xa4;

}
```

```
/*********************************************************************
 *
 * termDiskSize - This is the interrupt handler for the VBU
 *
 * Inputs : pointer to the VBU data structure
 *
 * Outputs: messages written to the writer pipe
 *
 *********************************************************************/

/*
 *  Interrupt routine called when board generates an interrupt.
 */
VOID termDiskSize(pVbu, delayTime)
struct VBU_STRUCT *pVbu;    /* Unit number interrupt is on */
int delayTime;
{

        delay(delayTime);
  switch(pVbu->validCurrentBuf) {
                case 0:
      intMessage.timeToShutDown = TRUE;
        intMessage.bufferAddr = pVbu->validReadBuf0;
            intMessage.numFramesInBuf = pVbu->validFramesInBuf;
                        if ((write(pVbu->validPipeFd, &intMessage, sizeof(intMessage))
                                                        == ERROR))
                                logMsg("Error writing to Valid pipe from Terminate Disk Size 0!\n");
                        break;
                case 1:
      intMessage.timeToShutDown = TRUE;
        intMessage.bufferAddr = pVbu->validReadBuf1;
            intMessage.numFramesInBuf = pVbu->validFramesInBuf;
                        if ((write(pVbu->validPipeFd, &intMessage, sizeof(intMessage))
                                                        == ERROR))
                                logMsg("Error writing to Valid pipe from Terminate Disk Size 1!\n");
                        break;
                default:
                        logMsg("Valid Data Int currentBuf out of range = %d\n",
                                                        pVbu->validCurrentBuf);
      break;
        }

}

/*********************************************************************
 *
 * configDataIntHandler - This is the interrupt handler for the VBU
 *
 * Inputs : pointer to the VBU data structure
 *
 * Outputs: messages written to the writer pipe
 *
 *********************************************************************/

/*
 *  Interrupt routine called when board generates an interrupt.
 */
VOID configDataIntHandler(pVbu)
struct VBU_STRUCT *pVbu;    /* Unit number interrupt is on */
{
    UINT32 status;

  if (vbuDebugFlags & 0x8)
    *vbuDebugPtr = 0xa5;

  configIntCnt++;

  if (vbuDebugFlags & 0x2000)
    logMsg("> configDataIntHandler\n");

    vbuMessageInt.newPartition = FALSE;
                vbuMessageInt.length = VBU_WINDOW_SIZE;
    /* copy VBU_WINDOW_SIZE/2 words from recovery module to local RAM */
    bcopyWords(pVbu->baseAddress, &vbuMessageInt.buffer,
                                                        ((VBU_WINDOW_SIZE+1)>>1));

    if (vbuDebugFlags & 0x8)
        *vbuDebugPtr = 0x1d;
```

```
    /* write the message to the pipe */
    if ((write(pVbu->configDataPipeFd,&vbuMessageInt,
                              sizeof(struct VBU_MESSAGE))==ERROR))
       logMsg("Error writing Pipe from ConfigDataInt 0!\n");

    /* reset the interrupt */
    if (vxMemProbe (pVbu->statusReg, VX_READ, 2, &status) == OK)
        status &= 0x1;

    /* check the current status vis-a-vis previous status */
    if ((status == pVbu->prevStatus) && !(pVbu->firstTime)) {
         pVbu->prevStatus = status;
    } else
         pVbu->prevStatus = status;

   /* reset the firstTime flag so status checking becomes valid */
   pVbu->firstTime = FALSE;

   /* Give the semaphore so we know that the ISR is done */
   semGive(pVbu->vbuSem2);

  if (vbuDebugFlags & 0x2000)
    logMsg("< configDataIntHandler\n");

  if (vbuDebugFlags & 0x8)
    *vbuDebugPtr = 0xa5;

}
/*********************************************************************
 *
 * startIntHandler - This is the interrupt handler for the VBU
 *
 * Inputs : pointer to the VBU data structure
 *
 * Outputs: messages written to the writer pipe
 *
 *********************************************************************/

/*
 *  Interrupt routine called when board generates an interrupt.
 */
VOID startIntHandler(pVbu)
struct VBU_STRUCT *pVbu;   /* Unit number interrupt is on */
{
  UINT32 nbytes;

  if (vbuDebugFlags & 0x8)
    *vbuDebugPtr = 0xa7;

  startIntCnt++;

  if (vbuDebugFlags & 0x4000) {
    logMsg("> startIntHandler\n");
              logMsg("Num calibration ints so far = %d\n", calibrateIntCnt);
        }

        vbuMessageInt.newPartition = FALSE;
        vbuMessageInt.length = 16;
        strncpy(vbuMessageInt.buffer[0], "Starting Backup!", 16);
        vbuMessageInt.buffer[16] = 0x0;

        if ((nbytes = write(pVbu->calibrationPipeFd, &vbuMessageInt,
                        sizeof(vbuMessageInt))) != sizeof(vbuMessage))
        logMsg("Error writing to calibration pipe from Calibration Int!\n");

  if (vbuDebugFlags & 0x4000)
    logMsg("< startIntHandler\n");

  if (vbuDebugFlags & 0x8)
    *vbuDebugPtr = 0xa7;

}

/*********************************************************************
 *
 * diskSizeIntHandler - This is the interrupt handler for the VBU
 *
```

```
 * Inputs : pointer to the VBU data structure
 *
 * Outputs: messages written to the writer pipe
 *
 *********************************************************************/

/*
 *  Interrupt routine called when board generates an interrupt.
 */
VOID diskSizeIntHandler(pVbu)
struct VBU_STRUCT *pVbu;   /* Unit number interrupt is on */
{
    UINT32 status;

  if (vbuDebugFlags & 0x8)
    *vbuDebugPtr = 0xa8;

  diskSizeIntCnt++;

  if (vbuDebugFlags & 0x8000)
    logMsg("> diskSizeIntHandler\n");

    vbuMessageInt.newPartition = FALSE;
                vbuMessageInt.length = VBU_WINDOW_SIZE;
    /* copy VBU_WINDOW_SIZE/2 words from recovery module to local RAM */
    bcopyWords(pVbu->baseAddress, &vbuMessageInt.buffer,
                                                         ((VBU_WINDOW_SIZE+1)>>1));

    /* write the message to the pipe */
    if ((write(pVbu->diskSizePipeFd,&vbuMessageInt,
                                sizeof(struct VBU_MESSAGE))==ERROR))
       logMsg("Error writing Pipe from newPart 0!\n");

    /* reset the interrupt */
    if (vxMemProbe (pVbu->statusReg, VX_READ, 2, &status) == OK)
        status &= 0x1;

    /* check the current status vis-a-vis previous status */
    if ((status == pVbu->prevStatus) && !(pVbu->firstTime)) {
          pVbu->prevStatus = status;
    } else
          pVbu->prevStatus = status;

   /* reset the firstTime flag so status checking becomes valid */
   pVbu->firstTime = FALSE;

   /* Give the semaphore so we know that the ISR is done */
   semGive(pVbu->vbuSem2);

  if (vbuDebugFlags & 0x8000)
    logMsg("> diskSizeIntHandler\n");

  if (vbuDebugFlags & 0x8)
    *vbuDebugPtr = 0xa8;

}

/*********************************************************************
 *
 * vbuCleanUp - This routine shuts the VBU down and cleans up all
 *              of the pipe and other file descriptors.  It also
 *              deletes the pipe, frees memory, and removes the ISR.
 *
 * Inputs : pointer to the VBU structure
 *
 * Outputs: printed info if debugging is turned on
 *
 *********************************************************************/

VOID vbuCleanUp(pVbu)
  struct VBU_STRUCT *pVbu;
  {
    char **pNameTail;
                char *bufPtr;
                char deviceName[80];

    if (vbuDebugFlags & 0x4)
      logMsg("setting up pointers \n");
```

```
                bufPtr = deviceName;
                pNameTail = &bufPtr;

                vbuConfigDone = FALSE;
                vbuBackupDone = TRUE;

    free(pVbu->validReadBuf0);
    if (vbuDebugFlags & 0x4)
      logMsg("Waiting for semaphore \n");
    semTake(pVbu->vbuSem2, WAIT_FOREVER);

    if (vbuDebugFlags & 0x4)
      logMsg("b/4 intConnect \n");
    intConnect(INUM_TO_IVEC(pVbu->intVector), NULL, 0);

    if (vbuDebugFlags & 0x4)
      logMsg("b/4 validPipeFd %d\n", pVbu->validPipeFd);
    close(pVbu->validPipeFd);

    if (vbuDebugFlags & 0x4)
      logMsg("b/4 fileFd \n");

    if (vbuDebugFlags & 0x4)
      logMsg("b/4 semDelete of vbuSem1\n");
    semDelete(pVbu->vbuSem1);

    if (vbuDebugFlags & 0x4)
      logMsg("b/4 semDelete of vbuSem2\n");
    semDelete(pVbu->vbuSem2);

    if (vbuDebugFlags & 0x4)
      logMsg("b/4 semDelete of vbuSem3\n");
    semDelete(pVbu->vbuSem3);

    if (vbuDebugFlags & 0x4)
      logMsg("b/4 taskDelete of vbuCounter \n");
    taskDelete(pVbu->countTaskId);

}


#if FALSE
/*********************************************************************
 *
 * vbuCounter - This routine prints out the running total of
 *              captured buffers
 *
 * Inputs : pointer to the VBU structure
 *
 * Outputs: buffer count on the palmtop LCD Display
 *
 *********************************************************************/

VOID vbuCounter(pVbu)
  struct VBU_STRUCT *pVbu;
  {
    /* forever */
                /* clear();  */
    while (1) {
      /* Wait for watchdog timer to tell us to go */
      semTake(pVbu->vbuSem3, WAIT_FOREVER);

      /* Wait for writer task to update the counter value */
      semTake(pVbu->vbuSem1, WAIT_FOREVER);

                        eraseToEOL(14);
                        eraseToEOL(15);
                        position(14,1);

                        if (pVbu->numBytesWritten > pVbu->diskSize) {
                                if (pVbu->numBytesWritten > (pVbu->diskSize + VBU_WINDOW_SIZE)) {
                            printf("Backed up %d Bytes so far...\n", pVbu->diskSize);
                            printf("That's %.1f %% of the disk...\n", 100.0);
                                        return;
                                } else {
                            printf("Backed up %d Bytes so far...\n", pVbu->diskSize);
                            printf("That's %.1f %% of the disk...\n", 100.0);
        }
```

```
                } else {
                    printf("Backed up %d Bytes so far...\n", pVbu->numBytesWritten);
                    printf("That's %.1f %% of the disk...\n",
            ((float) (pVbu->numBytesWritten/ (float) pVbu->diskSize))*100.0);
      }

      /* schedule a new watchdog to go off in REPORT_RATE seconds */
      wdStart(pVbu->vbuWatchDog1, sysClkRateGet() * REPORT_RATE, semGive,
              pVbu->vbuSem3);
    }

  }

#endif

/*******************************************************************
 *
 * vbuCounter - This routine prints out the running total of
 *              captured buffers
 *
 * Inputs : pointer to the VBU structure
 *
 * Outputs: buffer count on the palmtop LCD Display
 *
 *******************************************************************/

VOID vbuCounter(pVbu)
  struct VBU_STRUCT *pVbu;
  {
                int numStars, ix;
                int oneShot = TRUE;

    /* forever */
                /* clear();  */

                delay(5);
    while (1) {
      /* Wait for watchdog timer to tell us to go */
      semTake(pVbu->vbuSem3, WAIT_FOREVER);

      /* Wait for writer task to update the counter value */
      semTake(pVbu->vbuSem1, WAIT_FOREVER);

                        if(oneShot) {
                    eraseToEOL(14);
                    eraseToEOL(15);
                    eraseToEOL(16);
                    position(15,1);
                    printf(" 0%%  10 | 20 | 30 | 40 | 50 | 60 | 70 | 80 | 90 | 100%%");
                    position(16,1);
                    printf("|                                                  |");
                                oneShot = FALSE;
                        }

                        if (pVbu->numBytesWritten > pVbu->diskSize) {
                                if (pVbu->numBytesWritten > (pVbu->diskSize + (3*VBU_WINDOW_SIZE))) {
                                        numStars = 50;
                            position(16, 2);
                            for( ix = 0; ix < numStars; ix++)
                                    printf("*");
                                        eraseToEOL(14);
                                        position(14, 1);
                                        printf("Too much data recieved from VBU!\n");
                                        delay(2);
                                        return;
                                } else {
                                        numStars = 50;
        }
                        } else {
          numStars = ((((float) (pVbu->numBytesWritten/
                                                                                        (float) pVbu->dis
kSize))*100.0)/2);
      }

/*
                        position(14,1);
                        printf("That's %.1f %% of the disk...",
            ((float) (pVbu->numBytesWritten/ (float) pVbu->diskSize))*100.0);
```

```
*/
                    position(16, 2);
                    for( ix = 0; ix < numStars; ix++)
                            printf("*");

      /* schedule a new watchdog to go off in REPORT_RATE seconds */
      wdStart(pVbu->vbuWatchDog1, sysClkRateGet() * REPORT_RATE, semGive,
              pVbu->vbuSem3);
    }

  }


/*********************************************************************
 *
 * vbuWriter - This routine handles all of the writing of data out
 *             to a storage media
 *
 * Inputs : pipeName - name of the pipe device for commo from ISR
 *          fileName - name of device to write data out to
 *          pVbu     - pointer to the VBU structure
 *
 * Outputs: buffers written to fileName
 *
 *********************************************************************/

int vbuWriter(pVbu, offset)
  struct VBU_STRUCT *pVbu;
  UINT32 offset;

  {

    int pipeFd, fileFd, nBytes;
    struct BUFFER_MESSAGE pipeMsg;
    UINT32 fileOffset = 0, ix;
    UINT32 numBytesToWrite = 0;
    UINT32 one = 1;
                int    oneShot = FALSE;

    if (vbuDebugFlags & 0x1)
      logMsg(">vbuWriter\n");

    pipeFd = pVbu->validPipeFd;

    /* open the disk file */
    if ((fileFd=open(IMAGE_DISK, O_RDWR)) == ERROR) {
      printf("vbuWriter: could not open image disk file for writing!\n");
      printf("vbuWriter: image disk name: %s \n", IMAGE_DISK);
      return(ERROR);
    }

    /* and save it in the structure for future reference like cleanup */
    pVbu->validFileFd = fileFd;

    /* make a copy of the original vbu structure for safe keeping */
    bcopy(pVbu, &vbuBackup, sizeof(struct VBU_STRUCT));

    fileOffset = offset;

    ioctl(fileFd, FIOSEEK, fileOffset);

    /* Forever */
    while(1) {

      if (vbuDebugFlags & 0x10)
        *vbuDebugPtr = 0x20;

      /* blocking read on the pipe, wait until ISR says there's something */
      nBytes = read(pipeFd, &pipeMsg, sizeof(struct VBU_MESSAGE));

      if (oneShot) {
        d(pipeMsg.bufferAddr, 512, 1);
        for (ix = 0 ; ix <25; ix++)
          printf("\n");
        oneShot = FALSE;
      }

      if (vbuDebugFlags & 0x10)  /* how long have we waited? */
```

```
        *vbuDebugPtr = 0x21;

      /* if the bufferAddr == -1 then we've hit the end and should
       * shut everything down
       */
      if (pipeMsg.timeToShutDown == TRUE) {
                                nBytes = write(fileFd, pipeMsg.bufferAddr,
                                                                        pipeMsg.numFramesInBuf *
 VBU_WINDOW_SIZE );
                                if (nBytes != (pipeMsg.numFramesInBuf * VBU_WINDOW_SIZE)) {
                                        logMsg("Size error in final write from vbuWriter\n!");
                                } else {
          fileOffset += nBytes;
          ioctl(fileFd, FIOSEEK, fileOffset);
                                }
                                ioctl(fileFd, FIOFLUSH, one);
        close(fileFd);
        return(OK);
      } else {
                                nBytes = write(fileFd, pipeMsg.bufferAddr,
                                                                        pipeMsg.numFramesInBuf *
 VBU_WINDOW_SIZE );
                                if (nBytes != (pipeMsg.numFramesInBuf * VBU_WINDOW_SIZE)) {
                                        logMsg("Size error in normal write from vbuWriter\n!");
                                } else {
          fileOffset += nBytes;
          ioctl(fileFd, FIOSEEK, fileOffset);
                                }
                        }

        if (vbuDebugFlags & 0x1)
          logMsg("writing %d bytes @ %x...\n", numBytesToWrite, fileOffset);

        if (vbuDebugFlags & 0x10)
          *vbuDebugPtr = 0x21;

    }
    return(OK);
}

/*********************************************************************
 *
 * vbuConfigData - This routine handles all of the writing of data out
 *            to a storage media
 *
 * Inputs : pipeName - name of the pipe device for commo from ISR
 *          fileName - name of device to write data out to
 *          pVbu     - pointer to the VBU structure
 *
 * Outputs: buffers written to fileName
 *
 *********************************************************************/

int vbuConfigData(fileName, pVbu)
  char *fileName;
  struct VBU_STRUCT *pVbu;

  {

    int tid, ix, pipeFd, fileFd, nBytes;
    struct VBU_MESSAGE pipeMsg;
    UINT32 numBytesToWrite = 0;
    UINT32 dataInBuffer = 0, numFrames = 1;
                char   diskBuffer[17 * VBU_WINDOW_SIZE];
                char   *bufPtr;

    if (vbuDebugFlags & 0x1)
      logMsg(">vbuConfigData\n");

    /* and save it in the structure for future reference like cleanup */
    pipeFd = pVbu->configDataPipeFd;

                bufPtr = (char *) diskBuffer;

    /* open the disk file */
    if ((fileFd=open(fileName, O_RDWR)) == ERROR) {
                        if((fileFd=open(fileName, O_RDWR|O_CREAT)) == ERROR) {
        logMsg("Could not open file for writing!\n");
```

```
        return(ERROR);
                          }
    }

    /* and save it in the structure for future reference like cleanup */
    pVbu->configFileFd = fileFd;

    eraseToEOL(14);
                gotoYXBlink(5,1,"Working...     ");
                gotoYXBlink(14,1,"Receiving Configuration Data...");
/*              delay(2); */
    /* Forever */
    while(1) {

      if (vbuDebugFlags & 0x10)
        *vbuDebugPtr = 0x20;

      /* blocking read on the pipe, wait until ISR says there's something */
      nBytes = read(pipeFd, &pipeMsg, sizeof(struct VBU_MESSAGE));

      if (vbuDebugFlags & 0x10)  /* how long have we waited? */
        *vbuDebugPtr = 0x21;

      /* if the bufferAddr == -1 then we've hit the end and should
       * shut everything down
       */
      if (pipeMsg.length == -1) {
                                if (dataInBuffer)
                                        nBytes = write(fileFd, &diskBuffer, dataInBuffer);
        tid = taskSpawn("tVbuShutdown", 100, VX_FP_TASK | VX_DEALLOC_STACK,
                                                        50000, (FUNCPTR) termDiskSize, pVbu, 1);
        close(fileFd);
        return(OK);
      }

      for (ix = 0; ix < pipeMsg.length; ix++) {
                                *bufPtr = pipeMsg.buffer[ix];
                                bufPtr++;
                                dataInBuffer++;
                        }

                numFrames++;

      if (numFrames == 16) {

        if (vbuDebugFlags & 0x1)
          logMsg("writing %d bytes ...\n", numBytesToWrite);

        if (vbuDebugFlags & 0x10)
          *vbuDebugPtr = 0x21;

        if((nBytes = write(fileFd, &diskBuffer, dataInBuffer)) != dataInBuffer) {
           logMsg("Error writing to Config file!\n");
           close(fileFd);
           return(ERROR);
        }

        if (vbuDebugFlags & 0x10)
          *vbuDebugPtr = 0x22;

                                dataInBuffer = 0;
                                numFrames = 1;
                                bufPtr = (char *) diskBuffer;
      }
    }
                return(OK);
}

/*******************************************************************
 *
 * vbuDiskSize - This routine handles all of the writing of data out
 *              to a storage media
 *
 * Inputs : pipeName - name of the pipe device for commo from ISR
 *          fileName - name of device to write data out to
 *          pVbu     - pointer to the VBU structure
 *
 * Outputs: buffers written to fileName
```

```
 *
 *********************************************************************/

int vbuDiskSize(pVbu)
  struct VBU_STRUCT *pVbu;

  {

    int pipeFd, nBytes;
    struct VBU_MESSAGE pipeMsg;
    struct imageHeader tempImageElem;
    int nbytes, status, imageNum;
    char completeFileName[128], diskName[80];
    FILE *imageFile;
    int one = 1;

    if (vbuDebugFlags & 0x1)
      logMsg(">vbuDiskSize\n");

    /* and save it in the structure for future reference like cleanup */
    pipeFd = pVbu->diskSizePipeFd;

    if (vbuDebugFlags & 0x10)
      *vbuDebugPtr = 0x20;

    /* blocking read on the pipe, wait until ISR says there's something */
    nBytes = read(pipeFd, &pipeMsg, sizeof(struct VBU_MESSAGE));

    sscanf(&pipeMsg.buffer, "%ld %[^'\n']", &pVbu->diskSize, pVbu->description);

/*
                position(17,1);
                logMsg("Description = %s\n", pVbu->description);
                logMsg("disk Size = %d\n", pVbu->diskSize);

*/
                imageNum = findFirstFitImageBlock(pVbu->diskSize, 0);

    bzero(completeFileName, sizeof(completeFileName));
    bzero(diskName, sizeof(diskName));
    strcat(completeFileName, BOOT_DISK);
    strcat(completeFileName, IMAGE_FILE);

    imageFile = fopen(completeFileName, "r+b");

    if (!(imageFile)) {
      printErrMsg(15,1,"Error opening Image File from vbuDiskSize!!");
      vbuCleanUp(pVbu);
      return(ERROR);
    }

    fseek(imageFile,
         sizeof(masterElement)+ (imageNum*sizeof(tempImageElem)),SEEK_SET);
    nbytes = fread(&tempImageElem, sizeof(struct imageHeader), 1, imageFile);

    sprintf(diskName, "%s%s%d%s", BOOT_DISK, "image", imageNum + 1 , ".cnf");

    /* spawn the config data task */
    vbu.configDataTaskId = taskSpawn("tVbuConfigData", 75,
                        VX_FP_TASK | VX_DEALLOC_STACK, 0x80000,
                        (FUNCPTR) vbuConfigData, &diskName, &vbu);

    status = vbuWriter(pVbu, tempImageElem.startingLocation);

                if(status == ERROR) {
                        printErrMsg(15,1,"Error encountered during copy!");
      printErrno(errnoGet());
      ioctl(fileno(imageFile), FIOFLUSH, one);
      fclose(imageFile);
      delay(5);
      vbuCleanUp(pVbu);
      return(ERROR);
    } else {
      tempImageElem.partition1Start = pVbu->partition1Start;
      tempImageElem.partition1Start = pVbu->partition1Start;
      tempImageElem.partition2Start = pVbu->partition2Start;
      tempImageElem.partition3Start = pVbu->partition3Start;
      tempImageElem.partition4Start = pVbu->partition4Start;
```

```
    tempImageElem.imageSize = pVbu->numBytesWritten;
                    bfill(tempImageElem.description, 80, ' ');
    bcopy(pVbu->description, tempImageElem.description,
                                        strlen(pVbu->description));
                    tempImageElem.description[strlen(pVbu->description)] = NULL;

    fseek(imageFile,
        sizeof(masterElement)+ (imageNum*sizeof(tempImageElem)),SEEK_SET);
    nbytes = fwrite(&tempImageElem, sizeof(struct imageHeader), 1, imageFile);

    ioctl(fileno(imageFile), FIOFLUSH, one);
    fflush(imageFile);
    fclose(imageFile);
                    delay(5);
                    eraseToEOL(16);
                    gotoYX(16,1,"I'm finished.  Please wait while I close down ...");
    vbuCleanUp(pVbu);
                    delay(2);
                    eraseToEOL(13);
                    eraseToEOL(14);
                    eraseToEOL(15);
                    eraseToEOL(16);
                    gotoYXBlink(5,1,"Completed... ");
                    gotoYX(16,1,"I'm done now...  You may shut me off.");
                    delay(2);
                    shellPromptSet("-> ");
    return(OK);
  }

    return(OK);
 }

int vbuCalibrate2(pVbu)
  struct VBU_STRUCT *pVbu;

 {

   int ix, pipeFd, fileFd, nBytes;
   struct VBU_MESSAGE pipeMsg;
   UINT32 numBytesToWrite = 0;
   UINT32 dataInBuffer = 0, numFrames = 1;
             char   diskBuffer[33 * VBU_WINDOW_SIZE];
             char   *bufPtr;

   if (vbuDebugFlags & 0x1)
     logMsg(">vbuCalibrate\n");

   /* and save it in the structure for future reference like cleanup */
   pipeFd = pVbu->calibrationPipeFd;

             bufPtr = (char *) diskBuffer;

   /* open the disk file */
   if ((fileFd=open("/sd0/calib.dat", O_RDWR)) == ERROR) {
                    if((fileFd=open("/sd0/calib.dat", O_RDWR|O_CREAT)) == ERROR) {
       logMsg("Could not open calibration file for writing!\n");
       return(ERROR);
                    }
   }

   /* and save it in the structure for future reference like cleanup */
   pVbu->calibrationFileFd = fileFd;

   /* Forever */
   while(1) {

     if (vbuDebugFlags & 0x10)
       *vbuDebugPtr = 0x20;

     /* blocking read on the pipe, wait until ISR says there's something */
     nBytes = read(pipeFd, &pipeMsg, sizeof(struct VBU_MESSAGE));

     if (vbuDebugFlags & 0x10)  /* how long have we waited? */
       *vbuDebugPtr = 0x21;

     /* if the bufferAddr == -1 then we've hit the end and should
      * shut everything down
      */
```

```
if (pipeMsg.length == -1) {
                                if (dataInBuffer)
                                        nBytes = write(fileFd, &diskBuffer, dataInBuffer);
  close(fileFd);
  return(OK);
}

                        if (pipeMsg.length < 81) {
                                eraseToEOL(15);
  gotoYX(15, 1, pipeMsg.buffer);
} else {

  for (ix = 0; ix < pipeMsg.length; ix++) {
                                *bufPtr = pipeMsg.buffer[ix];
                                  bufPtr++;
                                  dataInBuffer++;
                        }

                numFrames++;

  if (numFrames == 32) {

    if (vbuDebugFlags & 0x1)
      logMsg("writing %d bytes ...\n", numBytesToWrite);

    if (vbuDebugFlags & 0x10)
      *vbuDebugPtr = 0x21;

    if((nBytes = write(fileFd, &diskBuffer, dataInBuffer)) != dataInBuffer) {
       logMsg("Error writing to Calibrate file!\n");
       close(fileFd);
       return(ERROR);
    }

    if (vbuDebugFlags & 0x10)
      *vbuDebugPtr = 0x22;

                                  dataInBuffer = 0;
                                  numFrames = 1;
                                  bufPtr = (char *) diskBuffer;
  }
                        }
    }
              return(OK);
}

/*********************************************************************
 *
 * vbuCalibrate - This routine handles all of the writing of data out
 *            to a storage media
 *
 * Inputs : pipeName - name of the pipe device for commo from ISR
 *          fileName - name of device to write data out to
 *          pVbu     - pointer to the VBU structure
 *
 * Outputs: buffers written to fileName
 *
 *********************************************************************/

int vbuCalibrate(pVbu)
  struct VBU_STRUCT *pVbu;

  {

    int pipeFd, nBytes;
    struct VBU_MESSAGE pipeMsg;
          UINT32 ix, iy, currentValue;
          char   *bufPtr;
                int     modulo = 0;
                int     aOk = TRUE;

    if (vbuDebugFlags & 0x1)
      logMsg(">vbuCalibrate\n");

    /* and save it in the structure for future reference like cleanup */
    pipeFd = pVbu->calibrationPipeFd;

               /* clear(); */
```

```
    /* Forever */
    while(1) {

      if (vbuDebugFlags & 0x10)
        *vbuDebugPtr = 0x20;

                aOk = TRUE;

      /* blocking read on the pipe, wait until ISR says there's something */
      nBytes = read(pipeFd, &pipeMsg, sizeof(struct VBU_MESSAGE));

      if (vbuDebugFlags & 0x10)  /* how long have we waited? */
        *vbuDebugPtr = 0x21;

      /* if the bufferAddr == -1 then we've hit the end and should
       * shut everything down
       */
      if (pipeMsg.length == -1) {
        return(OK);
      }

                      if (pipeMsg.length < 81) {
                              eraseToEOL(15);
        gotoYX(15, 1, pipeMsg.buffer);
      } else {

  /*  Based on which buffer we are currently using */

        bufPtr = (char *) pipeMsg.buffer;

              currentValue = (UINT8) *bufPtr;

        for (ix = 0; ix < ((int) (VBU_WINDOW_SIZE / BYTES_IN_FRAME)); ix++) {
          for (iy = 0; ix < BYTES_IN_FRAME; ix++) {
                              if (*bufPtr != currentValue) {
                         logMsg("Error in Calibration!\n");
                                                      aOk = FALSE;
                              } else {
                                      bufPtr ++;
                              }
                                              if (!aOk)
                                                      d(bufPtr, 128, 1);
                      }
                      if (currentValue == 128)
                        currentValue = 0;
                      else
                        currentValue <<= 1;
              }

                              if ((modulo == 0) && aOk) {
                                      eraseToEOL(14);
             gotoYX(14,1,"Calibration Success!! Press the PC <Enter> Key...");
                              } else {
                                      modulo %= 10;
                              }
                              modulo++;
                      }

    }
             return(OK);
}

/*********************************************************************
 *
 * vbuCheckSum - This routine calculates the 32-bit checksum for
 *               <numBytes> starting at the address passed
 *
 * Inputs : buffer   - address of buffer in RAM
 *          numBytes - number of bytes to checksum
 *
 * Outputs: calculated checksum info
 *
 *********************************************************************/

UINT32 vbuCheckSum(buffer, numBytes)
  UINT8 *buffer;
  UINT32 numBytes;
  {
```

```
    UINT32 ix, bufferChksum = 0;
    UINT8 *bufPtr = buffer;

    /* for each byte */
    for( ix = 0; ix < numBytes; ix++) {

      /* add the character */
      bufferChksum += (UINT32) *bufPtr;

      /* increment the pointer */
      bufPtr ++;
    }
    printf("The checksum of buffer at address 0x%x for 0x%x bytes was 0x%x\n",
            (UINT32) buffer, numBytes, bufferChksum);
    return(bufferChksum);
  }

/*********************************************************************
 *
 * vbuTestCheckSum8 - This routine calculates a 32-bit checksum for
 *                    <numBytes> and truncates all but the LSB.  That
 *                    value is then compared to the value in
 *                    <numBytes>+1 for a match
 *
 * Inputs : buffer   - address of start in RAM
 *          numBytes - number of bytes to include in checksum
 *
 * Outputs: The checksum and whether it matched or not
 *
 *********************************************************************/

UINT32 vbuTestCheckSum8(buffer, numBytes)
  UINT8 *buffer;
  UINT32 numBytes;
  {

    UINT32 ix, bufferChksum = 0;
    UINT8 *bufPtr = buffer;

    /* add up the checksum for numbytes */
    for( ix = 0; ix < numBytes; ix++) {
      bufferChksum += (UINT32) *bufPtr;
      bufPtr ++;
    }

    /* The next character position has the source calculated 8-bit checksum */
    if ((bufferChksum & 0xff) != (*bufPtr & 0xff)) {
      printf("Checksum Failed!\n");
      printf("The checksum of buffer at address 0x%x for 0x%x bytes was 0x%x\n",
              (UINT32) buffer, numBytes, (UINT32) (bufferChksum & 0xff));
      printf("The checksum in the data @ address 0x%x was 0x%x\n",
              (UINT32) bufPtr, (UINT32)(*bufPtr & 0xff));
    }
    else
      printf(" Checksummed OK\n");
    return(bufferChksum);
  }

/*********************************************************************
 *
 * vbuTestCheckSum32 - This routine calculates a 32-bit checksum for
 *                     <numBytes>.  That value is then compared to the
 *                     value in <numBytes>+1 through <numBytes>+4 for
 *                     a match
 *
 * Inputs : buffer   - address of start in RAM
 *          numBytes - number of bytes to include in checksum
 *
 * Outputs: The checksum and whether it matched or not
 *
 *********************************************************************/

UINT32 vbuTestCheckSum32(buffer, numBytes)
  UINT8 *buffer;
  UINT32 numBytes;
  {
```

```
  UINT32 ix, bufferChksum = 0;
  UINT8 *bufPtr = buffer;
  UINT32 *checkSumPtr;
  UINT32 reversedCheckSum =0;

  /* add up the checksum for numbytes */
  for( ix = 0; ix < numBytes; ix++) {
    bufferChksum += (UINT32) *bufPtr;
    bufPtr ++;
  }

  /* The next 4 character positions have the src calculated 32-bit checksum */
  checkSumPtr = (UINT32 *) bufPtr;

  reversedCheckSum |= (*(bufPtr+3) & 0xff) << 24;
  reversedCheckSum |= (*(bufPtr+2) & 0xff) << 16;
  reversedCheckSum |= (*(bufPtr+1) & 0xff) << 8;
  reversedCheckSum |= (*(bufPtr) & 0xff);


  if (!((bufferChksum == (*checkSumPtr)) || (bufferChksum == reversedCheckSum))) {
    printf("Checksum Failed!\n");
    printf("The checksum of buffer at address 0x%x for 0x%x bytes was 0x%x\n",
            (UINT32)buffer, numBytes, (UINT32)(bufferChksum & 0xffffffff));
    printf("The checksum in the data @ address 0x%x was 0x%x\n",
            (UINT32)bufPtr, (UINT32)(*checkSumPtr & 0xffffffff));
  }
  else
    printf(" Checksummed OK\n");
  return(bufferChksum);
}

/*********************************************************************
 *
 * vbuTestScanPattern - This routine scans starting at the address of
 *                      buffer looking to make sure that each byte(s)
 *                      match the pattern given in <pattern>.  An
 *                      error message is printed if there is not a
 *                      match
 *
 * Inputs : buffer        - address of the buffer in RAM for scanning
 *          pattern       - the pattern for comparison
 *          numBytes      - number of bytes to check
 *          bytesInFrame  - number of bytes in each video frame
 *
 * Outputs: error message if pattern doen't match
 *
 *********************************************************************/

UINT32 vbuTestScanPattern(buffer, pattern, numBytes, bytesInFrame)
  UINT8 *buffer;
  UINT32 pattern;
  UINT32 numBytes;
  UINT32 bytesInFrame;
  {

    UINT32 ix, compareSize, status;
    UINT8 *bufPtr = buffer;
    UINT8  patternSet;
    UINT8  bitPattern8, display8Bit;
    UINT16 bitPattern16, display16Bit;
    UINT32 bitPattern32, display32Bit;

    patternSet = 0;

    /* is it a 1 byte pattern? */
    if ((pattern & 0xff) == pattern) {
      compareSize = 1;
      bitPattern8 = pattern & 0xff;
      patternSet = 1;
    }

    /* is it a 2 byte pattern? */
    if (((pattern & 0xffff) == pattern) && !patternSet){
      compareSize = 2;
      bitPattern16 = pattern & 0xffff;
      patternSet = 1;
    }
```

```
/* is it a 4 byte pattern? */
if (((pattern & 0xffffffff) == pattern) && !patternSet){
  compareSize = 4;
  bitPattern32 = pattern & 0xffffffff;
  patternSet = 1;
}

if (vbuDebugFlags & 0x20)
  logMsg("compareSize = %d\n", compareSize);

/* move through the buffer comparsize bytes at a time */
for( ix = 0; ix < numBytes; ix+= compareSize) {
  switch (compareSize) {

    case 1:  /* byte at a time */

      /* do the comparison */
      status = memcmp(&bitPattern8, bufPtr, compareSize);

      if (vbuDebugFlags & 0x20)
        logMsg("bitPattern8 = 0x%x  *bufPtr = 0x%x status = %d\n",
               bitPattern8, *bufPtr, status);

      /* if it's not a 0 then we have a mismatch */
      if (status != 0) {
          memcpy(&display8Bit, bufPtr, compareSize);
          printf("Error @ 0x%x (offset 0x%x) value: 0x%x, Frame pos %d\n",
                  (UINT32)bufPtr, (UINT32)(bufPtr - buffer),
                  (UINT32)(display8Bit & 0xff),
                  (UINT32) ((bufPtr - buffer) % bytesInFrame));
      }
      break;

    case 2: /* word at a time */

      /* do the comparison */
      status = memcmp(&bitPattern16, bufPtr, compareSize);

      /* if it's not a 0 then we have a mismatch */
      if (status != 0) {
          memcpy(&display16Bit, bufPtr, compareSize);
          printf("Error @ 0x%x (offset 0x%x) value: 0x%x, Frame pos %d\n",
                  (UINT32) bufPtr, (UINT32) (bufPtr - buffer),
                  (UINT32) (display16Bit & 0xffff),
                  (UINT32) ((bufPtr - buffer) % bytesInFrame));
      }
      break;

    case 4: /* double word at a time */

      /* do the comparison */
      status = memcmp(&bitPattern32, bufPtr, compareSize);

      /* if it's not a 0 then we have a mismatch */
      if (status != 0) {
          memcpy(&display32Bit, bufPtr, compareSize);
          printf("Error @ 0x%x (offset 0x%x) value: 0x%x, Frame pos %d\n",
                  (UINT32) bufPtr, (UINT32) (bufPtr - buffer),
                  (UINT32) (display32Bit & 0xffffffff),
                  (int) ((bufPtr - buffer) % bytesInFrame));
      }
      break;

    default:  /* they tried somthing other than 8, 16 or 32 bits */
      printf("Unsupported pattern size!  Sizes are 8, 16, 32 bits.\n");
      return(ERROR);
  }

  /* move to the next target */
  bufPtr += (UINT8) compareSize;

}
return(pattern);
}

/**********************************************************************
 *
```

```
 * vbuDumpToFile - This routine copies <amount> bytes from the <source>
 *                 to the <dest>. A <-1> amount means go to the source
 *                 and dump all of the bytes listed in the source.
 *
 * Inputs : source - name of the source device/file
 *          dest   - name of the destination device/file
 *          amount - number of bytes to copy (-1 = all)
 *
 * Outputs: a file copy of the source
 *
 ********************************************************************/

int vbuDumpToFile(source, dest, amount)
  char *source;
  char *dest;
  int  amount;

  {
    int srcFd, destFd, nbytesRead, nbytesWritten, numBytesExpected;
    UINT32 numBytesTotal, numBytesToGo, numBytesRead = 0;
    UINT8 *tempBuf;


    /* open the source file */
    if ((srcFd=open(source, O_RDWR)) == ERROR) {
      printf("Could not open source file for reading!\n");
      return(ERROR);
    }

    /* open the destination file */
    if ((destFd=open(dest, O_CREAT | O_WRONLY)) == ERROR) {
      printf("Could not open destination file for writing!\n");
      return(ERROR);
    }

    /* seek to 0 to read the byte count */
    ioctl(srcFd, FIOSEEK, 0);

    /* how many bytes do we have in the file? */
    /* if the passed amount is < 0 then send the entire file */
    if((read(srcFd, &numBytesTotal, sizeof(UINT32))) != sizeof(UINT32)) {
      printf("Could not read source file size!\n");
      return(ERROR);
    }
    else {
      if (amount != -1) {
        numBytesTotal = amount;
      }

      printf("Copying 0x%x bytes from %s to %s...\n", numBytesTotal,
              source, dest);
    }

    /* set up a temporary read buffer */
    tempBuf = (UINT8 *) malloc(XFER_BUFFER_SIZE);

    /* seek past byte count */
    ioctl(srcFd, FIOSEEK, sizeof(UINT32));

    numBytesToGo = numBytesTotal;

    /* while we still have bytes to read */
    while (numBytesToGo) {

      /* more bytes than will fit in a buffer */
      if (numBytesToGo >= XFER_BUFFER_SIZE) {
        nbytesRead = read(srcFd, tempBuf, XFER_BUFFER_SIZE);
        numBytesExpected = XFER_BUFFER_SIZE;
      }
      else {
        /* less than a full buffer worth left */
        nbytesRead = read(srcFd, tempBuf, numBytesToGo);
        numBytesExpected = numBytesToGo;
      }

      /* make sure that the read was successful */
      if (nbytesRead != numBytesExpected)
        printf("Size error in transfer...  nbytesRead = %d\n", nbytesRead);
```

```
      /* write them out */
      nbytesWritten = write(destFd, &tempBuf, numBytesExpected);

      /* and make sure they were writte */
      if (nbytesWritten != numBytesExpected)
        printf("Size error in transfer...  nbytesWritten= %d\n", nbytesWritten);

      /* adjust pointers */
      numBytesRead += nbytesRead;
      numBytesToGo -= nbytesRead;

      /* seek to new location for next read */
      ioctl(srcFd, FIOSEEK, numBytesRead);
    }

    /* flush the bytes to the output file */
    ioctl(destFd, FIOFLUSH);

    /* close everything and free the temporary buffer */
    close(destFd);
    close(srcFd);
    free(tempBuf);
    return(OK);
  }

/*********************************************************************
 *
 * vbuLoadBuffer - This routine goes to <fileName> starting at
 *                 <startingPoint> and reads <bufSize> bytes into
 *                 a dynamically allocated buffer.  That buffer
 *                 address is returned.
 *
 * Inputs : fileName      - name of the source device/file
 *          bufSize       - size of the buffer to read from the source
 *          startingPoint - offset from the beginning of the file
 *
 * Outputs: pointer to the just malloced and filled buffer
 *
 *********************************************************************/

char *vbuLoadBuffer(fileName, bufSize, startingPoint)
  char *fileName;
  UINT32 bufSize;
  UINT32 startingPoint;
  {
    char *bufPtr;
    int bufFd, numBytes;

    /* open the source file */
    if ((bufFd = open(fileName, O_RDWR)) == ERROR) {
      printf("Could not open file %s!\n", fileName);
      return(NULL);
    }

    /* malloc a buffer of size bufSize */
    if ((bufPtr = (UINT8 *) malloc(bufSize)) == NULL) {
      printf("Error in mallocing 0x%x bytes!\n", bufSize);
      return(NULL);
    }

    /* seek past byte count and go to our starting point */
    ioctl(bufFd, FIOSEEK, sizeof(int) + startingPoint);

    /* read the bytes into the buffer */
    numBytes = read(bufFd, bufPtr, bufSize);

    /* check for error on read */
    if (numBytes != bufSize) {
      printf("Error on reading file!\n");
      close(bufFd);
      free(bufPtr);
      return(NULL);
    }

    /* close the file */
    close(bufFd);
```

```
    /* return a pointer to the buffer we just read */
    return((char *) bufPtr);
  }

/*******************************************************************
 *
 * vbuRollingCheckSum32 - calculates a 32-bit checksum for <numBlocksToCheck>
 *                        data block of size <blockSize> starting at
 *                        the address of <buffer>.  The next 4 bytes
 *                        (unsigned long int) will be used for comparison
 *
 * Inputs : buffer           - address to start at
 *          numBlocksToCheck - number of blocks to check
 *          blockSize        - number of bytes per block
 *
 * Outputs: error message if block's checksum doesn't match the data
 *
 *******************************************************************/

VOID vbuRollingCheckSum32(buffer, numBlocksToCheck, blockSize)
  char *buffer;
  int   numBlocksToCheck, blockSize;
  {
    int ix;
    char *bufPtr = buffer;

    /* run through numBlocksToCheck blocks */
    for (ix = 0; ix < numBlocksToCheck; ix++) {
      printf("\nChecking block #%d (offset 0x%x) ...", ix, ix * (blockSize+4));

      /* call the checksum routine */
      vbuTestCheckSum32(bufPtr, blockSize);

      /* move past current block and the checksum field */
      bufPtr += (blockSize + 4);

      /* give us a chance to read it */
      taskDelay(sysClkRateGet()*vbuReadDelay);
    }
  }

/*******************************************************************
 *
 * vbuRollingCheckSum8 - calculates a 32-bit checksum for <numBlocksToCheck>
 *                       data block of size <blockSize> starting at
 *                       the address of <buffer>.  The byte
 *                       (unsigned char) will be used for comparison
 *
 * Inputs : buffer           - address to start at
 *          numBlocksToCheck - number of blocks to check
 *          blockSize        - number of bytes per block
 *
 * Outputs: error message if block's checksum doesn't match the data
 *
 *******************************************************************/

VOID vbuRollingCheckSum8(buffer, numBlocksToCheck, blockSize)
  char *buffer;
  int   numBlocksToCheck, blockSize;
  {
    int ix;
    char *bufPtr = buffer;

    /* run through numBlocksToCheck blocks */
    for (ix = 0; ix < numBlocksToCheck; ix++) {
      printf("\nChecking block #%d (offset 0x%x) ...", ix, ix * (blockSize+1));

      /* call the checksum routine */
      vbuTestCheckSum8(bufPtr, blockSize);

      /* move past current block and the checksum field */
      bufPtr += (blockSize + 1);

      /* give us a chance to read it */
      taskDelay(sysClkRateGet()*vbuReadDelay);
    }
  }
```

```
/*********************************************************************
 *
 * vbuCalcBERFromRAM - produce bit error rate (BER) statistics based
 *                     on comparing <numBytesToCheck> bytes to the
 *                     <pattern> starting at <buffer>'s address
 *
 * Inputs : buffer          - the address in RAM to start the comparison
 *          numBytesToCheck - number of bytes to scan for the pattern
 *          pattern         - the pattern to scan for
 *
 * Outputs: BER statistics
 *
 *********************************************************************/

VOID vbuCalcBERFromRAM(buffer, numBytesToCheck, pattern)
  char *buffer;
  UINT32   numBytesToCheck;
  UINT8    pattern;
  {
    int ix;
    char *bufPtr = buffer;
    UINT8 patternArray[BITS_IN_BYTE];
    UINT8 mask = 0x0;
    UINT32 tempValue;
    UINT32 bitsInError = 0;
    UINT32 errorHistogramArray[BYTES_IN_FRAME];

    for (ix = 0; ix <BYTES_IN_FRAME; ix++)
      errorHistogramArray[ix] = 0;

    for (ix = 0; ix <BITS_IN_BYTE; ix++) {
      patternArray[ix]=
           ((pattern << ix) | ((pattern & mask) >> (BITS_IN_BYTE-ix))) & 0xff;
      if (vbuDebugFlags & 0x40)
        printf("patternArray[%d] = 0x%x\n", ix, patternArray[ix]);
      mask |= 0x1 << ((BITS_IN_BYTE-1)-ix);
    }

    printf("Working...");

    for (ix = 0; ix <= numBytesToCheck; ix ++) {

      if ((ix % DOT_PRINT_RATE) == 0)
        printf(".");

      if ((*bufPtr & 0xff) == patternArray[0]) {
        bufPtr++;
        continue;
      }

      if ((*bufPtr & 0xff) == patternArray[1]) {
        bufPtr++;
        continue;
      }

      if ((*bufPtr & 0xff) == patternArray[2]) {
        bufPtr++;
        continue;
      }

      if ((*bufPtr & 0xff) == patternArray[3]) {
        bufPtr++;
        continue;
      }

      if ((*bufPtr & 0xff) == patternArray[4]) {
        bufPtr++;
        continue;
      }

      if ((*bufPtr & 0xff) == patternArray[5]) {
        bufPtr++;
        continue;
      }

      if ((*bufPtr & 0xff) == patternArray[6]) {
        bufPtr++;
        continue;
```

```
      }

      if ((*bufPtr & 0xff) == patternArray[7]) {
        bufPtr++;
        continue;
      }

      if (vbuDebugFlags & 0x80)
        printf("\nAddress 0x%x (offset 0x%x) byte pattern 0x%x\n",
                (UINT32) bufPtr, ix,  (UINT32) (*bufPtr & 0xff));

      tempValue = ((UINT32) bufPtr % BYTES_IN_FRAME);
      errorHistogramArray[tempValue]++;
      bitsInError++;
      bufPtr++;
    }

    printf("\n\nThe error position histogram breaks out as follows:\n\n");
    for (ix =0; ix < BYTES_IN_FRAME; ix++) {
      printf("Position # %2d: %4d errors -> %5.2f%% of total\n", ix+1,
             errorHistogramArray[ix], (float) ((float) errorHistogramArray[ix]/
             (float) bitsInError) * 100.0);
    }

    printf("\nThere were %d bit errors detected in 0x%x (%ld) bytes.\n",
           bitsInError, numBytesToCheck, numBytesToCheck);
    printf("That is a BER of %f \n",
        (float) (float) bitsInError / (float) (numBytesToCheck *8));

  }

/*********************************************************************
 *
 * vbuCalcBERFromDisk - produce bit error rate (BER) statistics based
 *                      on comparing <numBytesToCheck> bytes to the
 *                      <pattern> starting at the beginning of <fileName>
 *
 * Inputs : fileName        - name of the device/file to use
 *          numBytesToCheck - number of bytes to scan for the pattern
 *          pattern         - the pattern to scan for
 *
 * Outputs: BER statistics
 *
 *********************************************************************/

int vbuCalcBERFromDisk(fileName, numBytesToCheck, pattern)
  char    *fileName;
  UINT32   numBytesToCheck;
  UINT8    pattern;
  {
    int ix;
    char *bufPtr;
    UINT8 patternArray[BITS_IN_BYTE];
    UINT8 srcFd, mask = 0x0;
    UINT32 tempValue, numBytesToGo, numBytesExpected;
    UINT32 numBytesTotal, nbytesRead;
    UINT32 numBytesRead = 0, bitsInError = 0;
    UINT32 errorHistogramArray[BYTES_IN_FRAME];
    char *tempBuf;

    for (ix = 0; ix <BYTES_IN_FRAME; ix++)
      errorHistogramArray[ix] = 0;

    for (ix = 0; ix <BITS_IN_BYTE; ix++) {
      patternArray[ix]=
           ((pattern << ix) | ((pattern & mask) >> (BITS_IN_BYTE-ix))) & 0xff;
      if (vbuDebugFlags & 0x40)
        printf("patternArray[%d] = 0x%x\n", ix, patternArray[ix]);
      mask |= 0x1 << ((BITS_IN_BYTE-1)-ix);
    }

    /* open the source file */
    if ((srcFd=open(fileName, O_RDWR)) == ERROR) {
      printf("Could not open source file for reading!\n");
      return(ERROR);
    }

    /* seek to 0 to read the byte count */
```

```
ioctl(srcFd, FIOSEEK, 0);

/* how many bytes do we have in the file? */
/* if the passed amount is < 0 then send the entire file */
if((read(srcFd, &numBytesTotal, sizeof(UINT32))) != sizeof(UINT32)) {
  printf("Could not read source file size!\n");
  return(ERROR);
}
else {
  if (numBytesToCheck != -1) {
    numBytesTotal = numBytesToCheck;
  }

  printf("Checking BER for 0x%x bytes ...\n", numBytesTotal);
}

/* set up a temporary read buffer */
tempBuf = (UINT8 *) malloc(BER_BUFFER_SIZE);

/* seek past byte count */
ioctl(srcFd, FIOSEEK, sizeof(UINT32));

numBytesToGo = numBytesTotal;

printf("Working...");

/* while we still have bytes to read */
while (numBytesToGo) {

  ioctl(srcFd, FIOSEEK, numBytesRead + sizeof(UINT32));

  /* more bytes than will fit in a buffer */
  if (numBytesToGo >= BER_BUFFER_SIZE) {
    nbytesRead = read(srcFd, tempBuf, BER_BUFFER_SIZE);
    numBytesExpected = BER_BUFFER_SIZE;
  }
  else {
    /* less than a full buffer worth left */
    nbytesRead = read(srcFd, tempBuf, numBytesToGo);
    numBytesExpected = numBytesToGo;
  }

  /* make sure that the read was successful */
  if (nbytesRead != numBytesExpected)
    printf("Size error in transfer...  nbytesRead = %d\n", nbytesRead);

  if (vbuDebugFlags & 0x80)
    printf("numBytesRead =  0x%x , nbytesRead = 0x%x\n", numBytesRead,
              nbytesRead);

  numBytesToGo -= nbytesRead;
  numBytesRead += nbytesRead;

  bufPtr = tempBuf;

  for (ix = 0; ix < numBytesExpected; ix ++) {

    if ((ix % DOT_PRINT_RATE) == 0)
      printf(".");

    if ((*bufPtr & 0xff) == patternArray[0]) {
      bufPtr++;
      continue;
    }

    if ((*bufPtr & 0xff) == patternArray[1]) {
      bufPtr++;
      continue;
    }

    if ((*bufPtr & 0xff) == patternArray[2]) {
      bufPtr++;
      continue;
    }

    if ((*bufPtr & 0xff) == patternArray[3]) {
      bufPtr++;
      continue;
```

```
      }

      if ((*bufPtr & 0xff) == patternArray[4]) {
        bufPtr++;
        continue;
      }

      if ((*bufPtr & 0xff) == patternArray[5]) {
        bufPtr++;
        continue;
      }

      if ((*bufPtr & 0xff) == patternArray[6]) {
        bufPtr++;
        continue;
      }

      if ((*bufPtr & 0xff) == patternArray[7]) {
        bufPtr++;
        continue;
      }

      if (vbuDebugFlags & 0x80)
        printf("\nAddress 0x%x byte pattern 0x%x\n",
              (numBytesRead - nbytesRead) + (UINT32) ix, *bufPtr & 0xff);

      tempValue = ((UINT32) bufPtr % BYTES_IN_FRAME);
      errorHistogramArray[tempValue]++;
      bitsInError++;
      bufPtr++;
    }
  }
  printf("\n\nThe error position histogram breaks out as follows:\n\n");
  for (ix =0; ix < BYTES_IN_FRAME; ix++) {
    printf("Position # %2d: %4d errors -> %5.2f%% of total\n", ix+1,
          errorHistogramArray[ix], (float) ((float) errorHistogramArray[ix]/
          (float) bitsInError) * 100.0);
  }

  printf("\nThere were %d bit errors detected in 0x%x (%ld) bytes.\n",
        bitsInError, numBytesTotal, numBytesTotal);
  printf("That is a BER of %f \n",
      (float) (float) bitsInError / (float) (numBytesToCheck *8));

  free(tempBuf);
  close(srcFd);
  return(OK);

}

/*********************************************************************
 *
 * vbuReset - writes the value specified in the LSb of the specified
 *            parameter to the control word reset bit, then writes the
 *            control word to the board. This function is re-entrant,
 *            but not ISR callable
 *
 * Inputs : value - On/off setting of the bit
 *
 * Outputs: returns current value of control word
 *
 *********************************************************************/
int vbuReset(int value, struct VBU_STRUCT *vbuPtr)
{

  /* take the control reg protection semaphore */

  semTake(vbuPtr->controlRegSem, WAIT_FOREVER);

  if(value & 1)
    {
      vbuPtr->controlWord |= VBU_RESET_BIT;
    }
  else
    {
      vbuPtr->controlWord &= ~VBU_RESET_BIT;
    }
```

```
  *vbuPtr->statusReg = vbuPtr->controlWord;

  semGive(vbuPtr->controlRegSem);

  return(vbuPtr->controlWord);
}

/*********************************************************************
 *
 * vbuIntEnable - writes the value specified in the LSb of the specified
 *            parameter to the control word reset bit, then writes the
 *            control word to the board. This function is re-entrant,
 *            but not ISR callable
 *
 * Inputs : value - On/off setting of the bit
 *
 * Outputs: returns current value of control word
 *
 *********************************************************************/
int vbuIntEnable(int value, struct VBU_STRUCT *vbuPtr)
{

  /* take the control reg protection semaphore */

  semTake(vbuPtr->controlRegSem, WAIT_FOREVER);

  if(value & 1)
    {
      vbuPtr->controlWord |= VBU_INT_ENABLE_BIT;
    }
  else
    {
      vbuPtr->controlWord &= ~VBU_INT_ENABLE_BIT;
    }

  *vbuPtr->statusReg = vbuPtr->controlWord;

  semGive(vbuPtr->controlRegSem);

  return(vbuPtr->controlWord);
}

/*********************************************************************
 *
 * vbuIntSpeed - writes the value specified in the LSb of the specified
 *            parameter to the control word reset bit, then writes the
 *            control word to the board. This function is re-entrant,
 *            but not ISR callable
 *
 * Inputs : value - On/off setting of the bit
 *
 * Outputs: returns current value of control word
 *
 *********************************************************************/
int vbuIntSpeed(int value, struct VBU_STRUCT *vbuPtr)
{

  /* take the control reg protection semaphore */

  semTake(vbuPtr->controlRegSem, WAIT_FOREVER);

  if(value & 1)
    {
      vbuPtr->controlWord |= VBU_INT_SPEED_BIT;
    }
  else
    {
      vbuPtr->controlWord &= ~VBU_INT_SPEED_BIT;
    }

  *vbuPtr->statusReg = vbuPtr->controlWord;

  semGive(vbuPtr->controlRegSem);

  return(vbuPtr->controlWord);
}
/*********************************************************************
```

```
 *
 * vbuIntLevel - writes the value specified in the 3 LSb's of the specified
 *             parameter to the control word reset bit, then writes the
 *             control word to the board. This function is re-entrant,
 *             but not ISR callable
 *
 * Inputs : value - On/off setting of the bit
 *
 * Outputs: returns current value of control word
 *
 *********************************************************************/
int vbuIntLevel(int value, struct VBU_STRUCT *vbuPtr)
{

  /* take the control reg protection semaphore */

  semTake(vbuPtr->controlRegSem, WAIT_FOREVER);

  vbuPtr->controlWord = ((value & 7) | (vbuPtr->controlWord & ~7));

  *vbuPtr->statusReg = vbuPtr->controlWord;

  semGive(vbuPtr->controlRegSem);

  return(vbuPtr->controlWord);
}


/*********************************************************************
 *
 * vbuWriteControlReg -writes the 16 LSB's of value to the
 *                     control register and the global copy of the
 *                     control word. This function is re-entrant, but
 *                     not ISR callable
 *
 * Inputs : value - value to be written
 *          vbuPtr - pointer to target vbu control struct
 *
 * Outputs: returns current value of control word
 *
 *********************************************************************/
UINT16 vbuWriteControlReg(int value, struct VBU_STRUCT *vbuPtr)
  {
  semTake(vbuPtr->controlRegSem, WAIT_FOREVER);

  *vbuPtr->statusReg = vbuPtr->controlWord;

  semGive(vbuPtr->controlRegSem);

  return(vbuPtr->controlWord);
}

void vbuDebug()
{
  vbuConfig("/sd1/", 0, 0xa0, 4, 0x3d, 64);
}
```

vbuMenu.c

```
/***************************************************************************/
/*                  VBU Backup Unit User Interface Routines               */
/*                                                                         */
/***************************************************************************/
/* needed for access to some of the SCSI specific routines from sbuDrv.c  */
#define SCSI_EXTERN extern

#include "backup.h"

/* get cursor positioning and user I/O routines declarations              */
#include "screenUtils.h"

/* get generic image management I/O routine declarations                 */
#include "backupUtils.h"

/* Get SCSI backup unit specific routine declarations                     */
#include "sbuDrv.h"

extern STATUS vbuConfig();
extern STATUS termDiskSize();

STATUS vbuMainMenu();

extern char userResponse;
extern int  imageFd;
extern int  scsiConfigDone;
extern struct VBU_STRUCT vbu;
int   vbuBackupDone = FALSE;
int   vbuConfigDone = FALSE;

VOID startVbuUp()
  {
    ULONG shellTaskId, rloginTaskId, telnetTaskId;

    rloginTaskId = taskNameToId("tRlogind");
    telnetTaskId = taskNameToId("tTelnetd");
    shellTaskId = taskNameToId("tShell");
    taskPrioritySet(shellTaskId, 2);
    taskPrioritySet(telnetTaskId, 3);
    taskPrioritySet(rloginTaskId, 3);
    taskSpawn("vbuBackup", 1, VX_DEALLOC_STACK|VX_FP_TASK, 0x6000,
              vbuMainMenu);
  }

STATUS  vbuMainMenu()
  {

    int userInputLoop, numExtraChars, currentPrintPos;
    char ch;

    while (TRUE) {
      userInputLoop = TRUE;
      while (userInputLoop) {
        clear();
        gotoYX(1, 20, "Video Backup System");
        gotoYX(3, 12, "Options:");
        gotoYX(5, 17, "1) Start Backup using Video Port");
        if ( vbuConfigDone)
          gotoYX(5, 1, "Waiting on PC");
        if ( vbuBackupDone)
          gotoYX(5, 1, "Completed");
        gotoYX(6, 17, "2) Configure SCSI Bus (Needed for Restore)");
        if (scsiConfigDone)
          gotoYX(6, 1, "Completed");
        gotoYX(7, 17, "3) Display SCSI Device Summary");
        gotoYX(8, 17, "4) Disk Image Maintenance");
        gotoYX(9, 17, "5) Low-level Disk Functions");
        gotoYX(10, 17, "6) Emergency VBU Shutdown ");
        gotoYX(11, 17, "E) Exit ");
        eraseToEOL(13);
        gotoYX(13, 17, "Enter Choice (1-5 or E): ");
        readAndEcho ((char *) &userResponse, 1);
        ioctl(STD_IN, FIONREAD, &numExtraChars);
        if (numExtraChars)
          gobbleUpExtraChars (numExtraChars);
        switch (userResponse) {
          case '1':
                                              vbuConfig("/sd1/", 0, 0xa0, 4, 0x3d, 64);
```

vbuMenu.c 2

```
        vbuConfigDone = TRUE;
        userInputLoop = FALSE;
        break;
      case '2':
        clear();
        initScsiVars();
        scsiConfig();
        scsiConfigDone = TRUE;
        userInputLoop = FALSE;
        break;
      case '3':
        if (scsiConfigDone) {
          currentPrintPos = showScsiBus("Connected SCSI Devices: ",
                                        SHOW_ALL);
          gotoYX(currentPrintPos + 2 , 1, "Press Return when ready: ");
          readAndEcho ((char *) &ch, 1);
          ioctl(STD_IN, FIONREAD, &numExtraChars);
          if (numExtraChars)
            gobbleUpExtraChars (numExtraChars);
        } else {
          printErrMsg(14,1,"You must configure the SCSI Bus First!!!");
        }
        userInputLoop = FALSE;
        break;
      case '4':
        if (scsiConfigDone) {
          userInputLoop = FALSE;
          imageMaintenance();
        } else {
          printErrMsg(14,1,"You must configure the SCSI Bus First!!!");
        }
        break;
      case '5':
        if (scsiConfigDone) {
          userInputLoop = FALSE;
          lowLevelDiskFunctions();
        } else {
          printErrMsg(14,1,"You must configure the SCSI Bus First!!!");
        }
        break;
      case '6':
        userInputLoop = FALSE;
                                          termDiskSize(&vbu, 1);
        break;
      case 'Q':
      case 'q':
      case 'e':
      case 'E':
        userInputLoop = FALSE;
        return(OK);
        break;
      default:
        position(12,0);
        printf("%c",0x7);
        break;
    }
  }
 }
}
```

Page
1

```
//   [ backupDrive.c ]
//
//   Spawns tasks to perform the disk backup
//
////////////////////////////////////////////////////////////////
//(jwm) debug
//
//   The following define will cause the application to delay for
//   one (1) tic, or approximately 3 frames after each frame of
//   valid data is stored in VRAM.  The delay occurs prior to setting
//   the trigger so that we are guarenteed the VBU hardware has time
//   to see the previous frame and store it.
//
#define USING_DELAYS     // define to slow down output with delays
//(jwm) debug


#define READING_DISK     // define to read data from hard drive
#define USING_METER      // define to show progress line


#ifdef __TURBOC__
#include <dir.h>
#else
#include <direct.h>
#endif

#include <graphics.h>   /* graphics & initgraph() */
#include <stdio.h>
#include <stdlib.h>     /* exit() */
#include <stdarg.h>     /* 'va_list' */
#include <conio.h>      /* inp(), clrscr() */
#include <ctype.h>      /* toupper() */
#include <dos.h>        /* declares keep, getvect, & setvect fctns */
#include <io.h>         // filelength()
#include <time.h>       /* time() */
#include <bios.h>       /* getmode(), setvmode(), biostime() */
#include <string.h>     /* movedata() */
#include <alloc.h>      /* farcoreleft() */
#include <mem.h>        /* _fmemcpy() */

#include "vbu.h"        /* VRAM addresses & Frame Offsets */
#include "disk_IO.h"    /* for function disk_IO() */

#include "SmartDrv.H"  /* compatibility with SmartDrive */
#include "RTKernel.H"  /* task management */
#include "ITimer.H"    /* time measurement and control of timer interrupt rate *
/
#include "RTKeybrd.H"  /* interrupt handler for the keyboard */
#include "RTTextio.H"  /* screen window management */
#include "CPUMoni.H"   /* CPU load monitor */
#include "RTCom.H"     /* interrupt-driven serial communications */
#include "KillKey.H"   /* disable dangerouse keyboard input */


#define MAIN_PRIO      5              // backupDrive task priority
#define DISK_PRIO      MAIN_PRIO - 1  // diskRead    task priority
#define VIDEO_PRIO     MAIN_PRIO - 2  // videoWrite  task priority
```

Page
2

```
#define SR0 0x3C2       /* Input Status Reg #0 */
#define SR1 0x3DA       /* Input Status Reg #1 */
#define VRmask 0x0008   /* Vertical Retrace mask */
#define DEnot  0x0001   /* Display Enable NOT mask */

#define FOREVER    for(;;)
#define VR_ACTIVE  (inp(SR1) & VRmask) /* Vertical Retrace Active */
#define HR_ACTIVE  (inp(SR1) & DEnot)  /* Horizontal Retrace Active */


// ****************  P R O T O T Y P E S  *************************
void sendFrame(char far*);
char *decimalString(long unsigned);
void diskRead(void);
void getDiskImage(long, long, long);
void videoWrite(void);
void writScan(int, unsigned *);
int  fdumpHex(FILE *, long, unsigned char far *, unsigned char far *);
int  m_decode(unsigned numWds, unsigned *mBuf, unsigned char *bBuf);
// ****************  P R O T O T Y P E S  *************************


//(jwm)
extern int debugFlag;  // =1 if debugging envoked
FILE *debug;           // file handle for debug output

extern struct RWBLOCK parmBlock;      // allocate mem for RWBLOCK structure
extern struct G_MODE  gStruct;        // allocate mem for G_MODE  structure

extern DRIVE_INFO drive[2];
extern char huge *T_buf;              // farmalloced Disk Transfer buffer
extern unsigned  bufOffset;
extern unsigned  man_lkup[];          // Manchester lookup table
extern long      actSectors;          // actual No. sectors to be used
extern long      totalBytesToTransfer;
extern long      totalFrames;
extern long              dataFramesSent;      // No. frames of data sent
extern long      diskBlocksRead;      // No. disk blocks read
extern long      absSector0;
extern int       graphOpen;
extern int       physicalDrives;
extern int       driveNumber;
extern char      systemIdBuf[];

long             bytesRemaining;      // No. bytes remaining in T_buf
long             outOfBounds = 0L;    // No. times meter was out of bounds
long bytesPerRead = (long)BYTES_PER_READ;

TaskHandle BackupHandle;              // Task handle for backupDrive()
TaskHandle DiskHandle;                // Task handle for diskRead()
TaskHandle VideoHandle;               // Task handle for videoWrite()
Semaphore  Completion;                // Task complete flag
Semaphore  diskComplete;
Semaphore  videoComplete;

int  diskReadFailure = 0;                               // =1 if disk read fai
ls

/*-----------------------------------------------------------------*/
#ifndef DPMI
```

Page 3

```
#define FAIL 3
#ifdef _MSC_VER
void far CriticalError(unsigned dummy1, unsigned dummy2, unsigned far * dummy3)
{
   _hardresume(FAIL);
}
#else
int CriticalError(void)
{
        return FAIL;
}
#endif
#endif


void getDiskImage(long numToRead, long startSec, long actSectors)
/////////////////////////////////////////////
//
//  Returns  0 = Success
//           1 = Disk Read Error
//
/////////////////////////////////////////////
{
        long endFileFlag = 0L;
        long totalBytesRead;    // total No. bytes read from drive
        long absSector  = startSec;
        int  nextBuffer;        // 0 = Read 1st half T_buf, else read 2nd half
        int  status;
        int  loop;
        char far* padPtr;
        int padBytes;

        totalBytesRead = 0L;
        nextBuffer = 0;
        padBytes = 0;

        while(totalBytesRead < numToRead)
        {
                ///////////////////////////////////////////////////////////
                //
                //  Read another block of data into the buffer.
                //
                //  Alternate between the 1st & 2nd half of T_buf[].
                //  (each half contains 'BYTES_PER_READ' bytes)
                ///////////////////////////////////////////////////////////

                switch (nextBuffer)
                {
                        case 0:  //  Read into 1st half of T_buf
                                parmBlock.rwLogical = absSector;
                                parmBlock.rwBuffer  = (char far *) &T_buf[0L];
                                nextBuffer = 1;  // toggle
                                break;

                        case 1:  //  Read into 2nd half of T_buf
                                parmBlock.rwLogical = absSector;
                                parmBlock.rwBuffer  = (char far *) &T_buf[bytesP
erRead];
                                nextBuffer = 0;  // toggle
                                break;
```

```
                }
                //  Read the next block
                #ifdef READING_DISK
                if( (status = disk_IO(LOGICAL, &parmBlock)) != 0)
                {
                        RTKSend(VideoHandle, &endFileFlag);
                        diskReadFailure = 1;
                        printf("\nDISK READ ERROR - STATUS = %d\n", status);
                        printf("Record status value, then hit any key to quit\n"
);
                        fflush(stdin);
                        getch();
                        return;
                }
                #endif READING_DISK
                diskBlocksRead++;

                //(jwm)
                #ifdef NEVER
                {
                        static int firstTime=1;
                        if(firstTime)
                        {
                                firstTime=0;
                                printf("(backupDrive): Called disk_IO() with log
ical sector %ld\n",
                                        parmBlock.rwLogical);

                                dumpHex(64L, (char far*)&T_buf[0], (char far*)"F
irst Buf");
                                fflush(stdin);
                                getch();
                        }
                }
                #endif NEVER

                absSector += actSectors;         // inc by equivalent of one blo
ck
                totalBytesRead += bytesPerRead;  // inc by No. bytes read

                if(totalBytesRead > numToRead)
                {
                        padBytes = totalBytesRead - numToRead;
                        padPtr = parmBlock.rwBuffer + (bytesPerRead - padBytes);

                        for(loop=0; loop < padBytes; loop++)
                        {
                                *padPtr = 0;
                        }
                }

                //  RTKSend blocks until 'backupDrive' is ready to accept data
                //
                RTKSend(VideoHandle, &bytesPerRead);

    } // while(totalBytesRead < bytesToTransfer)

    ////////////////////////////////////////////////////////////////////
```

Page 5

```
   //  Requested No. bytes on drive have now been read.
   //  Some data (at least 'BYTES_PER_READ') remain in the data
   //  buffer (T_buf[]).
   //
        //  Send the End-Of-File flag to backupDrive().
   //  This flag will not actually be read until AFTER the
   //  current message has been processed.
   //
   ///////////////////////////////////////////////////////////////////

   RTKSend(VideoHandle, &endFileFlag);
   return;
}


/*-----------------------------------*/
void diskRead(void)
{
   long numBytesToRead = totalBytesToTransfer;
   long absSector      = absSector0;
   long numSectors     = actSectors;

   while (True)
   {
      ////////////////////////////////////////////////////////////////
      //  Read 'numBtesToRead' off the hard drive and
      //  transmit to back to function backupDrive().
      //
      //  Send read-completion acknowledge to calling task
      //  and wait until acknowledge is received.
      //
      //  After receipt of ack, immediately start reading next
      //  block until 'numBytesToRead' bytes have been read.
      //
      //  'getDiskImage' will return after the last block has
      //  been read and sent to the calling task.
      ////////////////////////////////////////////////////////////////

      getDiskImage(numBytesToRead, absSector, numSectors);
              RTKSignal(diskComplete);
   }

}


/*-----------------------------------*/
#if LDATA
#define DEFAULT_STACK_SIZE  4096
#else
#define DEFAULT_STACK_SIZE  1024
#endif


int backupDrive(void)
{
        int status;
```

Page 6

```
#ifndef DPMI
#ifdef _MSC_VER
_harderr(CriticalError);
#else
harderr(CriticalError);
#endif
#endif

//
//  In a real-time process control application,
//  reliability is of prime importance.
//
//  Therefore, we must avoid letting the program be
//  disprupted by faulty user input.
//
//  For this reason, some 'dangerous' keys are disabled:
//
KillKeyInit();
FilterKeySeq("\x53",             CtrlAltActive);   /* Ctrl-Alt-Del */
FilterKeySeq("\x1D\x45",         StatusTrue);      /* Pause        */
FilterKeySeq("\xE0\x2A\xE0\x37", StatusTrue);      /* Print Screen */
FilterKeySeq("\xE0\x46",         CtrlActive);      /* Ctrl-Break   */
FilterKeySeq("\x2E",             CtrlActive);      /* Ctrl-C       */

//
//    Delayed-write disk cache programs need to be disabled
//    while running RTKernel.  These programs will be
//    re-enabled when the program terminates.
//
SmartDriveInit();

//
//    No need to save 8087 registers unless floating pt math used
//
RTKDefault8087Protection = False;

//
//   Start the  RTKernel
//
BackupHandle = RTKernelInit(MAIN_PRIO);


//ITimerInit();
//RTKeybrdInit();
//RTTextIOInit();
//if(RTKGetTaskStack(RTKCurrentTaskHandle()) < 2500)
//{
//   printf("The stack size of this program should be set to at least\n"

//    "4 kilobytes.  Please re-complile the program.\n");
//   exit(1);
//}
//if(RTKDebugVersion()) RTKSetTraceBufferSize(256);



//(jwm) ?
//   RTKeybrdInit();

//
```

```
        //  To be able to "steal" CPU time even from uncooperative tasks
        //  preemptions and disk-interrupt support are actuvated:
        //
        #ifndef DPMI
        if (RTKLPSemas > 0)     // for preemptions, Library Protection MUST be us
ed
        {
                RTKPreemptionsON();
                RTKDiskIntsON();
        }
        #endif

        //  create completion semaphores
        //
        diskComplete  = RTKCreateSemaphore(Binary, 0, "disk completion");
        videoComplete = RTKCreateSemaphore(Binary, 0, "video completion");


        //  Start the disk-read task
        //
        DiskHandle =
                RTKCreateTask( diskRead, DISK_PRIO, DEFAULT_STACK_SIZE, "Disk Re
ad");

        VideoHandle =
                RTKCreateTask( videoWrite, VIDEO_PRIO, DEFAULT_STACK_SIZE, "Vide
o Write");

        // Block (waiting) till the video task has finished
        //
        RTKWait(videoComplete);

        //  Terminate videoWrite & diskRead tasks if still running
        //
        RTKTerminateTask(&VideoHandle);
        RTKTerminateTask(&DiskHandle);
        /* RTKernel automatically terminates all tasks for you - but still */

        return(0);
}



void videoWrite(void)
{
        extern int  graphOpen;
        extern long bytesPerFrame;

        long unsigned mask8 = 0x000000ffL;
        long diskNotReady = 0L;  // No. times diskRead task caused waiting
        long diskTotal    = 0L;  // Total No. times 'diskRead' task accessed
        long frames       = 0L;  // 32-bit frame counter
        long linesToFill;        // used for percent completed calculations
        long frameBytes;         // = No. bytes per video frame
        long throughPut;         // (bytes/sec) throughPut

        long seconds, minutes;
        long bytesToPad;
        long l;
        long newBytesRead;
```

Page 8

```
      long startTic, stopTic;  // start & end times in tics (1/18 sec)
      long elapsedTics;        // = No. tics of run time
      long wordsPerLine;       // = No. 16-bit wds / scanline
      long part0Sectors;       // = No. sectors to back up in 1st partition
      long part1Sectors;       // = No. sectors to back up in 2nd partition
      long sectorsSent;        // = No. sectors already sent (in partition)
      long sectorsPerFrame;    // = No. sectors per video frame
      long sectorsInPartition; // = No. sectors in next partition

      int  meterWord;          // Value to be stored for 'meter' line
      int  newPartition;       // =TRUE for 1st frame in partition, else =FALS
E
      int  nextBuffer;         // = data buffer toggle
      int  errorCode, saveError;
      int  i;

  unsigned      trigger;    // lsw of frame count
  unsigned char control;    // current value in CONTROL field
  unsigned char far *A_data;
  unsigned far  *man_lkupPtr;
  unsigned far  *vram16;
  unsigned far  *vram16end;
  char     far  *dataBufPtr; // = current data buffer
  char          decimal1[32], decimal2[32];


  part0Sectors = drive[driveNumber-3].part[0].sectors;
       part1Sectors = drive[driveNumber-3].part[1].sectors;
  sectorsPerFrame = bytesPerFrame / 512L;
  sectorsInPartition = part0Sectors;
  sectorsSent = 0L;

  //(jwm)
  //closegraph();

  //printf("driveNumber = %d\n", driveNumber);
  //printf("part0Sectors= %ld\n", part0Sectors);
  //printf("part1Sectors= %ld\n", part1Sectors);
  //printf("sectorsPerFrame    = %ld\n", sectorsPerFrame);
  //printf("sectorsInPartition = %ld\n", sectorsInPartition);
  //fflush(stdin);
  //getch();
  //exit(1);


  wordsPerLine = ((long)gStruct.pixels/16L);
  frameBytes = (long)BYTES_PER_LINE * (long)gStruct.lines;
  // (jwm) need adjustment for other formats

  nextBuffer = 0;          // Initialize buffer toggle
  bufOffset  = 0;          // Offset to next available byte in T_buf
  frames     = 0L;         // initialize 32-bit frame count
  man_lkupPtr= man_lkup;
  meterWord  = *(man_lkupPtr + 0x00FF);


  // Wait for the 1st disk block to be read and sent.
  // (this task blocked till disk read task sends data)
  //
```

Page 9

```
RTKReceive(&newBytesRead, sizeof(newBytesRead));
bytesRemaining += newBytesRead;

//(jwm) - dbug
if(debugFlag)
{
   //  Must skip down a line or two or the debug output will
   //  destroy the contents of the first scanline later on.
   //
   //  fprintf(debug, "\n\nbufOffset = %u\n", bufOffset);
   //  fdumpHex(debug, 64L, (char far*)&T_buf[0], (char far*)"After 1st RTKRe
ceive()");
   }

     ///////////////////////////////////////////////////////////
     //
     //  Copy Requested Disk Image to VRAM for Output to VBU.
     //
     //  Before sending the disk image, send a start flag and
     //  the PC configuration data.
     //
     ///////////////////////////////////////////////////////////

             /*
              * Insure that a complete, unaltered frame goes out.
              * This means that we must wait for the beginning of a frame,
              * Then wait for the end of that same frame
              */

             while(!VR_ACTIVE );      /* continue After VR has finished */
             while( VR_ACTIVE );      /* continue After VR has finished */
             while(!VR_ACTIVE );      /* continue After VR has finished */

     //  Set control word for VBU processor
     //
     control    = (unsigned char)UNDEFINED;
     vram16 = (unsigned far *) MCGA_MEMORY + F_CONTROL;
     *vram16 = *(man_lkupPtr + control);

     //  Get the least significant 16 bits of the trigger
     //  in preparation for the end of vertical retrace
     //
     trigger = *(man_lkupPtr + (frames & mask8) );

     //  Set up word address of the trigger and just
     //  wait for Vertical retrace to finish
     //
     vram16 = (unsigned far *) MCGA_MEMORY + F_TRIGGER;

     //  Set trigger After VR has finished (VR goes Low)
     //
     //  set the least-significant 16-bits of the trigger
     //  and increment address to start of DATA field
     //
     *vram16++ = trigger;
     frames++;

     ////////////////////////////////////////////////////
```

```
//  Just sent control = UNDEFINED
//
//  Now, send control = STARTING
//
        /*
         * Insure that a complete, unaltered frame goes out.
         * This means that we must wait for the beginning of a frame,
         * Then wait for the end of that same frame
         */

        while(!VR_ACTIVE );     /* continue After VR has finished */
        while( VR_ACTIVE );     /* continue After VR has finished */
        while(!VR_ACTIVE );     /* continue After VR has finished */

control    = (unsigned char)STARTING;
vram16 = (unsigned far *) MCGA_MEMORY + F_CONTROL;
*vram16 = *(man_lkupPtr + control);
trigger = *(man_lkupPtr + (frames & mask8) );
vram16 = (unsigned far *) MCGA_MEMORY + F_TRIGGER;
*vram16++ = trigger;
frames++;

///////////////////////////////////////////////////
//  Just sent control = STARTING
//
//  Now, send control = DISK_SIZE
//
//  Need to fill frame with initialization data
//  before sending the trigger.  We can output
//  BYTES_PER_READ = (NUM_LINES*BYTES_PER_LINE)
//                 = 15,360 (for 640x480)
//
//  bytes with each frame sent.
///////////////////////////////////////////////////
{

        char     msgBuf[80];
        unsigned codedBuf[32];
        int      i, j, c;
        int      finished = FALSE;
int      msgBytes, offset;
FILE     *rpt;  // report file handle


sprintf(msgBuf, "%ld %s\n", totalBytesToTransfer, systemIdBuf);

        //(jwm)
//closegraph();
//printf("%s\n", msgBuf);
//fflush(stdin);
//getch();
//closegraph();      // Return to Text mode
//graphOpen = 0;
//clrscr();
//RTKSignal(videoComplete);
//return;


msgBytes = 1 + strlen(msgBuf);
offset = 0;
```

Page 11

```
while( !finished )
{
   for(i=0; i<480; i++)
   {
      for(j=0; j<32; j++)
      {
         if( offset < msgBytes )  // check for end of msg buffer
         {
            //  Get next byte in message buffer
            //
            codedBuf[j] = man_lkup[ msgBuf[offset] ];
            offset++;
         }
         else
         {

            //  No more data in message buffer
                                          //  Zero fill remainder of frame

            //
            //  Leave a flag indicating the job is finished
            //
            finished = TRUE;
            codedBuf[j] = man_lkup[ 0 ];
                                 }

      }  // for(j=0; j<32; j++)

      //  Write this scanline to VRAM
      //
      writScan(i, codedBuf);

   }  // for(i=0; i<480; i++)

   //  Put out the whole frame
   //
         /*
          * Insure that a complete, unaltered frame goes out.
          * This means that we must wait for the beginning of a frame,
          * Then wait for the end of that same frame
          */

         while(!VR_ACTIVE );      /* continue After VR has finished */
         while( VR_ACTIVE );      /* continue After VR has finished */
         while(!VR_ACTIVE );      /* continue After VR has finished */

                 control     = (unsigned char)DISK_SIZE;
  vram16 = (unsigned far *) MCGA_MEMORY + F_CONTROL;
  *vram16 = *(man_lkupPtr + control);
  trigger = *(man_lkupPtr + (frames & mask8) );
  vram16 = (unsigned far *) MCGA_MEMORY + F_TRIGGER;
                 *vram16++ = trigger;
                 frames++;

         }  // while( !finished )
 }

 ////////////////////////////////////////////////////////
 //                                                    //
 //  Delay for 2 seconds for VBU processor to store    //
```

Page 12

```
//  data just sent into a DOS file.                 //
//                                                  //
//////////////////////////////////////////////////////

RTKDelay(18);  // after DISK_SIZE, delay for 1 second


//(jwm)
//fflush(stdin);
//getch();





/////////////////////////////////////////////////////
//  Just sent control = DISK_SIZE
//
//  Now, send control = PC_CONFIG
//
//  Need to fill frame with configuration data
//  before sending the trigger.  We can output
//  (32x480) = 15,360 bytes with each frame sent.
/////////////////////////////////////////////////////
{
        char     errorMsgBuf[64];
        unsigned codedBuf[32];
        int      i, j, c;
        int      finished = FALSE;
        int      msgBytes, offset;
        FILE     *rpt;  // report file handle

        //(jwm) use the compressed file if available
        //if( (rpt = fopen("report.zip", "rb")) == NULL)
        if( (rpt = fopen("report.msd", "rt")) == NULL)
        {
                //  Unable to find the "msd" report file.
                //
                //  This means we can not report it back to user.
                //  (send a notice instead)
                //
                sprintf(errorMsgBuf, "Unable to report results of msd\n"
);

                //  Simulate a file (using the message buffer)
                msgBytes = 1 + strlen(errorMsgBuf);
                offset = 0;

                while( !finished )
                {
                        for(i=0; i<480; i++)
    {
       for(j=0; j<32; j++)
       {
          if( offset < msgBytes )  // check for end of msg buffer
          {
             //  Get next byte in message buffer
             //
             codedBuf[j] = man_lkup[ errorMsgBuf[offset] ];
```

Page 13

```
            }
            else
            {

               //  No more data in message buffer
               //  Zero fill remainder of frame
               //
               //  Leave a flag indicating the job is finished
               //
               finished = TRUE;
               codedBuf[j] = man_lkup[ 0 ];
            }

         }  // for(j=0; j<32; j++)

         //  Write this scanline to VRAM
         //
         writScan(i, codedBuf);

      }  // for(i=0; i<480; i++)

      //  Put out the whole frame
      //
          /*
           * Insure that a complete, unaltered frame goes out.
           * This means that we must wait for the beginning of a frame,
           * Then wait for the end of that same frame
           */

          while(!VR_ACTIVE );      /* continue After VR has finished */
          while( VR_ACTIVE );      /* continue After VR has finished */
          while(!VR_ACTIVE );      /* continue After VR has finished */

                           control     = (unsigned char)PC_CONFIG;
      vram16 = (unsigned far *) MCGA_MEMORY + F_CONTROL;
      *vram16 = *(man_lkupPtr + control);
      trigger = *(man_lkupPtr + (frames & mask8) );
      vram16 = (unsigned far *) MCGA_MEMORY + F_TRIGGER;
                           *vram16++ = trigger;
                           frames++;

          }  // while( !finished )


}
else
{

   // found msd report - send it back to user

   while( !finished )
                {
      for(i=0; i<480; i++)
      {
         for(j=0; j<32; j++)
         {
            if( !feof(rpt) )  //  check for EOF
            {
               //  Get next bytes from report file
               //  Encode & store it for transmission
```

```
                //
                c = fgetc(rpt);   // get next byte from report
                codedBuf[j] = man_lkup[ (unsigned char) c ];

            }
            else
            {

                //  No more data in report file
                //  Zero fill remainder of frame
                //
                //  Leave a flag indicating the job is finished
                //
                finished = TRUE;
                codedBuf[j] = man_lkup[ 0 ];
            }

        }  // for(j=0; j<32; j++)

                                // Write this scanline to VRAM
        //
        writScan(i, codedBuf);

                        }  // for(i=0; i<480; i++)

                        //  Put out the whole frame
    //
        /*
         * Insure that a complete, unaltered frame goes out.
         * This means that we must wait for the beginning of a frame,
         * Then wait for the end of that same frame
         */

        while(!VR_ACTIVE );      /* continue After VR has finished */
        while( VR_ACTIVE );      /* continue After VR has finished */
        while(!VR_ACTIVE );      /* continue After VR has finished */

                        control     = (unsigned char)PC_CONFIG;
    vram16 = (unsigned far *) MCGA_MEMORY + F_CONTROL;
    *vram16 = *(man_lkupPtr + control);
    trigger = *(man_lkupPtr + (frames & mask8) );
    vram16 = (unsigned far *) MCGA_MEMORY + F_TRIGGER;
                        *vram16++ = trigger;
                        frames++;
                }  // while( !finished )
                fclose(rpt);
        }
}

///////////////////////////////////////////////////////
//                                                   //
//  Delay for 2 seconds for VBU processor to store   //
//  data just sent into a DOS file.                  //
//                                                   //
///////////////////////////////////////////////////////

RTKDelay(18);  // after PC_CONFIG, delay for 1 second

//(jwm)
```

Page 15

```
//fflush(stdin);
//getch();

////////////////////////////////////////////////////
     //  Just sent control = PC_CONFIG
//
//  Now, send control = UNDEFINED
     //
            /*
             * Insure that a complete, unaltered frame goes out.
             * This means that we must wait for the beginning of a frame,
             * Then wait for the end of that same frame
             */

            while(!VR_ACTIVE );      /* continue After VR has finished */
            while( VR_ACTIVE );      /* continue After VR has finished */
            while(!VR_ACTIVE );      /* continue After VR has finished */

     control    = (unsigned char)UNDEFINED;
     vram16 = (unsigned far *) MCGA_MEMORY + F_CONTROL;
     *vram16 = *(man_lkupPtr + control);
     trigger = *(man_lkupPtr + (frames & mask8) );
     vram16 = (unsigned far *) MCGA_MEMORY + F_TRIGGER;
     *vram16++ = trigger;
     frames++;

///////////////////////////////////////////////////
//  Now, set up to send the New Partition flag
//  on the 1st frame of the next partition.
//
newPartition = TRUE;


     startTic = RTKGetTime();  // Start timer for this run

//
//  By waiting for the 2nd VR before starting our test, we are
//  assured that we don't start in the middle of a VR.
//
     while( !VR_ACTIVE );     // wait for start of next VR
     while( VR_ACTIVE );     // wait for start of next VR
     while( !VR_ACTIVE );     // wait for start of next VR

//  The VR pulse just went high - Previous frame received by VBU.
//  After trigger toggles, VBU will store the previous frame.


     while(TRUE)
{
   //  Fill the entire frame (if possible)
   //
   if( bytesRemaining < frameBytes )
   {
      /////////////////////////////////////////////////////////////
      //
                  //  The data buffer has fewer than a full frame worth of

      //  data left.  Before continuing with the next video frame,
      //  get another block (32KB) of data from the disk-read task.
```

```
        //
                    //  That task is responsible for storing the data in alt
ernate
                    //  halves of buffer T_buf[].   (each half contains 32K
bytes)
        //
        //  If the Disk Read task is ready pick up the number of bytes
        //  passed and continue.
        //
        //  If the Disk Read task is not finished yet, we have to block
        //  waiting for it and may miss the next Vertical Retrace.
        //
        //  Therefore, we have to allow a frame to pass to ensure
        //  synchronization.
        //
        //////////////////////////////////////////////////////////////

        if( !RTKReceiveCond(&newBytesRead, sizeof(newBytesRead)) )
        {
           //  Wait for disk-read task to send more data.
           //
           //  Task 'diskRead' has already read the next block
           //  when it sends the next acknowledge
           //
           //  This task is blocked until task 'diskRead' sends data.
           //
           RTKReceive(&newBytesRead, sizeof(newBytesRead));

           while( !VR_ACTIVE );        // wait for Vertical retrace
                              diskNotReady++;
        }
        if(newBytesRead == 0L) break;  // No more data from Disk Read

        diskTotal++;
        bytesRemaining += newBytesRead;

              }

              /*
               * Insure that a complete, unaltered frame goes out.
               * This means that we must wait for the beginning of a frame,
               * Then wait for the end of that same frame
               */

              while(!VR_ACTIVE );      /* continue After VR has finished */
              while( VR_ACTIVE );      /* continue After VR has finished */
              while(!VR_ACTIVE );      /* continue After VR has finished */


              //////////////////////////////////////////////////////////////////
///
              //
 //
              //  Store control word for the PREVIOUS frame before triggering
 //
              //
 //
              //////////////////////////////////////////////////////////////////
///

              vram16 = (unsigned far *) MCGA_MEMORY + F_CONTROL;
```

Page 17

```
*vram16 = *(man_lkupPtr + control);

/* get the least significant 16 bits of the trigger */
/* in preparation for the end of vertical retrace */

trigger = *(man_lkupPtr + (frames & mask8) );


/* set up word address of the trigger and just */
/* wait for Vertical retrace to finish */

          vram16 = (unsigned far *) MCGA_MEMORY + F_TRIGGER;

          /* set the least-significant 16-bits of the trigger */
// and increment address to start of DATA field

*vram16++ = trigger;


          //////////////////////////////////////////////////////////////
//
//  During the current Vertical Retrace period, compute
//  the percentage completed and then set up the first
          //  word of the trigger and just wait
//
//  The control word transmitted will be the LAST one set.
//  Each control word is set up at the bottom of the loop
//  (after) the entire frame has been stored in VRAM.
//
//////////////////////////////////////////////////////////////


#ifdef USING_METER
linesToFill = (frames*(long)gStruct.lines) / totalFrames;
if( (linesToFill > 0L) && (linesToFill < (long)gStruct.lines ))
{
                  //  Point to 'control' field in 1st scan line, then
   //  Increment down to current line showing completion and
   //  Store a percent completed marker for user to watch
   //
   vram16 = (unsigned far *) MCGA_MEMORY + F_CONTROL;
   vram16 += linesToFill * wordsPerLine;
   *vram16 = meterWord;
}
else
{
   outOfBounds++;
          }
#endif USING_METER

NO_DEBUG:

     //  After trigger has been set, it is OK to begin writing
     //  into the VRAM prior to the GDC actually sending it out.
     //

     switch(nextBuffer)
               {
          case 0:  // 1st buffer
```

Page 18

```
            dataBufPtr = (char far*) &T_buf[0];
            nextBuffer = 1;  // toggle switch
            break;

         case 1:  // 2nd buffer
            dataBufPtr = (char far*) &T_buf[bytesPerRead];
            nextBuffer = 0;  // toggle switch
            break;
      }

      sendFrame(dataBufPtr);

                  //  Increment No. sectors sent & check to see
                  //  If the current partition has beeen sent.
                  //
                  if(sectorsSent > sectorsInPartition)   // true after new part st
arts
                  {
                          newPartition = TRUE;   // last frame was 1st frame of 2n
d partition
                          sectorsInPartition = part1Sectors;  // = No. sectors in
2nd part
                          sectorsSent = 0L;                   // reset counter
                  }

                  //  Set up control word for the frame just sent
                  //  (not the next frame, but the one just sent since
                  //  the VBU recovery device will use the next control
                  //  word received and associate it with the last frame)
                  //
                  if(newPartition)
                  {
                          newPartition = FALSE;
                          control = (unsigned char)NEW_PARTITION;
                          //printf("NEW PARTITION\n");


                  }
                  else
                  {

                          control = (unsigned char)VALID_DATA;
                  }

                  sectorsSent += sectorsPerFrame;
                  bytesRemaining -= bytesPerFrame;
                  frames++;
                  dataFramesSent++;

        } // while(TRUE)

        ////////////////////////////////////////////////////////////////////
        //  Entire drive has now been read.  Some data (at least 32KB)
        //  remains in the data buffer (T_buf[]).
        //
        //  Finish sending the final few frames and then wrap up.
        ////////////////////////////////////////////////////////////////////
```

Page 19

```
//  Fill the entire frame (if possible)
if( bytesRemaining >= frameBytes )
{
        /*
         * Insure that a complete, unaltered frame goes out.
         * This means that we must wait for the beginning of a frame,
         * Then wait for the end of that same frame
         */

        while(!VR_ACTIVE );     /* continue After VR has finished */
        while( VR_ACTIVE );     /* continue After VR has finished */
        while(!VR_ACTIVE );     /* continue After VR has finished */


        vram16 = (unsigned far *) MCGA_MEMORY + F_CONTROL;
        *vram16++ = *(man_lkupPtr + control);

        trigger = *(man_lkupPtr + (frames & mask8) );
        vram16 = (unsigned far *) MCGA_MEMORY + F_TRIGGER;
        *vram16++ = trigger;

        switch(nextBuffer)
        {
                case 0:  // 1st buffer
                        dataBufPtr = (char far*) &T_buf[0];
                        nextBuffer = 1;  // toggle switch
                        break;

                case 1:  // 2nd buffer
                        dataBufPtr = (char far*) &T_buf[bytesPerRead];
                        nextBuffer = 0;  // toggle switch
                        break;
        }

        sendFrame(dataBufPtr);
        control = (unsigned char)VALID_DATA;        // set control flag

        bytesRemaining -= bytesPerFrame;
        frames++;  // increment frame count
        dataFramesSent++;

        //  Send the next frame (done at top of loop, or outside this lo
op)

}

        /*
         * Insure that a complete, unaltered frame goes out.
         * This means that we must wait for the beginning of a frame,
         * Then wait for the end of that same frame
         */

        while(!VR_ACTIVE );     /* continue After VR has finished */
        while( VR_ACTIVE );     /* continue After VR has finished */
        while(!VR_ACTIVE );     /* continue After VR has finished */


/*
 *
```

Page 20

```
 * Last trigger is unrolled from the write loop. This will ensure that
 * a little extra time is given to the last write
 *
 */

vram16 = (unsigned far *) MCGA_MEMORY + F_CONTROL;
*vram16++ = *(man_lkupPtr + control);

trigger = *(man_lkupPtr + (frames & mask8) );
vram16 = (unsigned far *) MCGA_MEMORY + F_TRIGGER;
*vram16++ = trigger;

//  If any data remains, pad with zero and send last frame
//

bytesToPad = 0;

if( bytesRemaining > 0L )
{

/*
 * First: determine current buffer address
 *
 */

        switch(nextBuffer)
{
    case 0:  // 1st buffer
       dataBufPtr = (char far*) &T_buf[0];
       nextBuffer = 1;  // toggle switch
                        break;

    case 1:  // 2nd buffer
       dataBufPtr = (char far*) &T_buf[bytesPerRead];
       nextBuffer = 0;  // toggle switch
       break;
        }

        /*
         *
         * Now: pad remaining bytes in frame
         *
         */

        bytesToPad = bytesPerFrame - bytesRemaining;
        if(bytesToPad > 0L)
        {
                A_data = dataBufPtr + bytesRemaining;
                for(l=bytesRemaining; l<bytesPerFrame; l++)
                {
                        *A_data++ = 0x00;  // put in pad byte before con
tinuing
                }
        }


        sendFrame(dataBufPtr);
control = (unsigned char)VALID_DATA;         // set control flag
bytesRemaining -= bytesPerFrame;
        frames++;  // increment frame count
        dataFramesSent++;
```

```
//  Send the next frame (done outside this loop)

        /*
         * Insure that a complete, unaltered frame goes out.
         * This means that we must wait for the beginning of a frame,
         * Then wait for the end of that same frame
         */

        while(!VR_ACTIVE );     /* continue After VR has finished */
        while( VR_ACTIVE );     /* continue After VR has finished */
        while(!VR_ACTIVE );     /* continue After VR has finished */


        vram16 = (unsigned far *) MCGA_MEMORY + F_CONTROL;
        *vram16++ = *(man_lkupPtr + control);

        trigger = *(man_lkupPtr + (frames & mask8) );
        vram16 = (unsigned far *) MCGA_MEMORY + F_TRIGGER;
        *vram16++ = trigger;

        frames++;              // increment frame count (trigger)
  }

        /*
         * Insure that a complete, unaltered frame goes out.
         * This means that we must wait for the beginning of a frame,
         * Then wait for the end of that same frame
         */

        while(!VR_ACTIVE );     /* continue After VR has finished */
        while( VR_ACTIVE );     /* continue After VR has finished */
        while(!VR_ACTIVE );     /* continue After VR has finished */


  control = (unsigned char)TERMINATE;    // set control flag


  vram16 = (unsigned far *) MCGA_MEMORY + F_CONTROL;
  *vram16++ = *(man_lkupPtr + control);

  trigger = *(man_lkupPtr + (frames & mask8) );
  vram16 = (unsigned far *) MCGA_MEMORY + F_TRIGGER;
  *vram16++ = trigger;
  while( VR_ACTIVE );     /* continue After VR has finished */

  frames++;

  /////////////////////// DEBUG (jwm) /////////////
  //
  //  SEND MULTIPLE TERMINATES for MIKE
  //
  for(i=0; i<2; i++)
  {

        /*
         * Insure that a complete, unaltered frame goes out.
         * This means that we must wait for the beginning of a frame,
         * Then wait for the end of that same frame
         */
```

Page 22

```
            while(!VR_ACTIVE );      /* continue After VR has finished */
            while( VR_ACTIVE );      /* continue After VR has finished */
            while(!VR_ACTIVE );      /* continue After VR has finished */

            control = (unsigned char)TERMINATE;    // set control flag


            vram16 = (unsigned far *) MCGA_MEMORY + F_CONTROL;
            *vram16++ = *(man_lkupPtr + control);

            trigger = *(man_lkupPtr + (frames & mask8) );
            vram16 = (unsigned far *) MCGA_MEMORY + F_TRIGGER;
            *vram16++ = trigger;
            frames++;              // increment frame count (trigger)

     }

            /*
             * Insure that a complete, unaltered frame goes out.
             * This means that we must wait for the beginning of a frame,
             * Then wait for the end of that same frame
             */

            while(!VR_ACTIVE );      /* continue After VR has finished */
            while( VR_ACTIVE );      /* continue After VR has finished */
            while(!VR_ACTIVE );      /* continue After VR has finished */

     stopTic = RTKGetTime();
elapsedTics = stopTic - startTic;
     seconds = (10L * elapsedTics) / 182L;
     RTKDelay(180);  // delay for 10 seconds to allow VBU to terminate

     if(graphOpen)
{
   closegraph();      // Return to Text mode
   graphOpen = 0;
}
     clrscr();

if(debugFlag)
{
            if( debug ) fclose(debug);
}

     fprintf(stderr, "\nResults of Backup Operation:\n\n");
     //fprintf(stderr, "Measured Run Time:        %ld Tics\n", elapsedTics);


     strcpy(decimal1, decimalString( seconds / 60L) );
     strcpy(decimal2, decimalString( seconds % 60L) );
     fprintf(stderr, "Measured Run Time:      %s Mins, %s Seconds\n",
             decimal1, decimal2);

     fprintf(stderr, "Total Bytes:            %s Bytes\n",
             decimalString(totalBytesToTransfer));

     throughPut = totalBytesToTransfer / (10L*elapsedTics / 182L);
     fprintf(stderr, "Measured Data Rate:     %s Bytes / Second\n",
             decimalString(throughPut));

     fprintf(stderr, "Frames   Transferred:   %ld\n",dataFramesSent);
```

Page 23

```
        fprintf(stderr, "Sectors  Transferred:    %ld\n",dataFramesSent*30);
        fprintf(stderr, "Bytes    Transferred:    %ld\n",dataFramesSent*30*512);

        fprintf(stderr, "Video Frame Rate Used:   %lu\n", frames/seconds);

        fprintf(stderr, "Pad Bytes Used:          %ld\n",bytesToPad);

    RTKSignal(videoComplete);

    return;
}
```

Page 1

```
//    [ diskGeom.c ]
//
//
//    Purpose:   To determine a disk's geometry from its Boot sector.
//
//    Calling Sequence:
//
//       diskGeometry(printFlag, &bootBuf, &bps, &sph, &hds, &spc, &cyl, &tot);
//
//       where,
//
//        printFlag = TRUE (=1) if printout desired, else no printout
//
//          bootBuf = Buffer containing partition's boot sector
//
//              bps = No. bytes per sector              (int)
//              sph = No. sectors per head (side)       (int)
//              hds = No. heads (sides) per cylinder    (int)
//              spc = No. sectors per cylinder          (long)
//              cyl = No. cylinders per logical drive   (long)
//              tot = Total No. sectors on logical drive (long)
//
//
//Written by:  John Monroe     SPARTA, Inc.     27 Dec, 1994
//////////////////////////////////////////////////////////////////////

#include <stdio.h>

char  *decimalString(long unsigned);
int dumpHex( unsigned long, unsigned char far *, unsigned char far *);
void diskGeometry(int, char*, int*, int*, int*, long*, long*, long*);


/*  structure defining the Boot Sector on all disks  */
struct BOOTSECTOR {
      /* Near JMP to boot code */
   char           bsJump[3];            /* E9 XX XX or EB XX 90 */
   char           bsOemName[8];         /* OEM Name and Version */
      /* Start of BIOS Parameter Block */
   unsigned       bsBytesPerSec;        /* Bytes per Sector */
   char           bsSecPerClust;        /* Sectors per Cluster */
   unsigned       bsResSectors;         /* No. of Reserved Sectors */
   char           bsFATs;               /* No. of File Allocation Tables */
   unsigned       bsRootDirEnts;        /* No. of Root-Directory Entries */
   unsigned       bsSectors;            /* Total No. of Logical Sectors */
   char           bsMedia;              /* Media Descriptor Byte */
   unsigned       bsFATsecs;            /* No of Sectors per FAT */
      /* Next three are computed when disk is formatted */
   unsigned       bsSecPerTrack;        /* Sectors per Track */
   unsigned       bsHeads;              /* No. of Heads */
   long unsigned bsHiddenSecs;          /* No. of Hidden Sectors(for Boot) */
   long unsigned bsHugeSectors;         /* No. of Sectors if bsSectors = 0 */
      /* End of BIOS Parameter Block */
   char           bsDriveNumber;        /* Drive Number (80h) */
   char           bsReserved1;          /* Reserved */
   char           bsBootSignature;      /* Extended Boot Signature (29h) */
   long unsigned bsVolumeID;            /* Volume ID Number */
   char           bsVolumeLabel[11];    /* Volume Label */
   char           bsFileSysType[8];     /* File-System Type */
};
```

Page 2

```
void diskGeometry(int printFlag, char *bootBuf,
              int *bps,  int *sph,  int *hds,
              long *spc, long *cyl, long *tot)
{
   struct BOOTSECTOR *pbs = (struct BOOTSECTOR *) bootBuf;
   int i;

   *bps = pbs->bsBytesPerSec;    /* No. bytes / sector */
   *sph = pbs->bsSecPerTrack;    /* No. sectors / track side */
   *hds = pbs->bsHeads;          /* No. heads / cylinder */
   *spc = (*sph) * (*hds);

   if(pbs->bsSectors != 0)
   {
      /* for drives < 32MB */
      *tot = (long unsigned) pbs->bsSectors;

   }
   else
   {
      /* for drives > 32MB */
      *tot = (long unsigned) pbs->bsHugeSectors;
   }
   *cyl = (*tot + pbs->bsHiddenSecs) / *spc;
   // may need one more due to division truncation??? jwm
   //*cyl = 1L + ((*tot + pbs->bsHiddenSecs) / *spc);

   if(printFlag)
   {
      printf("Boot Sector Information on Device\n");
      printf("   OEM Name & Version:  ");
      for(i=0; i<8; i++) printf("%c", pbs->bsOemName[i]);
      printf("\n");
      printf("   Volume ID Number      = %lu\n", pbs->bsVolumeID);
      printf("   Volume Label          = ");
      for(i=0; i<11; i++) printf("%c", pbs->bsVolumeLabel[i]);
      printf("\n");
      printf("   File-System Type      = ");
      for(i=0; i<8; i++) printf("%c", pbs->bsFileSysType[i]);
      printf("\n");

      printf("   Bytes per Sector      = %u\n", pbs->bsBytesPerSec);
      printf("   Sectors per Cluster   = %u\n", (unsigned)pbs->bsSecPerClust&0xff
);
      printf("   No. Reserved Sectors = %u\n", pbs->bsResSectors);
      printf("   No. FATs              = %u\n", (unsigned)pbs->bsFATs & 0xff);
      printf("   No. Sectors per FAT   = %u\n", pbs->bsFATsecs);
      printf("   No. Root Dir Entries = %u\n", pbs->bsRootDirEnts);
      printf("   Media Descriptor Byte= %02X(h)\n", pbs->bsMedia & 0xff);
      printf("   No. Hidden Sectors    = %lu\n", pbs->bsHiddenSecs);
      printf("   Drive Number (80h)    = %02X(h)\n", pbs->bsDriveNumber & 0xff);
      printf("   Extended Boot Signature = %02X(h)\n", pbs->bsBootSignature&0xff
);

      printf("Disk Geometry Information\n");
      printf("   Bytes / Sector        = %u\n",   *bps);
      printf("   Sectors / Head        = %u\n",   *sph);
```

Page 3

```
      printf("   No. Heads             = %u\n",   *hds);
      printf("   Total No. Cylinders   = %ld\n", *cyl);
      printf("   Sectors / Cylinder    = %13s\n", decimalString(*spc));
      printf("   Total No. Bytes       = %13s\n", decimalString((*tot) * (*bps)))
;
      printf("   Total No. Sectors     = %13s\n", decimalString(*tot));

      //printf("pbs->bsSectors      = %u\n",    pbs->bsSectors);
      //printf("pbs->bsHugeSectors  = %lu \n", pbs->bsHugeSectors);
   }

   return;
}
```

Page 1

```
/*
        [ getGraph.c ]   Get Information About the Graphics Hardware

        Calling Sequence:

           if( getGraphicsHardware() == FAILURE )
           {
                  printf("Error Collecting Graphics H/W Information\n");
                  exit(1);
           }

        Returns:   SUCCESS or FAILURE (defined in vbu.h)


Latest Version:
   1 Oct, 1993    jwm   Original version
  14 Dec, 1994    jwm   Made stand-alone function


Written by: John W. Monroe, III    SPARTA, Inc.      October, 1993
====================================================================
*/

#include <stdio.h>
#include <graphics.h>   /* graphics & initgraph() */

#include "vbu.h"        /* VRAM addresses & Frame Offsets */


int getGraphicsHardware(void)
/* determine type video adapter in use */
{
   extern struct G_MODE gStruct;
   int   gdriver = DETECT, gmode=0, errorcode;  /* autodetection */
   int maxx, maxy;


   if(registerbgidriver(EGAVGA_driver) < 0 )
   {
          printf("Error Registering BGI Driver\n");
          goto ERRORS;
   }
   //printf("Driver Registered - OK\n");


   ///////////////////////////////////////////////////////////
   //  To register a specific font, it is necessary to
   //  first add the font to graphics.lib by following
   //  the directions in \borlandc\doc\utils.doc
   //
   ///////////////////////////////////////////////////////////

   //if(registerbgifont(bold) < 0 )
   //{
   //   printf("Error Registering Font\n");
   //   goto ERRORS;
   //}
```

Page 2

```
//printf("Fonts Registered - OK\n");


/* initialize graphics mode */
initgraph(&gdriver, &gmode, "");

/* read results of initialization */
errorcode = graphresult();

if( errorcode != grOk)
{
   printf("Graphics Init Error: %s\n", grapherrormsg(graphresult()));
       goto ERRORS;
}


/* see if graphics adapter will support 640x480, 2-color mode */
if( gdriver >= MCGA )
{

   /* initialize to MCGA 640x480, 2-color graphics mode */
   gdriver = MCGA;
   gmode   = MCGAHI;

       closegraph();  /* close current mode before changing */

   if(registerbgidriver(CGA_driver) <0)
   {
             printf("Unable to Register CGA_driver\n");
             goto ERRORS;
       }

   initgraph(&gdriver, &gmode, "");

   /* check the results of this initialization */
   errorcode = graphresult();

   if( errorcode != grOk)
   {
             printf("Graphics Reinitialization Error: %s\n", errorcode);
             goto ERRORS;
       }

}
else
{

       printf("Unable to use MCGA (640x480) mode\n");
       goto ERRORS;
}

/* get maximum X and Y ranges for graphics mode */
/* convert max resolution values to 'graphics' strings */
maxx = getmaxx();
maxy = getmaxy();


/* set up global graphics structure elements */
gStruct.driver = gdriver;
```

Page 3

```
   gStruct.mode   = gmode;
   gStruct.pixels = maxx +1;
   gStruct.lines  = maxy +1;
   gStruct.bits16 = TRUE;     /* ??? needs more testing */

   #ifdef NEVER
   {
      int x, y;

      /* use gprintf() function to get out the word */
      x = 0;
      y = 100;

      gprintf( &x, &y, "Graphics Driver Used is: %d", gdriver);
      gprintf( &x, &y, "Mode = %d", gmode );
      gprintf( &x, &y, "Resolution is:  %dx%d", maxx+1, maxy+1);

      gprintf( &x, &y, "");
      gprintf( &x, &y, "Hit Any Key to Continue");
      getch();
   }
   #endif NEVER

OK:
   closegraph();      /* return to text mode */
   return SUCCESS;

ERRORS:
   closegraph();      /* return to text mode */
   return FAILURE;

}
```

```
//   [ getP_Table.c ]
//
//      Purpose:   To decode the information in the DOS Partition Tables
//
//  Calling Sequence:
//
//              getP_Table(printFlag, masterBoot, partitionNumber,
//                         &status, &type, &s_cylinder, &e_cylinder,
//                         &s_head, &e_head, &s_sector, &e_sector,
//                         &startAbsSector, &numberSectors);
//
//              where,
//
//                      printFlag = TRUE to print, else no printouts
//                      masterBoot= buffer containing the Master Boot record
//          partitionNumber = partition (0-rel) to process
//          status    = partition's status
//                      type      = partition's type
//          s_cylinder & e_cylinder = start & ending cylinders
//          s_head     & e_head     = start & ending heads
//                      s_sector   & e_sector   = start & ending sectors
//                      startAbsSector = starting sector (from start of drive)
//                                                (1st partition = Boot s
ector)
//                                                (2nd partition = Partit
ion Table)
//                      numberSectors  = number of sectors in partition
//                                                (1st partition = from B
oot to end of Data)
//                                                (2nd partition = from P
artiton to end of Data)
//
//      Notes:  Addresses are zero relative (0-Rel)
//                      Number of sectors is one relative (1-Rel)
//                      Each partition starts on a new cylinder
//                      First sector on first head of cylinder is the Partition
Table
//                      (cyl,hd=0,sect=0)  [ 0-Rel addressing ]
//
//                      Rest of sectors on that head are wasted
//                      Boot sector starts on a new head
//                      (cyl, hd=1,sect=0) [ 0-Rel addressing ]
//
//Written by:   John W. Monroe, III     SPARTA, Inc.     4 Jan, 1995
/////////////////////////////////////////////////////////////////////////////

#include <stdio.h>
#include <alloc.h>
#include <ctype.h>

#include "disk_IO.h"


#ifndef TRUE
#define TRUE (1==1)
#endif  TRUE

#ifndef FALSE
#define FALSE (1==0)
#endif  FALSE
```

Page 2

```
void getP_Table( int printFlag, char far *masterBoot, int partitionNumber,
                 unsigned char *status,
                 unsigned char *type,
                 unsigned *s_cylinder, unsigned *e_cylinder,
                 unsigned *s_head,     unsigned *e_head,
                 unsigned *s_sector,   unsigned *e_sector,
                 unsigned long *startAbsSector,
                 unsigned long *numberSectors
               )
{
   struct PARTITION_TABLE far *pTab;    // partition table pointer
   unsigned char hiByte, loByte;


   //dumpHex( (long unsigned) 16L,(unsigned char far *) &masterBoot[0x1BE],(unsi
gned char far *) "");

   pTab = (struct PARTITION_TABLE *) &masterBoot[0x1BE + 16*partitionNumber];


   *status = pTab->partitionStatus;
   *type     = pTab->partitionType;
   if(*type == 0) return;  // get out if partition Not Used


   hiByte = (pTab->startingSect_Cyl >> 8) & 0x00ff;
   loByte = (pTab->startingSect_Cyl     ) & 0x00ff;
   *s_head    = pTab->startingHead;    // head (0-Rel)
   *s_sector    = loByte & 0x003f;
   *s_cylinder = loByte & 0x00c0;
   *s_cylinder = (*s_cylinder << 2) + hiByte;

   hiByte = (pTab->endingSect_Cyl >> 8) & 0x00ff;
   loByte = (pTab->endingSect_Cyl     ) & 0x00ff;
   *e_head    = pTab->endingHead;      // head (0-Rel)
   *e_sector    = loByte & 0x003f;
   *e_cylinder = loByte & 0x00c0;
   *e_cylinder = (*e_cylinder << 2) + hiByte;


   //  Save the starting & number sectors for each partition
   *startAbsSector = pTab->startAbsSector;
   *numberSectors  = pTab->numberSectors;

   if(printFlag)
   {
      printf("Partition No. %d (0-Rel) Statistics:\n", partitionNumber);
      printf("   status = %02X(h) ", *status);
      printf("%s\n", ((*status == 0x80)? "Boot-Partition" : "Inactive" ));
      printf("   type   = %02X(h) ", *type);
      switch( (int) (*type) )
      {
         case 0x00:
            printf("Entry not allocated\n");
            break;
         case 0x01:
            printf("DOS with 12-bit FAT (primary Part.)\n");
            break;
         case 0x02:
         case 0x03:
```

```
            printf("XENIX\n");
            break;
         case 0x04:
            printf("DOS with 16-bit FAT (primary Part.)\n");
            break;
         case 0x05:
            printf("extended DOS-Partition (DOS 3.3)\n");
            break;
         case 0x06:
            printf("DOS-4.0 partition with more than 32 Megs\n");
            break;
         case 0xDB:
            printf("Concurrent DOS\n");
            break;
         default:
            printf("Unknown - Undefined\n");
            break;
      }
      printf("                            Starting       Ending\n");
      printf("   Cylinder:  (0-Rel) %8u      %8u\n", *s_cylinder, *e_cylinder);
      printf("   Head(Side):(0-Rel) %8u      %8u\n", *s_head,     *e_head);
      printf("   Sector:    (1-Rel) %8u      %8u\n", *s_sector,   *e_sector);
      printf("   Start Abs Sector: %lu  (rel to start of physical drive)\n",
         *startAbsSector);

      if( partitionNumber == 0 )
      {
         printf("   %lu Sectors (for All 'logical' drives in partition)\n",
            *numberSectors);
      }
      else
      {
         printf("   %lu Sectors (for First 'logical' drive in partition)\n",
            *numberSectors);
      }
   }

   return;
}
```

Page 1

```
//  [ getTic.c ]
//
//  Purpose:  To read the system's current 'tic' counter and return
//            to caller as a 32-bit long.
//
//
//  Calling Sequence:
//
//      unsigned long startTic, endTic, totalTics;
//      unsigned long seconds, minutes;
//
//      startTic = getTic();
//        .
//        .
//      endTic = getTic();
//
//      totalTics = endTic - startTic;
//      seconds = (10L * totalTics) / 182L;
//
//      printf("Elapsed Time:  %ld (tics)\n", totalTics);
//      printf("               %lu (seconds)\n", seconds);
//      printf("              [%lu:%lu] (mins:secs)\n",
//                               (seconds/60L), (seconds%60L) );
//
//  Notes:
//     The system tic count is reset at Midnight by DOS.  Beware!!
//     DOS updates the tic count approximately 18.2 times / second.
//
//
//Written by:   John W. Monroe, III   SPARTA, Inc.     9 Jan , 1995
//////////////////////////////////////////////////////////////////////

#include <dos.h>     // _disable(), _enable()
#include <bios.h>    // biostime()


long getTic(void)
{
   long currentTic;

   // disable interrupts to ensure proper operation
   _disable();
   currentTic = biostime(0, 0L);
   _enable();
   return(currentTic);
}
```

Page 1

```
//  [ getUserSelection.c ]
//
//  Get user inputs and compute run parameters
//
//////////////////////////////////////////////////////////////////////

#include <graphics.h>   /* graphics & initgraph() */
#include <stdio.h>
#include <stdlib.h>     /* exit() */
#include <stdarg.h>     /* 'va_list' */
#include <conio.h>      /* inp(), clrscr() */
#include <ctype.h>      /* toupper() */
#include <dos.h>        /* declares keep, getvect, & setvect fctns */
#include <time.h>       /* time() */
#include <bios.h>       /* getmode(), setvmode(), biostime() */
#include <string.h>     /* movedata() */
#include <alloc.h>      /* farcoreleft() */
#include <mem.h>        /* _fmemcpy() */

#include "vbu.h"        /* VRAM addresses & Frame Offsets */
#include "disk_IO.h"    /* for function disk_IO() */

// ***************  P R O T O T Y P E S  ************************
int  getGraphicsHardware(void);     // determines type video adapter
char *decimalString(long unsigned);
void getSystemID(char *);
// ***************  P R O T O T Y P E S  ************************

extern char systemIdBuf[];


void getSystemID(char *Buf)
{
   //  Request user to enter a system description
   //  limited to 79 characters plus a NULL.
   //
   fprintf(stderr, "\nPlease enter a system description:\n");
   fflush(stdin);

   Buf[0] = '\0';
   fgets(Buf, 80, stdin);
   fflush(stdin);    // flush input stream in case of bad user input
}


void showMenu(void)
{
   //  Put up menu for user to choose from
   //
   fprintf(stderr, "       USER  MENU\n");
   fprintf(stderr, "       ==========\n");
   fprintf(stderr, " 1 - Backup Drive C:\n");
   fprintf(stderr, " 2 - Backup Drive D:\n");
   fprintf(stderr, "\n");
   fprintf(stderr, " C - Send Calibration Data Only\n");
   fprintf(stderr, " X - Exit\n");
}
```

Page 2

```
int getUserSelection(
        int *selection,
        int *physicalDrives,   // No. 'physical' drives known to DOS
        int logicalDrvNum[],
        DRIVE_INFO drive[],
        unsigned long *totalFrames

)
{
   extern long actSectors;      // actual No. sectors to be used
   extern int driveNumber;
   extern struct G_MODE  gStruct;    /* allocate mem for G_MODE  structure */
   extern unsigned char huge *T_buf; /* farmalloced Disk Transfer buffer */
   extern struct RWBLOCK parmBlock;     /* allocate mem for RWBLOCK structure */

   extern long   totalBytesToTransfer;
   extern unsigned long bytesPerFrame;
   extern long absSector0;

   long unsigned  totalLines;
   long      totalSectorCount;    // No. sectors on each physical drive
   int       percentDrive;    // percent of drive to test with
   int       legalDrive, physicalDriveSelected;
   int       i, errorCode;
   char      driveLetter;  // C:, D:, E:, etc.


GET_SELECTION:

   showMenu();  //  Put up menu for user to choose from
   fprintf(stderr, "\nPlease Enter Selection:  ");
   fflush(stdin);
   scanf("%c", selection);
   *selection = toupper(*selection);

   switch (*selection)
   {
          case (int)'1':  // backup a drive
          case (int)'2':

                 // get user to identify the system being backed up
                 //
                 getSystemID(&systemIdBuf[0]);
                 break;

          case (int)'C':  // send only calibrations
                 break;

          case (int)'X':  // terminate program & exit
                 return(0);

          default:  // any funny entries will be detected in next switch
                 fprintf(stderr, "This Is Not A Legal Entry - Please Try Again\n
");
                 goto GET_SELECTION;
   }

   ///////////////////////////////////////////////////////
```

Page 3

```
//
//  Determine the graphics hardware environment.
//
//  This must be done AFTER the menu goes up because
//  the next function will erase the screen.  And it
//  must be done before the next switch() since, the
//  hardware must be set up for the calibrations to
//  work properly.
//
///////////////////////////////////////////////////////

if( getGraphicsHardware() == FAILURE )
{
        errorCode = 4;
        goto ERRORS;
}


switch (*selection)
{
        case (int)'1':  // backup drive C:
                driveLetter = 'C';
                break;

        case (int)'2':  // backup drive D:
                if(*physicalDrives > 1)
                {
                        driveLetter = 'D';

                }
                else
                {

                        errorCode = 10;  // "2nd Drive Not Found"
                        goto ERRORS;
                }
                break;

        case (int)'C':  // send only calibrations
        case (int)'X':  // terminate program & exit
                return(0);

        default:
                fprintf(stderr, "This Is Not A Legal Entry - Please Try Again\n
");
                errorCode = 11;  // "Not A Legal Entry"
                goto ERRORS;
}
driveNumber = 1 + (driveLetter - 'A');

// validate that user entered one of the 'recommended' drives
//
legalDrive = FALSE;
for(i=0; i<(*physicalDrives); i++)
{
        if(driveNumber == logicalDrvNum[i])
        {
                legalDrive = TRUE;
                physicalDriveSelected = i;  // record this for later
```

Page 4

```
        }
      }

   if( !legalDrive )
   {
          fprintf(stderr, "Sorry - We Don't Allow That\n");
          fprintf(stderr, "Available Menu Selections Are:\n\n");

          showMenu();  //  Put up menu for user to choose from
          return(-1);
   }



   #ifdef VERBOSE
   printf("Backing Up Logical Drive  %c:  (= drive %d)\n", driveLetter, driveNum
ber);
   printf("All Partitions On This Drive Can Be Backed Up\n");

   printf("No. Partitions on Selected Drive = %d\n",
          drive[physicalDriveSelected].partitions);
   #endif VERBOSE

   totalSectorCount = 0L;
   for(i=0; i<drive[physicalDriveSelected].partitions; i++)
   {
          totalSectorCount += drive[physicalDriveSelected].part[i].sectors;
   }
   #ifdef VERBOSE
   printf("Total No. Sectors on Entire Drive is %13s  starting at [0,0,0]\n",
          decimalString(totalSectorCount) );
   #endif VERBOSE


        totalBytesToTransfer = totalSectorCount *
                                                                drive[physical
DriveSelected].part[0].bps;

        fprintf(stderr, "Total No. Bytes On Drive = %13s\n",
          decimalString(totalBytesToTransfer) );


   /*
        If you desire to process less than the full disk, enter
        the percentage desired here.
   */

   fprintf(stderr, "Percentage of Drive To Use? (1-100): ");
        fflush(stdin);
   scanf("%d", &percentDrive);
   fprintf(stderr, "\nTesting With %d Percent of Drive.\n", percentDrive);

   if((percentDrive<=0) || (percentDrive>100))
   {
      errorCode = 3;
      goto ERRORS;
   }

   #ifdef VERBOSE
```

Page 5

```
printf("\nUsing: %s Driver in Mode %d\n",
       (gStruct.driver == MCGA ? "MCGA" : "CGA"), gStruct.mode );
printf("Pixels       = %d\n", gStruct.pixels);
printf("Lines        = %d\n", gStruct.lines);
printf("16-bit Mode %s Available\n",
   (gStruct.bits16 ? "IS" : "IS NOT") );

printf("Graphics Format To Be Used for Transfer: %d x %d\n",
   gStruct.pixels, gStruct.lines);
#endif VERBOSE




//////////////////////////////////////////////////////
//  Need to be careful how we do the arithmetic here
//  A disk can contain a pretty large number of bytes
//  (possibly, as large as an unsigned long can hold)
//  Therefore, do the divide first, then the multiply.
//
totalBytesToTransfer =
       ( (totalBytesToTransfer/100L) * (long)percentDrive );

//////////////////////////////////////////////////////////////////////
//  Compute No. scan lines to send (No. Bytes / BytesPerLine)
//  Compute No. video frames to send (No. scan lines / linesPerFrame)
//  Compute No. frames each scan line represents (% completed)
//
totalLines  = (long)(totalBytesToTransfer) / 32L;

*totalFrames = (totalLines + (long)gStruct.lines-1L) / (long)gStruct.lines;

bytesPerFrame = 32L * (long)gStruct.lines;  // = No. Data bytes / frame

//printf("totalBytesToTransfer = %s\n", decimalString(totalBytesToTransfer));

//printf("totalLines           = %s\n", decimalString(totalLines));
//printf("totalFrames          = %s\n", decimalString(*totalFrames));

//printf("   Generating %s Video Frames\n", decimalString(*totalFrames));


     //  Get No. sectors to read on each disk access
     //  (defined in "vbu.h"
     //
     actSectors = SECTORS_PER_READ;

//====================================================
//  Need to define the sector offset to the 1st sector
//  in the first partition of the drive selected.
//
//  This information comes from the Master Boot Record
//  located in the first physical sector on the drive.
//
//(jwm) FIXES
absSector0 = (long) drive[physicalDriveSelected].part[0].absStart;

//(jwm)
//printf("(getusers): Offset to Requested Partition: %ld\n", absSector0);
//fflush(stdin);
```

Page 6

```
//getch();


   parmBlock.rwDirection       = READ;  // read disk
   parmBlock.rwSpecFunc        = 0;     // always = 0
        parmBlock.rwSectors         = actSectors;  // = No. sectors per read
   parmBlock.rwDrive           = (unsigned) drive[physicalDriveSelected].driveNum
;
   parmBlock.rwBytesPerSector = (unsigned) drive[physicalDriveSelected].part[0].
bps;
   parmBlock.rwSectorsPerSide = (unsigned) drive[physicalDriveSelected].part[0].
sph;
   parmBlock.rwSides           = (unsigned) drive[physicalDriveSelected].part[0].
hds;

   #ifdef WANTED
   printf("Reading Logical Sector No. %lu\n", parmBlock.rwLogical);
   printf("direction      = %X(h)\n", parmBlock.rwDirection &0xff);
   printf("sectors        = %u\n",    parmBlock.rwSectors);
   printf("drive          = %u\n",    parmBlock.rwDrive);
   printf("bytesPerSector = %u\n",    parmBlock.rwBytesPerSector);
        printf("sectorsPerSide = %u\n",    parmBlock.rwSectorsPerSide);
   printf("sides          = %u\n",    parmBlock.rwSides);
   printf("logical        = %lu\n",   parmBlock.rwLogical);
   #endif WANTED

   return (0);

 ERRORS:
   return (errorCode);
}
```

Page 1

```
/*
   [ GPRINTF.C ]

   GPRINTF: Used like PRINTF except the output is sent to the
   screen in graphics mode at the specified co-ordinate.

Written by:         John Monroe         SPARTA, Inc.
----------------------------------------------------------------------
*/
#include <stdio.h>
#include <graphics.h>       /* declares graphics and initgraph fctns */
#include <stdarg.h>        /* 'va_list' */

int gprintf( int *xloc, int *yloc, char *fmt, ... )
{
   va_list  argptr;          /* Argument list pointer   */
   char str[140];         /* Buffer to build sting into */
   int cnt;             /* Result of SPRINTF for return */

   va_start( argptr, fmt );     /* Initialize va_ functions    */

   cnt = vsprintf( str, fmt, argptr );  /* prints string to buffer */

   settextjustify( LEFT_TEXT, TOP_TEXT );

   outtextxy( *xloc, *yloc, str );    /* Send string in graphics mode */
   *yloc += textheight( "H" ) + 2;        /* Advance to next line         */

   va_end( argptr );         /* Close va_ functions     */

   return( cnt );        /* Return the conversion count    */

}
```

Page 1

```
//  [ sendCalibrations.c ]
//
//  Function to send continuous set of calibrations to VRAM.
//  Operator can terminate this mode by entering any key.
//
//  Calibration data to be sent in the 'data' field of each
//  scanline is formatted as follows:
//
//  Each scan line will hold 32 bytes of calibration data
//  formatted as shown below.  There will be sets of eight
//  (8) lines with a single bit being rotated on each new
//  line.  After the 8th line, the pattern is repeated.
//
//  0x01 0x01 0x01   ...   0x01    total of 32 bytes on line 1
//  0x02 0x02 0x02   ...   0x02      "    "  "    "    "   "  2
//  0x04 0x04 0x04   ...   0x04      "    "  "    "    "   "  3
//  0x08 0x08 0x08   ...   0x08      "    "  "    "    "   "  4
//  0x10 0x10 0x10   ...   0x10      "    "  "    "    "   "  5
//  0x20 0x20 0x20   ...   0x20      "    "  "    "    "   "  6
//  0x40 0x40 0x40   ...   0x40      "    "  "    "    "   "  7
//  0x80 0x80 0x80   ...   0x80    total of 32 bytes on line 8
//
//  Then, pattern repeats for another 8 lines of 256 bytes.
//  (32x8 for VGA format)
//
//
//Written by:  John W. Monroe, III   SPARTA, Inc.    Feb, 1995
///////////////////////////////////////////////////////////////////

#define USING_METER      // define to show progress line
#define METER_CYCLE 2240 // = No. frames per meter line cycle
                                                // line cycle rate = (METER_CYCL
E / Frames/Sec)

#include <stdio.h>
#include <graphics.h>    /* graphics & initgraph() */
#include <conio.h>       /* inp(), clrscr() */

#include "vbu.h"         /* VRAM addresses & Frame Offsets */


#define SR0 0x3C2        /* Input Status Reg #0 */
#define SR1 0x3DA        /* Input Status Reg #1 */
#define VRmask 0x0008    /* Vertical Retrace mask */
#define DEnot  0x0001    /* Display Enable NOT mask */

#define FOREVER     for(;;)
#define VR_ACTIVE   (inp(SR1) & VRmask) /* Vertical Retrace Active */
#define HR_ACTIVE   (inp(SR1) & DEnot)  /* Horizontal Retrace Active */

// ****************  P R O T O T Y P E S  *************************
void setupFrame(void);               // generate 'static' part of frame
void writScan(int, unsigned *);      // write to VRAM
void setControlWord(unsigned char control);
// ****************  P R O T O T Y P E S  *************************


extern unsigned man_lkup[];      /* Manchester lookup table */
```

Page 2

```
int sendCalibrations(void)
{
   extern int graphOpen;
   extern struct G_MODE  gStruct;     /* allocate mem for G_MODE  structure */
   unsigned far  *man_lkupPtr;
   int       errorCode;
   unsigned char control;          /* current value in CONTROL field */
   unsigned sl;              // scanline counter
   unsigned j, k;
   unsigned char calVal;
   unsigned calBuffer[32];         // calibration buffer
   long unsigned  frames= 0L;      /* 32-bit frame counter */
   unsigned far *vram16;
   unsigned trigger;            /* lsw of frame count */
   long unsigned  mask8 = 0x000000ffL;
   int  meterWord;               // Value to be stored for 'meter' line
   int  meterCycle = 0;
   long linesToFill;
   long wordsPerLine;            // = No. 16-bit wds / scanline


   fflush(stdin);  // Wait for user key entry to begin
   getch();


   /////////////////////////////////////////////////////////////////
   //  Unless file 'EGAVGA.BGI' is in the search path, the
   //  graphics driver must be statically loaded during the
   //  link process.  This is done with registerbgidriver().
   //
   //  If it is desired to load the driver dynamically at run
   //  time, file egavga.bgi must be converted to an object file
   //  using the  \borlandc\bgi\bgiobj  utility and then adding
   //  egavga.obj to the graphics.lib library.
   //
   //  The same is true if a font is needed.  For VBU, no fonts
   //  other than the default is required.
   /////////////////////////////////////////////////////////////////
   if(registerbgidriver(EGAVGA_driver) < 0 )
   {
      errorCode = 13;
      goto ERRORS;
   }

   /* initialize graphics mode with appropriate values */
   /* [ determined by function getGraphicsHardware() ] */

   initgraph(&gStruct.driver, &gStruct.mode, "");

   /* get results of initialization */
   if( graphresult() != grOk)
   {
      errorCode = 5;
          goto ERRORS;
   }
   graphOpen = 1;           // flag as being in 'graphics' mode

   setupFrame();            // set up frame (sync, trigger, etc.)

   man_lkupPtr= man_lkup;
   meterWord  = *(man_lkupPtr + 0x00FF);
```

Page 3

```
wordsPerLine = ((long)gStruct.pixels/16L);

//  After video mode changes to GRAPHICS, it is necessary
//  to set the Out-of-Band 'Control' word.
//
control = (unsigned char)UNDEFINED;
vram16  = (unsigned far *) MCGA_MEMORY + F_CONTROL;
*vram16 = *(man_lkupPtr + control);


////////////////////////////////////////////////////
//                                                //
//   Put out a calibration pattern until operator //
//   presses any key to begin data collection.    //
//                                                //
//   Calibration consists of 32 words of encoded  //
//   data consisting of the series [0 thru 31].   //
//   This pattern is repeated for all scan lines. //
//                                                //
////////////////////////////////////////////////////


//  Fill video memory with barber shop calibration pattern
//
sl = 0;
while(sl<gStruct.lines)
{
       //  Repeate this pattern till frame is full
       //
       for(j=0; j<8; j++)  // make next 8 lines
       {
              calVal = 1<<j;        // [ 1, 2, 4, ..., 128 ]
              for(k=0; k<32; k++) calBuffer[k] = *(man_lkupPtr +calVal);

              //  Check for full frame inside "for" loop
              //
              if(sl == gStruct.lines) break;

              writScan(sl, calBuffer);
              sl++;
       }

}

//  wait here until the next vertical retrace
//  starts indicating the frame has completed
while( !VR_ACTIVE );

frames  = 0L;
control = (unsigned char) CALIBRATE;           // set control flag
vram16  = (unsigned far *) MCGA_MEMORY + F_CONTROL;
*vram16 = *(man_lkupPtr +control);


FOREVER     // or until the operator hits 'any' key
{
       while(  VR_ACTIVE );     // wait for VR to end

       //  set the least-significant 16-bits of the trigger
       //  equal to the current frame count - let it overflow
```

Page 4

```
        trigger = *(man_lkup + (frames & mask8));
        vram16  = (unsigned far *) MCGA_MEMORY + F_TRIGGER;

        *vram16 = trigger++;    // before storing to memory

        frames ++;                          // then, increment frame count
        if(frames == (long)METER_CYCLE)
        {
                frames = 0L;
                switch(meterCycle)
                {
                        case 0:
                           meterCycle = 1;
                           meterWord  = *(man_lkupPtr + 0x0000);
                           break;

                        case 1:
                           meterCycle = 0;
                           meterWord  = *(man_lkupPtr + 0x00FF);
                           break;
                }
        }

        if( kbhit() )             // wait for operator to continue
        {
                getch();
                goto FINISHED_CALS;  // continue after key is pressed
        }

    #ifdef USING_METER
        linesToFill = (frames*(long)gStruct.lines) / (long)METER_CYCLE;

        if( (linesToFill > 0L) && (linesToFill < (long)gStruct.lines ))
    {
       //  Point to 'control' field in 1st scan line, then
       //  Increment down to current line showing completion and
       //  Store a percent completed marker for user to watch
       //
       vram16 = (unsigned far *) MCGA_MEMORY + F_CONTROL;
               vram16 += linesToFill * wordsPerLine;
       *vram16 = meterWord;
    }
        #endif USING_METER


        //  wait here until the next vertical retrace
        //  starts indicating the frame has completed
        while( !VR_ACTIVE );    // wait for next VR to start
  }

FINISHED_CALS:
  //
  //  Need to reset the control word for VBU processor
  //
  while( !VR_ACTIVE );        // wait for next VR to start
  while(  VR_ACTIVE );        // wait for VR to end
  control = (unsigned char) UNDEFINED;
  setControlWord(control);
```

Page 5

```
   setupFrame();              // reset to get rid of meter line
   setControlWord(control);
   return (0);

 ERRORS:
   //
   //  Need to reset the control word for VBU processor
   //
   while( !VR_ACTIVE );       // wait for next VR to start
   while(  VR_ACTIVE );       // wait for VR to end
   control = (unsigned char) UNDEFINED;
   setControlWord(control);
   setupFrame();              // reset to get rid of meter line
   setControlWord(control);
   return (errorCode);
}

void setControlWord(unsigned char control)
{
   unsigned far *vram16;

   vram16 = (unsigned far *) MCGA_MEMORY + F_CONTROL;
   *vram16 = man_lkup[control];
}
```

Page 1

```
//  [ sendFrame.c ]
//
//  Optimized function to move data into the VRAM for a given
//  video format (currently, 640x480)
//
//  Revisions:
//              29 Mar 95       jwm             Fixed data buffer offset problem
//
0 from farmalloc()                                              Offset was 4, not
//
//    10 Apr 95 jwm             Using dataBufPtr to point to each frame's buf
//
//Written by:  John W. Monroe, III     SPARTA, Inc.     Feb, 1995
/////////////////////////////////////////////////////////////////////

#include <dos.h>

#include "vbu.h"        /* VRAM addresses & Frame Offsets */



void sendFrame(char far *dataBufPtr)
{
   extern unsigned man_lkup[];        /* Manchester lookup table */
        extern char huge *T_buf;   // farmalloced Disk Transfer buffer
        extern unsigned vram_seg, scanLine;
//      extern unsigned data_seg, vram_seg, bufOffset, scanLine;

   /////////////////////////////////////////////////////////////////////
   //
   //  NOTE:
   //
   //  When memory is allocated using farmalloc(), and probably
   //  malloc() also, the Compiler sees the address as the first
   //  location following the 4-byte number of bytes allocated.
   //  That is, the Compiler sees *T_buf as pointing to the first
   //  data element in the buffer.
   //
   //  However, the Assembler sees the array starting with the
   //  4-byte length which preceeds the data elements.
   //
   //  Therefore, it is necessary to adjust the Compiler's offset
   //  into the array by the 4 bytes in the length value as follows.
   //
   //  In the body of the text, T_bufOffset is always used to
   //  initialize the pointer to the data array.
   //
   /////////////////////////////////////////////////////////////////////

        //unsigned T_bufOffset= FP_OFF(T_buf);  // offset due to farmalloc()
// data displaced by 4 bytes

        unsigned data_seg, T_bufOffset, bufOffset;

        //
  // Get offset of returned buffer pointer
  //
```

Page 2

```
data_seg     = FP_SEG(dataBufPtr);
T_bufOffset = FP_OFF(dataBufPtr);
bufOffset    = 0;


    ///////////////////////////////////////////////////////////////
//
//  This technique is hardwired to a Data Field containing
//  exactly 32 Words (64 Bytes) of encoded data
//  and 480 scanlines per video frame.
//
//  For other video formats, this code will have to be
//  more general.  The following instructions will change:
//
// ADD    DX,64     ADD   DX,X_Bytes
//
//     ADD bufOffset,32     MOV   AX,Y_Words
//          ADD   bufOffset,AX
//
// CMP      scanline,480 MOV   AX,scanLine
// JB       L1        CMP   lines,AX
//          JB L1
//
///////////////////////////////////////////////////////////////

                                                  // FB_DATA = 16 (i.e.
, word 8)
  asm   MOV    AX,FB_DATA_OFF  // initialize VRAM offset (Byte ptr)
  asm   PUSH   AX              // and save on stack
  asm   XOR    SI,SI
  asm   MOV    scanLine,SI     // initialize scanline to 0

L1:
  asm   POP    DX              // get current VRAM offset
  asm   PUSH   DX              // & put back on stack
  asm   ADD    DX,64           // end-of-scan = start + 64 Bytes

  asm   MOV    CX,T_bufOffset  // take care of farmalloc() offset
  asm   ADD    CX,bufOffset    // get T_buf (Byte) offset

L2:
  asm   MOV    BX,CX
  asm   INC    CX              // increment T_buf ptr by 1 byte
  asm   MOV    ES,data_seg
  asm   MOV    AL,ES:[BX]      // pick up next byte of data
  asm   MOV    AH,0
  asm   SHL    AX,1            // use byte to make Word offset
  asm   MOV    SI,AX           // into the Manchester table
  asm   MOV    AX,man_lkup[SI] // pick up coded form of data
  asm   MOV    ES,vram_seg
  asm   POP    BX              // get current VRAM offset (Byte ptr)
                                                  // (starts with 16 ea
ch scanline)

  asm   MOV    ES:[BX],AX      // store coded word into VRAM

  asm   ADD    BX,2            // inc VRAM ptr by 1 word (2 bytes)
  asm   PUSH   BX              // & put back on stack
  asm   CMP    BX,DX           // check for end of scan line
  asm   JB L2                  // loop to end of scan line
```

Page 3

```
    asm   ADD   BX,FB_DATA_OFF  // inc VRAM to next Data field
    asm   POP   AX              // pop stack (to replace with new value)
    asm   PUSH  BX              // store updated VRAM offset (Byte ptr)
    asm   ADD   bufOffset,32    // inc to next block in T_buf
    asm   INC   scanLine        // inc number of scan lines
    asm   CMP   scanLine,480    // see if finished
    asm   JB L1                 // loop to end of frame

    asm   POP   AX              // clean up the stack
}
```

Page 1

```
/*
   [ SetFrame.C ]

  To Set Up A Complete 'Static' Video Frame

  The purpose of this function is to set up the frame with a
  pre-defined bit pattern composed of three 'static' fields in
  each of 'scanLines' scan lines.

  Note:  It is assumed that Manchester Lookup Table 'man_lkup'
        has already been set up and initialized.


Latest Version:
   28 Jan 1992      Original version
    8 Nov 1993     Converted to Borland C
   24 Nov 1993      Converted to work with CGA or MCGA
   06 Dec 1993     Modified for 64-bit sync field,
                          32-bit scan line field, and
                          32-bit trigger field

Written by:         John Monroe         SPARTA, Inc.
------------------------------------------------------------
*/


//(jwm)debug
//#define DISPLAY_FIRST_LINE
//(jwm)debug


#include <stdio.h>
#include <graphics.h>    /* graphics & initgraph() */
#include <conio.h>       /* getch() */
#include <dos.h>

#include "vbu.h"  /* get VRAM addresses & Frame offsets */

// ****************  P R O T O T Y P E S  *************************
int  dumpHex(long, unsigned char far *, unsigned char far *);
int  m_decode(unsigned numWds, unsigned *mBuf, unsigned char *bBuf);
// ****************  P R O T O T Y P E S  *************************

extern struct G_MODE gStruct;
int      gprintf(int *xloc, int *yloc, char *fmt, ... );


void setupFrame(void)
{
   /*

   The purpose of this function is to set up the frame with a
   pre-defined bit pattern composed of three 'static' fields in
   each of 'scanLines' scan lines.

  VGA (640 X 480) VIDEO FRAME FORMAT:
  ----------------------------------
```

Page 2

```
  Field Offset Bits  Name         Description
  ----- ------ ----  ----         -----------
    1     0     64   Scan Sync    Fixed 64-bit pattern defined by CECI.

    2    64     32   Scan Line    Manchester-encoded value of the scan
                                                              line in the rang
e (0 - 65,535).  For

d values are 0 - 479.                                          MCGA, the encode

    3    96     16   Control      8-bit, Manchester-encoded 'control' word.
                                                              The High-Order 4
 bits of this field

6 values (0x00 - 0xF0)                                         contain one of 1

g.                                                             prior to encodin

    4   112     16   Trigger      Except for the 1st scan line, this field
                                                              always contains
an 8-bit value equal

 Manchester-encoded                                            to zero which is

 sequence of 8 (10)                                            to form a 16-bit

n hex, 0XAAAA.                                                 binary pairs.  I

    5   128    512   Data         Contains 64 bytes of Manchester-encoded
                                                              data (= 32 bytes
 of actual data)
            =====
            640

  */

  extern unsigned man_lkup[];   /* Manchester lookup table */

  static unsigned syncData[] = { 0xAAAA, 0xCCF1 };
  static unsigned syncCode[4];
  //static unsigned swapCode[8];
  /* default sync pattern */

  unsigned char scanLineHO, scanLineLO;      /* High & Low Order parts */
  unsigned manScanEven, manScanOdd;    /* scan Nos. in Manchester */
  unsigned far *vramE, far *vramO;     /* ptrs to Even/Odd VRAM banks */
  unsigned far *vram1, far *vram2;
  unsigned far *vram16;                // WORD pointer into VRAM
  unsigned manZero;                    /* Manchester code for zero */
  int       i, j;
//   int       x = gStruct.pixels /4;     /* 1/4 distance from left */
//   int       y = gStruct.lines  /4;     /* 1/4 distance down page */

#ifdef DISPLAY_FIRST_LINE
unsigned char far *ucfp = (unsigned char far *)MK_FP(MCGA_MEMORY, 0);   // = Byt
e addr VRAM
unsigned      far *ufp  = (unsigned      far *)MK_FP(MCGA_MEMORY, 0);   // = Wor
d addr VRAM
```

Page 3

```
unsigned char bBuf[32];
unsigned      mBuf[32], *mBufPtr;
int numBytes;

printf("\n\nVRAM at: %Fp (Byte Addr)  or  %Fp (Word Addr)\n", ucfp, ufp );
#endif DISPLAY_FIRST_LINE


   /* convert sync field data bits to Manchester codes */
   /*  (remember that the codes will be byte-swapped)  */

   syncCode[0] = man_lkup[(unsigned)((syncData[0]>>8) & 0x00ff)];
   syncCode[1] = man_lkup[(unsigned)((syncData[0]>>0) & 0x00ff)];
   syncCode[2] = man_lkup[(unsigned)((syncData[1]>>8) & 0x00ff)];
   syncCode[3] = man_lkup[(unsigned)((syncData[1]>>0) & 0x00ff)];

   /******************
   printf("Sync Field Data Pattern: %04X %04X\n", syncData[0], syncData[1] );

   printf("Sync Field Manchester Codes: %04X %04X %04X %04X\n",
      syncCode[0], syncCode[1], syncCode[2], syncCode[3] );

   printf("Hit any key to continue\n");
   getch();
   ******************/


   if( gStruct.mode == MCGAHI )
   {

      /****************************************************************
      MCGA Video RAM in the 640x480 mode is composed of
      480 raster lines of 640 pixels each.

      This 'logical' memory is actually composed of a single bank
      of 'physical' memory.
      ****************************************************************/


         /* for each of the scan lines */
         for(j=0; j<gStruct.lines; j++)
         {

                /* point to first word (16 bits) of each scan line */
                ///
                // F_SCAN_SYNC = 0
                //
                vram16 = (unsigned far *) MCGA_MEMORY + j*40L + F_SCAN_SYNC;
//printf("vram16(scan sync) = %Fp  (SB = A000:0000)\n", vram16);

                *vram16++ = syncCode[0] & 0xffff;   // 'AA' = word 0 (0-Rel)
                *vram16++ = syncCode[1] & 0xffff;   // 'AA' = word 1
                *vram16++ = syncCode[2] & 0xffff;   // 'CC' = word 2
                *vram16++ = syncCode[3] & 0xffff;   // 'F1' = word 3

#ifdef DISPLAY_FIRST_LINE
#ifdef NEVER
printf("Starting Byte Address for Scan Sync Field: %Fp\n", (char far*)&ufp[F_SCA
N_SYNC]);
mBufPtr = &mBuf[0];
for(i=F_SCAN_SYNC; i<F_SCAN_SYNC+W_SCAN_SYNC; i++) *mBufPtr++ = ufp[i];
```

Page 4

```
dumpHex((long)WB_SCAN_SYNC, (char far*)mBuf, (char far*)"Coded Scan Sync");
numBytes = m_decode(W_SCAN_SYNC, mBuf, bBuf);
dumpHex((long)numBytes, (char far*)bBuf, (char far*)"Decoded Scan Sync [AA AA CC
 F1]");
printf("\n");
#endif NEVER
#endif DISPLAY_FIRST_LINE

                /* The next 32 bits represent the Scan Line Field made */
                /* up of 16 bits of Manchester-encoded data.           */
                /* The 16-bit, binary scan line (0-479) is encoded and */
                /* stored into the 32 bits.                            */
                //
                // F_SCAN_LINE = 4
                //

                scanLineHO = (unsigned char) ((j >> 8) & 0x00ff);
                scanLineLO = (unsigned char) ((j >> 0) & 0x00ff);

                vram16 = (unsigned far *) MCGA_MEMORY + j*40L + F_SCAN_LINE;
//printf("vram16(scan line) = %Fp  (SB = A000:0008)\n", vram16);
                *vram16++ = man_lkup[scanLineHO];   // word 4
                *vram16++ = man_lkup[scanLineLO];   // word 5

//              *vram16 = man_lkup[scanLineHO];   // word 4
//printf("WROTE: scanLineHO = %u,   coded value = %04X\n", scanLineHO, *vram16);

//printf("READ:  ufp[] = %04X\n", ufp[F_SCAN_LINE]);
//              vram16++;
//              *vram16 = man_lkup[scanLineLO];   // word 5
//printf("WROTE: scanLineHO = %u,   coded value = %04X\n", scanLineHO, *vram16);

//printf("READ:  ufp[] = %04X\n", ufp[F_SCAN_LINE+1]);
//              vram16++;


#ifdef DISPLAY_FIRST_LINE
#ifdef NEVER
printf("Starting Byte Address for Scan Line Field: %Fp\n", (char far*)&ufp[F_SCA
N_LINE]);
mBufPtr = &mBuf[0];
for(i=F_SCAN_LINE; i<F_SCAN_LINE+W_SCAN_LINE; i++) *mBufPtr++ = ufp[i];
dumpHex((long)WB_SCAN_LINE, (char far*)mBuf, (char far*)"Coded Scan Line");
numBytes = m_decode(W_SCAN_LINE, mBuf, bBuf);
dumpHex((long)numBytes, (char far*)bBuf, (char far*)"Decoded Scan Line [00 00]")
;
printf("\n");
#endif NEVER
#endif DISPLAY_FIRST_LINE

                /* blank out the 16-bit CONTROL & TRIGGER fields in every line
*/
                /* (that is, store Manchester code for zero) */
                //
                //  F_CONTROL 6
                //
                manZero = man_lkup[0];

                vram16 = (unsigned far *) MCGA_MEMORY + j*40L + F_CONTROL;
//printf("vram16(control)   = %Fp  (SB = A000:000C)\n", vram16);
```

Page 5

```
                *vram16++ = manZero;                // word 6

                //
                //  F_TRIGGER = 7
                //
                vram16 = (unsigned far *) MCGA_MEMORY + j*40L + F_TRIGGER;
//printf("vram16(trigger)    = %Fp  (SB = A000:000E)\n", vram16);
                *vram16++ = manZero;                // word 7


                //
        //  vram16 now equals F_DATA = 8
        //
                vram16 = (unsigned far *) MCGA_MEMORY + j*40L + F_DATA;
//printf("vram16(data)       = %Fp  (SB = A000:0010)\n", vram16);
                for(i=0; i<32; i++)
        {
                        *vram16++ = 0x0000;     /* clear screen */
                        // words (8-39)
        }

#ifdef DISPLAY_FIRST_LINE
#ifdef NEVER
printf("Starting Byte Address for Data Field: %Fp\n", (char far*)&ufp[F_DATA]);
mBufPtr = &mBuf[0];
for(i=F_DATA; i<F_DATA+W_DATA; i++) *mBufPtr++ = ufp[i];
dumpHex((long)WB_DATA, (char far*)mBuf, (char far*)"Coded Data");
numBytes = m_decode(W_DATA, mBuf, bBuf);
dumpHex((long)numBytes, (char far*)bBuf, (char far*)"Decoded Data [00 01 02 03 e
tc.]");
printf("\n");
fflush(stdin); getch();
#endif NEVER
#endif DISPLAY_FIRST_LINE


          #ifdef DISPLAY_FIRST_LINE
          if(j==0)
          {
          //
          //  Display first few scanline in VRAM
          //

          printf("Starting Byte Address for Scan Sync Field: %Fp\n", (char far*)
&ufp[F_SCAN_SYNC]);
          mBufPtr = &mBuf[0];
          for(i=F_SCAN_SYNC; i<F_SCAN_SYNC+W_SCAN_SYNC; i++) *mBufPtr++ = ufp[i]
;
          dumpHex((long)WB_SCAN_SYNC, (char far*)mBuf, (char far*)"Coded Scan Sy
nc");
          numBytes = m_decode(W_SCAN_SYNC, mBuf, bBuf);
          dumpHex((long)numBytes, (char far*)bBuf, (char far*)"Decoded Scan Sync
 [0xAAAACCF1]");

          printf("Starting Byte Address for Scan Line Field: %Fp\n", (char far*)
&ufp[F_SCAN_LINE]);
          mBufPtr = &mBuf[0];
          for(i=F_SCAN_LINE; i<F_SCAN_LINE+W_SCAN_LINE; i++) *mBufPtr++ = ufp[i]
;
          dumpHex((long)WB_SCAN_LINE, (char far*)mBuf, (char far*)"Coded Scan Li
```

```
ne");
        numBytes = m_decode(W_SCAN_LINE, mBuf, bBuf);
        dumpHex((long)numBytes, (char far*)bBuf, (char far*)"Decoded Scan Line
");


        printf("Starting Byte Address for Control Field: %Fp\n", (char far*)&u
fp[F_CONTROL]);
        mBufPtr = &mBuf[0];
        for(i=F_CONTROL; i<F_CONTROL+W_CONTROL; i++) *mBufPtr++ = ufp[i];
        dumpHex((long)WB_CONTROL, (char far*)mBuf, (char far*)"Coded Control W
ord");
        numBytes = m_decode(W_CONTROL, mBuf, bBuf);
        dumpHex((long)numBytes, (char far*)bBuf, (char far*)"Decoded Control B
yte");


        printf("Starting Byte Address for Trigger Field: %Fp\n", (char far*)&u
fp[F_TRIGGER]);
        mBufPtr = &mBuf[0];
        for(i=F_TRIGGER; i<F_TRIGGER+W_TRIGGER; i++) *mBufPtr++ = ufp[i];
        dumpHex((long)WB_TRIGGER, (char far*)mBuf, (char far*)"Coded Trigger W
ord");
        numBytes = m_decode(W_TRIGGER, mBuf, bBuf);
        dumpHex((long)numBytes, (char far*)bBuf, (char far*)"Decoded Trigger B
yte");


        printf("Starting Byte Address for Data Field: %Fp\n", (char far*)&ufp[
F_DATA]);
        mBufPtr = &mBuf[0];
        for(i=F_DATA; i<F_DATA+W_DATA; i++) *mBufPtr++ = ufp[i];
        dumpHex((long)WB_DATA, (char far*)mBuf, (char far*)"Coded Data Word");

        numBytes = m_decode(W_DATA, mBuf, bBuf);
        dumpHex((long)numBytes, (char far*)bBuf, (char far*)"Decoded Data Byte
");

        fflush(stdin);
        getch();
        }
        #endif DISPLAY_FIRST_LINE


        } // for(j=0; j<gStruct.lines; j++)


    #ifdef NEVER
    gprintf( &x, &y, "Running in MCGA mode (%dx%d)",
       gStruct.pixels, gStruct.lines );

    gprintf( &x, &y, "");
    gprintf( &x, &y, "Sync Field Data Pattern:     %04X      %04X",
       syncData[0], syncData[1] );
    #endif NEVER


    #ifdef NEVER
    /* before displaying, we need to byte swap again so that */
```

Page
7

```
      /* the pattern displayed looks just like the bit stream  */
      /* which gets transmitted by the video graphics adapter. */

      swapCode[0] = (syncCode[0]>>0) & 0x00ff;
      swapCode[1] = (syncCode[0]>>8) & 0x00ff;
      swapCode[2] = (syncCode[1]>>0) & 0x00ff;
      swapCode[3] = (syncCode[1]>>8) & 0x00ff;
      swapCode[4] = (syncCode[2]>>0) & 0x00ff;
      swapCode[5] = (syncCode[2]>>8) & 0x00ff;
      swapCode[6] = (syncCode[3]>>0) & 0x00ff;
      swapCode[7] = (syncCode[3]>>8) & 0x00ff;

      gprintf( &x, &y, "");
      gprintf( &x, &y, "Sync Field Manchester Codes: %02X%02X %02X%02X %02X%02X
%02X%02X",
         swapCode[0], swapCode[1], swapCode[2], swapCode[3],
         swapCode[4], swapCode[5], swapCode[6], swapCode[7] );

      gprintf( &x, &y, "");
      /*
      gprintf( &x, &y, "Hit Any Key to Start Transmitting Data");
      getch();
      */
      #endif NEVER
   }

   return;
}
```

Page 1

```
/*
   [ vbu.c ]   Video Backup Unit

   Application to copy entire (or portion of) hard drive contents
   to video RAM in a Manchester-encoded format.


Latest Version:
   1 Oct, 1993    jwm   Original version
   2 Nov, 1993    jwm   Converted to Borland C
   22 Nov, 1993   jwm   Added Disk Read Capability


Written by: John W. Monroe, III    SPARTA, Inc.       October, 1993
======================================================================
*/
//#define VERBOSE        // define to get extra printouts


#include <graphics.h>    /* graphics & initgraph() */
#include <stdio.h>
#include <stdlib.h>      /* exit() */
#include <stdarg.h>      /* 'va_list' */
#include <conio.h>       /* inp(), clrscr() */
#include <ctype.h>       /* toupper() */
#include <dos.h>         /* declares keep, getvect, & setvect fctns */
#include <time.h>        /* time() */
#include <bios.h>        /* getmode(), setvmode(), biostime() */
#include <string.h>      /* movedata() */
#include <alloc.h>       /* farcoreleft() */
#include <mem.h>         /* _fmemcpy() */


#include "vbu.h"         /* VRAM addresses & Frame Offsets */
#include "disk_IO.h"     /* for function disk_IO() */
#include "RTKernel.H"   /* task management */

#define SR0 0x3C2        /* Input Status Reg #0 */
#define SR1 0x3DA        /* Input Status Reg #1 */
#define VRmask 0x0008    /* Vertical Retrace mask */
#define DEnot  0x0001    /* Display Enable NOT mask */

#define FOREVER     for(;;)
#define VR_ACTIVE   (inp(SR1) & VRmask) /* Vertical Retrace Active */
#define HR_ACTIVE   (inp(SR1) & DEnot)  /* Horizontal Retrace Active */


// ****************  P R O T O T Y P E S  *************************
char *decimalString(long unsigned);
void manchester(void);              // initializes man_lkup[]
void setupFrame(void);              // generate 'static' part of frame
int  dumpHex(long, unsigned char far *, unsigned char far *);
int  basicInfo(DRIVE_INFO*, int*, int*);
int  getUserSelection(int*, int*, int*, DRIVE_INFO *, long*);
int  sendCalibrations(void);
int  backupDrive(void);
```

Page
2

```
// ****************  P R O T O T Y P E S  *************************

// **************** G L O B A L   V A R I A B L E S ***************
DRIVE_INFO drive[2];

long debugCount = 0L;
char huge *T_bufPtr;        // farmalloced buffer pointer
char huge *T_buf;           // farmalloced Disk Transfer buffer
unsigned  T_bufOffset;      // offset due to farmalloc() = 4 bytes
char systemIdBuf[80];


int  driveNumber;           // Logical Drive: 3=C, 4=D, 5=E, etc.
static unsigned char masterBoot[512];  // Master Boot Sector
static unsigned char boot[512];        // Partition's Boot Sector
static unsigned char buffer[4096];     // static to init bufptr
int             linesPerTrack;
int                  physicalDrives=0; // No. 'physical' drives known to DOS

long diskAccesses= 0L; /* Total No. Disk Accesses Made */
long heapSpace;        /* No. bytes available in the Heap */
long bufferSize;       /* No. bytes in Transfer buffer */

long     actSectors;       // actual No. sectors to be used
long sectorsPerRead;   /* No. sectors per disk access */
long linesPerSector;   /* No. raster lines per sector */
long linesLeft;        /* No. unprocessed raster lines */
long linesPerRead;     /* No. raster lines per disk read */
long totalBytesToTransfer;
long totalFrames;
long dataFramesSent = 0L;  // No. frames of data sent
long diskBlocksRead = 0L;  // No. disk blocks read
long bytesPerFrame;
int      graphOpen= 0;     /* init to 'Text' mode */
long absSector0;


long nextSector;       /* Next (0-rel) sector to read */

unsigned vram_seg = FP_SEG(MCGA_MEMORY);
unsigned data_seg;
unsigned bufOffset;          // Offset to next available byte in T_buf
unsigned scanLine;           // scan line counter


struct G_MODE  gStruct;      /* allocate mem for G_MODE  structure */
struct RWBLOCK parmBlock;     /* allocate mem for RWBLOCK structure */


//(jwm)
int debugFlag = 0;  // =1 if debugging envoked
                                        // (envoked with calling sequence:  vbu
1
```

Page 3

```
int main(int argc)
{

   int      errorCode, saveError;
   int      logicalDrvNum[8];     // 1st Logical of each Physical drive
   int      selection;

/* added by jjs */
        unsigned time_high = 0;
        unsigned time_low = 0;
        double duty_cycle;
        int x;

//(jwm)
if(argc>1) debugFlag = 1;


   if(RTKDebugVersion())
   {
          printf("Using RTK Debug Version of Libraries\n");
   } else {
          printf("Using Standard RTK Libraries\n");
   }


   clrscr();

   manchester();  /* init the Manchester lookup table */

   ///////////////////////////////////////////////////////////////
        //  A maximum of 64K bytes can be read in a single
   //  access because of the limitation on the DMA chip.
   //
   //  Our strategy will be to read no more than 32K bytes at
   //  a time to make the encoding & storage loop faster.
   ///////////////////////////////////////////////////////////////

        if( farcoreleft() < (16L + (long)BYTES_PER_READ) )
        {
      errorCode = 1;  goto ERRORS;
   }
   else
   {
          //printf("This application requires %lu bytes of free memory.\n"\
          //              "The machine has %lu bytes remaining.\n",
          //(16L + (long)BYTES_PER_READ), farcoreleft());
   }


   /////////////////////////////////////////////////////////////////////
   //
   //  The memory allocation functions are going to start on a
   //  segment boundary, but the first 4 bytes are going to contain
   //  the length of the block being allocated.  The pointer returned
   //  will have an offset pointing to the first buffer location, but
   //  its value will be (4), and not (0) as expected.
   //
```

Page 4

```
   //  To get around this, we must allocate a slightly larger block
   //  (larger by one paragraph or 16 bytes) and adjust the pointer
   //  to account for the segment mis-allignment.
   //
   ///////////////////////////////////////////////////////////////////////

        //  Use two blocks (each of 'BYTES_PER_READ' bytes)
   //
        T_bufPtr = (unsigned char huge *) farmalloc( (16L + 2L*(long)BYTES_PER_R
EAD) );
   if( T_bufPtr == NULL )
   {
          perror("Allocating Memory with farmalloc()");;
          errorCode = 2;   goto ERRORS;
   }

   //
   // Get offset of returned buffer pointer
   //
   data_seg = FP_SEG(T_bufPtr);
   T_bufOffset = FP_OFF(T_bufPtr);

   //printf("T_bufPtr = %Fp,  Seg = %04X, Off = %04X\n",
   //      T_bufPtr, data_seg, T_bufOffset);


   //  Save the segment address of the transfer buffer for later
   //
   //  Adjust pointer so that offset becomes zero
   //  and segment address is bumped up by one.
   //
   T_buf = (char huge*) &T_bufPtr[16 - T_bufOffset];
   data_seg = FP_SEG(T_buf);
   T_bufOffset = FP_OFF(T_buf);
   //printf("T_buf = %Fp,  Seg = %04X, Off = %04X\n", T_buf, data_seg, T_bufOffs
et);
   //getch();
   //getch();



 BASIC_INFORMATION:

   // Get some basic information about the selected drive
   // Determine No. 'logical' Drives Known to DOS
   //
   memset(drive, 0, sizeof(drive));
   if(basicInfo(drive, logicalDrvNum, &physicalDrives) == -1)
   {
      printf("basicInfo()  Error\n");
          return (-1);
   }


/* added by jjs */

        while(!VR_ACTIVE);
        while(VR_ACTIVE);
```

Page 5

```
        while(!VR_ACTIVE)
        {
                time_low++;
        }
        while(VR_ACTIVE)
        {
                time_high++;
        }

/* end of added by jjs */

 SHOW_RESULTS:

        fprintf(stderr, "\nR E S U L T S   OF   S Y S T E M   Q U E R Y\n\n");
        printf("Vertical Retrace Timing:\ttime high = %u\t\ttime low = %u\n",tim
e_high,time_low);

        switch(physicalDrives)
   {
          case 0:
                fprintf(stderr, "No hard drives were detected on this system\n"
);
                break;
          case 1:
                fprintf(stderr, "A single hard drive was detected on this syste
m\n");
                break;
          case 2:
                fprintf(stderr, "Multiple hard drives were detected on this sys
tem\n");
                break;
          default:
                break;
   }
        fprintf(stderr, "\n");
   fprintf(stderr, "drive %c:  Partition 1:  %12s (bytes)\n",
          'A'-1+drive[0].driveNum,
          decimalString(drive[0].part[0].sectors * drive[0].part[0].bps) );

   fprintf(stderr, "                         %12s (sectors) \n",
          decimalString(drive[0].part[0].sectors) );


   fprintf(stderr, "           Partition 2:  %12s (bytes)\n",
          decimalString(drive[0].part[1].sectors * drive[1].part[0].bps) );

   fprintf(stderr, "                         %12s (sectors) \n",
      decimalString(drive[0].part[1].sectors) );

   fprintf(stderr, "\n");


   if(physicalDrives > 1)
   {
          fprintf(stderr, "drive %c:  Partition 1:  %12s (bytes) \n",
                 'A'-1+drive[1].driveNum,
                 decimalString(drive[1].part[0].sectors * drive[1].part[0].bps)
);

          fprintf(stderr, "                         %12s (sectors) \n",
```

Page 6

```
                decimalString(drive[1].part[0].sectors) );

        fprintf(stderr, "         Partition 2:  %12s (bytes) \n",
                decimalString(drive[1].part[1].sectors * drive[1].part[1].bps)
);

        fprintf(stderr, "                       %12s (sectors) \n",
                decimalString(drive[1].part[1].sectors) );
   }
   fprintf(stderr, "\n");


 GET_USER_SELECTION:
   if( (errorCode =
        getUserSelection( &selection, &physicalDrives, logicalDrvNum,
        drive, &totalFrames )) != 0)
   {
      goto ERRORS;
   }


   switch (selection)
   {
      case (int)'1':
      case (int)'2':
         //fprintf(stderr, "Backing Up Drive");
         fprintf(stderr, "Hit A Key to Start Sending Calibrations\n"\
            "then,\n"\
                        "Hit Another Key to Begin Backup of Drive\n\n");
         errorCode = sendCalibrations();
         if( errorCode )goto ERRORS;

                setupFrame();   // Reset the fram

         //  Leave video in Graphics mode for Backup process
         //
                errorCode = backupDrive();
         if( errorCode )goto ERRORS;
         if(graphOpen)
         {
            closegraph();     // Return to Text mode
            graphOpen = 0;
                        }

                if(debugFlag)
                {
                        printf("\nBackup Statistics:\n");
                        printf("   Total Disk Blocks Read = %s\n",
                                decimalString(diskBlocksRead));
                        printf("   Total Disk Bytes  Read = %s\n",
                                decimalString((long)SECTORS_PER_READ * 512L * di
skBlocksRead));

                        printf("   Total Data Frames Sent = %s\n",
                                decimalString(dataFramesSent));
                        printf("   Total Data Bytes  Sent = %s\n",
                                decimalString( (long)NUM_LINES * (long)BYTES_PER
_LINE * dataFramesSent));
                }
                return(0);
```

Page 7

```
      case (int)'C':
                fprintf(stderr,
                        "Hit A Key to  START      Sending Calibrations\n"\
                        "\nthen,\n\n"\
                        "Hit A Key to  TERMINATE  Sending Calibrations\n\n");

         errorCode = sendCalibrations();
         if( errorCode )goto ERRORS;
         if(graphOpen)
         {
            closegraph();     // Return to Text mode
            graphOpen = 0;
         }
         return(0);

      case (int)'X':
      default:
         fprintf(stderr, "Exiting at User's Request");
         return(0);

   }

 FINIS:
   return(0);


 ERRORS:
   if(graphOpen) closegraph();

printf("(VBU): errorCode = %d\n", errorCode);

   switch(errorCode)
   {
      case 1:
                fprintf(stderr,
                        "Unable to Allocate Two 32K Byte Blocks\n"\
                        "This machine does not have sufficient memory\n");
         break;

      case 2:
                fprintf(stderr,
                        "Unable to Allocate Transfer Buffer With farmalloc()");
         break;

          case 3:
                fprintf(stderr,
                        "Illegal percentage value - must be in range (1-100)\n")
;
         break;

      case 4:
                fprintf(stderr,
                        "Unable to Determine the Graphics Hardware Environment\n
");
         break;

      case 5:
                fprintf(stderr,
                        "Error While Initializing the Graphics Hardware\n\n");
```

Page 8

```
        fprintf(stderr, "Graphics error: %s\n", grapherrormsg(saveError));
        fprintf(stderr, "File 'EGAVGA.BGI' must be accessable by application\n"
);
                fprintf(stderr,
                        "\n\nFOR DEVELOPERS ONLY\n"\
                        "Run 'bgiobj cga' to convert library to 'cgaf.obj'\n"\
                        "Run 'bgiobj egavga' to convert library to 'egavgaf.obj'
\n"\
                        "Then, run 'tlib graphics +cga +egavga'\n");
        break;

        case 6:
        fprintf(stderr, "Disk Read Error - 1\n");
        break;

     case 7:
        fprintf(stderr, "Disk Read Error - 2\n");
        break;

     case 8:
        fprintf(stderr, "Illegal switch value\n");
        break;

     case 9:
        fprintf(stderr, "Disk Read Error - 3\n");
        break;

     case 10:
        fprintf(stderr, "2nd Drive Was Not Found On System\n");
        break;

     case 11:
        fprintf(stderr, "This Is Not A Legal Entry - Please Try Again\n");
                break;

     case 12:
        fprintf(stderr, "Terminating At User's Request\n");
        break;

     case 13:
        fprintf(stderr, "Unable To Register Graphics Driver\n");
        break;

     case 14:
        fprintf(stderr, "Unable To Register Graphics Fonts\n");
        break;

     default:
        fprintf(stderr, "Unknown Error %d\n", errorCode);
        break;
  }

  fprintf(stderr,
        "T E R M I N A T I N G\n"\
        "\n"\
        "Any Data Which Has Been Collected is UN-RELIABLE\n"\
        "For Valid Data to Be Collected, VBU Must Be Re-Run\n");

  return(-1);
```

Page
9

Page 1

```
/////////////////////////////////////////////////////////////
//
//   [ writScan.c ]
//
//   Functions to write & read a single VBU scan line.
//   Only the 'data' field is affected by these functions
//   and exactly 32 (16-bit) words of Manchester-encoded
//   data are transferred with each call.
//
//   Calling Sequences:
//
//      writScan(int line, unsigned *buf);  // write to VRAM
//      readScan(int line, unsigned *buf);  // read from VRAM
//
//   where,
//      line = the zero-relative scan line number to use
//             (the range of values is:  [0-479] for VGA)
//
//      buf  = the 64-byte (32 words) buffer used for the
//             transfer.
//
/////////////////////////////////////////////////////////////
#include <stdio.h>

#include "vbu.h"

static int i;
static unsigned far *vram16;

void writScan(int line, unsigned *buf)
{
   vram16 = (unsigned far *) MCGA_MEMORY + line * 40L + F_DATA;
   for(i=0; i<32; i++) *vram16++ = *buf++;
}


void readScan(int line, unsigned *buf)
{
   vram16 = (unsigned far *) MCGA_MEMORY + line * 40L + F_DATA;
   for(i=0; i<32; i++) *buf++ = *vram16++;
}
```

We claim:

1. A process for outputting digital data stored in a memory of a computer having a graphics display processor comprising:

reading digital data from the memory and processing the digital data to produce at least one serial data stream with the at least one serial data stream including the digital data and clock information, the clock information being a function of a clock signal representative of a rate at which the at least one serial data stream is outputted by a video channel;

serially outputting the at least one formatted serial data stream on the video channel under control of the graphics processor;

at least one of the at least one serial data stream also includes display information which permits the at least one serial data stream to be displayed by a video monitor connectable to the video channel;

processing at least one of the at least one serial data stream after outputting by the video channel to remove the display information from the processed at least one serial data stream; and producing the clock signal representative of a bit rate at which the at least one serial data stream is outputted by the video channel in response to the clock information in the one of the at least one serial data stream.

2. A process in accordance with claim 1 wherein:

one of the at least one serial data stream contains the clock signal and the display information and another of the at least one serial data stream contains the digital data and the display information.

3. A process in accordance with claim 1 wherein:

one of the at least one serial data stream includes the digital data with at least a portion of the one of the at least one serial data stream being encoded with self-clocking information which permits the clock signal representative of a rate at which the one of the at least one serial data stream is outputted by the video channel to be derived from processing at least the portion of the one of the at least one serial data stream outputted from the video channel.

4. A process in accordance with claim 3 further comprising:

processing the one of the at least one serial data stream to remove the self-clocking information.

5. A process in accordance with claim 4 further comprising:

the processing the one of the at least one serial data stream to remove the self-clocking information includes converting the one of the at least one serial data stream into parallel digital data having a number of bits corresponding to a number of bits stored at each addressable location of the memory from which the digital data was read.

6. A process in accordance with claim 3 wherein:

the at least one serial data stream is outputted in frames formatted for video display, each frame having a set number of lines with each line having bits disposed between periodically occurring horizontal synchronization information with at least a group of bits in each line being encoded with the self-clocking information;

the frames are outputted under control of the graphics display processor on the video channel and stored in another memory; and the frames stored in the another memory are read out from the another memory in response to detection of storing the set number of lines in the another memory.

7. A process in accordance with claim 4 further comprising:

the at least one serial data stream is outputted in frames formatted for video display, each frame having a set number of lines with each line having bits disposed between periodically occurring horizontal synchronization information with at least a group of bits in each line being encoded with the self-clocking information;

the frames are outputted under control of the graphics display processor on the video channel and stored in another memory; and the frames stored in the another memory are read out from the another memory in response to detection of storing the set number of lines in the another memory.

8. A process in accordance with claim 5 further comprising:

the at least one formatted serial data stream is outputted in frames formatted for video display, each frame having a set number of lines with each line having bits disposed between periodically occurring horizontal synchronization information with at least a group of bits in each line being encoded with the self-clocking information;

the frames are outputted under control of the graphics display processor on the video channel and stored in another memory; and the frames stored in the another memory are read out from the another memory in response to detection of storing the set number of lines in the another memory.

9. A process in accordance with claim 6 wherein:

each frame is being stored in one of a first and a second frame buffer of the another memory while another frame is being read out of another of the first and second frame buffer with sequential frames stored in the another memory being read out alternatively from the first and second frame buffers during storing of sequential frames outputted on the video channel.

10. A process in accordance with claim 7 wherein:

each frame is being stored in one of a first and a second frame buffer of the another memory while another frame is being read out of another of the first and second frame buffer with sequential frames stored in the another memory being read out alternatively from the first and second frame buffers during storing of sequential frames outputted on the video channel.

11. A process in accordance with claim 8 wherein:

each frame is being stored in one of a first and a second frame buffer of the another memory while another frame is being read out of another of the first and second frame buffer with sequential frames stored in the another memory being read out alternatively from the first and second frame buffers during storing of sequential frames outputted on the video channel.

12. A process in accordance with claim 6 further comprising:

the frames read out from the another memory in response to detection of the storing of the set number of lines in the another memory are stored in a memory of a processing system in response to an interrupt signal produced in response to the detection of the storing of set number of lines in the another memory.

13. A process in accordance with claim 7 further comprising:

the frames read out from the another memory in response to detection of the storing of the set number of lines in the another memory are stored in a memory of a processing system in response to an interrupt signal produced in response to the detection of the storing of set number of lines in the another memory.

14. A process in accordance with claim 8 further comprising:

the frames read out from the another memory in response to detection of the storing of the set number of lines in the another memory are stored in a memory of a processing system in response to an interrupt signal produced in response to the detection of the storing of set number of lines in the another memory.

15. A process in accordance with claim 9 further comprising:

the frames read out from the another memory in response to detection of the storing of the set number of lines in the another memory are stored in a memory of a processing system in response to an interrupt signal produced in response to the detection of the storing of set number of lines in the another memory.

16. A process in accordance with claim 10 further comprising:

the frames read out from the another memory in response to detection of the storing of the set number of lines in the another memory are stored in a memory of a processing system in response to an interrupt signal produced in response to the detection of the storing of set number of lines in the another memory.

17. A process in accordance with claim 11 further comprising:

the frames read out from the another memory in response to detection of the storing of the set number of lines in the another memory are stored in a memory of a processing system in response to an interrupt signal produced in response to the detection of the storing of set number of lines in the another memory.

18. A process in accordance with claim 4 wherein the one serial data stream comprises:

a sequence of frames with each frame being serially read out as a series of lines under control of the graphics display processor;

each frame is processed to remove the self-clocking information while retaining the digital data;

the processed frames are stored in a backup memory; and the frames stored in the backup memory are read back into the memory of the computer to restore the digital data originally stored in the memory of the computer.

19. A system for outputting digital data stored in a memory of a computer comprising:

a graphics display processor, coupled to the memory, for processing the digital data stored in the memory to produce at least one serial data stream including clock information, which is a function of a clock signal representative of a rate at which the at least one display formatted serial data stream is outputted, and display information for use in controlling a video monitor;

a video channel, coupled to the graphics display processor, for outputting the at least one serial data stream produced by the graphics display processor;

a data processing memory; and a data processing system, coupled to the video channel and to the data processing memory, for processing the at least one serial data stream in response to the clock information and for removing at least the display information and controlling storing of the at least one of the at least one serial data stream with the display information removed in the data processing memory which contains the digital data read from the memory of the computer system.

20. A system in accordance with claim 19 wherein:

one of the at least one serial data stream contains the clock signal and display information and another of the at least one serial data stream contains the digital data and the display information.

21. A system in accordance with claim 19 wherein:

one of the at least one serial data stream includes the digital data with at least a portion of the one of the at least one serial data stream being encoded with self-clocking information which permits the clock signal representative of a rate at which the one of the at least one serial data stream is outputted by the video channel to be derived from processing the portion of the one of the at least one serial data stream outputted from the video channel.

22. A system in accordance with claim 21 further comprising:

a storage processor memory; and a storage processor, coupled to the data processing system and to the storage processor memory, for controlling storing of data read out from the data processing memory in the storage processor memory in response to the data processor memory storing a data block of a set size.

23. A system in accordance with claim 22 wherein:

the set size is a full frame of information formatted by the graphics display processor for display by the video monitor.

24. A system in accordance with claim 23 wherein the at least one serial data stream encoded with self-clocking information comprises:

frames having a set number of lines and bits disposed between periodically occurring horizontal synchronization information with at least a group of bits in each line being encoded with the self-clocking information.

25. A system in accordance with claim 24 wherein:

each line is formatted into a packet including a sync field for use in detecting the clock signal and a data field containing data from the digital data stored in the memory of the computer; and the data processing system comprises a clock, responsive to the sync field, for producing the clock signal and a data separator, responsive to the clock signal and to the lines, for removing the self-clocking information and converting the lines into parallel digital data having a number of bits equal to a number of bits stored at each addressable location of the memory of the computer.

26. A system in accordance with claim 25 wherein:

each packet further includes a scan line field for encoding an address of each line within each frame and a trigger bit field for encoding a number of a frame within a sequence of frames outputted by the video channel; and each frame is outputted with a vertical synchronization pulse transmitted with each frame and a horizontal synchronization pulse transmitted with each line.

27. A system in accordance with claim 26 wherein the data processing memory comprises:

first and second frame buffers; and wherein when the trigger field changes in magnitude by one indicating storing of a complete frame from one of the sequence of frames in one of the frame buffers of the data processing memory, the data processing system causes the complete frame to be read out from the one of the first and second frame buffers and controls storing of another one of the frames in another of the first and second frame buffers of the data processing memory.

28. A system in accordance with claim 27 wherein:

the data processing system produces an interrupt in response to the change in magnitude of the trigger field by one; and in response to reception of the interrupt from the data processing system, the storage processor initiates storing of the frame read out from the one of the first and second frame buffers of the data processing memory in the storage processor memory.

29. A system in accordance with claim 28 wherein the storage processor memory comprises:

first and second frame buffers, each storage processor frame buffer storing a frame in response to the reception of the interrupt from the data processing system with the storage processor first and second frame buffers alternatively storing and outputting a frame.

30. A system in accordance with claim 29 wherein:

the storage processor memory is a backup memory and the storage processor writes frames stored in the storage processor memory back into the memory of the computer to restore the original digital data.

31. A system for backing up digital data stored in a memory of a computer comprising:

a graphics display processor, coupled to the memory, for processing the digital data stored in the memory to produce at least one serial data stream including the digital data and clock information which is a function of a clock signal representative of a rate at which the at least one serial data stream is outputted;

a video channel, coupled to the display processor, for outputting the at least one serial data stream produced by the graphics display processor; and a back up memory, coupled to the video channel, in which is written the at least one serial data stream from the video channel in a word format and provides the written digital data back to the memory to restore the digital data in the memory of the computer.

32. A system in accordance with claim 31 wherein the clock information comprises:

at least a portion of one of the at least one serial data stream encoded with self-clocking information which permits the clock signal to be derived from processing at least the portion of one of the at least one serial data stream.

33. A system in accordance with claim 31 wherein the at least one serial data stream further comprises:

display information for use in controlling a video monitor and the system further including a subsystem, coupled to the at least one serial data stream and the memory, for processing the at least one serial data stream to remove the display information, to reformat the at least one digital data stream into the word format having a format identical to a word format in which the digital data is stored in the memory and for forwarding the words to the backup memory for storage therein.

34. A process for outputting digital data stored in a memory of a computer having a graphics display processor comprising:

reading digital data from the memory and processing the digital data to produce at least one serial data stream with the at least one serial data stream including the digital data and clock information, the clock information being a function of a clock signal representative of a rate at which the at least one serial data stream is outputted by a video channel;

serially outputting the at least one formatted serial data stream on the video channel under control of the graphics processor; and wherein at least one of the at least one serial data stream comprises a sequence of frames with each frame being serially read out as a series of lines under control of the graphics display processor, each line being formatted into a packet including the clock information comprising a sync field used for producing the clock signal, a scan line field for encoding an address of each line within each frame, a trigger field for encoding a number of a frame within the sequence of frames being outputted on the video channel, and a data field containing data from the block of digital data; and wherein each frame is transmitted with a vertical synchronization pulse and a horizonal synchronization pulse is transmitted with each line.

35. A process in accordance with claim 34 wherein:

the sync field is processed to produce the clock signal; and the sequence of frames are processed with the clock signal to remove the clock information and to convert each packet into parallel information formatted into groups of bits with each group of bits being equal in number to a number of bits stored at each addressable location in the memory from which the block of digital data was read.

36. A process in accordance with claim 35 wherein:

the sequence of frames is stored in another memory having first and second frame buffers; and when the trigger field changes in magnitude by one indicating storing of a complete frame from one of the sequence of frames in one of the frame buffers of the another memory the complete frame is read out from the one of the first and second frame buffers and storing of a subsequent one of the frames is begun in another of the first and second frame buffers while the complete frame is being read out.

37. A process in accordance with claim 36 wherein:

an interrupt is produced in response to the change in magnitude of the trigger field by one; and the interrupt is received by a processing system which initiates storing of the frame read out from the one of the first and second frame buffers in response to the interrupt in a memory of the processor system.

38. A process in accordance with claim 27 wherein:

the memory of the processing system has first and second processing system frame buffers and the first and second processing system frame buffers store a sequence of frames in response to the interrupt to cause each of the first and second processing system frame buffers to alternatively store a frame.

39. A process for outputting digital data stored in a memory of a computer having a graphics display processor comprising:

reading digital data, without clock information, from the memory and processing the digital data to produce at least one serial data stream with the at least one serial data stream including the digital data and clock information, the clock information being a function of a rate at which the at least one serial data stream is outputted by a video channel and not being synchronization information used for controlling display of information from the video channel; and serially outputting the at least one serial data stream on the video channel under control of the graphics processor.

40. A process in accordance with claim 39 wherein:

the clock information is encoded into the digital data after reading of the digital data from the memory; and the clock information is used for processing the serial data stream to store the digital data in a word format in another memory.

41. A process in accordance with claim 39 wherein:

the clock information comprises another serial data stream separate from the digital data stream; and the clock information is used for processing the serial data stream to store the digital data in a word format in another memory.

42. A process in accordance with claim 40 wherein:

the word format is identical to a word format used to store the digital data in the memory; and reading the data stored in the another memory to restore the digital data stored in the memory.

43. A process in accordance with claim 41 wherein:

the word format is identical to a word format used to store the digital data in the memory; and reading the data stored in the another memory to restore the digital data stored in the memory.

* * * * *